United States Patent
Archetti et al.

(10) Patent No.: US 11,072,742 B2
(45) Date of Patent: Jul. 27, 2021

(54) LIQUID-CRYSTALLINE MEDIA HAVING HOMEOTROPIC ALIGNMENT

(71) Applicant: MERCK PATENT GMBH, Darmstadt (DE)

(72) Inventors: Graziano Archetti, Darmstadt (DE); Izumi Saito, Darmstadt (DE); Rocco Fortte, Frankfurt am Main (DE); Edward Plummer, Frankfurt am Main (DE); Dmitry Ushakov, Muenster (DE); Helmut Haensel, Muehltal (DE); Melanie Klasen-Memmer, Heuchelheim (DE)

(73) Assignee: MERCK PATENT GMBH, Darmstadt (DE)

( * ) Notice: Subject to any disclaimer, the term of this patent is extended or adjusted under 35 U.S.C. 154(b) by 103 days.

(21) Appl. No.: 16/225,694

(22) Filed: Dec. 19, 2018

(65) Prior Publication Data

US 2019/0185754 A1    Jun. 20, 2019

(30) Foreign Application Priority Data

Dec. 20, 2017  (EP) ..................... 17208758

(51) Int. Cl.
| C09K 19/30 | (2006.01) |
| C09K 19/56 | (2006.01) |
| C09K 19/12 | (2006.01) |
| C09K 19/04 | (2006.01) |
| C09K 19/34 | (2006.01) |

(52) U.S. Cl.
CPC .............. *C09K 19/56* (2013.01); *C09K 19/04* (2013.01); *C09K 19/12* (2013.01); *C09K 19/3003* (2013.01); *C09K 19/3098* (2013.01); *C09K 2019/0444* (2013.01); *C09K 2019/0448* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3078* (2013.01); *C09K 2019/3408* (2013.01)

(58) Field of Classification Search
CPC ....................................................... C09K 19/04
See application file for complete search history.

(56) References Cited

U.S. PATENT DOCUMENTS

| 9,726,933 | B2 | 8/2017 | Archetti |
| 9,809,748 | B2 | 11/2017 | Archetti |
| 9,868,904 | B2 | 1/2018 | Graziano |
| 10,131,841 | B2 | 11/2018 | Archetti et al. |
| 2007/0187644 | A1 | 8/2007 | Sasada |
| 2009/0103011 | A1 | 4/2009 | Bernatz |
| 2013/0182202 | A1 | 7/2013 | Graziano |
| 2013/0287970 | A1 | 10/2013 | Zhong |
| 2018/0171231 | A1 | 6/2018 | Archetti et al. |
| 2018/0208848 | A1 | 7/2018 | Archetti |
| 2018/0208849 | A1 | 7/2018 | Saito |

FOREIGN PATENT DOCUMENTS

| EP | 2883934 A1 * | 6/2015 | ......... C09K 19/0403 |
| EP | 2918658 A2 | 9/2015 | |
| EP | 2883934 B1 | 11/2019 | |
| WO | 2012038026 A1 | 3/2012 | |
| WO | 2013004372 A1 | 1/2013 | |
| WO | 2014094959 A1 | 6/2014 | |
| WO | 2016015803 A1 | 2/2016 | |
| WO | 2017013981 A1 | 1/2017 | |
| WO | 17041893 A1 | 3/2017 | |
| WO | 2017045740 A1 | 3/2017 | |
| WO | WO-2017041893 A1 * | 3/2017 | ....... G02F 1/133703 |

OTHER PUBLICATIONS

Office Action in corresponding EP application 18213334.8 dated Mar. 12, 2020 (pp. 1-4).

* cited by examiner

*Primary Examiner* — Chanceity N Robinson

(74) *Attorney, Agent, or Firm* — Millen White Zelano and Branigan, PC; Csaba Henter

(57) ABSTRACT

A liquid-crystalline media (LC media) containing a low-molecular-weight, non-polymer component, and a combination of self-alignment additives for vertical alignment of two or more of the specified kinds (formulae IA to IM). The combination of two or more self-alignment additives affect homeotropic (vertical) alignment of the LC media at a surface or the cell surfaces of a liquid-crystal display (LC display).

27 Claims, No Drawings ically controlled birefringence, the
LIQUID-CRYSTALLINE MEDIA HAVING HOMEOTROPIC ALIGNMENT The present invention relates to liquid-crystalline media (LC media) comprising a low-molecular-weight, non-polymer component, and a combination of self-alignment additives for vertical alignment selected from two or more of the specified kinds (formulae IA to IM). The combination of two or more self-alignment additives effects homeotropic (vertical) alignment of the LC media at a surface or the cell surfaces of a liquid-crystal display (LC display).

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leq -0.5$ in order to be suitable for use in high-information display elements based on the ECB effect. Electro-optical display elements based on the ECB effect have homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), and ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Considerable effort is associated with the production of VA displays having two or more domains of different preferential direction. It is an aim of this invention to simplify the production processes and the display devices themselves without giving up the advantages of VA technology, such as relatively short response times and good viewing-angle dependence.

VA displays which comprise LC media having positive dielectric anisotropy are described in S. H. Lee et al. Appl. Phys. Lett. (1997), 71, 2851-2853. These displays use inter-digital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. J. Appl. Phys. (2008), 104, 084515 (DSIPS: 'double-side in-plane switching' for improvements of driver voltage and transmission), M. Jiao et al. App. Phys. Lett (2008), 92, 111101 (DFFS: 'dual fringe field switching' for improved response times) and Y. T. Kim et al. Jap. J. App. Phys. (2009), 48, 110205 (VAS: 'viewing angle switchable' LCD). In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA-IPS technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity. VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display. Owing to possible interactions of this type, the number of suitable liquid-crystal components is considerably reduced. It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development is the so-called PS-VA (polymer-stabilized vertical alignment) or PSA (polymer sustained vertical alignment) displays, for which the term "polymer stabilized" is also occasionally used. The PS-VA displays are distinguished by the shortening of the response times without significant adverse effects on other parameters, such as, in particular, the favorable viewing-angle dependence of the contrast.

In these displays, a small amount (for example 0.3% by weight, typically <1% by weight) of one or more polymerizable compound(s) is added to the LC medium and, after introduction into the LC cell, is polymerized or crosslinked in situ, usually by UV photopolymerization, between the electrodes with or without an applied electrical voltage. The addition of polymerizable mesogenic or liquid-crystalline compounds, also known as reactive mesogens or "RMs", to the LC mixture has proven particularly suitable. PS-VA technology has hitherto been employed principally for LC media having negative dielectric anisotropy.

Unless indicated otherwise, the term "PS-VA" is used below as representative of PS-VA displays and PSA displays.

In the meantime, the PS-VA principle is being used in diverse classical LC displays. Thus, for example, PS-VA, PS-OCB, PS-IPS, PS-FFS and PS-TN displays are known. The polymerization of the polymerizable compound(s) preferably takes place with an applied electrical voltage in the case of PS-VA and PS-OCB displays, and with or without an applied electrical voltage in the case of PS-IPS displays. As can be demonstrated in test cells, the PS-VA method results in a 'pretilt' in the cell. In the case of PS-OCB displays, for example, it is possible for the bend structure to be stabilized so that an offset voltage is unnecessary or can be reduced. In the case of PS-VA displays, the pretilt has a positive effect on the response times. A standard MVA or PVA pixel and electrode layout can be used for PS-VA displays. In addition, however, it is also possible, for example, to manage with only one structured electrode side and no protrusions, which significantly simplifies production and at the same time results in very good contrast at the same time as very good light transmission.

PS-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J-Chen et al., Jpn. J. Appl. Phys. (2006), 45, 2702-2704 and S. H. Kim, L.-C-Chien, Jpn. J. Appl. Phys. (2004), 43, 7643-7647. PSA-IPS displays are described, for example, in U.S. Pat. No. 6,177,972 and Appl. Phys. Lett. (1999), 75(21), 3264. PSA-TN displays are described, for example, in Optics Express (2004), 12(7), 1221. PS-VA-IPS displays are disclosed, for example, in WO 2010/089092 A1.

Like the conventional LC displays described above, PS-VA displays can be operated as active-matrix or passive-matrix (PM) displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimization of the response times, but also of the contrast and luminance (i.e. also transmission), of the LC display is still sought after. The polymer stabilization method can provide crucial advantages here. In particular in the case of PS-VA displays, a shortening of the response times, which correlate with a pretilt which can be measured in test cells, can be achieved without significant adverse effects on other parameters.

In the prior art, polymerizable compounds of the following formula, for example, are used for PS-VA:

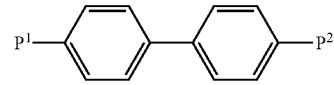

in which $P^{1/2}$ denotes a polymerizable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimize the image quality (viewing-angle dependence, contrast, response times) would therefore be desirable.

The documents WO 2012/038026 A1, WO2013004372 A1 or EP 2918658 A2 describe self-aligning mesogens (self-alignment additives) containing a hydroxyl group or another anchor group which is located on a mesogenic basic structure comprising two or more rings.

However, the existing approaches for obtaining VA display applications without polyimide layer give rise to further improvements.

The present invention relates to an LC medium comprising a low-molecular-weight, non-polymerizable liquid-crystalline component and a combination of self-alignment additives for vertical alignment selected from two or more of the formulae IA, IB, IC, ID, IE, IF, IG, IH, IJ, IK IL or IM:

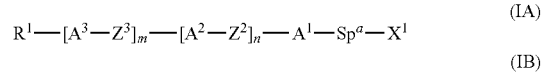

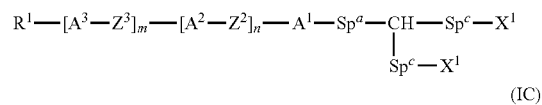

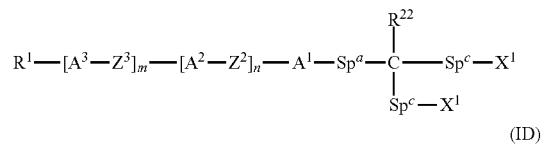

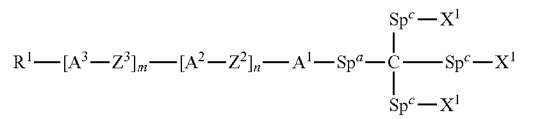

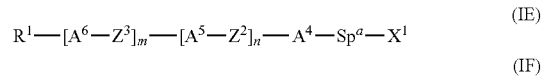

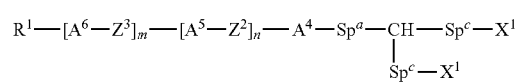

-continued

R¹—[A⁶—Z³]ₘ—[A⁵—Z²]ₙ—A⁴—Spᵃ—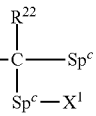—Spᶜ—X¹ (IG)

R¹—[A⁶—Z³]ₘ—[A⁵—Z²]ₙ—A⁴—Spᵃ—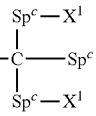—Spᶜ—X¹ (IH)

R¹—[A⁹—Z³]ₘ—[A⁸—Z²]ₙ—A⁷—Spᵃ—X¹ (IJ)

R¹—[A⁹—Z³]ₘ—[A⁸—Z²]ₙ—A⁷—Spᵃ——Spᶜ—X¹ (IK)

R¹—[A⁹—Z³]ₘ—[A⁸—Z²]ₙ—A⁷—Spᵃ—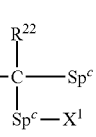—Spᶜ—X¹ (IL)

R¹—[A⁹—Z³]ₘ—[A⁸—Z²]ₙ—A⁷—Spᵃ—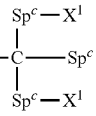—Spᶜ—X¹ (IM)

in which
A¹, A², A³ each, independently of one another, denote an aromatic, heteroaromatic, alicyclic or heterocyclic group, which may also contain fused rings, and which may also be mono- or polysubstituted by a group L,
A⁴, A⁵, A⁶ each, independently of one another, denote an aromatic, heteroaromatic, alicyclic or heterocyclic group, which may also contain fused rings, and which may also be mono- or polysubstituted by a group L or -Sp-P,
A⁷, A⁸, A⁹ each, independently of one another, denote an aromatic, heteroaromatic, alicyclic or heterocyclic group, which may also contain fused rings, and which may also be mono- or polysubstituted by a group L or -Sp-P,
P denotes a polymerizable group,
Sp denotes a spacer group (also called spacer) or a single bond,
wherein formulae IE to IH independently comprise one polymerizable group P each, and
wherein formulae IJ to IM independently comprise two or more polymerizable groups P each
L in each case, independently of one another, denotes H, F, Cl, Br, I, —CN, —NO₂, —NCO, —NCS, —OCN, —SCN, —C(=O)N(R⁰)₂, —C(=O)R⁰, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F or Cl,
Z², Z³ in each case, independently of one another, denotes a single bond, —O—, —S—, —CO—, —CO—O—, —O—CO—, —O—CO—O—, —OCH₂—, —CH₂O—, —SCH₂—, —CH₂S—, —CF₂O—, —OCF₂—, —CF₂S—, —SCF₂—, —(CH₂)ₙ₁—, —CF₂CH₂—, —CH₂CF₂—, —(CF₂)ₙ₁—, —CH=CH—, —CF=CF—, —C≡C—, —CH=CH—COO—, —O—CO—CH=CH—, —(CR⁰R⁰⁰)ₙ₁—, —CH(-Sp-P)—, —CH₂CH(-Sp-P)—, or —CH(-Sp-P)CH(-Sp-P)—, preferably a single bond,
n1 denotes 1, 2, 3 or 4,
R⁰ in each case, independently of one another, denotes alkyl having 1 to 12 C atoms,
R⁰⁰ in each case, independently of one another, denotes H or alkyl having 1 to 12 C atoms,
m denotes 0, 1, 2, 3, 4, 5 or 6, preferably 0, 1, 2 or 3,
n denotes 0 or 1, preferably 1,
R¹ denotes H, halogen, straight-chain, branched or cyclic alkyl having 1 to 25 C atoms, in which, in addition, one or more non-adjacent CH₂ groups may each be replaced by —O—, —S—, —CH=CH—, —C≡C—, —CO—, —CO—O—, —O—CO—, or —O—CO—O— in such a way that O and/or S atoms are not linked directly to one another and in which, in addition, one or more H atoms may each be replaced by F or Cl, or a group -Sp-P,
X¹, independently of one another, denotes —OH, —SH, —NH₂,
R²² denotes alkyl having 1 to 12 C atoms, and
Spᵃ, Spᶜ each, independently of one another, denote a spacer group or a single bond.

The LC medium preferably comprises an additional polymerized or polymerizable component, where the polymerized component is obtainable by polymerization of a polymerizable component. This component enables the LC medium and in particular its alignment to be stabilised and a desired pretilt optionally to be established. The polymerizable component preferably comprises one or more polymerizable compounds. Suitable polymerizable compounds are disclosed later below. Use is preferably made of those polymerizable compounds which are suitable for the PS-VA principle.

The invention furthermore relates to a liquid-crystal display (LC display) comprising an LC cell having two substrates and at least two electrodes, where at least one substrate is transparent to light and at least one substrate has one or two electrodes, and a layer of an LC medium according to the invention located between the substrates. The LC display is preferably one of the PS-VA type.

The invention furthermore relates to a method for effecting homeotropic alignment of a LC medium with respect to a surface delimiting the LC medium comprising adding to said medium a combination of two or more compounds selected from formulae (IA) to (IM).

A further aspect of the present invention is a process for the preparation of an LC medium according to the invention, which is characterized in that one or more self-alignment additives (compounds of the formula I) are mixed with a low-molecular-weight, liquid-crystalline component, and optionally one or more polymerizable compounds and optionally any other additional desired additives are added.

The invention furthermore relates to a process for the production of an LC display comprising an LC cell having two substrates and at least two electrodes, where at least one substrate is transparent to light and at least one substrate has one or two electrodes, comprising the process steps:
  filling of the cell with an LC medium according to the invention,
  optionally heating, and
  polymerization of any optional polymerizable component(s), optionally with application of a voltage to the cell or under the action of an electric field, in one or more process steps.

The use according to the invention of the self-alignment additives as additives of LC media is not tied to particular LC media. The LC medium or the non-polymerizable component present therein can have positive or negative dielectric anisotropy, preferably it has a negative one, which is suitable for VA type displays. Positive dielectric media with vertical alignment are also useful in displays, but require a different electrode setup. The LC medium is preferably nematic, since most displays based on the VA principle comprise nematic LC media.

The combination of self-alignment additives is introduced into the LC medium as additive. It effects homeotropic alignment of the liquid crystal with respect to the substrate surfaces (such as, for example, preferably a surface coated with ITO, or a metal surface). The combination of additive and LC mixture is very stable to elevated temperatures. No additional process step is needed for achieving the vertical alignment. In view of the investigations in connection with this invention, it appears that the anchoring element $X^1$ interacts with the substrate surface. This causes the alignment additive to interact with the substrate surface and to align and induce homeotropic alignment of the liquid crystal. The molecule fragment connected to the ring element $A^1$, such as the fragments -$Sp^a$-$X^1$

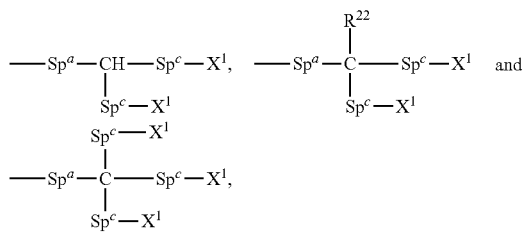

are referred to here as the anchor group (also abbreviated as group $R^a$).

The LC cell of the LC display according to the invention preferably has no alignment layer, in particular no polyimide layer for homeotropic alignment of the LC medium. The polymerized component of the LC medium is in this connection not regarded as an alignment layer. In the case where an LC cell nevertheless has an alignment layer or a comparable layer, this layer is, in accordance with the invention, not the cause of the homeotropic alignment.

Rubbing of, for example, polyimide layers is, in accordance with the invention, not necessary in order to achieve homeotropic alignment of the LC medium with respect to the substrate surface. The LC display according to the invention is preferably a VA display comprising an LC medium having negative dielectric anisotropy and electrodes arranged on opposite substrates. Alternatively, it is a VA-IPS display comprising an LC medium having positive dielectric anisotropy and interdigital electrodes arranged at least on one substrate.

The self-alignment additives according to the invention provide homeotropic alignment to ITO surfaces, metal surfaces or glass. The LC media comprising the combination of self-alignment additives according to the invention have advantageous stability at low temperature (LTS), improved spreading behaviour on the substrates, reduced ODF (one drop filling) mura, long-term stability, reliability, high VHR (voltage holding ratio) and improved control and stability of the tilt angle compared to a single self-alignment additive.

Reliability in this context includes the ability to perform the advantageous properties after thermal or UV stress or after ordinary aging.

The self-alignment additives of the formulae IA-IM are preferably employed in a concentration of less than 5% by weight in sum over all, particularly preferably ≤3% by weight and very particularly ≤1.5% by weight. Each additive is preferably employed in a concentration of at least 0.05% by weight, preferably at least 0.5% by weight. In sum over all additives preferably at least 0.1% by weight is used. The use of 0.1 to 1.5% by weight in sum of the self-alignment additives generally already results in completely homeotropic alignment of the LC layer in combination with the usual cell thicknesses (3 to 4 µm), with the conventional substrate materials and under the conventional conditions of the production processes of an LC display.

Preferred structures of the self-alignment additives IA to IM are disclosed in the following parts.

The anchor groups ($R^a$) contain by definition one, two or three groups $X^1$, which are intended to serve as bonding element to a surface. The spacer groups $Sp^a$ and $Sp^c$ are intended to form a flexible bond between the mesogenic group with rings, particularly ring $A^1$, and the group(s) $X^1$. The structure of the spacer group is therefore very variable and in the most general case of the formula IA to IM openly defined. The person skilled in the art will recognize that a multiplicity of possible variations of chains and even combined with rings come into question here. Preferably the spacer groups $Sp^a$ and $Sp$ consist of molecular structures without rings, such as aliphatic hydrocarbons, with optional heteroatoms (O, N, Si, S etc.), which are saturated or unsaturated (having e.g. C=C double bonds).

In the above-depicted anchor groups or in the general formula IA to IM preferably at least one of the groups $Sp^a$ and $Sp$ is present and is not a single group. In that sense an anchor group of formula $R^a$=—OH, which has no spacer group, is preferably not used, respectively preferably excluded from general formulae IA to IM.

Particularly preferably OH group containing anchor groups ($R^a$) are selected. Furthermore anchor groups are selected from the following part-formulae, where the group $R^a$ is bonded to the group $A^1$ of the formula I via the dashed bond:

The element -$Sp^a$-$X^1$ preferably stands for any of the structures selected from:

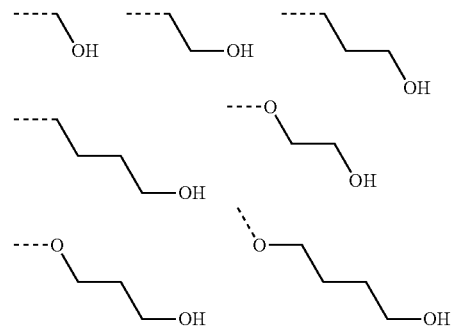

The element

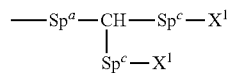

preferably stands for any of the structures selected from:
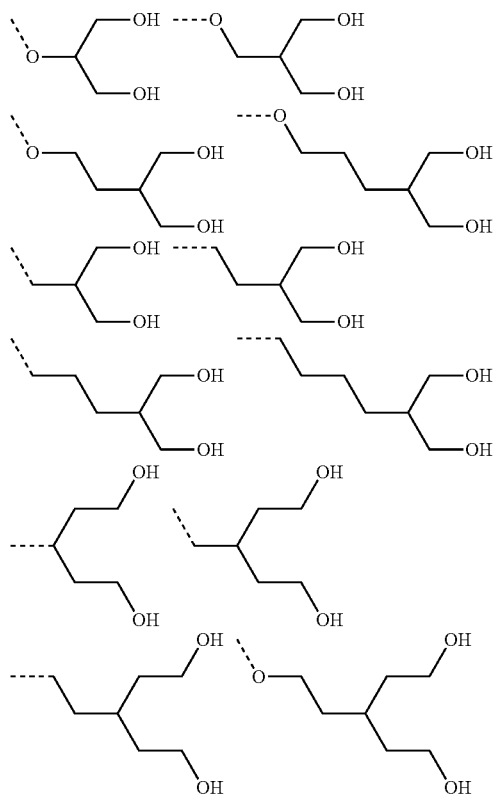
The element
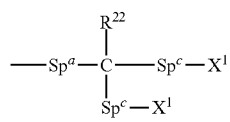
preferably stands for any of the structures selected from:
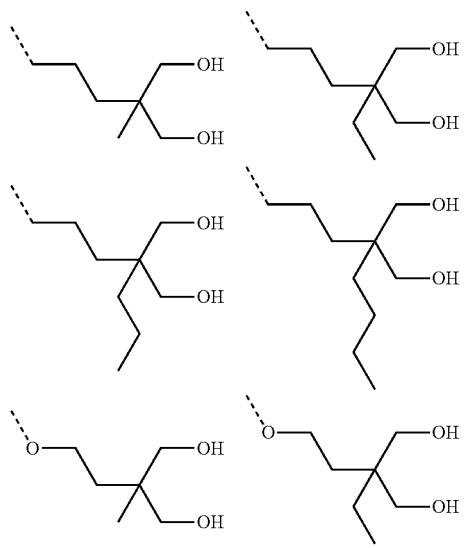
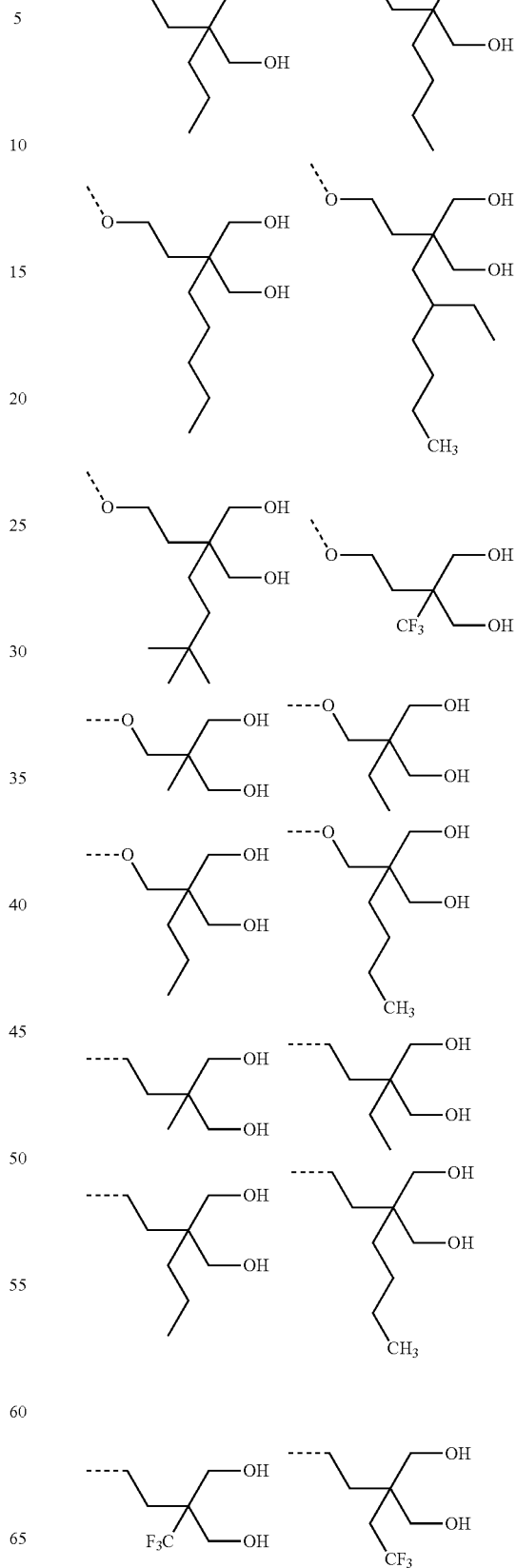

-continued

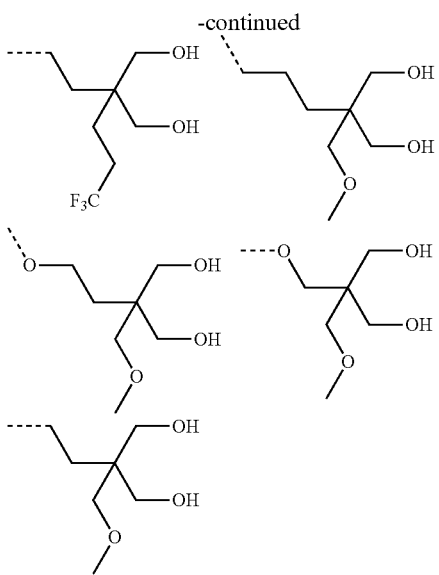

The element

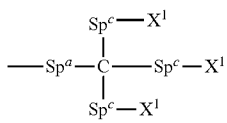

preferably stands for any of the structures selected from:

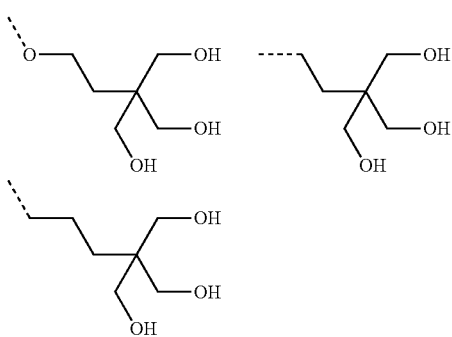

The term "spacer group" or "spacer", generally denoted by "Sp" (or Sp$^{a/c/d12}$) herein, is known to the person skilled in the art and is described in the literature, for example in Pure Appl. Chem. 73(5), 888 (2001) and C. Tschierske, G. Pelzl, S. Diele, Angew. Chem. (2004), 116, 6340-6368. In the present disclosure, the term "spacer group" or "spacer" denotes a connecting group, for example an alkylene group, which connects a mesogenic group to a polymerizable group. Whereas the mesogenic group generally contains rings, the spacer group is generally without ring systems, i.e. is in chain form, where the chain may also be branched. The term chain is applied, for example, to an alkylene group. Substitutions on and in the chain, for example by —O— or —COO—, are generally included. In functional terms, the spacer (the spacer group) is a bridge between linked functional structural parts which facilitates a certain spatial flexibility to one another.

The group Sp$^a$ preferably denotes a group selected from the formulae —CH$_2$—, —CH$_2$CH$_2$—, —OCH$_2$CH$_2$—, —CH$_2$CH$_2$CH$_2$—, —OCH$_2$CH$_2$CH$_2$—, —CH$_2$CH$_2$CH$_2$CH$_2$—, —OCH$_2$CH$_2$CH$_2$CH$_2$—, —CH$_2$CH$_2$OCH$_2$CH$_2$— or —OCH$_2$CH$_2$OCH$_2$CH$_2$—.

The group Sp$^c$ preferably denotes a group selected from the formulae —CH$_2$—, —CH$_2$CH$_2$—, —CH$_2$CH$_2$CH$_2$—, —CH$_2$CH$_2$CH$_2$CH$_2$— or —CH$_2$CH$_2$OCH$_2$CH$_2$—.

The ring groups A$^1$ to A$^9$ each independently preferably denote 1,4-phenylene, naphthalene-1,4-diyl or naphthalene-2,6-diyl, where, in addition, one or two CH groups in these groups may each be replaced by N, cyclohexane-1,4-diyl, in which, in addition, one or more non-adjacent CH$_2$ groups may each be replaced by O or S, 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl), where all these groups may be unsubstituted or mono- or polysubstituted by a group L, and A$^4$ to A$^6$ may additionally be substituted by a group -Sp-P, and A$^7$ to A$^9$ may additionally be substituted by one, two or three groups -Sp-P.

Particularly preferably, the groups A$^1$, A$^2$, A$^3$ each independently denote a group selected from
a) the group consisting of 1,4-phenylene and 1,3-phenylene, in which, in addition, one or more H atoms may be replaced by L,
b) the group consisting of trans-1,4-cyclohexylene, 1,4-cyclohexenylene and 4,4'-bicyclohexylene, in which, in addition, one or more non-adjacent CH$_2$ groups may each be replaced by —O— or —S— and in which, in addition, one or more H atoms may each be replaced by F or L. The groups A$^1$ and A$^2$ especially preferably denote a group from the above sub-group a). The groups A$^1$ and A$^2$ independently very particularly preferably denote 1,4-phenylene or cyclohexane-1,4-diyl, which may be mono- or polysubstituted by a group L. A$^1$ preferably denotes a group selected from the sub-group for definitions a), more preferably 1,4-phenylene.

Particularly preferably, the groups A$^4$, A$^5$, A$^6$, A$^7$, A$^8$, A$^9$ each independently denote a group selected from
a) the group consisting of 1,4-phenylene and 1,3-phenylene, in which, in addition, one or more H atoms may be replaced by L or -Sp-P,
b) the group consisting of trans-1,4-cyclohexylene, 1,4-cyclohexenylene and 4,4'-bicyclohexylene, in which, in addition, one or more non-adjacent CH$_2$ groups may each be replaced by —O— or —S— and in which, in addition, one or more H atoms may each be replaced by F, L, or -Sp-P. The groups A$^1$ and A$^2$ especially preferably denote a group from the above sub-group a). The groups A$^1$ and A$^2$ independently very particularly preferably denote 1,4-phenylene or cyclohexane-1,4-diyl, which may be mono- or polysubstituted by a group L or -Sp-P. A$^1$ preferably denotes a group selected from the sub-group for definitions a), more preferably 1,4-phenylene.

In the self-alignment additives of formula IA to IM the number of rings is preferably 2, 3 or 4, which for example is the case when n is 1 and m is 0, 1 or 2 in the formulae IA to IM.

In the formulae above and below the molecular part structure

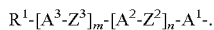

preferably is selected from the following part structures:

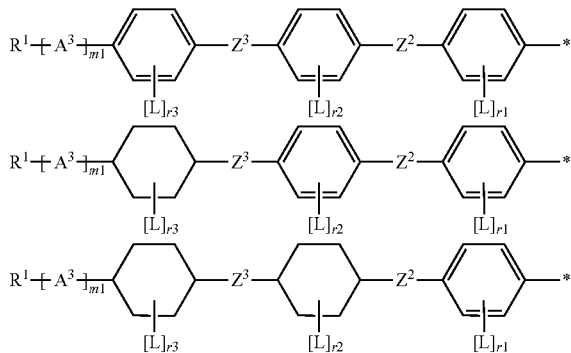

wherein the variable groups are defined as above,
L and $A^3$ independently are as defined for formula IA to ID,
$Z^2/Z^3$ independently are as defined above, and where $Z^2$ and $Z^3$ preferably independently denote a single bond or —$CH_2CH_2$— and very particularly a single bond,
m1 is 0 or 1,
and
r1, r2, r3 independently denote 0, 1, 2 or 3, preferably 0, 1 or 2.

In the formulae above and below the molecular part structure

preferably is selected from the following part structures:

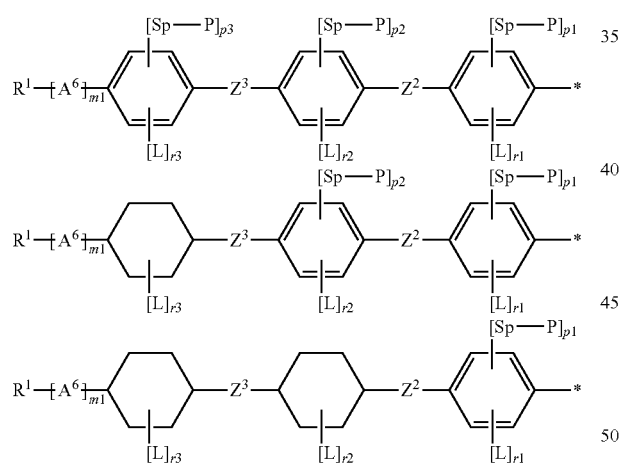

wherein the variable groups are defined as above, and the structures contain one polymerizable group P each,
L and $A^6$ independently are as defined for formula IE to IH,
$Z^2/Z^3$ independently are as defined above, and where $Z^2$ and $Z^3$ preferably independently denote a single bond or —$CH_2CH_2$— and very particularly a single bond,
m1 is 0 or 1,
p1, p2, p3 independently denote 0, 1 or 2, while p1+p2+p3 is 1, and
r1, r2, r3 independently denote 0, 1, 2 or 3, preferably 0, 1 or 2.

In the formulae above and below the molecular part structure

preferably is selected from the following part structures:

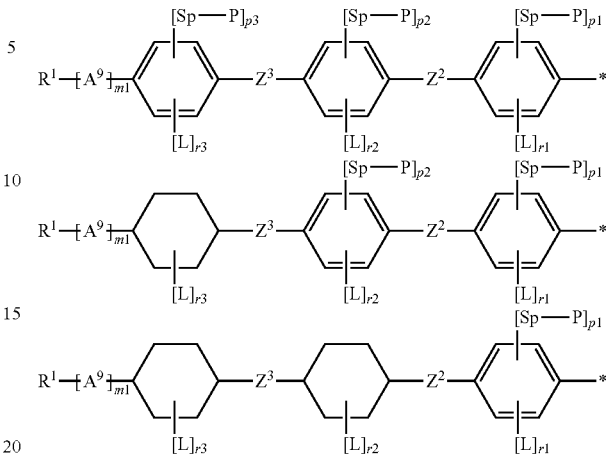

wherein the variable groups are defined as above, and the structures contain two or three polymerizable groups P each,
L and $A^9$ independently are as defined for formula IJ to IM,
$Z^2/Z^3$ independently are as defined above, and where $Z^2$ and $Z^3$ preferably independently denote a single bond or —$CH_2CH_2$— and very particularly a single bond,
m1 is 0 or 1,
p1, p2, p3 independently denote 0, 1 or 2, while p1+p2+p3 is 2 or 3, and
r1, r2, r3 independently denote 0, 1, 2 or 3, preferably 0, 1 or 2,
and more preferably of the part formulae

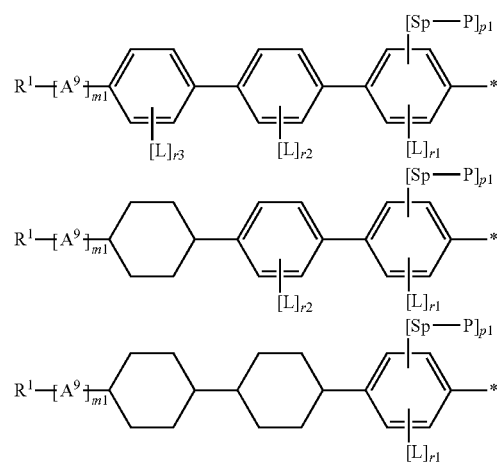

wherein
m1 is 0 or 1,
p1 denotes 2, and
r1, r2, r3 independently denote 0, 1, 2 or 3, preferably 0, 1 or 2.

In the following preferred combinations of two or more additives are disclosed.

In a preferred embodiment the LC media comprise preferably one or more compounds of each of formula IA and IB,

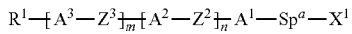 (IA)

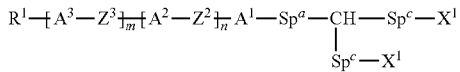 (IB)

whereby the formulae are defined as above.

In another embodiment of the current invention, preferred LC media comprise one or more compounds of the formulae IE and IJ

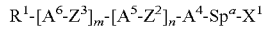 (IE)

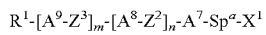 (IJ)

combined with one or more compounds selected from the formulae IF, IG, IK and IL:

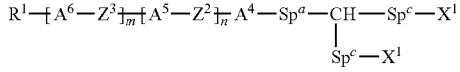 (IF)

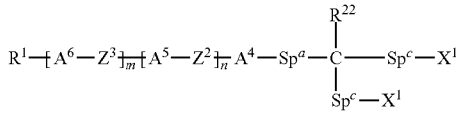 (IG)

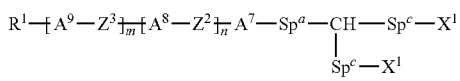 (IK)

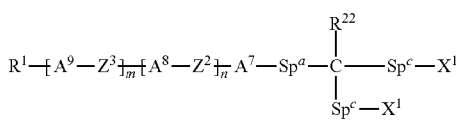 (IL)

whereby the formulae are defined as above. According to this embodiment the combined two or more additives vary from each other in the type of anchor groups, particularly the number of groups $X^1$, and optionally in other features. More preferably the LC media comprise one or more compounds of the formula IF and one or more compounds from the formula IE.

In a more preferred embodiment the LC media comprise one or more compounds of the formula IJ combined with one or more compounds selected from of the formulae IK and IL,

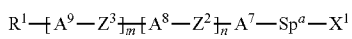 (IJ)

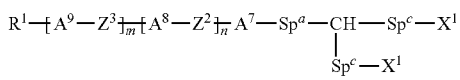 (IK)

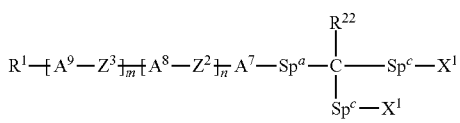 (IL)

whereby the formulae are defined as above. According to this embodiment the two or more additives with two polymerizable groups vary from each other in the number of polar groups $X^1$, and optionally in other features.

More preferably the LC media comprise one or more compounds of the formula IJ combined with one or more compounds from the formula IK,

 (IJ)

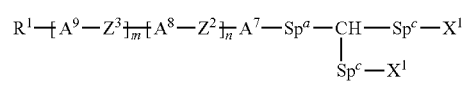 (IK)

whereby the formulae are defined as above.

The LC media comprise more preferably one or more compounds of each of the formulae IJ-1 and IK-1:

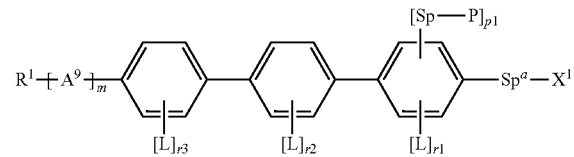
IJ-1

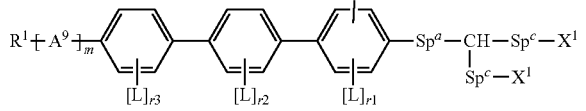
IK-1 in which in each case independently the variables are as defined as for formula IJ/IK above,
p1 denotes 2, and
r1, r2, r3 independently denote 0, 1, 2 or 3, preferably 0, 1 or 2.

In the above formulae the number r1+r2+r3 is preferably 1, 2, 3, or 4, more preferably 1, 2 or 3. More preferably the number r1+r2 is 1, 2 or 3. r is preferably 0.

The medium preferably comprises compounds of formula IJ in a concentration of 0.1 or more and less than 0.4% by weight. Further, the medium preferably comprises the one or more compounds of formula IK in a total concentration of 0.2 or more and less than 0.8% by weight.

In another embodiment of the current invention, preferred LC media comprise one or more compounds of the formulae IE and IF combined with one or more compounds selected from the formulae IJ, IK and IL:

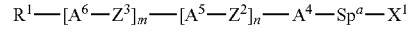 (IE)

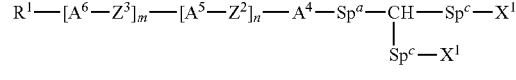 (IF)

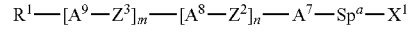 (IJ)

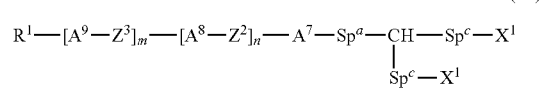 (IK)

-continued

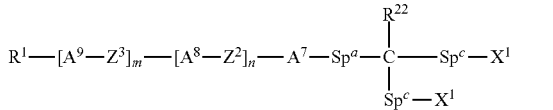
(IL)

whereby the formulae are defined as above. According to this embodiment the two or more additives vary from each other in the number of polymerizable groups P, and optionally in other features.

More preferably the LC media comprise one or more compounds of the formula IF and one or more compounds from the formula IK and IL,

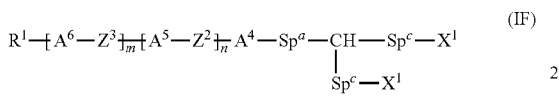
(IF)

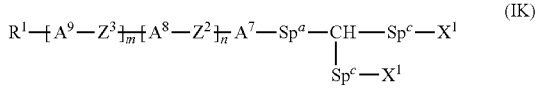
(IK)

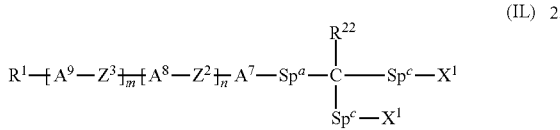
(IL)

or
the LC media comprise one or more compounds of the formula IE and one or more compounds from the formula IK and IL,

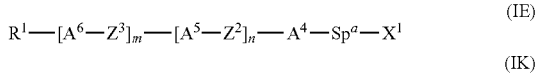
(IE)

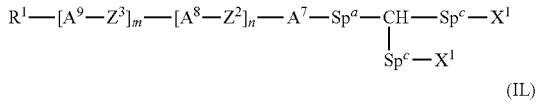
(IK)

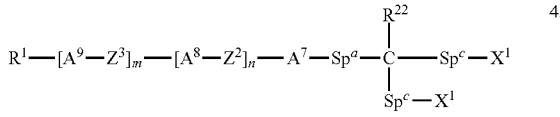
(IL)

In another embodiment of the current invention, preferred LC media comprise one or more compounds of the formulae IG and IL

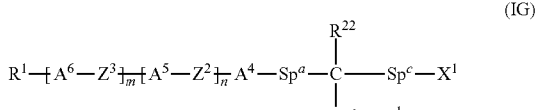
(IG)

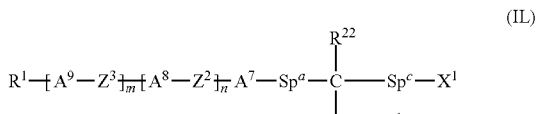
(IL)

combined with one or more compounds selected from the formulae IE, IF, IJ and IK:

$$R^1-[A^6-Z^3]_m-[A^5-Z^2]_n-A^4-Sp^a-X^1 \quad (IE)$$

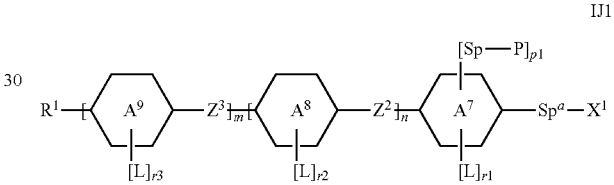
(IF)

(IJ)

(IK)

whereby the formulae are defined as above. According to this embodiment the two or more additives vary from each other in the kind of the anchor group having a group $R^{22}$ or not, and optionally in other features.

The compound of formula IJ is preferably a compound of the formula IJ1,

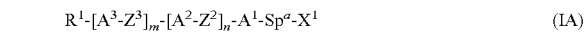
IJ1 in which
$R^1$, $A^7$, $A^8$, $A^9$, $Z^2$, $Z^3$, m, n, L, $Sp^a$, $X^1$, Sp and P independently are as defined for formula IJ,
p1 is 2, and
r1, r2, r3 independently are 0, 1, 2 or 3.

In another embodiment of the current invention, preferred LC media comprise one or more compounds of the formulae IA $$R^1\text{-}[A^3\text{-}Z^3]_m\text{-}[A^2\text{-}Z^2]_n\text{-}A^1\text{-}Sp^a\text{-}X^1 \quad (IA)$$

combined with one or more compounds selected from the formulae IK and IL:

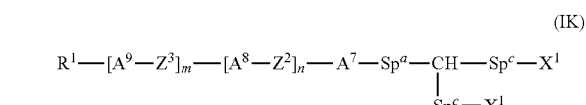
(IK)

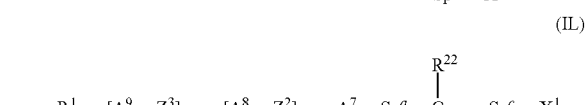
(IL)

whereby the formulae are defined as above. According to this embodiment the two or more additives vary from each other in their ability to be polymerized or not, and optionally in other features.

More preferably the compound of formula IJ is preferably a compound selected from the formulae IJ-1 to IJ-9:
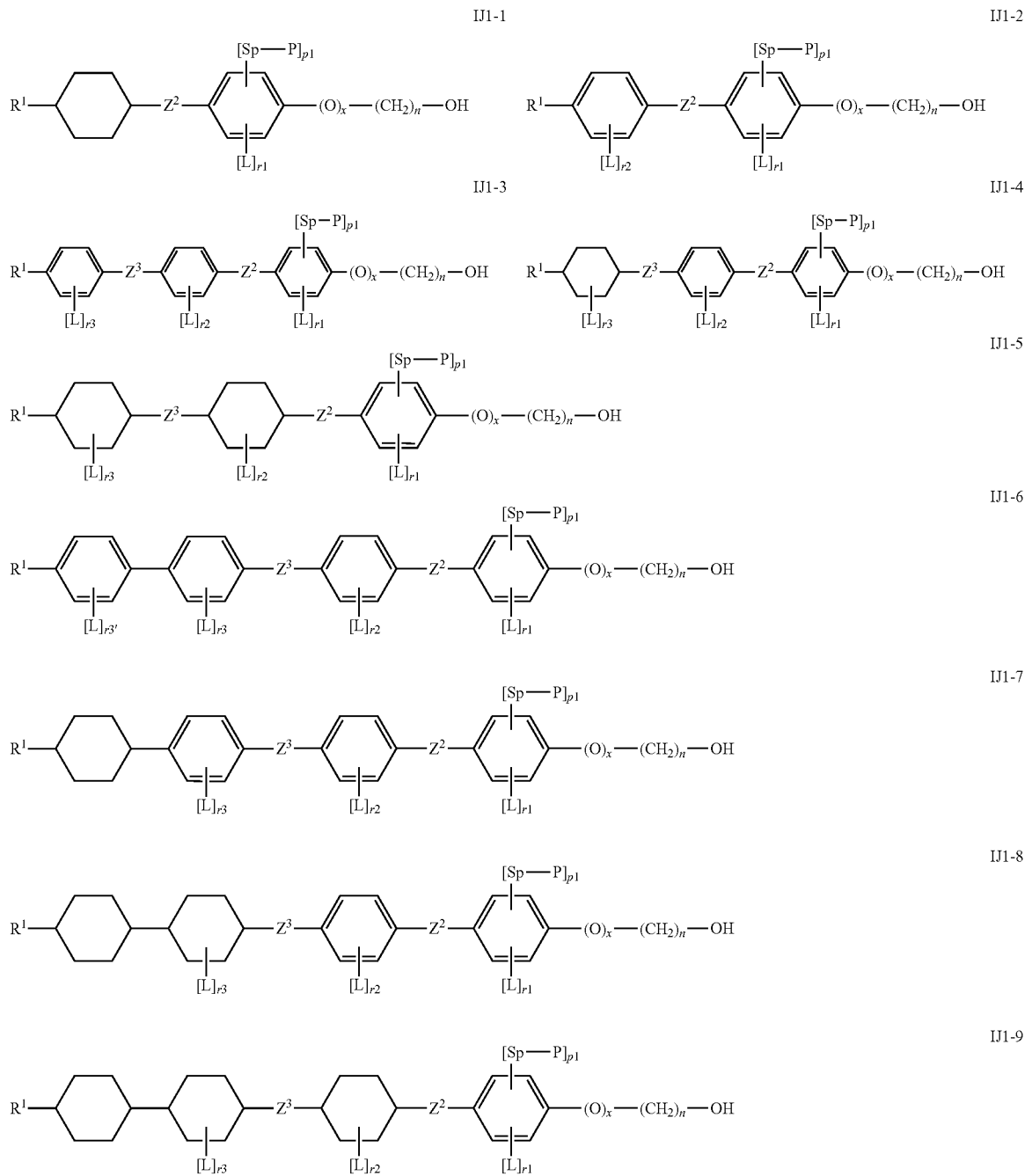
in which $R^1$, $Z^2$, $Z^3$, L, Sp and P independently are as defined for formula IJ, and
x is 0 or 1,
n is 1, 2, 3, 4, 5, 6, 7 or 8,
p1 is 2, and
r1, r2, r3, r3' independently denote 0, 1, 2 or 3.
The compound of formula IK is preferably a compound of the formula IK1,
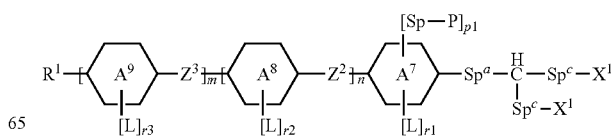

in which
R¹, A⁷, A⁸, A⁹, Z², Z³, m, n, L, Sp$^a$, Sp$^c$, X¹, Sp and P independently are defined as for the compound of formula IK,
p1 is 2, and
r1, r2, r3 independently are 0, 1, 2 or 3.
More preferably the compound of formula IK is preferably a compound selected from the formulae IK-1 to IK-9:
IK1-1
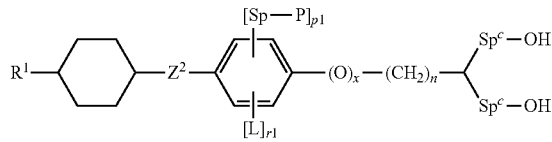
IK1-2
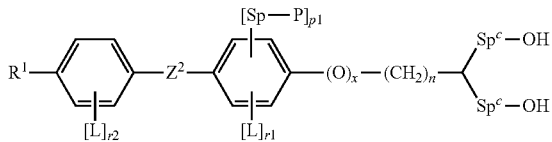
IK1-3
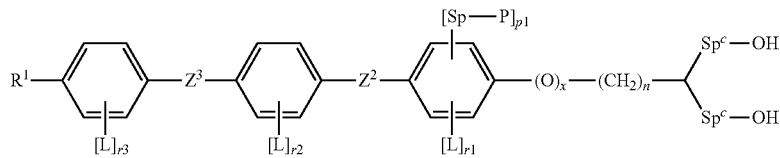
IK1-4
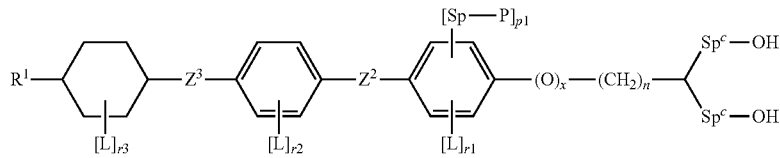
IK1-5
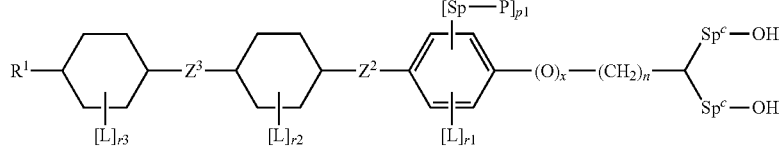
IK1-6
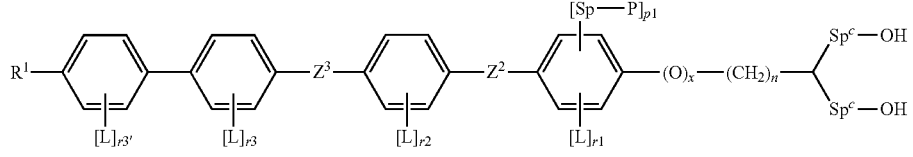
IK1-7
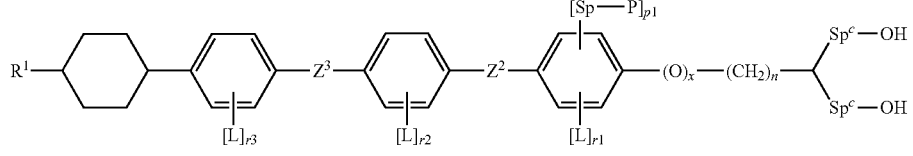
IK1-8
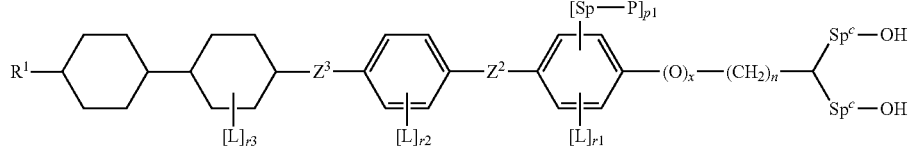
IK1-9
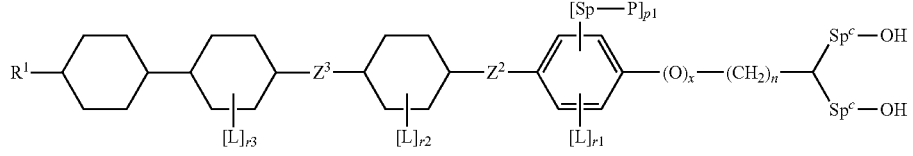

in which $R^1$, $Z^2$, $Z^3$, L, Sp, $Sp^c$ and P independently are as defined for formula IK, and
x is 0 or 1,
n is 1, 2, 3, 4, 5, 6, 7 or 8,
p1 is 2, and
r1, r2, r3, r3' independently denote 0, 1, 2 or 3.

Preferred are any of the following combinations of a first and a second self-alignment additive of formulae:
IA and IB,
IA and IC,
IB and IC,
IE and IF,
IE and IG,
IF and IG,
IJ and IK,
IJ and IG,
IJ and IL,
IK and IL,
IE and IJ,
IE and IK,
IE and IL,
IF and IJ,
IF and IK,
IG and IK
IG and IL and
IF and IL.

Further, in another or the same embodiment of the present invention, it is preferred to have alignment additives with one, two or more polymerizable groups (P) each. More preferably the LC media comprise a first and a second self-alignment additive, wherein the first alignment additive has exactly one polymerizable group P and the second alignment additive has exactly two polymerizable groups P, or the first alignment additive has exactly two polymerizable groups P and the second alignment additive has exactly one polymerizable group P, or both, the first and second self-alignment additive have exactly two polymerizable groups.

Particularly preferred LC media comprise a combination of compounds according to any of the preceding embodiments which compounds are selected from two or more of the following more closely defined formulae, and which formulae are each respectively preferred embodiments of the general formulae IA to IM:

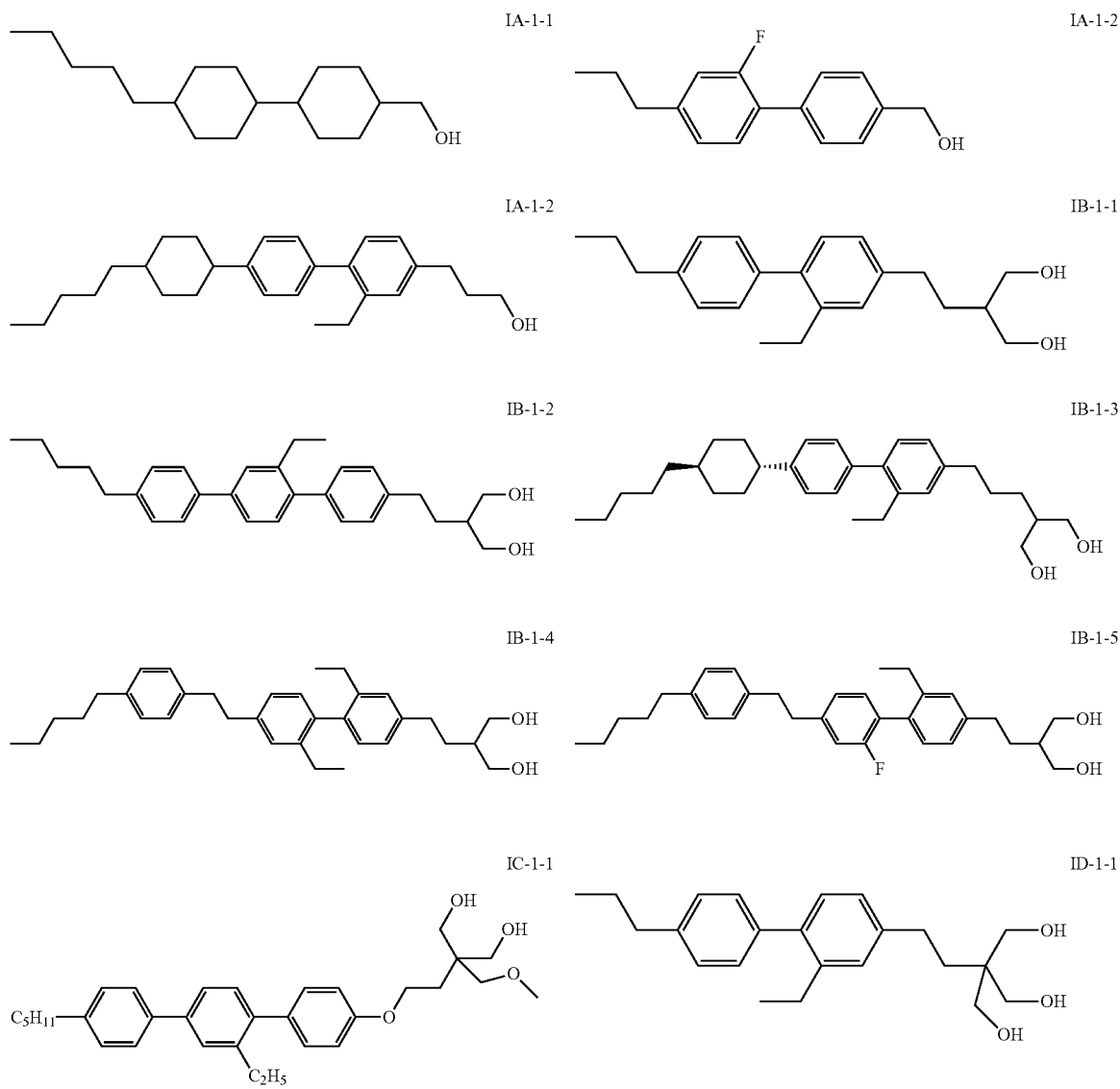

-continued
IE-1-1
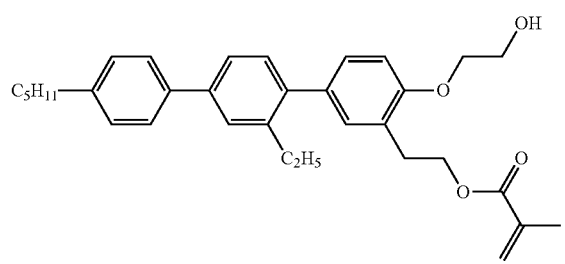
IF-1-1
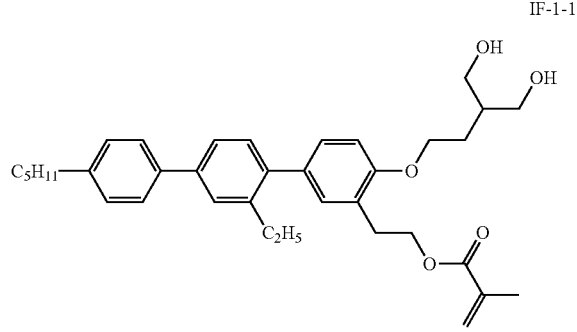
IF-1-2
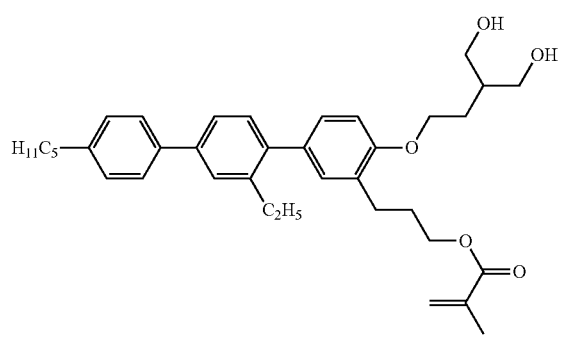
IF-1-3
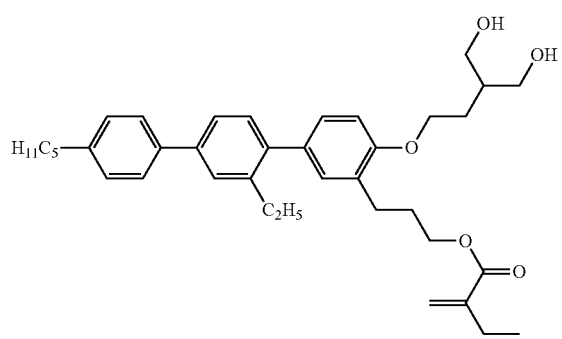
IF-4-1
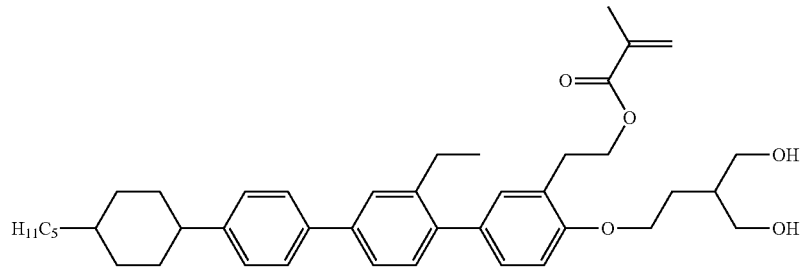
IF-4-2
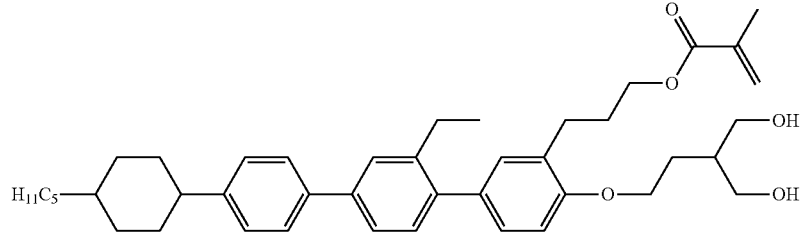
IG-1-1
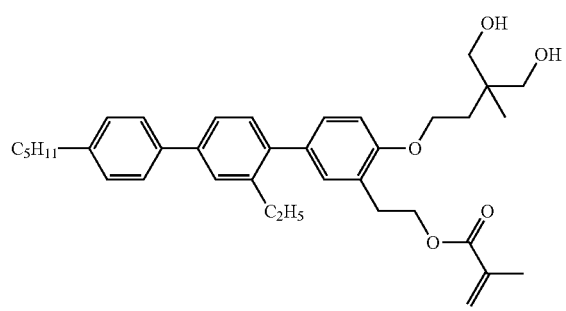
IG-1-2
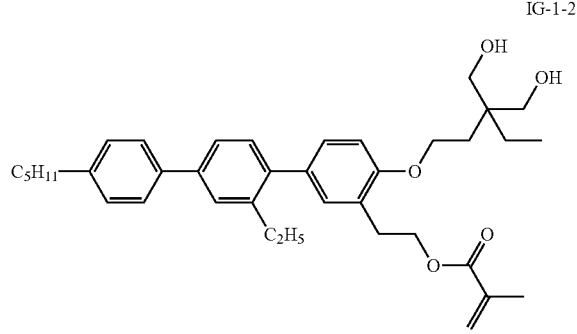

-continued
IG-1-3
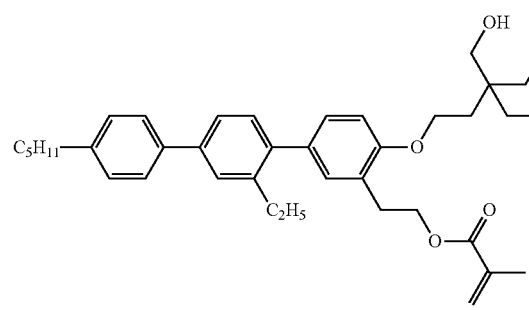
IG-1-4
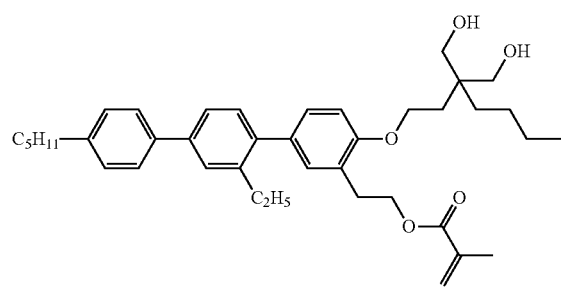
IG-1-5
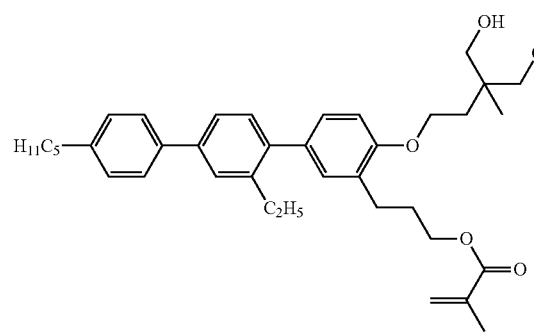
IG-1-7
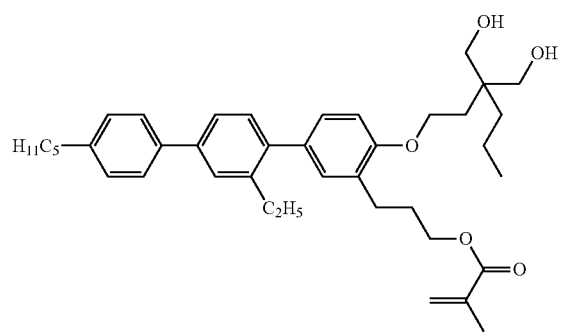
IG-1-8
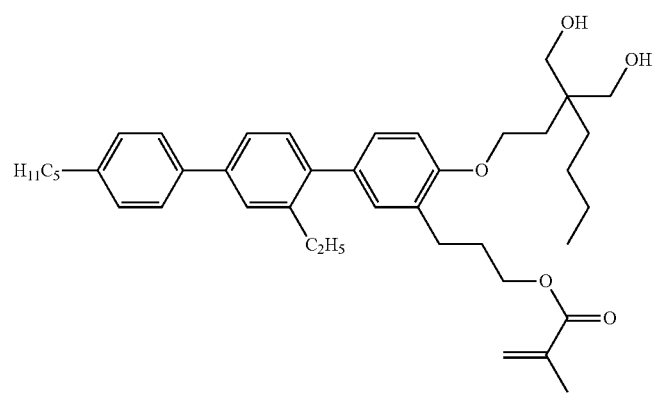
IG-2-1
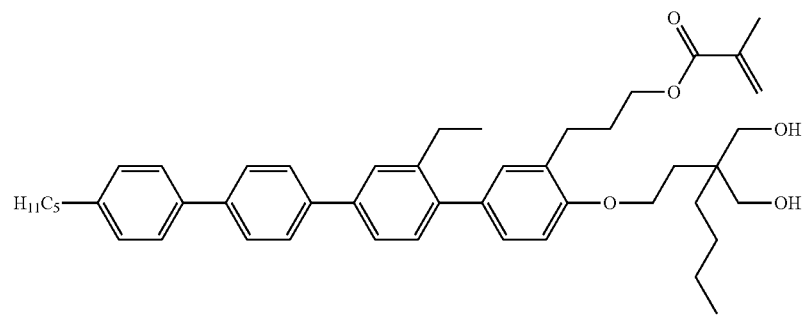

IG-3-1
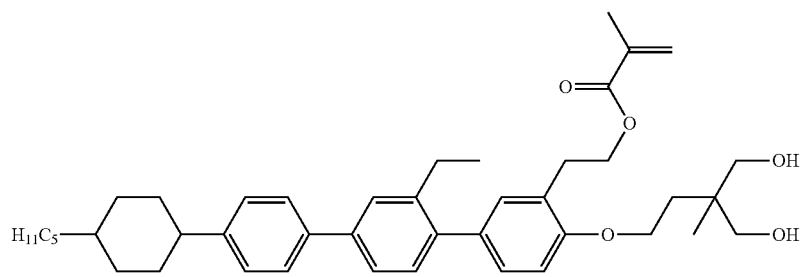
IG-3-2
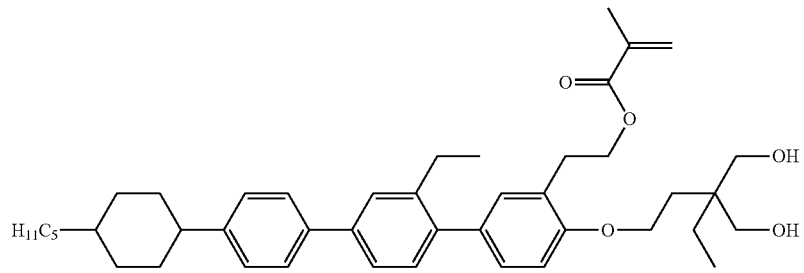
IG-3-4
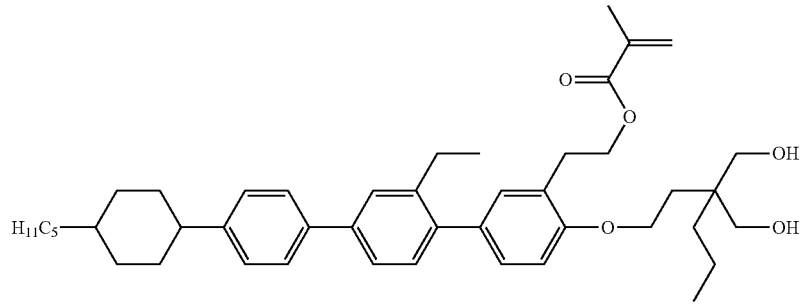
IG-3-5
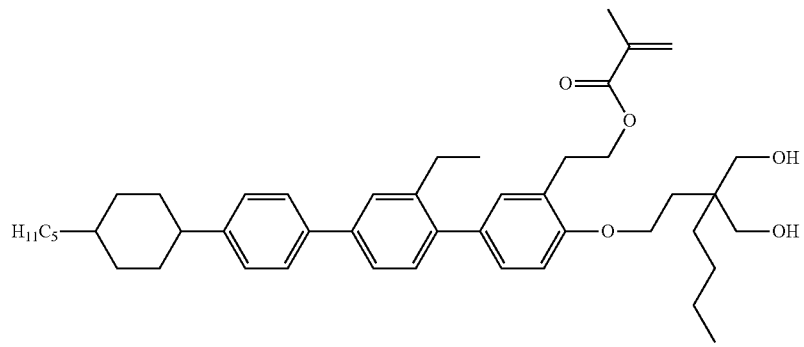
IG-3-6
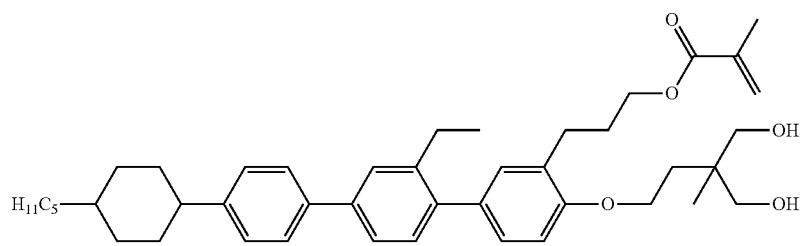

IG-3-7
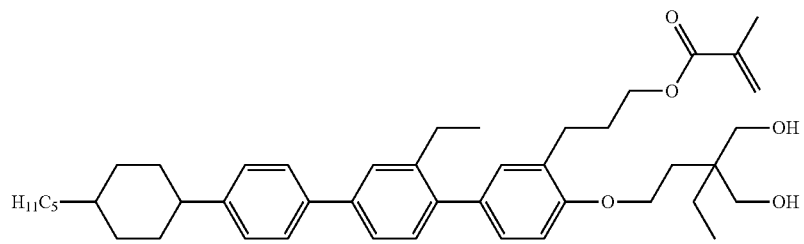
IG-3-8
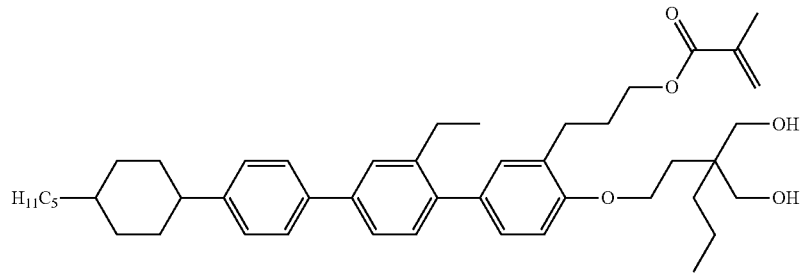
IG-3-9
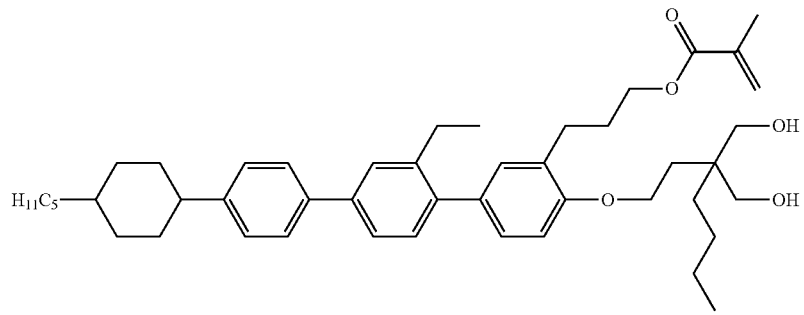
IH-1-1
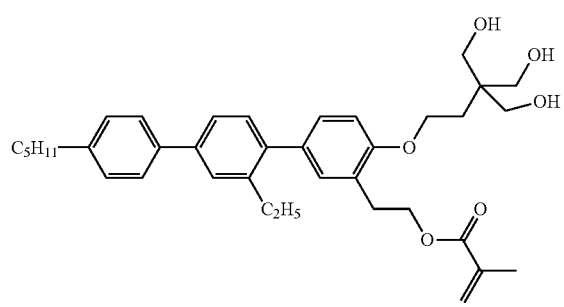
IJ-1-1
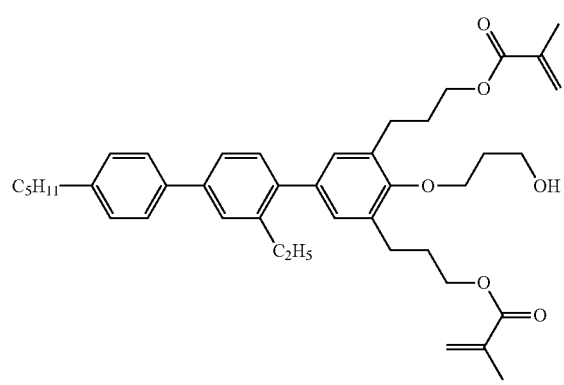
IJ-1-2
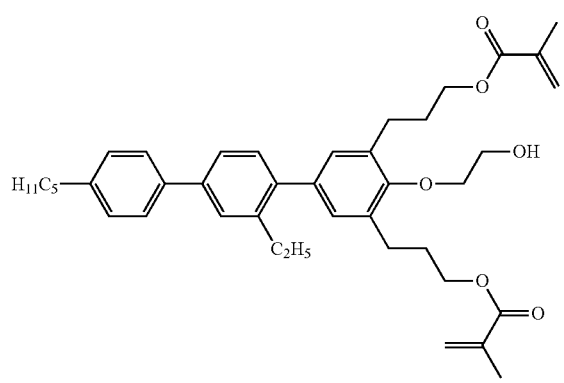
IJ-1-3
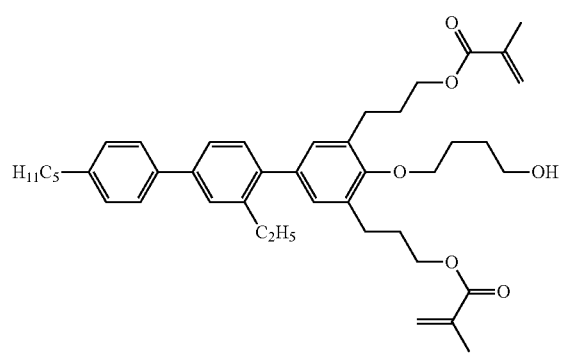

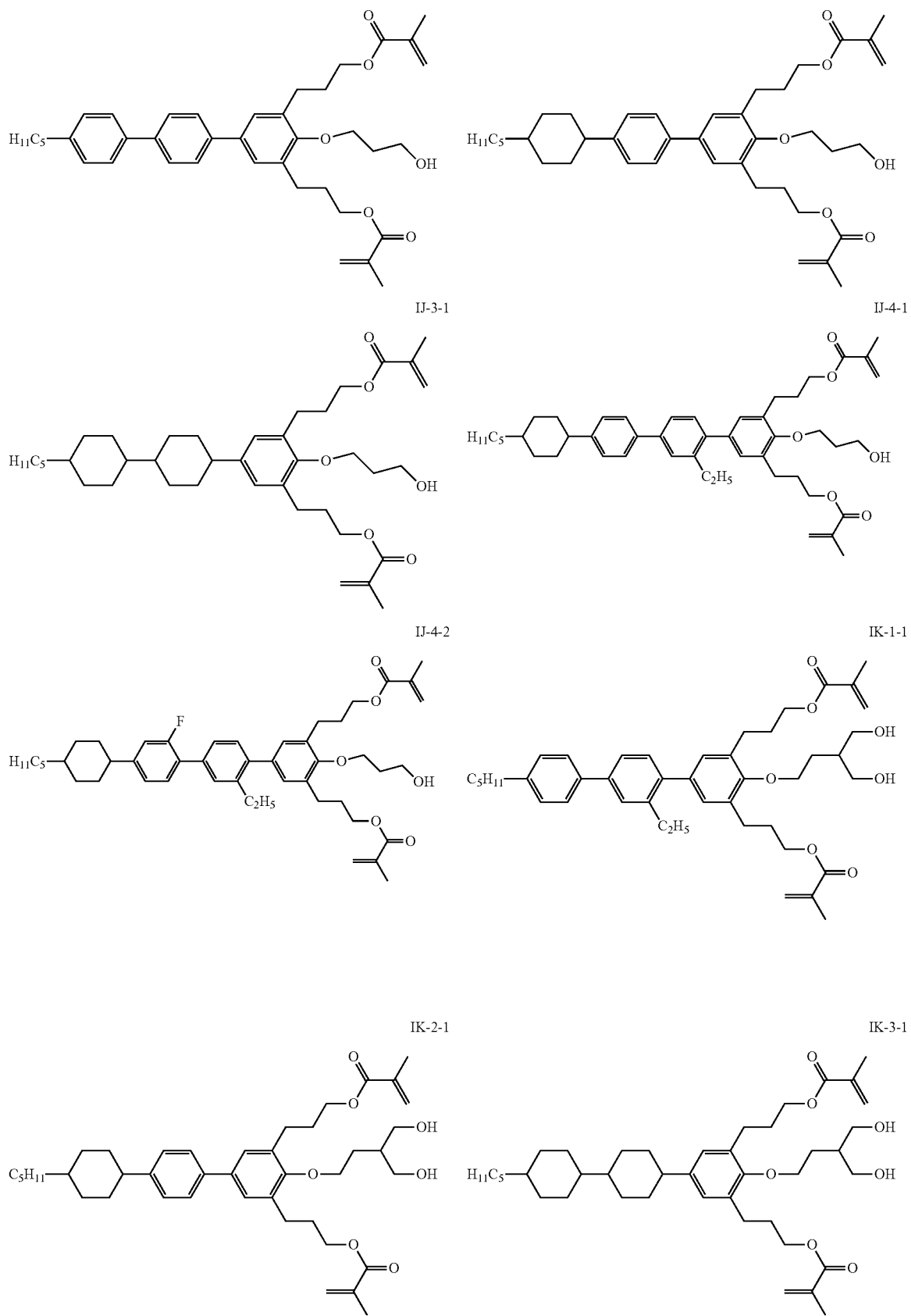

-continued
IK-4-1
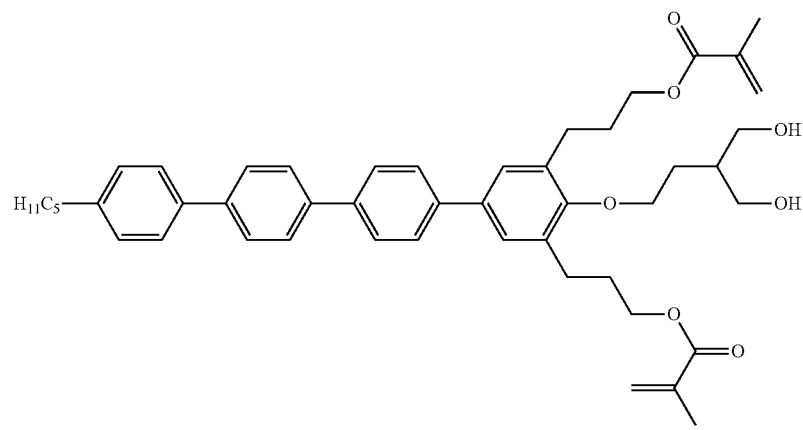
IK-4-2
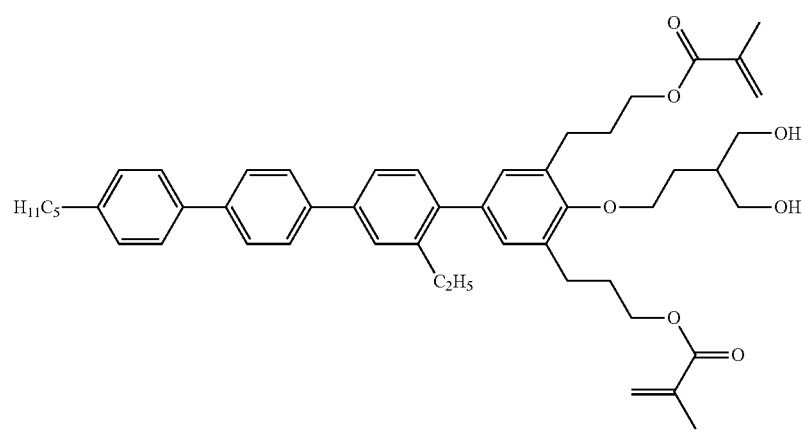
IK-4-3
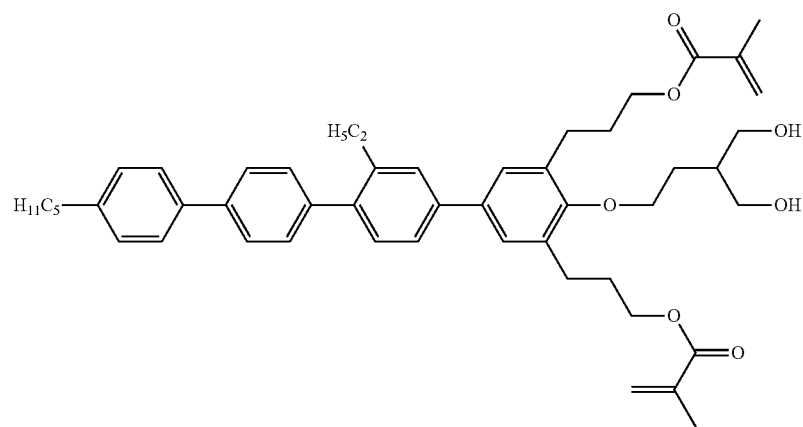

-continued
IK-4-4
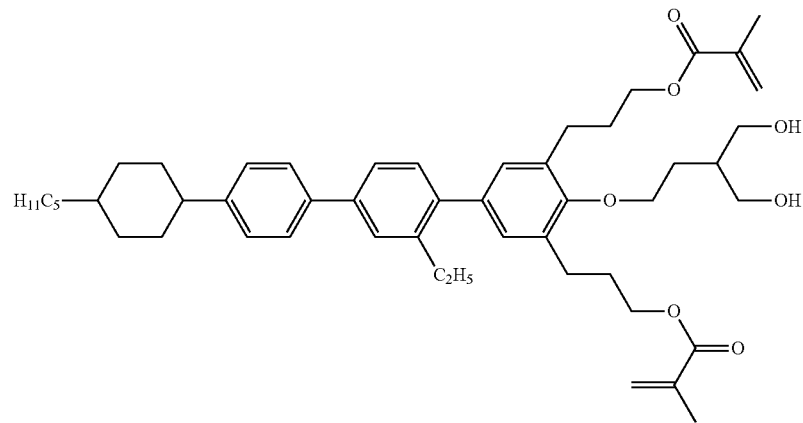
IK-4-5
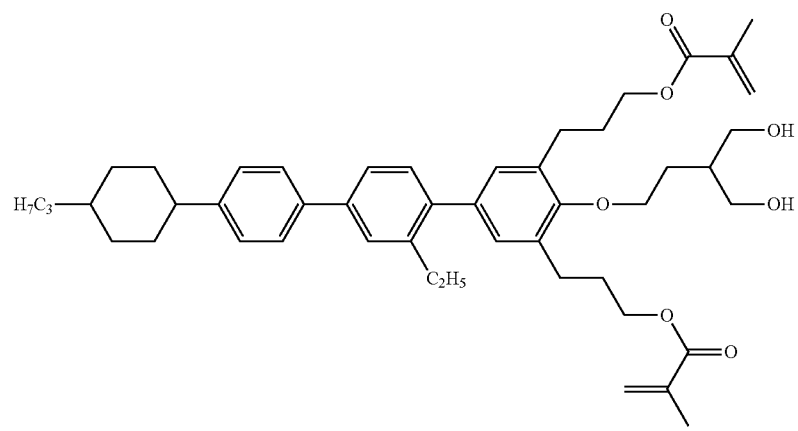
IK-4-6
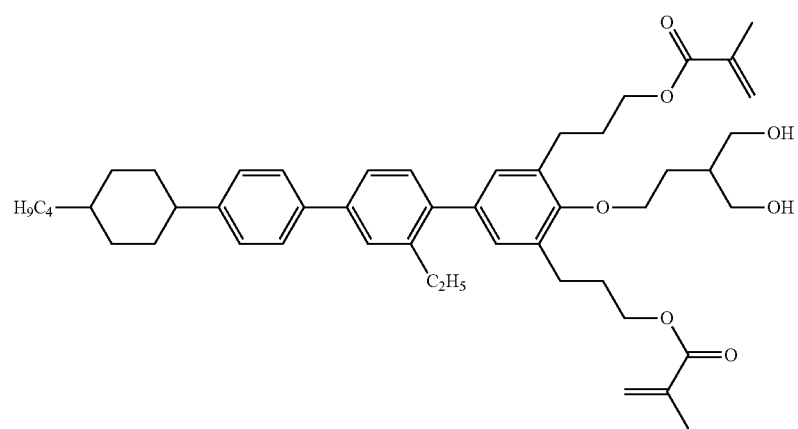

-continued
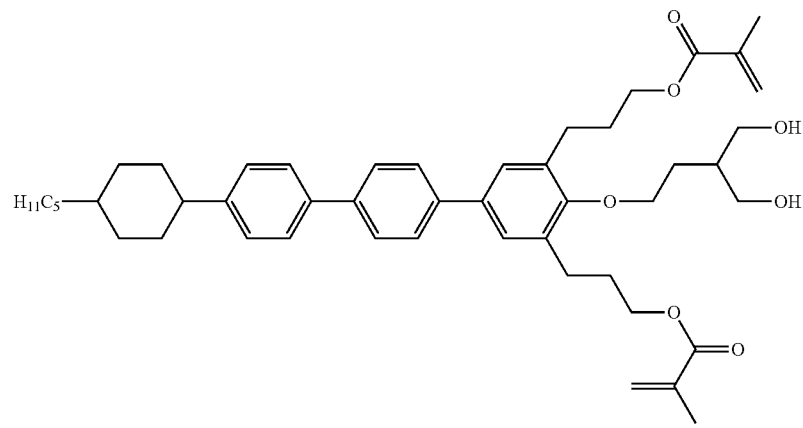
IK-4-7
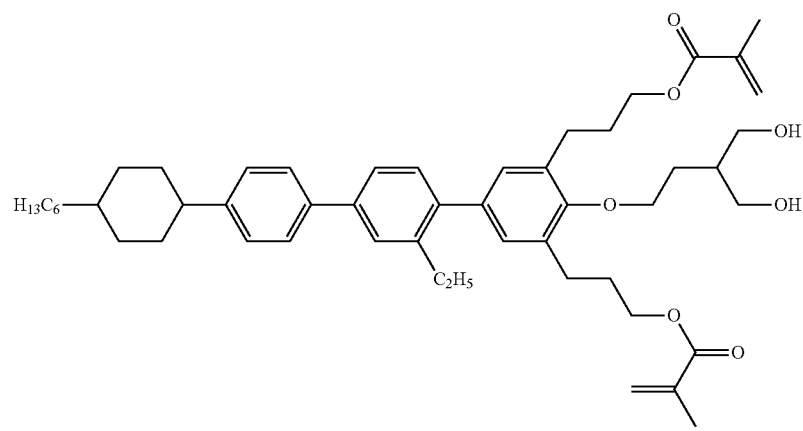
IK-4-8
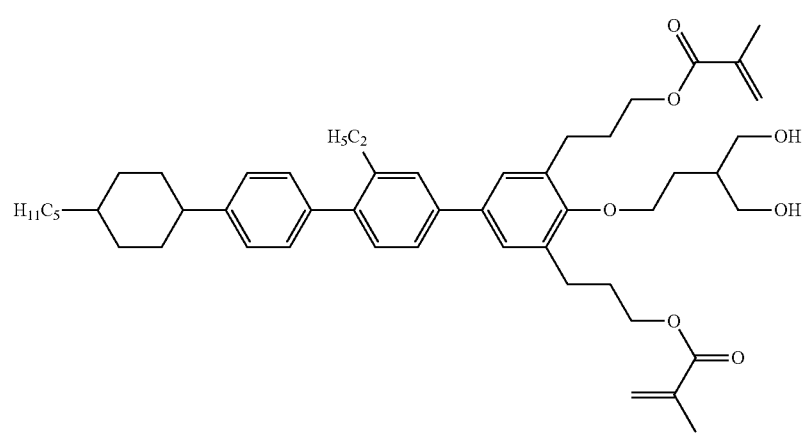
IK-4-9

-continued
IK-4-10
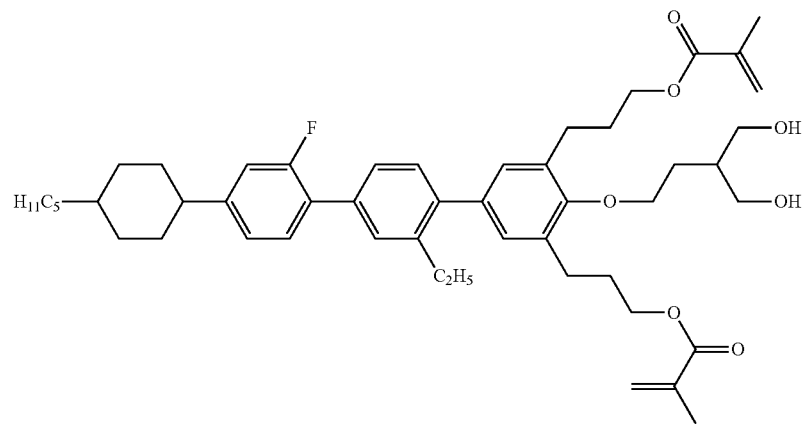
IK-4-11
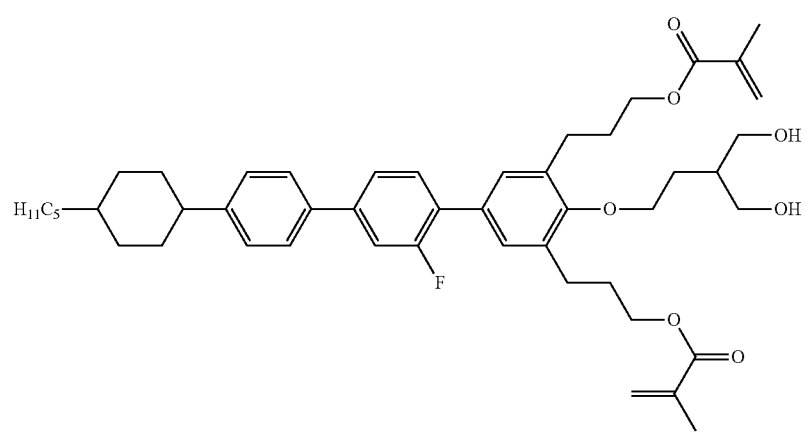
IK-4-12
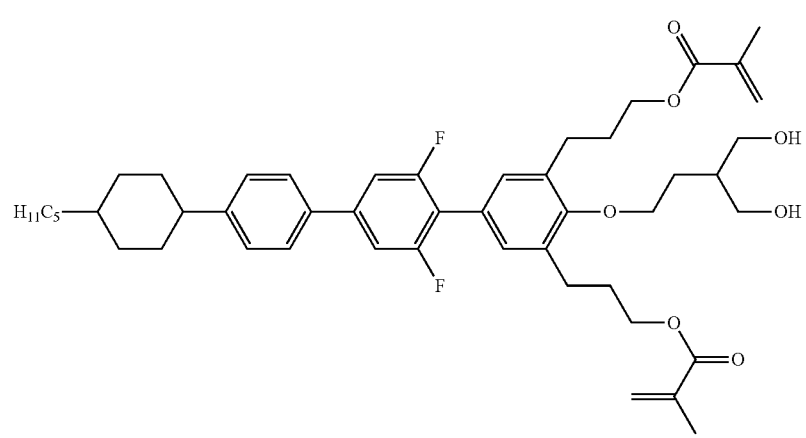

-continued
IK-4-13
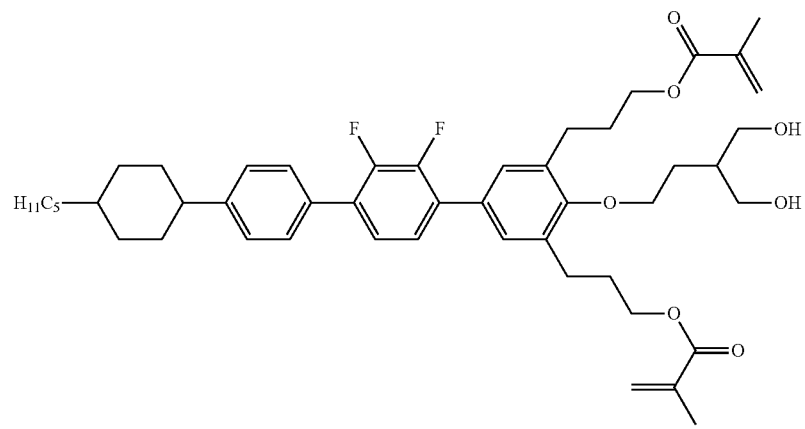
IK-4-14
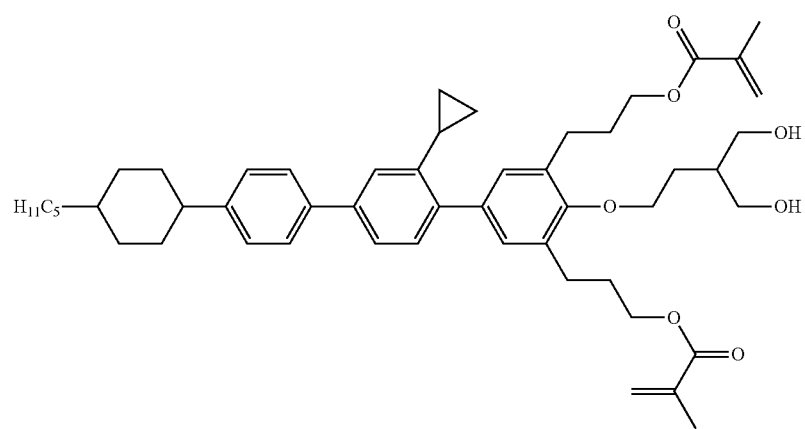
IK-5-1
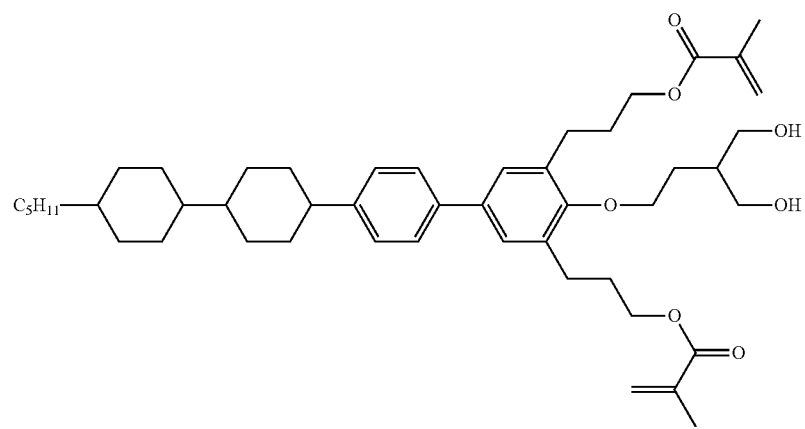

-continued
IK-5-2
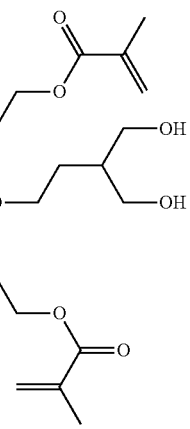
IL-1-1
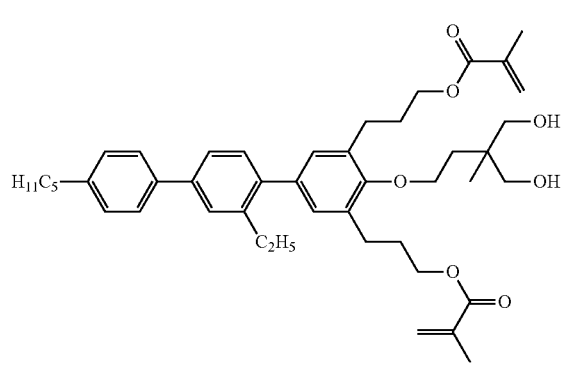
IL-1-2
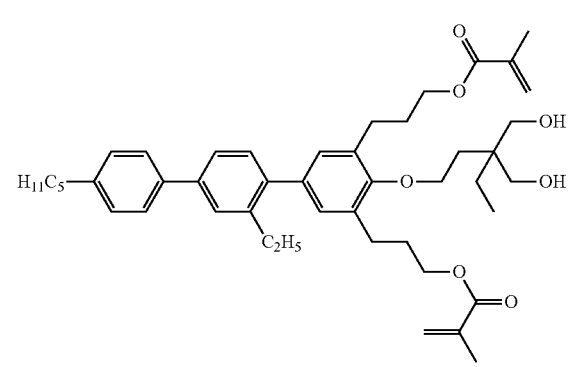
IL-1-3
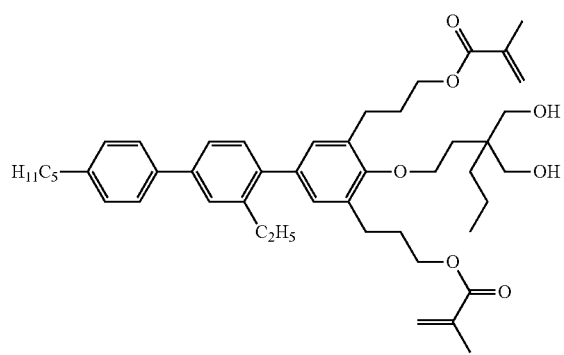
IL-1-4
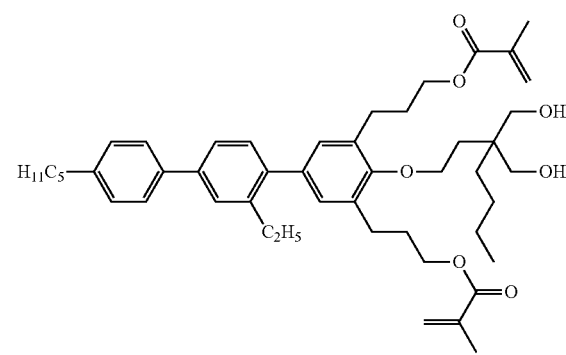
IL-2-1
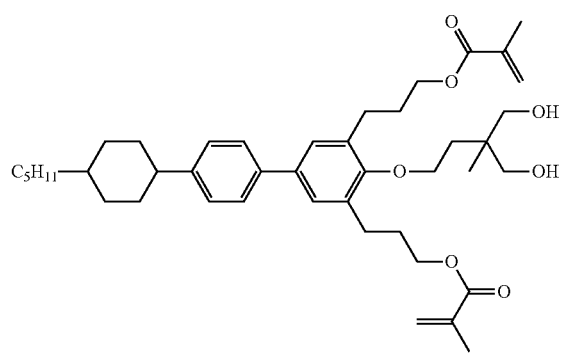
IL-3-1
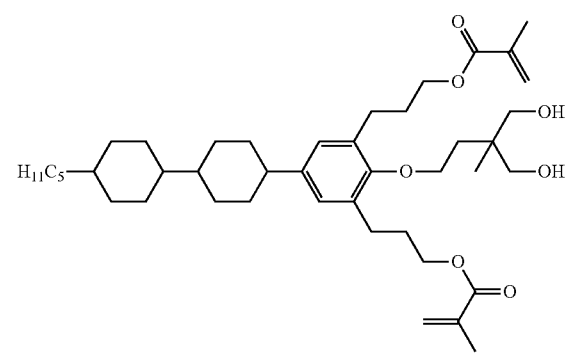

-continued
IL-3-2
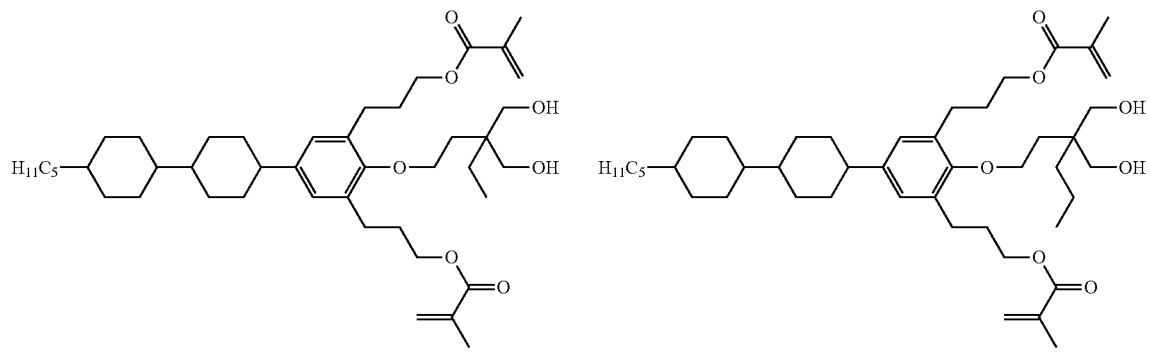
IL-3-3
IL-3-4
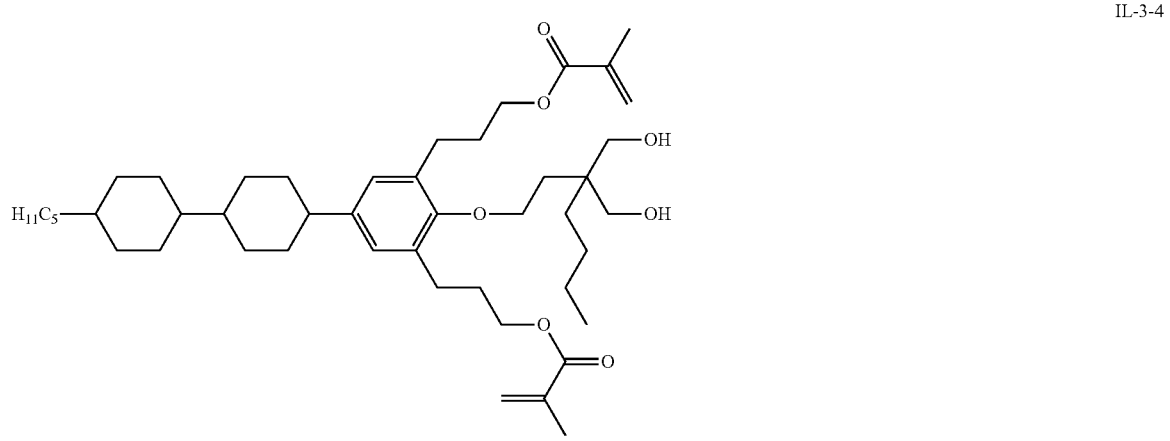
IL-4-1
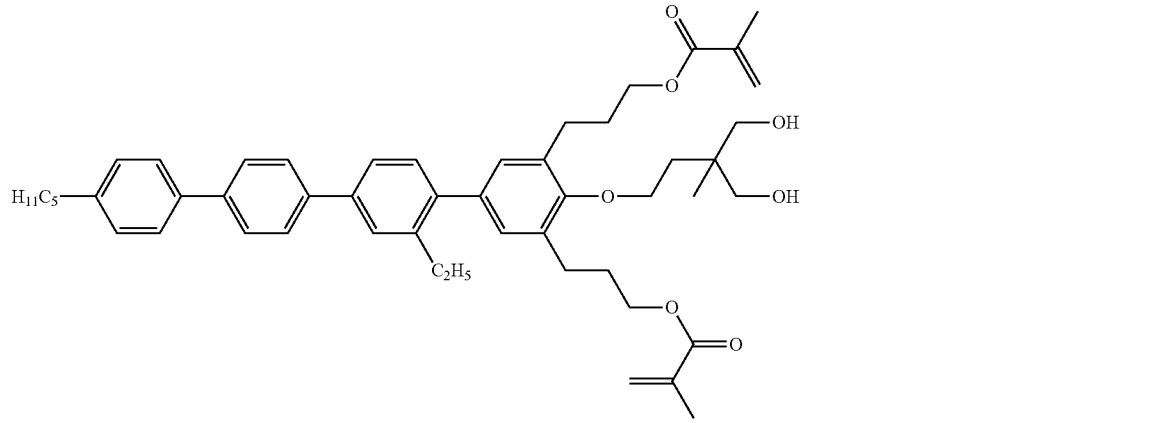
IL-4-2
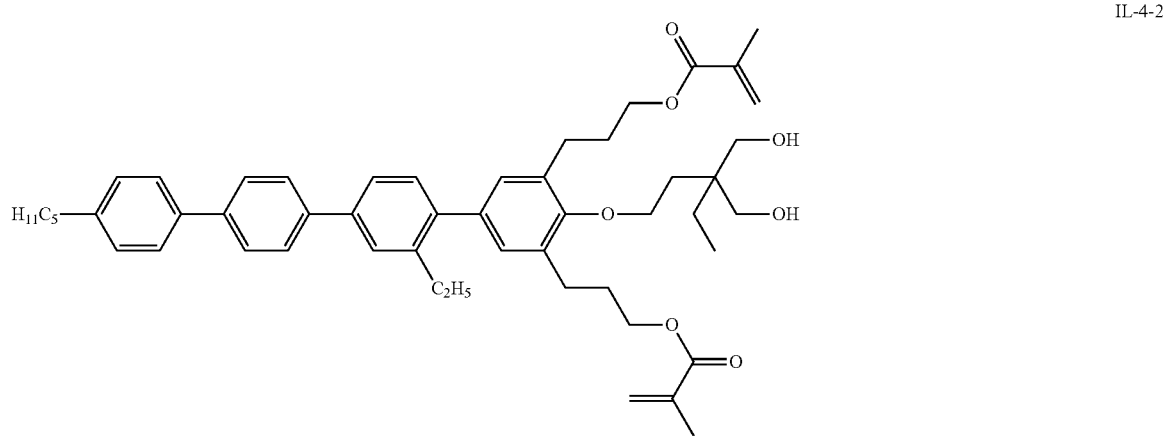

IL-4-3
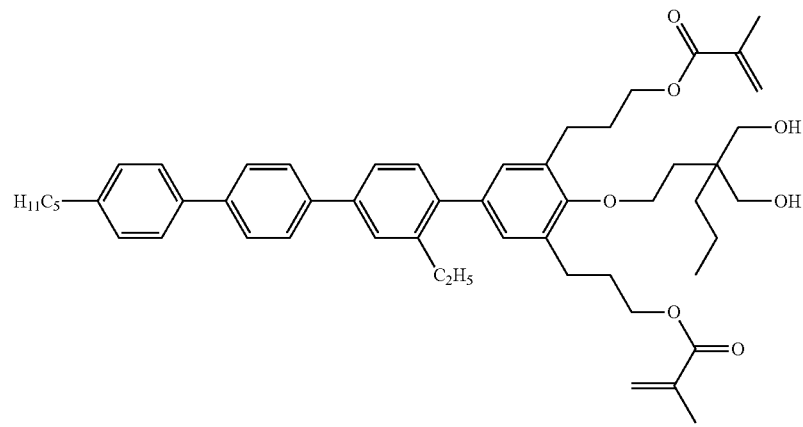
IL-4-4
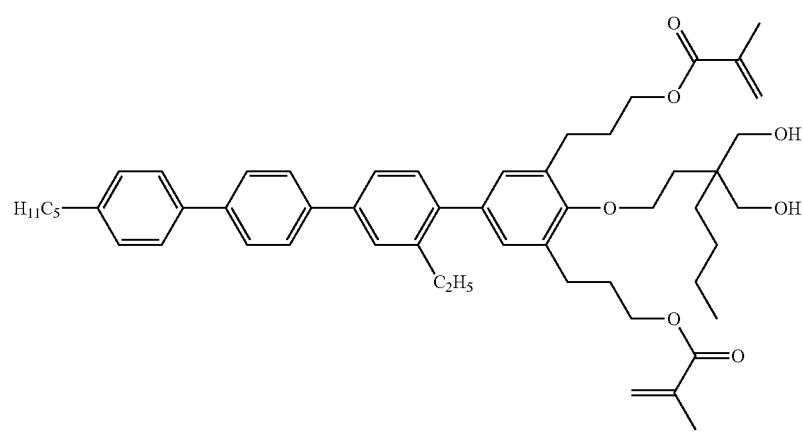
IL-4-5
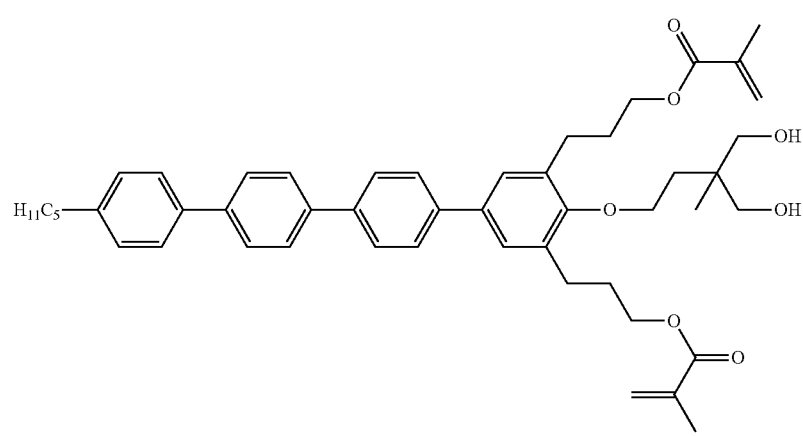

IL-4-6
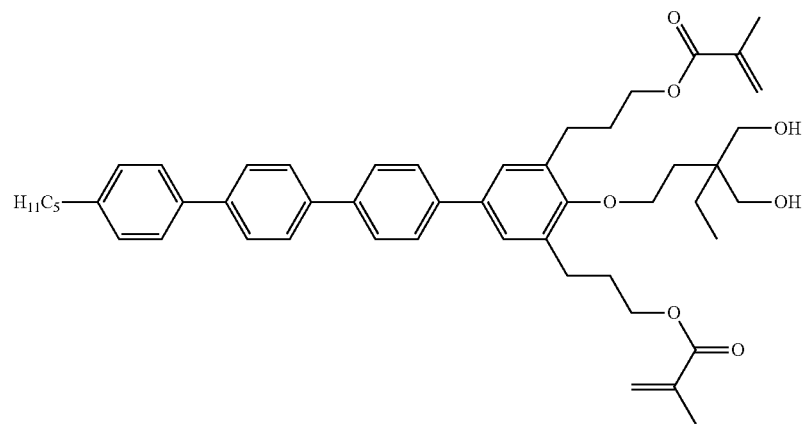
IL-4-7
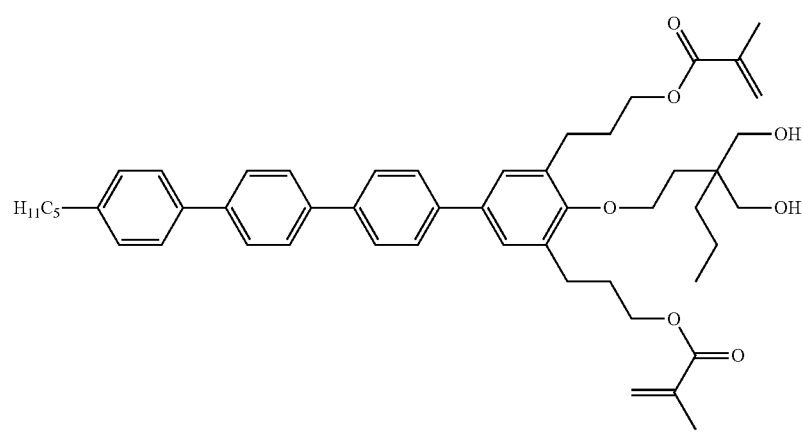
IL-4-8
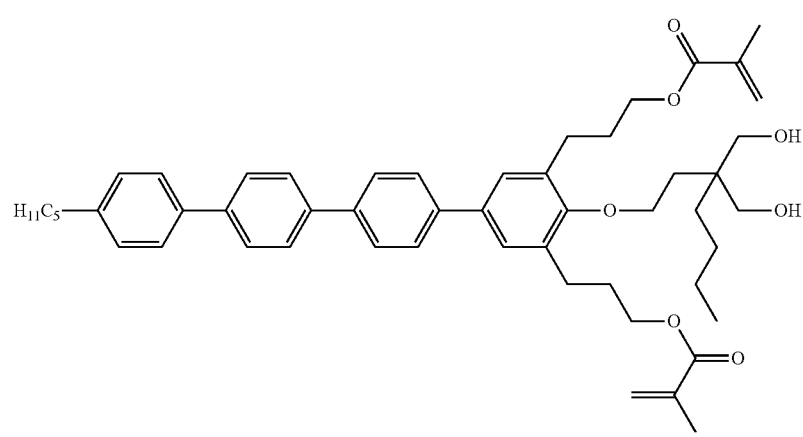

-continued
IL-4-9
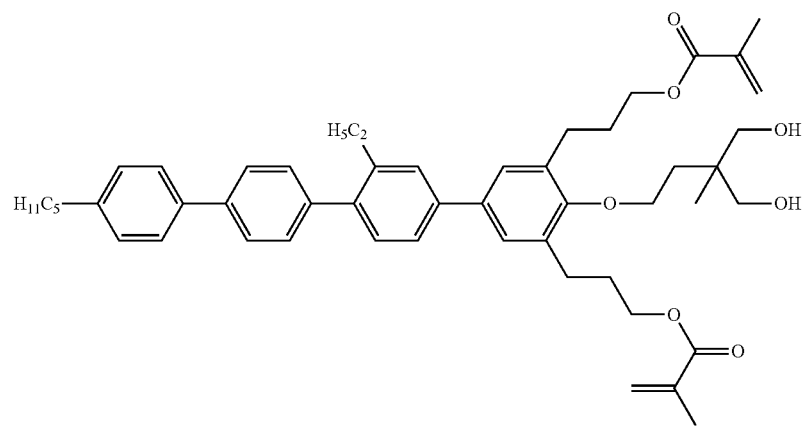
IL-4-10
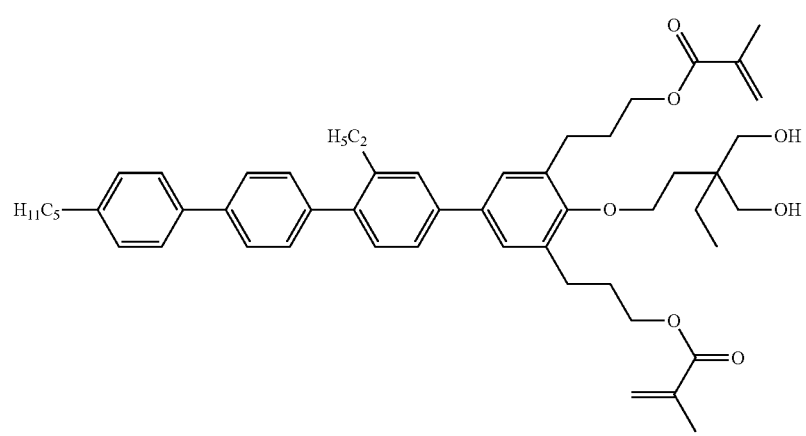
IL-4-11
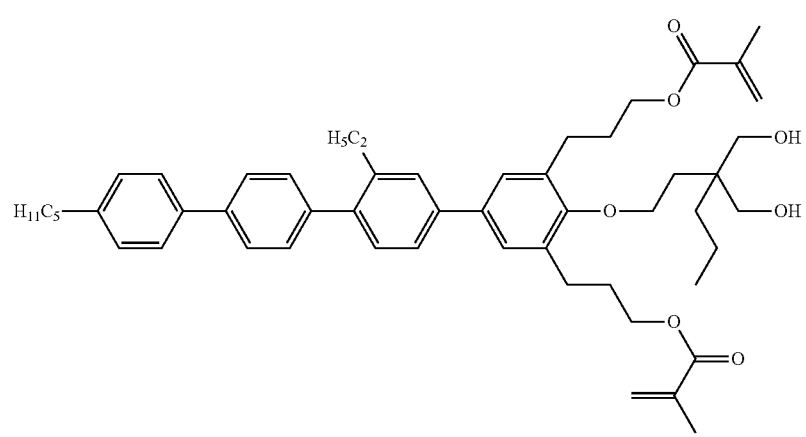

-continued
IL-4-12
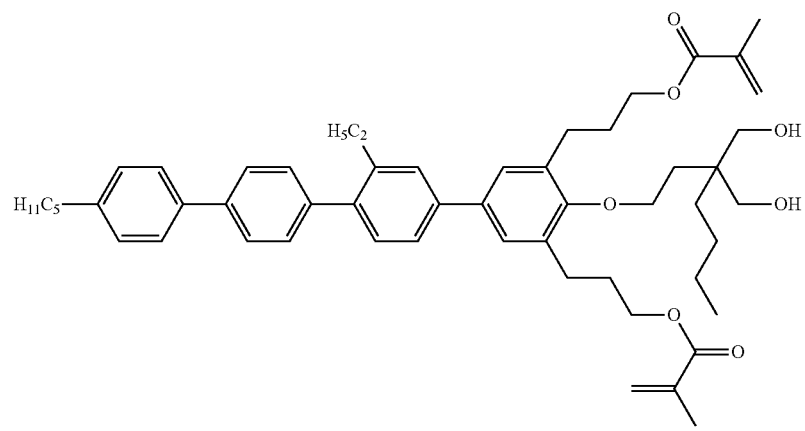
IL-5-1
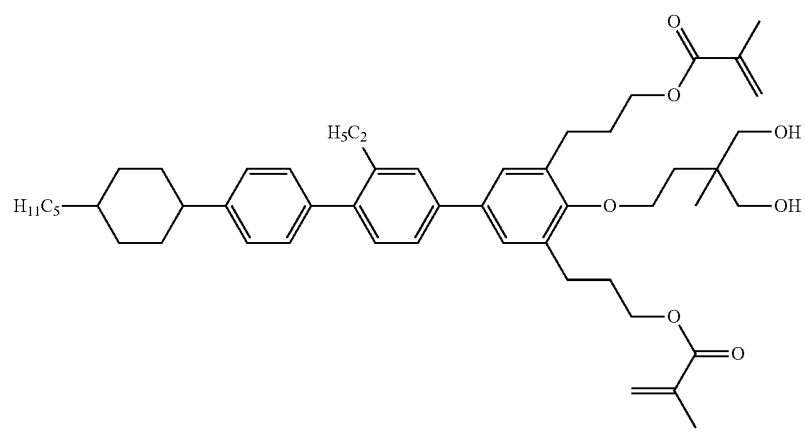
IL-5-2
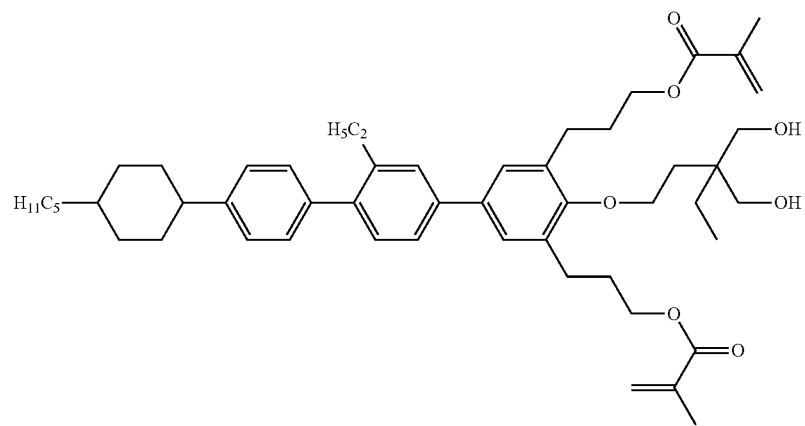

IL-5-3
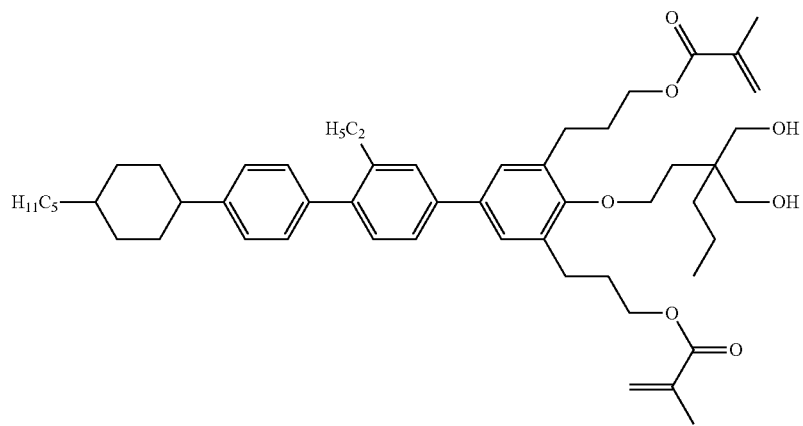
IL-5-4
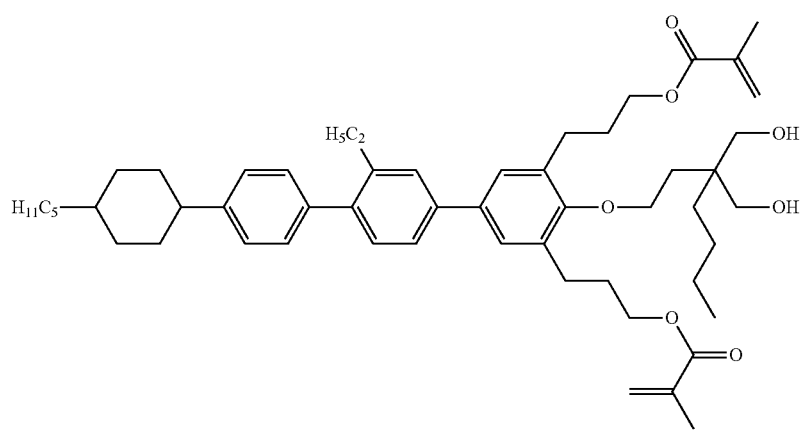
IL-5-5
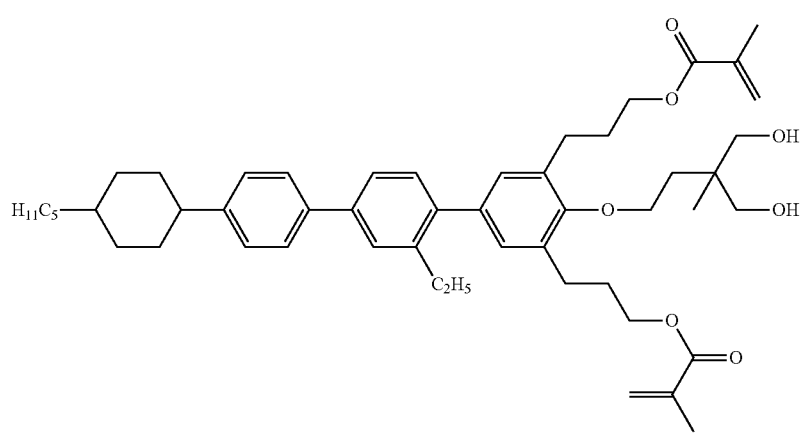

-continued
IL-5-6
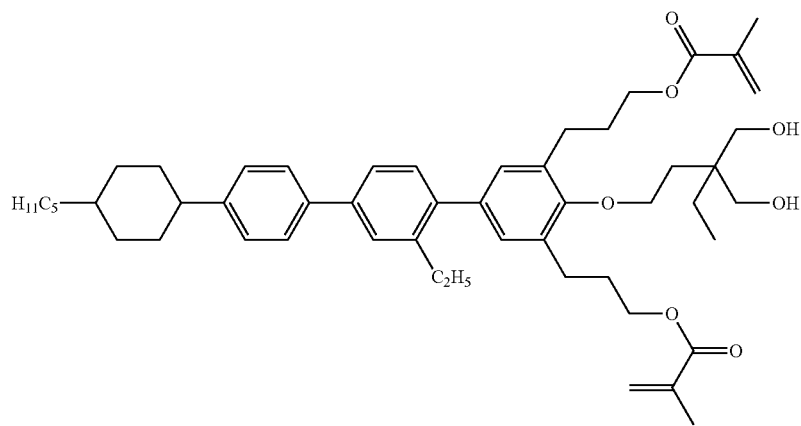
IL-5-7
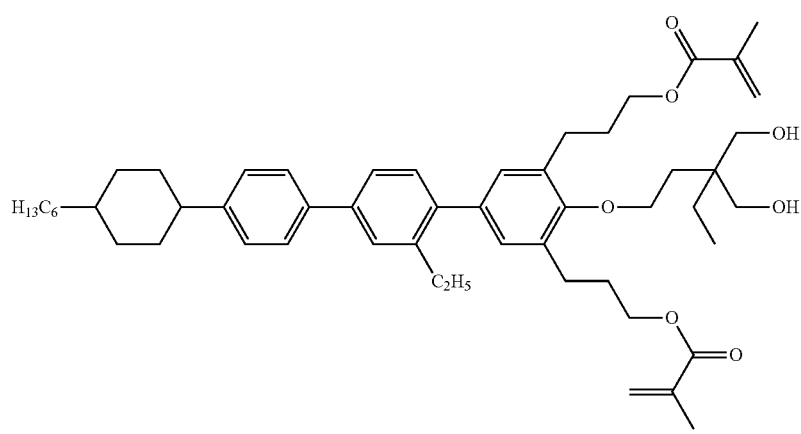
IL-5-8
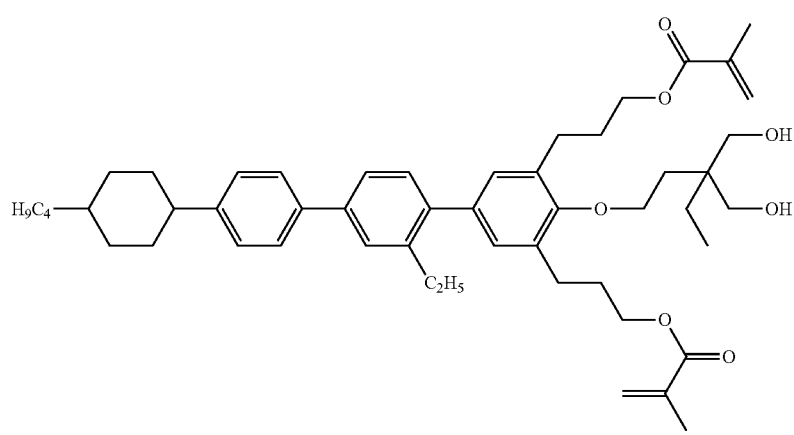

-continued
IL-5-9
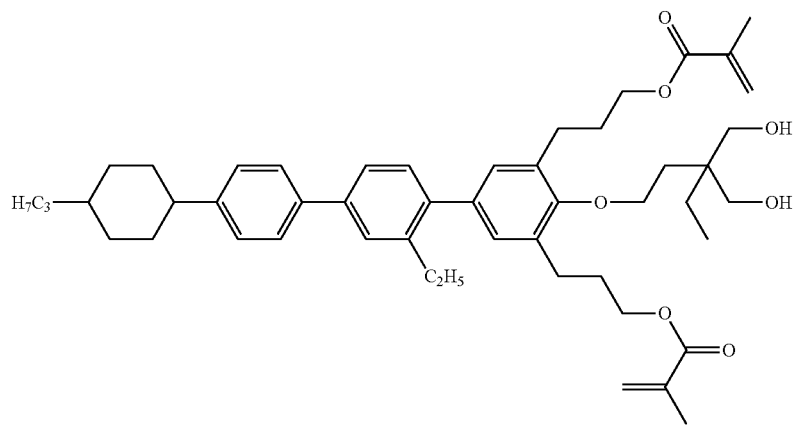
IL-5-10
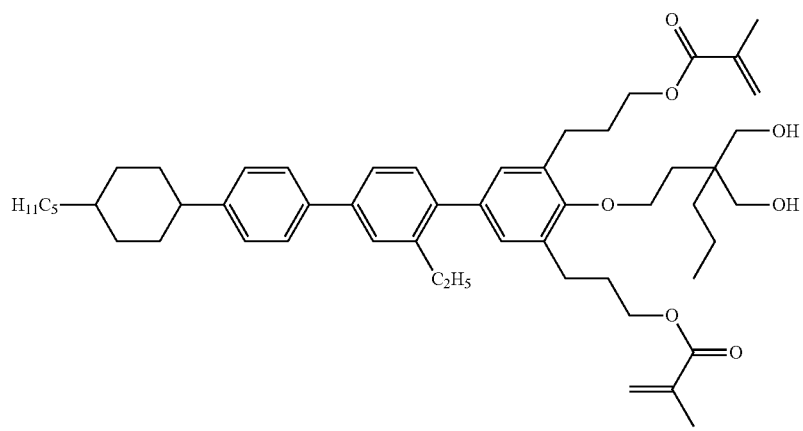
IL-5-11
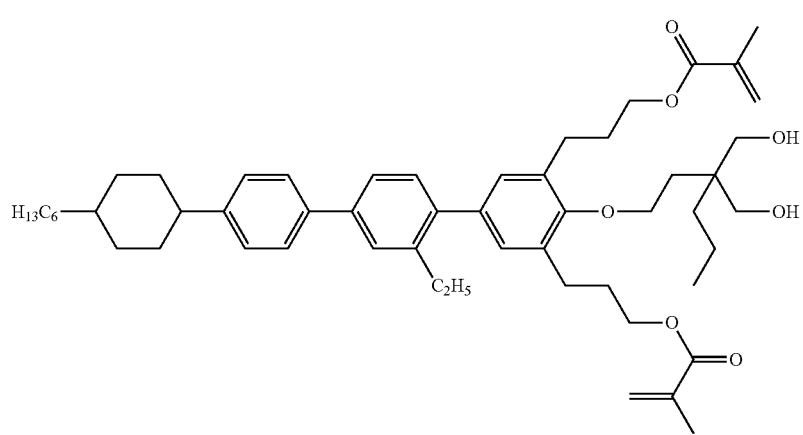

-continued
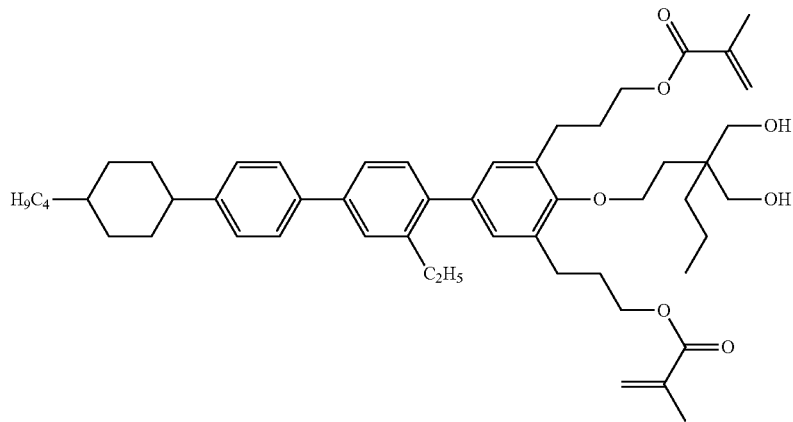
IL-5-12
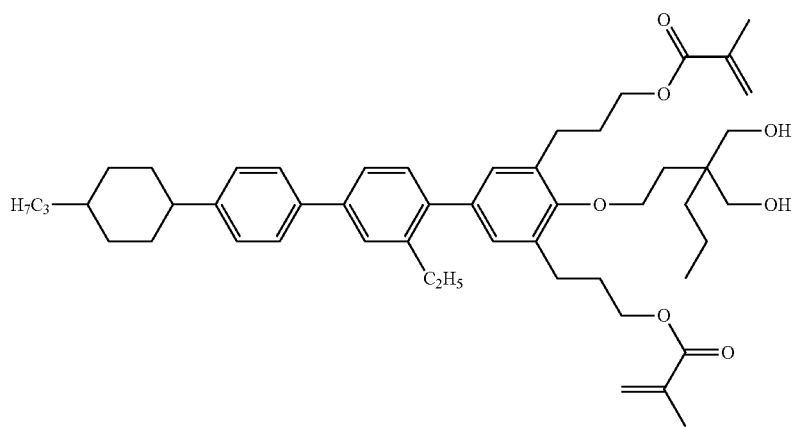
IL-5-13
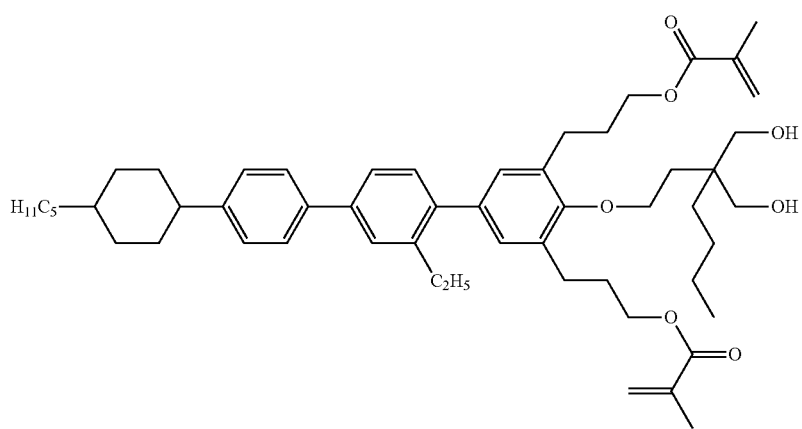
IL-5-14

IL-5-15
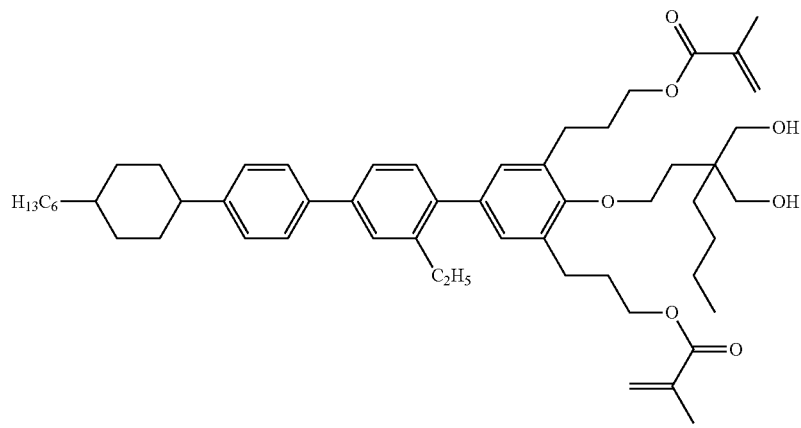
IL-5-16
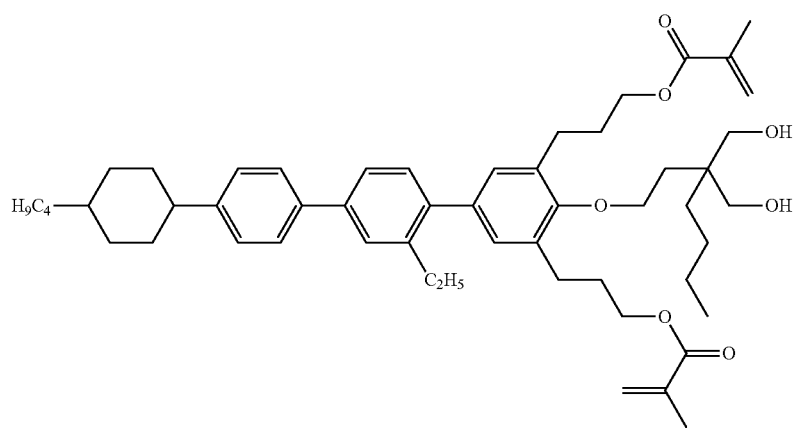
IL-5-17
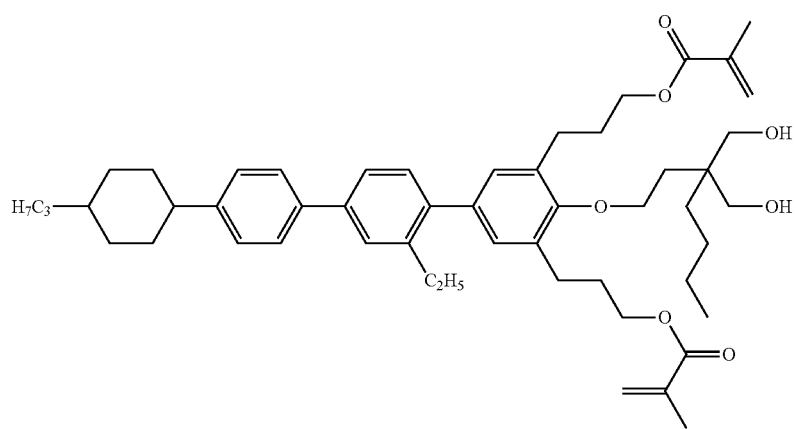

-continued
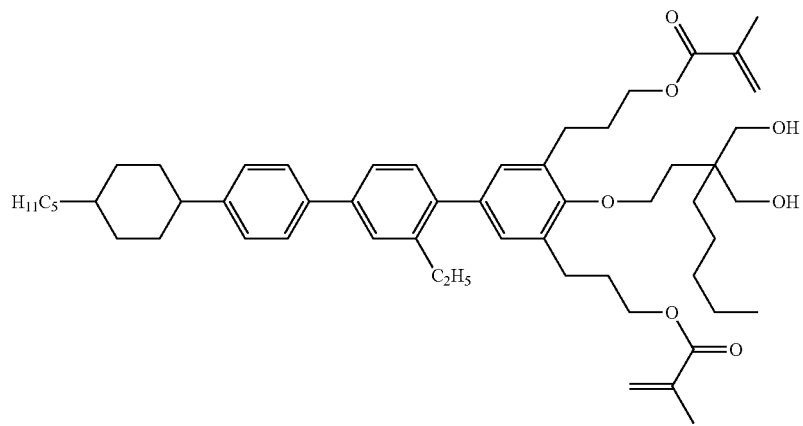
IL-5-19
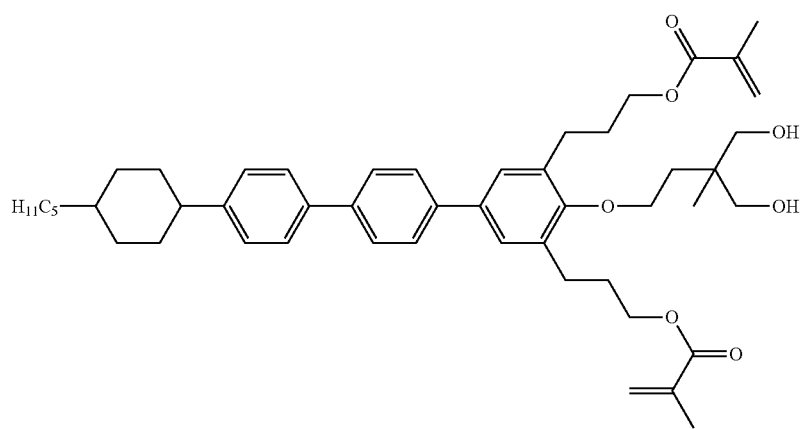
IL-5-20
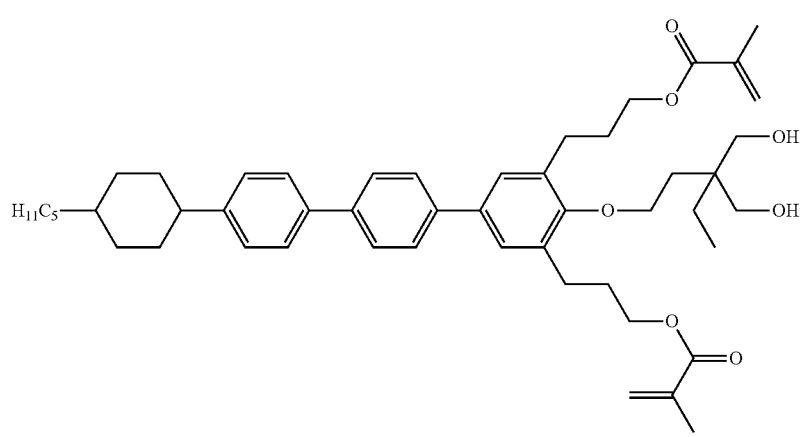
IL-5-21

IL-5-22
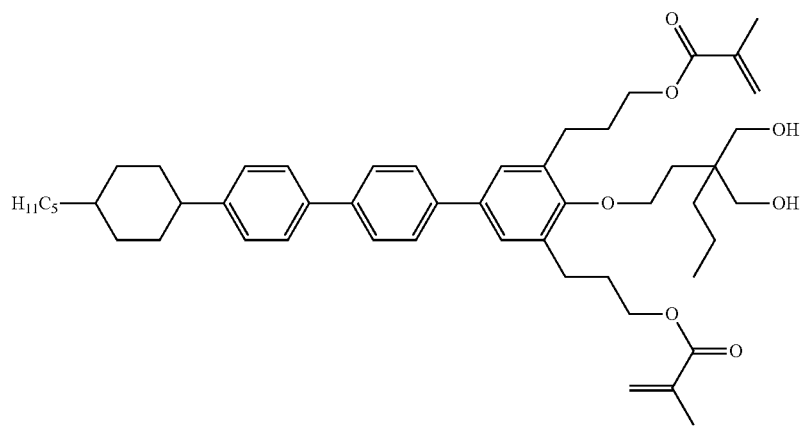
IL-5-23
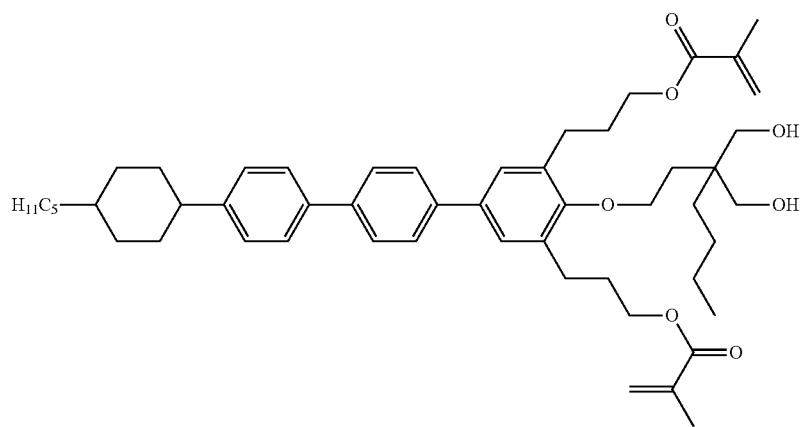
IL-5-24
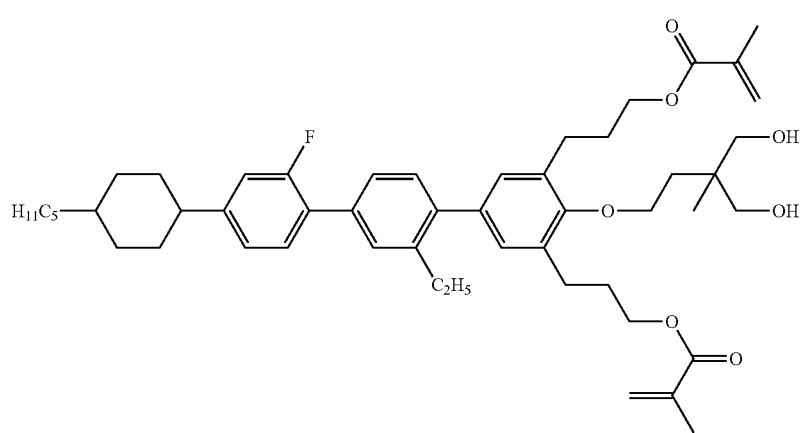

IL-5-25
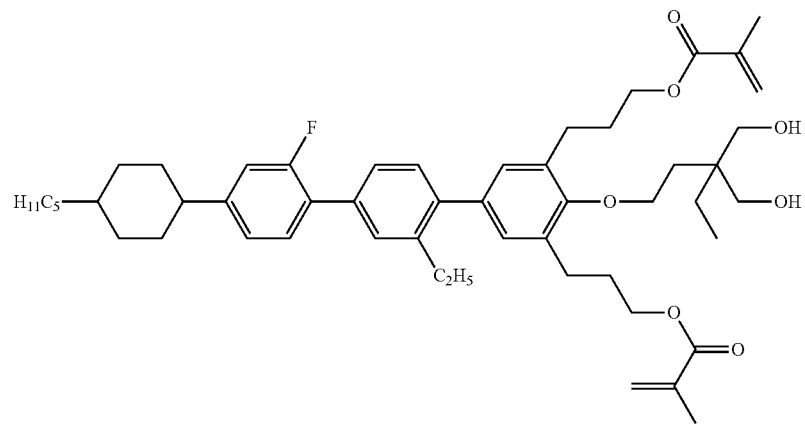
IL-5-26
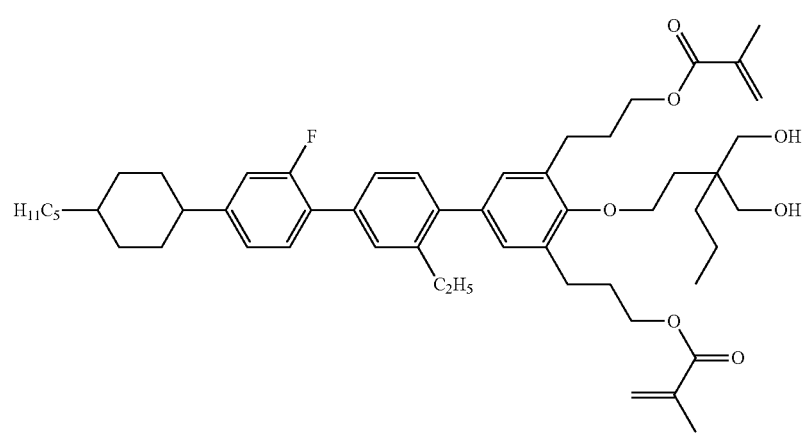
IL-5-27
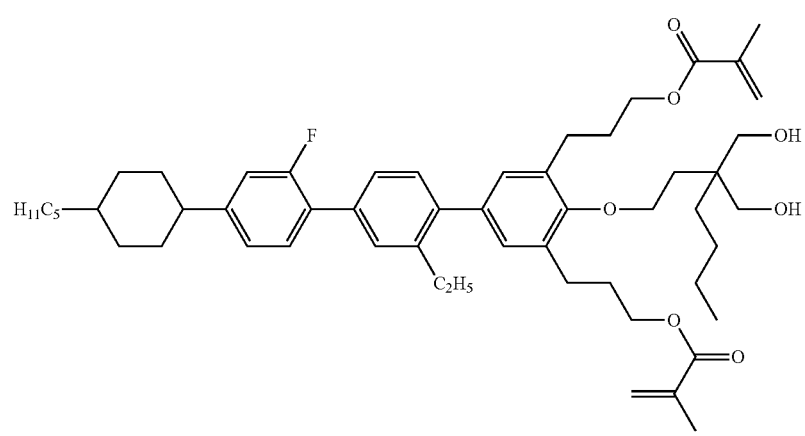

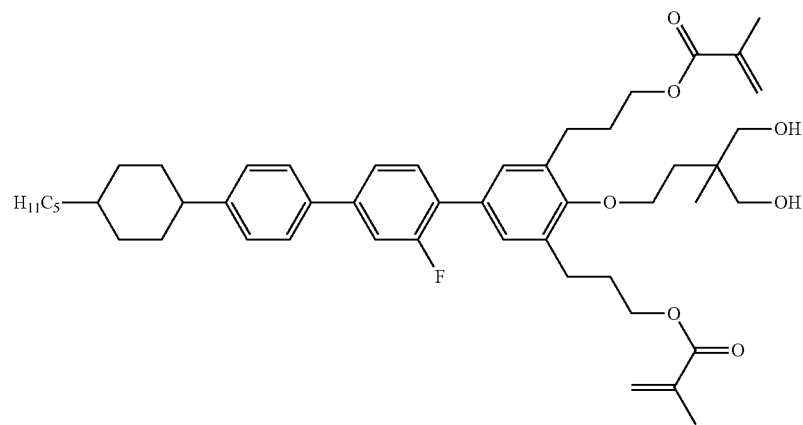
IL-5-28
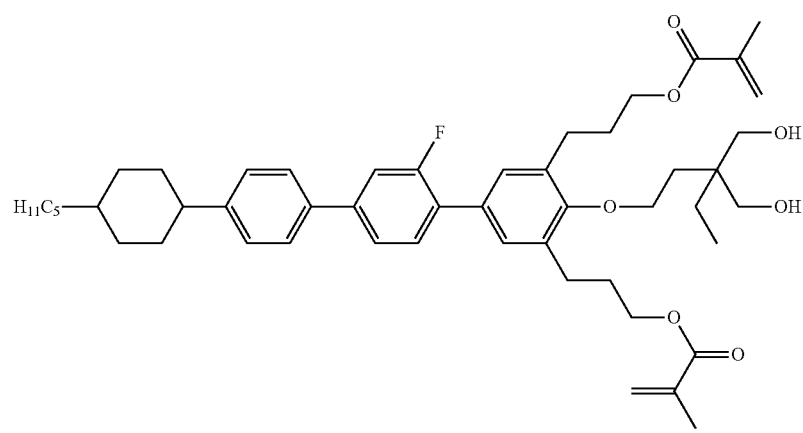
IL-5-29
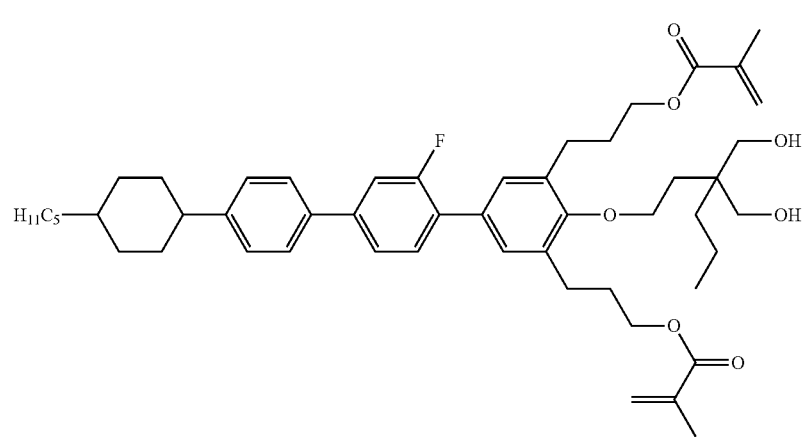
IL-5-30

-continued
IL-5-31
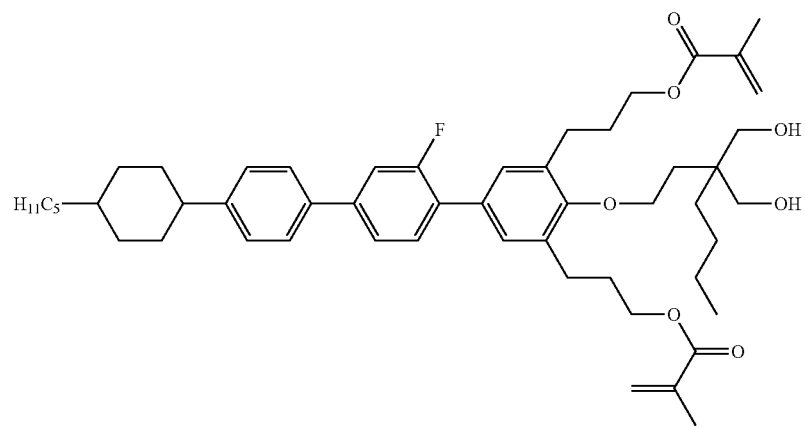
IL-5-32
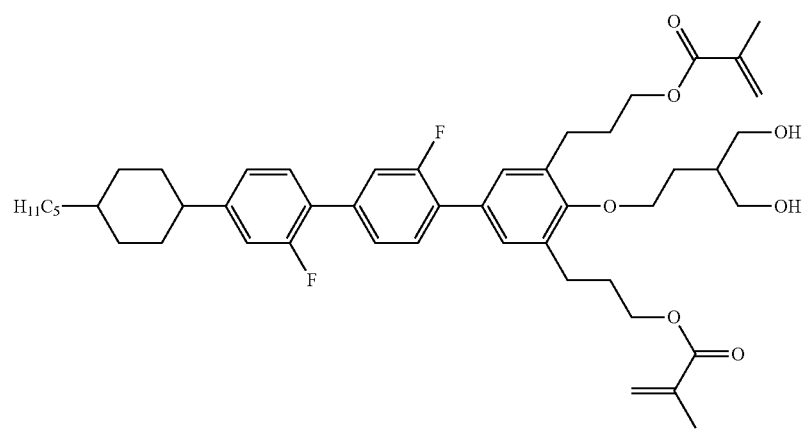
IL-5-33
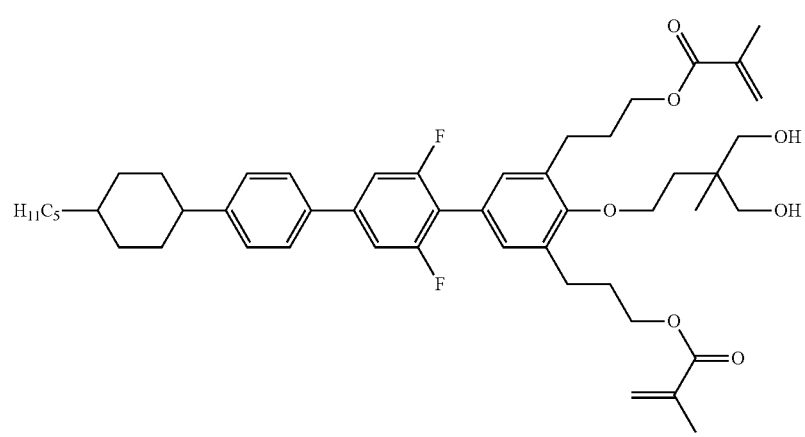

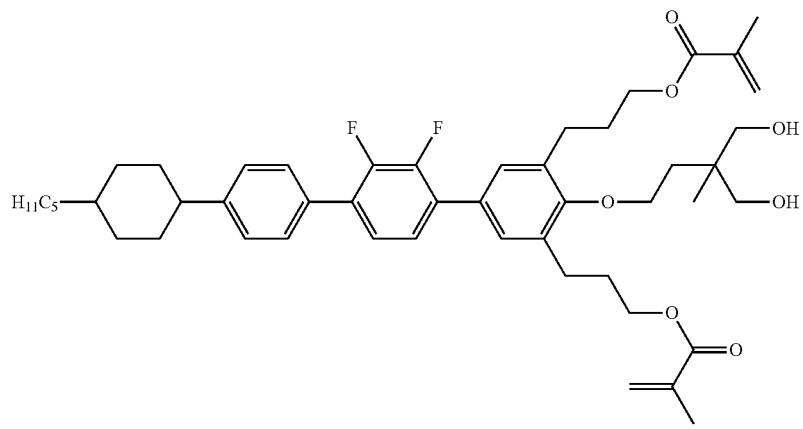
IL-5-34
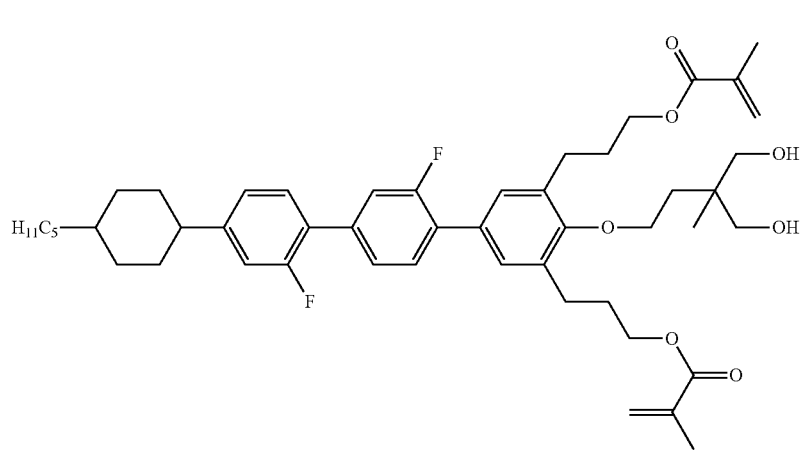
IL-5-35
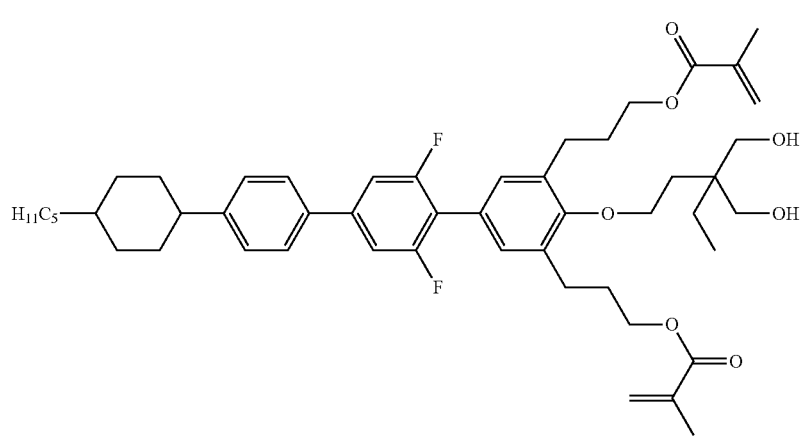
IL-5-36

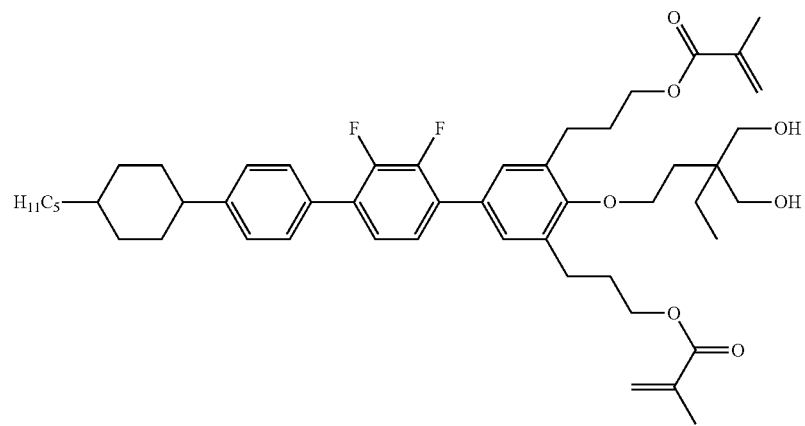
IL-5-37
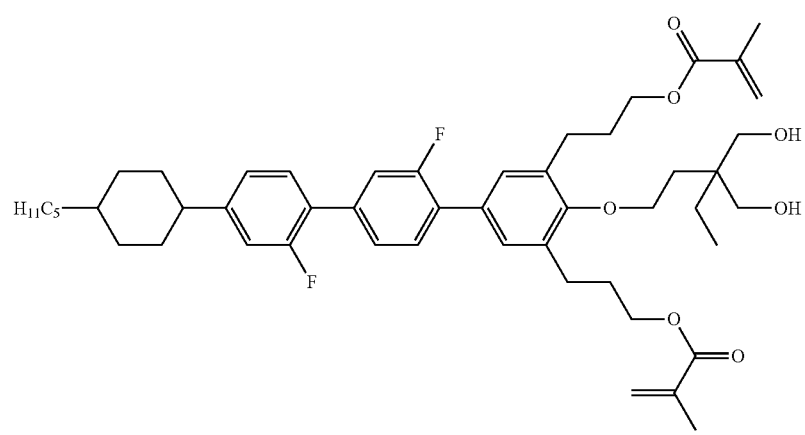
IL-5-38
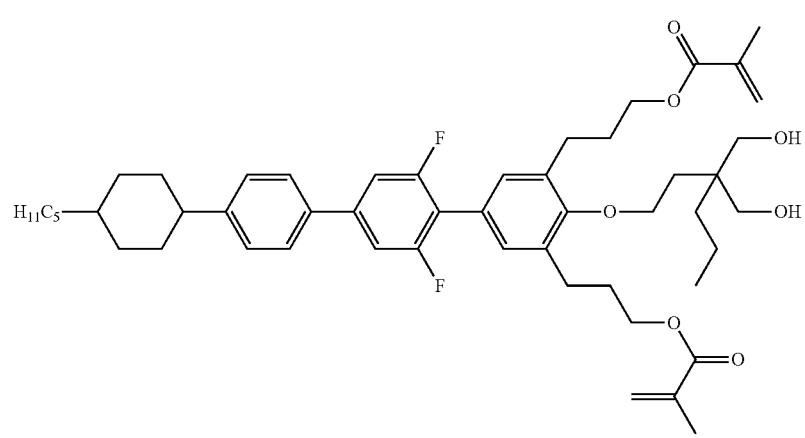
IL-5-39

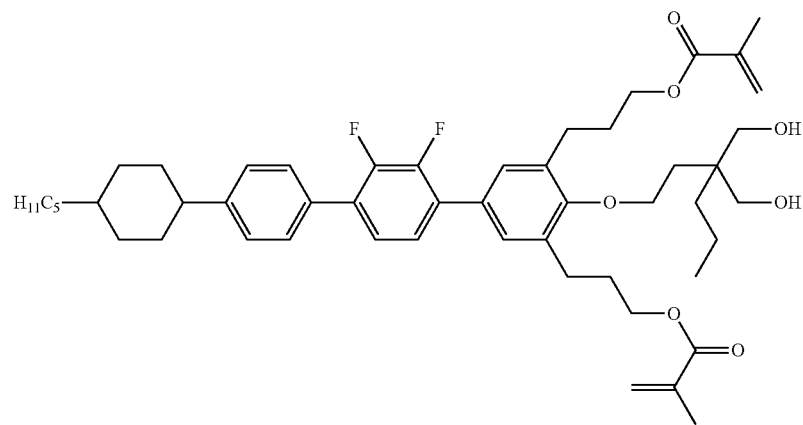
IL-5-40
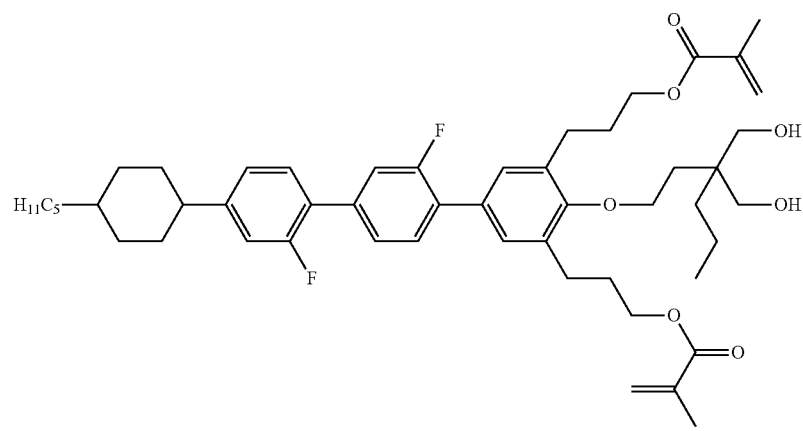
IL-5-41
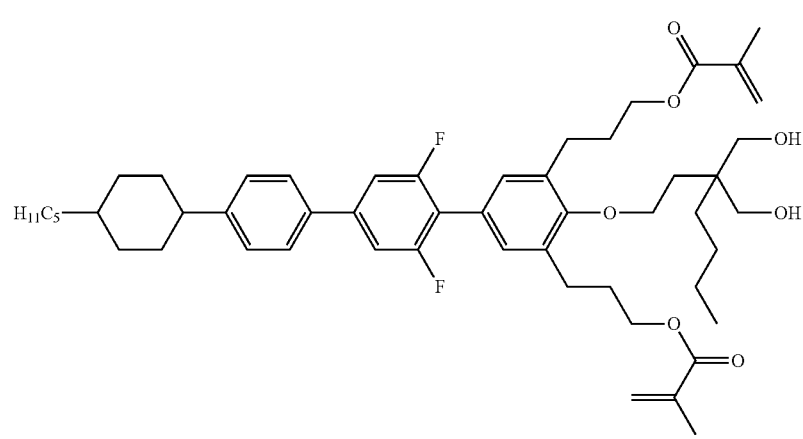
IL-5-42

IL-5-43
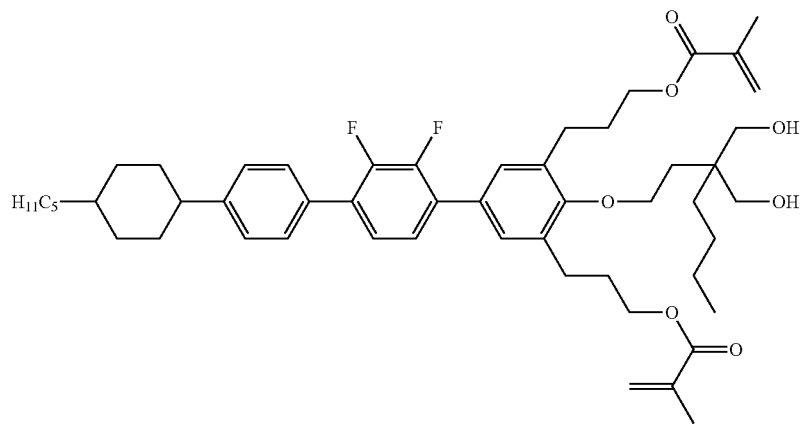
IL-5-44
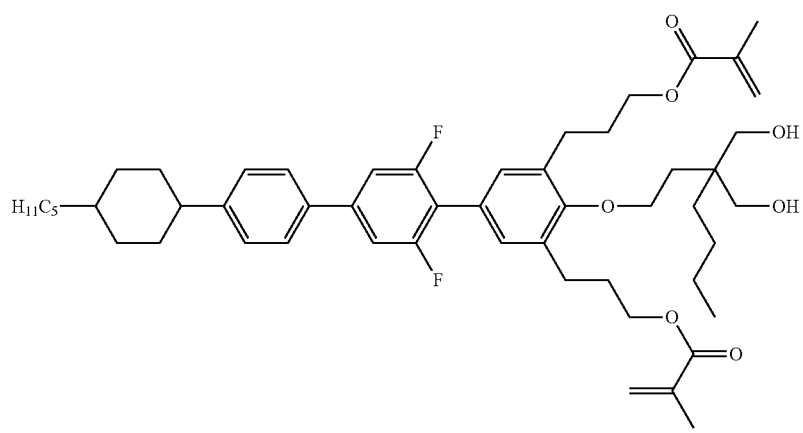
IL-5-45
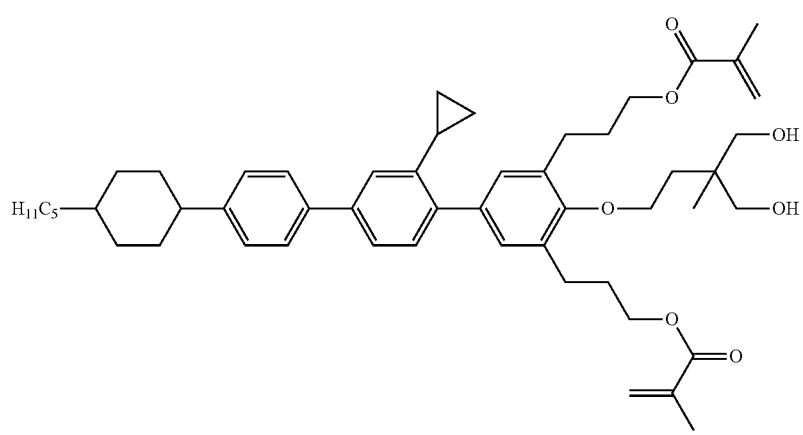

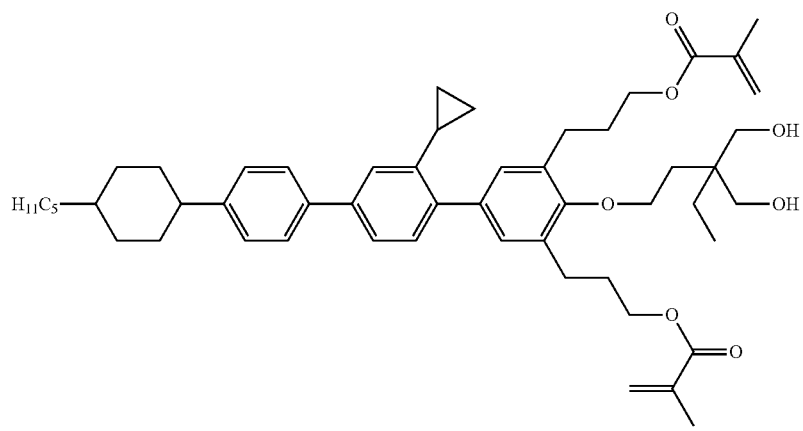
IL-5-46
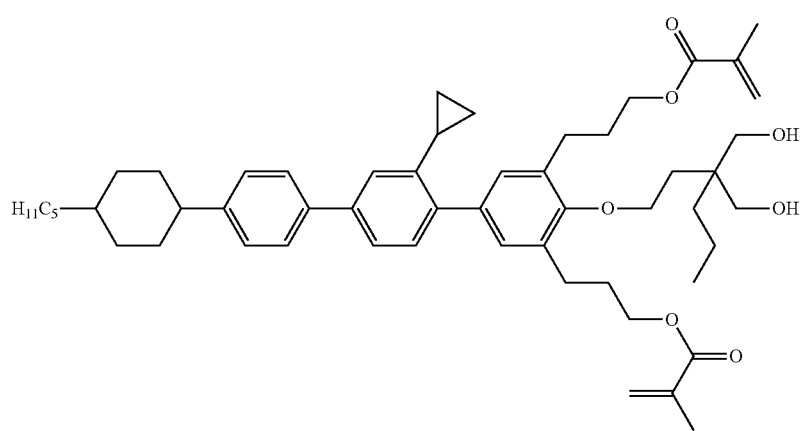
IL-5-47
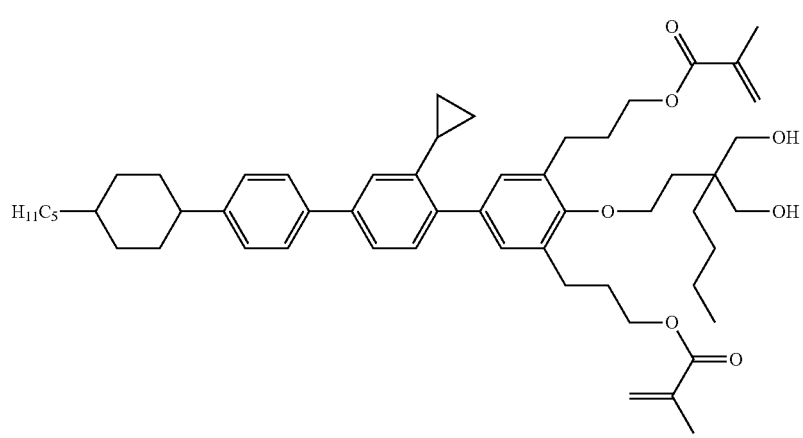
IL-5-48

-continued
IL-5-49
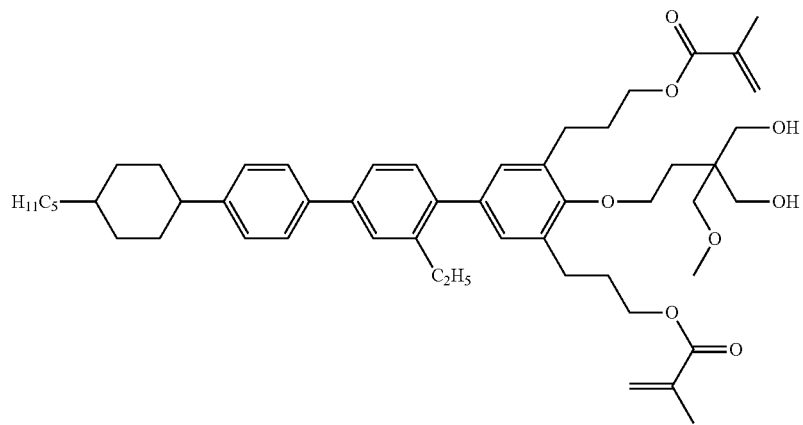
IL-5-50
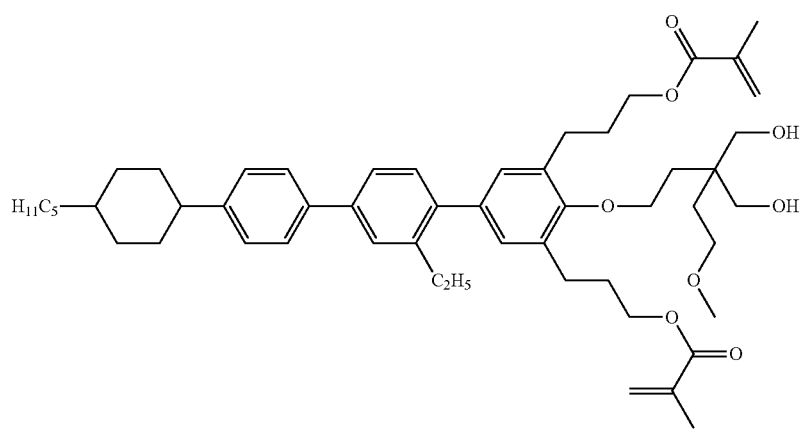
IL-6-1
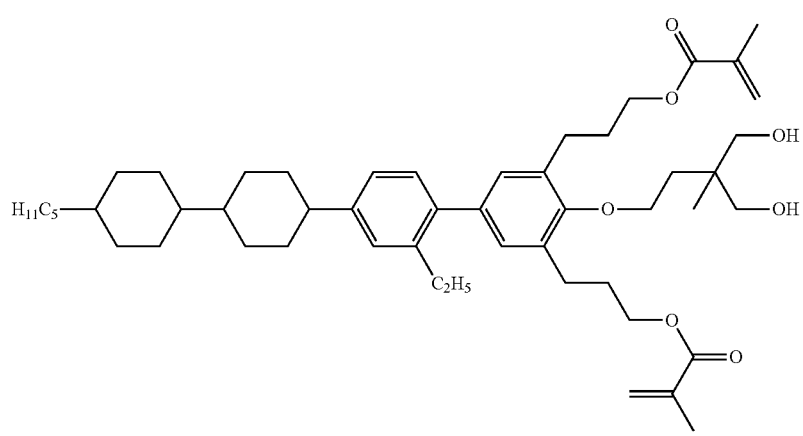

-continued
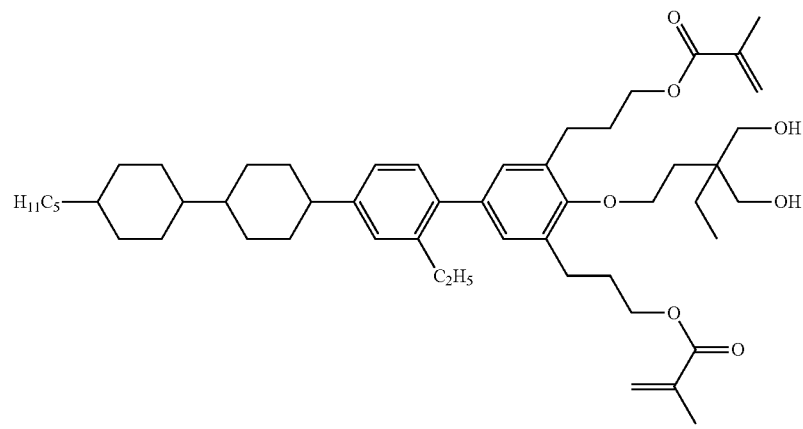
IL-6-2
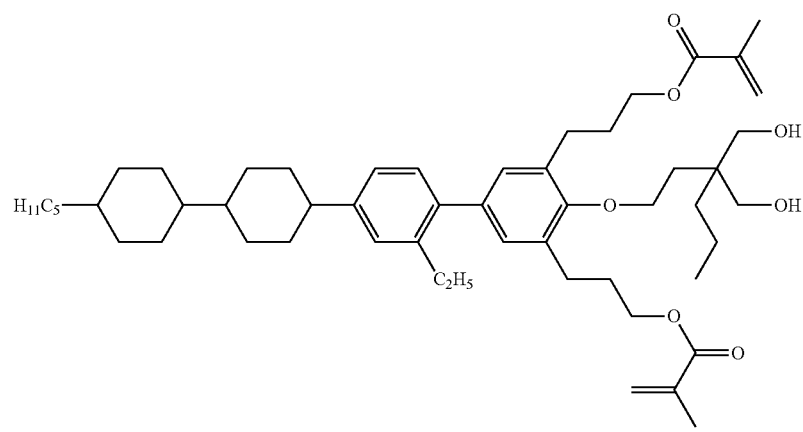
IL-6-3
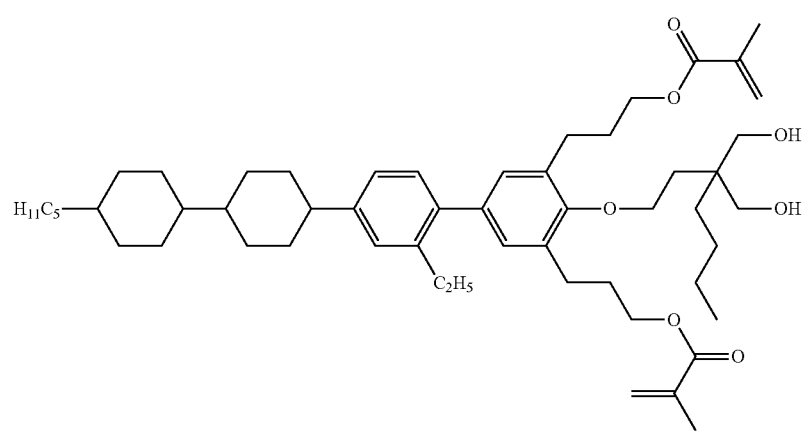
IL-6-4

IL-6-5
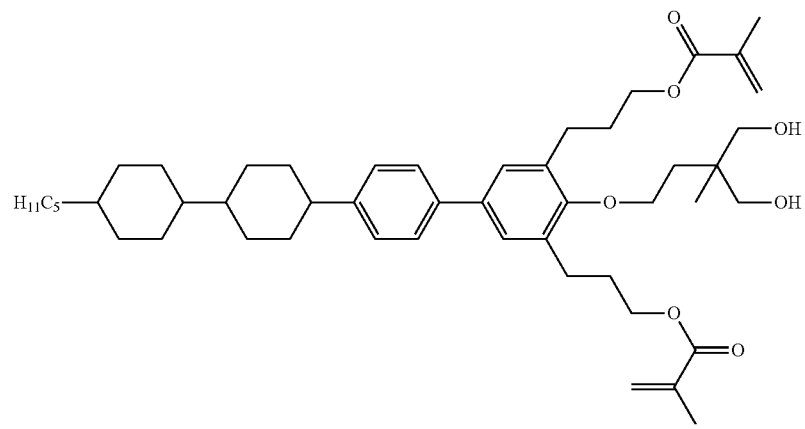
IL-6-6
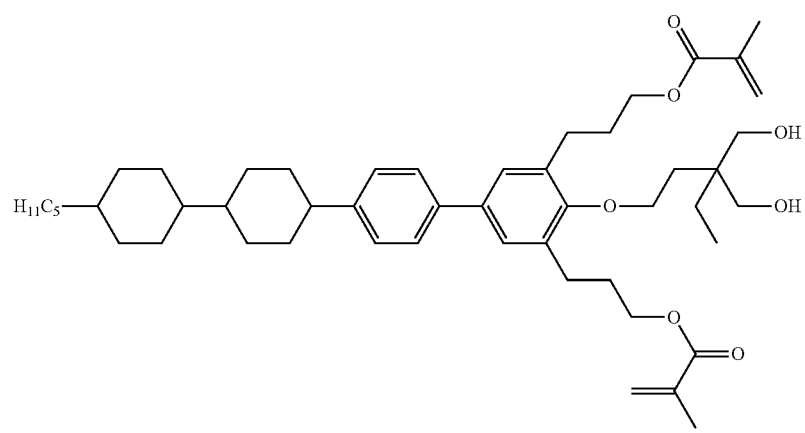
IL-6-7
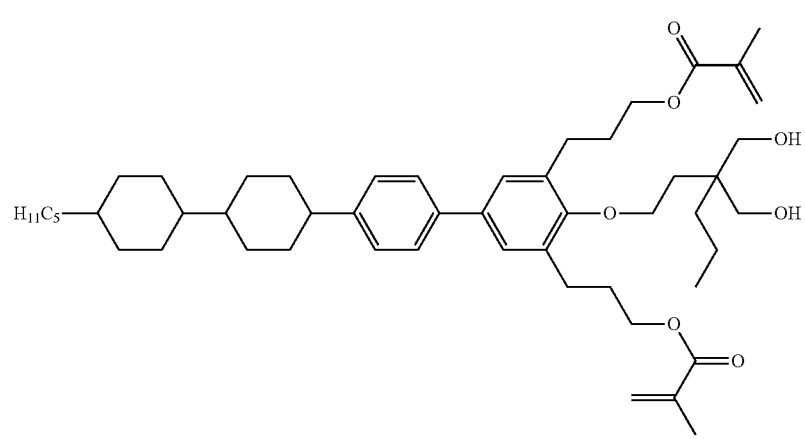

-continued
IL-6-8
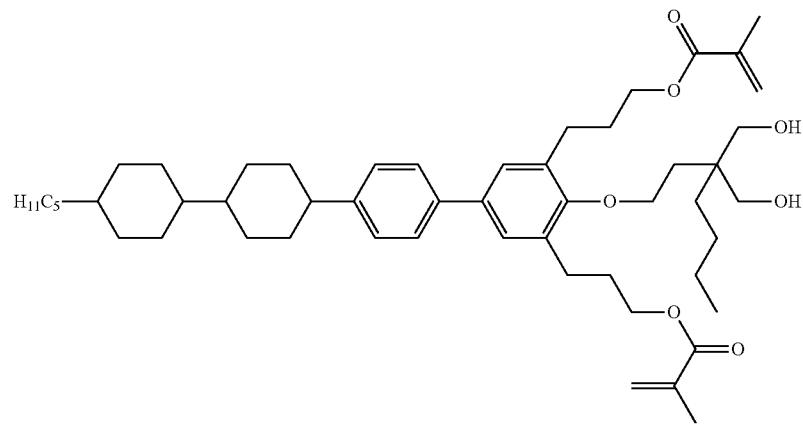
IL-7-1
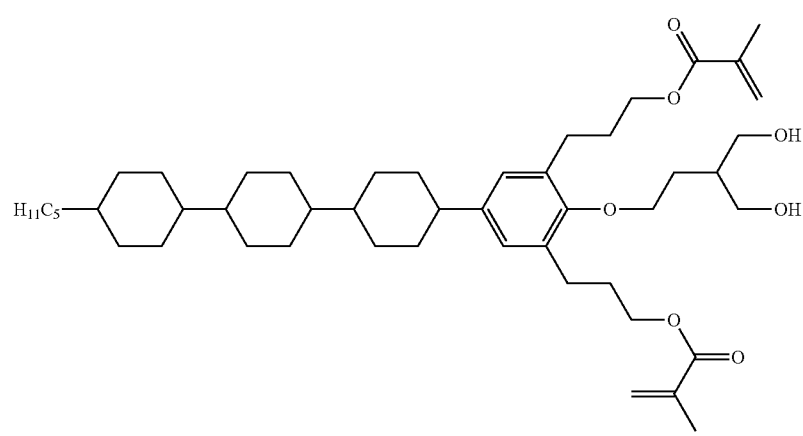
IL-7-2
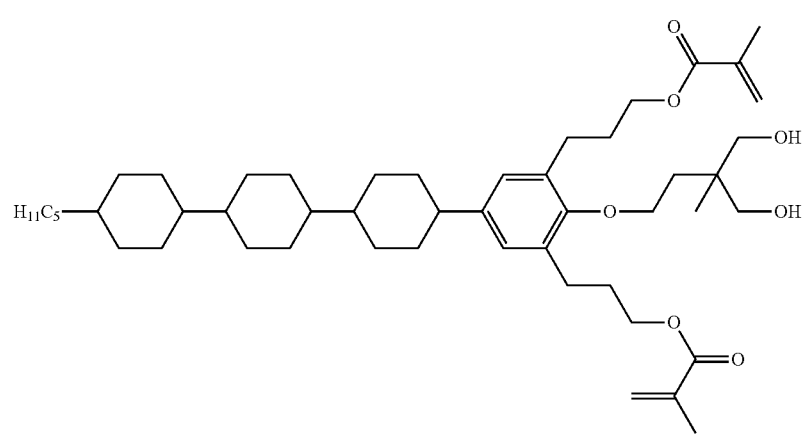

IL-7-3
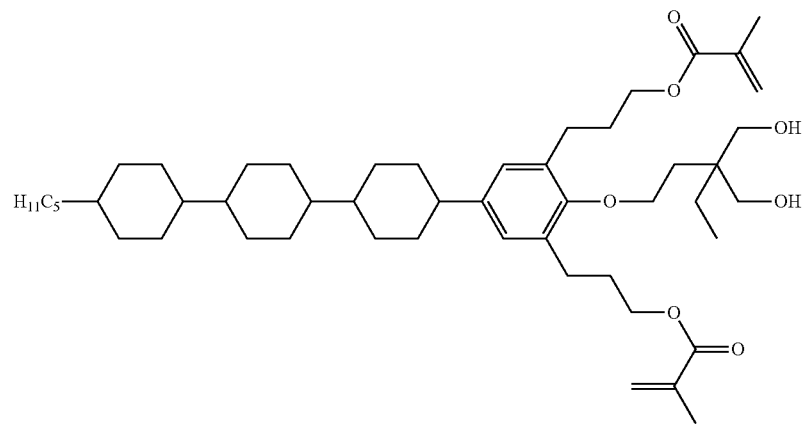
IL-7-4
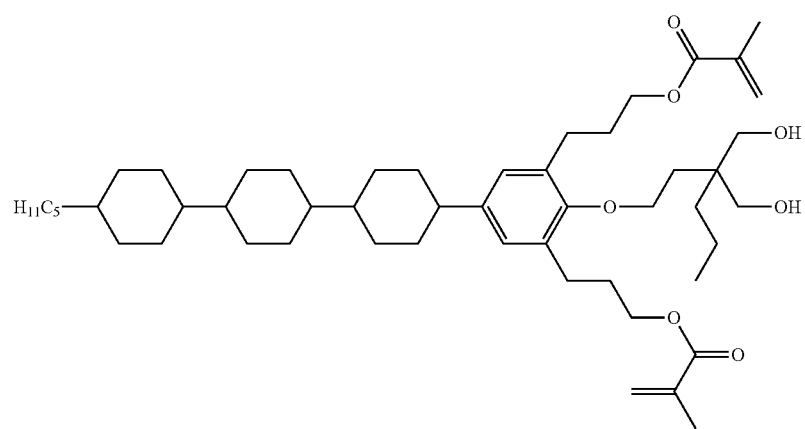
IL-7-5
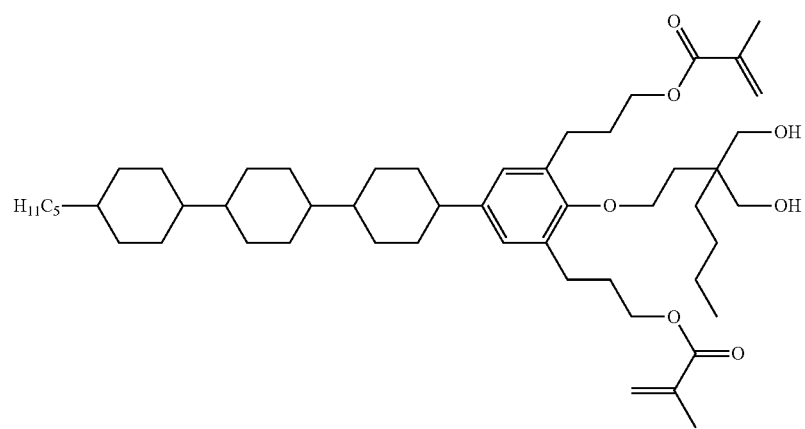

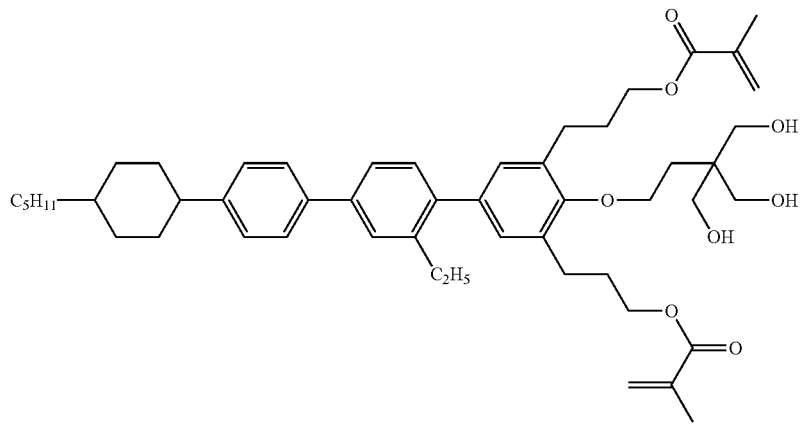

IM-4-1

The preparation of the self-alignment additives is disclosed, for example, in the documents WO 2012/038026 A1, EP 2918658, WO2016/015803, WO2017/041893 and WO2017/045740 an can be described in a simplified general way by the following synthesis pathway which does not include all different substitution patterns as described in the synthesis protocols:

Scheme 1

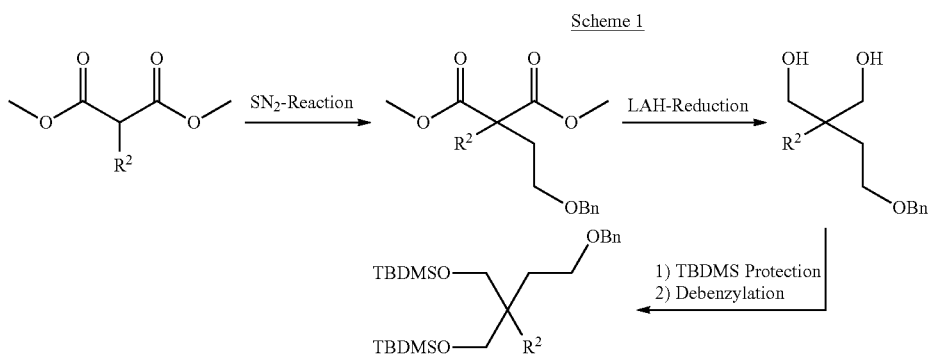

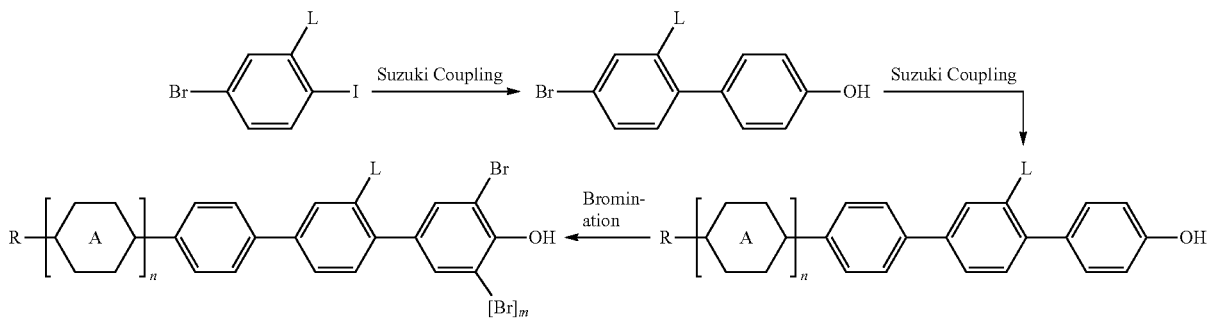

Synthesis of alignment additives, part 1.
Definitions: m = 0 or 1; n = 0 or 1; A = aromatic, heteroaromatic, alicyclic or heterocyclic group, which may also contain fused rings, and which may also be mono- or polysubstituted by a group L Scheme 2
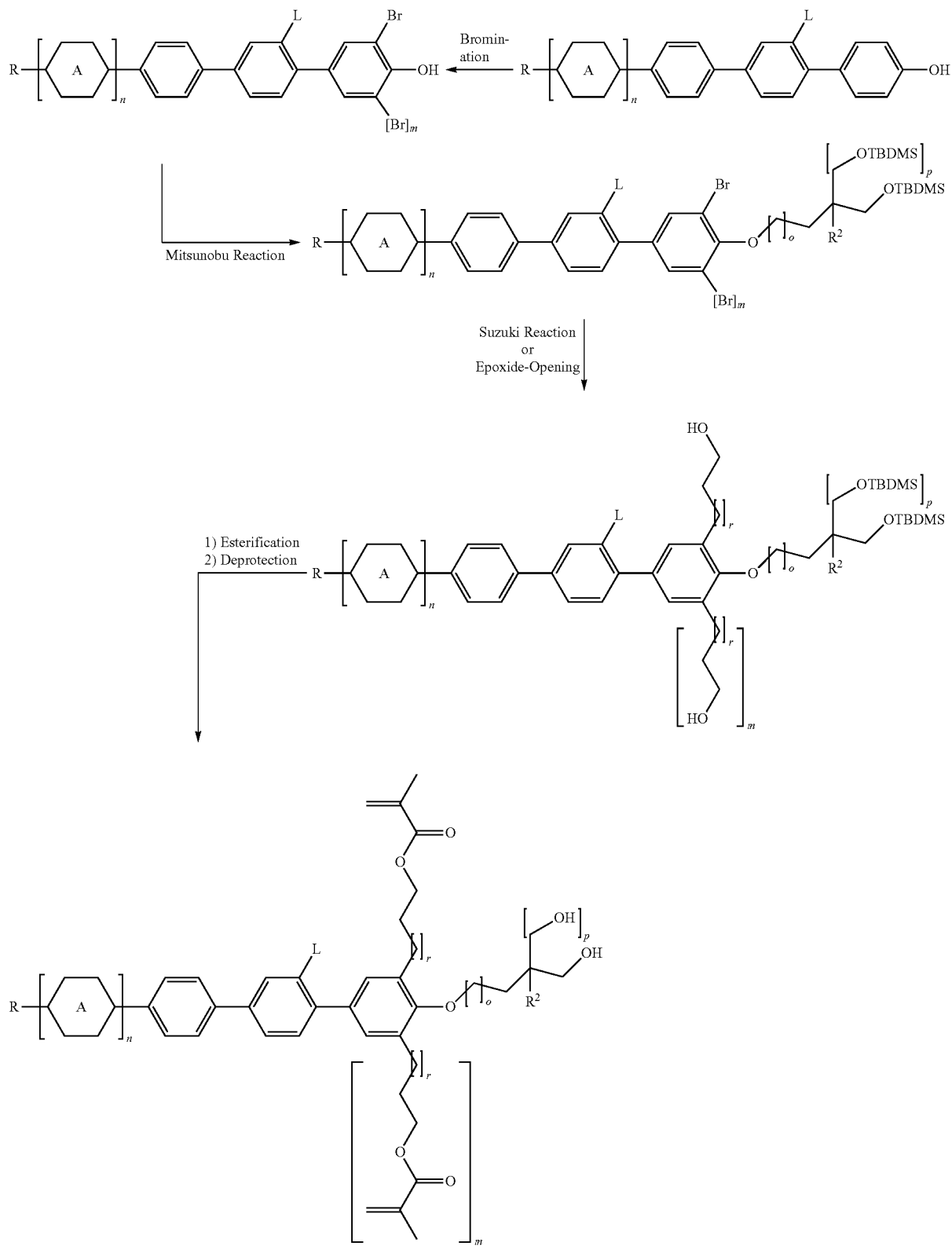
Synthesis of alignment additives, part 2.
Definitions: $R^2$ as group $R^{22}$ described in Formula I; m = 0 or 1; n = 0 or 1; o = 0 or 1; p = 0 or 1; r = 0 or 1; A = aromatic, heteroaromatic, alicyclic or heterocyclic group, which may also contain fused rings, and which may also be mono- or polysubstituted by a group L.

The term "aryl" denotes an aromatic carbon group or a group derived therefrom. The term "heteroaryl" denotes "aryl" as defined above containing one or more heteroatoms.

Aryl and heteroaryl groups may be monocyclic or polycyclic, i.e. they may contain one ring (such as, for example, phenyl) or two or more fused rings. At least one of the rings here has an aromatic configuration. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, naphthyl, anthracene, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, coumarin or combinations of these groups. The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms. Preference is furthermore given to 5-, 6-, 7- or 8-membered carbocyclic groups, in which, in addition, one or more C atoms may each be replaced by Si and/or one or more CH groups may each be replaced by N and/or one or more non-adjacent $CH_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

In connection with the present invention, the term "alkyl" denotes a straight-chain or branched, saturated or unsaturated, preferably saturated, aliphatic hydrocarbon radical having 1 to 15 (i.e. 1, 2, 3, 4, 5, 6, 7, 8, 9, 10, 11, 12, 13, 14 or 15) carbon atoms.

The term "cyclic alkyl" encompasses alkyl groups which have at least one carbocyclic part, i.e., for example, also cycloalkylalkyl, alkylcycloalkyl and alkylcycloalkylalkyl. The carbocyclic groups encompass, for example, cyclopropyl, cyclobutyl, cyclopentyl, cyclohexyl, cycloheptyl, cyclooctyl, etc.

"Halogen" in connection with the present invention stands for fluorine, chlorine, bromine or iodine, preferably for fluorine or chlorine.

The polymerizable component of the LC medium preferably comprises further polymerizable or (partially) polymerized compounds. These are preferably conventional polymerizable compounds, preferably mesogenic compounds, in particular those which are suitable for the PS-VA technique.

Polymerizable compounds which are preferred for this purpose are the structures indicated below for formula M and the sub-formulae M1, M2, etc. thereof. The polymer formed therefrom is able to stabilize the alignment of the LC medium, optionally form a passivation layer and optionally generate a pre-tilt.

The LC media according to the invention therefore preferably comprise >0 to <5% by weight, particularly preferably 0.05 to 1% by weight and very particularly preferably 0.2 to 1% by weight of polymerizable compounds (without an anchor group $R^a$ or $R^{a1}$), in particular compounds of the formula M as defined below and the preferred formulae falling thereunder.

The polymerization of the polymerizable components is carried out together or in part-steps under different polymerization conditions. The polymerization is preferably carried out under the action of UV light. In general, the polymerization is initiated with the aid of a polymerization initiator and UV light. Some polymerizable compounds with extended aromatic groups can be polymerized without the need of an intiator. In the case of the preferred (meth)acrylates, virtually complete polymerization is achieved by UV light irradiation. During the polymerization, a voltage can optionally be applied to the electrodes of the cell or another electric field can be applied in order additionally to influence the alignment of the LC medium.

The optionally present further monomers of the polymerizable component of the LC medium are preferably described by the following formula M:

$$P^1\text{-}Sp^1\text{-}A^2\text{-}(Z^1\text{-}A^1)_n\text{-}Sp^2\text{-}P^2 \qquad \text{M}$$

in which the individual radicals have the following meanings:

$P^1$, $P^2$ each, independently of one another, denote a polymerizable group, $Sp^1$, $Sp^2$ on each occurrence, identically or differently, denote a spacer group or a single bond, $A^1$, $A^2$ each, independently of one another, denote a radical selected from the following groups:
  a) the group consisting of trans-1,4-cyclohexylene, 1,4-cyclohexenylene and 4,4'-bicyclohexylene, in which, in addition, one or more non-adjacent $CH_2$ groups may each be replaced by —O— or —S— and in which, in addition, one or more H atoms may each be replaced by a group L, or a radical of the formula

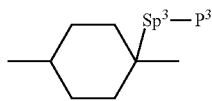

b) the group consisting of 1,4-phenylene and 1,3-phenylene, in which, in addition, one or two CH groups may each be replaced by N and in which, in addition, one or more H atoms may each be replaced by a group L or -Sp³-P,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

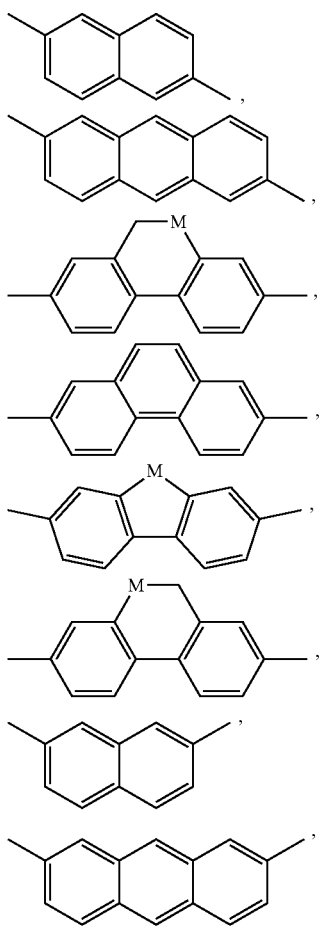

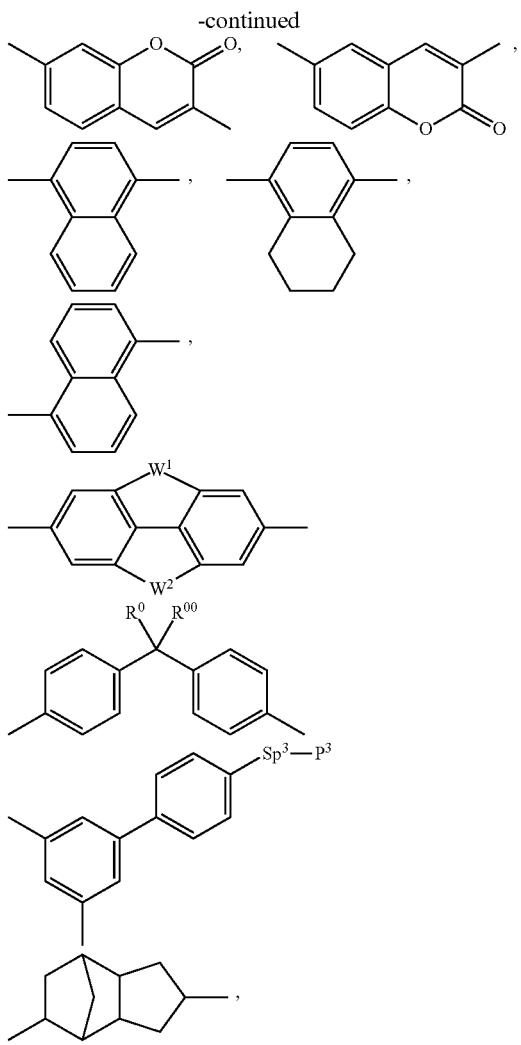

where, in addition, one or more H atoms in these radicals may each be replaced by a group L or -Sp³-P, and/or one or more double bonds may each be replaced by single bonds, and/or one or more CH groups may each be replaced by N, P³ denotes a polymerizable group,
Sp³ denotes a spacer group,
n denotes 0, 1, 2 or 3, preferably 1 or 2,
Z¹ in each case, independently of one another, denotes —CO—O—, —O—CO—, —CH₂O—, —OCH₂—, —CF₂O—, —OCF₂—, —(CH₂)ₙ— where n is 2, 3 or 4, —O—, —CO—, —C(R$^c$R$^d$)—, —CH₂CF₂—, —CF₂CF₂— or a single bond,
L on each occurrence, identically or differently, denotes F, Cl, CN, SCN, SF₅ or straight-chain or branched, in each case optionally fluorinated, alkyl, alkoxy, alkenyl, alkylcarbonyl, alkoxycarbonyl, alkylcarbonyloxy, alkylalkoxy or alkoxycarbonyloxy having 1 to 12 C atoms,
M denotes —O—, —S—, —CH₂—, —CHY¹— or —CY¹Y²—, and
Y¹ and Y² each, independently of one another, denote H, F or straight-chain or branched alkyl having 1 to 12 C atoms, in which, in addition, one or more H atoms may each be replaced by F, or denote Cl or CN, and preferably denote H, F, Cl, CN, OCF₃ or CF₃, $W^1$, $W^2$ each, independently of one another, denote —$CH_2CH_2$—, —CH=CH—, —$CH_2$—O—, —O—$CH_2$—, —$C(R^c R^d)$— or —O—, $R^c$ and $R^d$ each, independently of one another, denote H, F, $CF_3$, or alkyl having 1 to 6 C atoms, preferably H, methyl or ethyl.

where one or more of the groups $P^1$-$Sp^1$-, -$Sp^2$-$P^2$ and -$Sp^3$-$P^3$ may denote a radical $R^{aa}$, with the proviso that at least one of the groups $P^1$-$Sp^1$-, -$Sp^2$-$P^2$ and -$Sp^3$-$P^3$ present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^0)$—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl or CN, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals contain at least two C atoms and the branched radicals contain at least three C atoms), where the groups —OH, —$NH_2$, —SH, —NHR, and $R^0$, $R^{00}$ each, independently of one another, denote H, F or straight-chain or branched alkyl having 1 to 12 C atoms, in which, in addition, one or more H atoms may each be replaced by F.

The polymerizable group P, $P^1$, $P^2$ or $P^3$ in the formulae above and below independently is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups $P/P^1/P^2/P^3$ are independently selected from the group consisting of $CH_2$=$CW^1$—CO—O—, $CH_2$=$CW^1$—CO—,

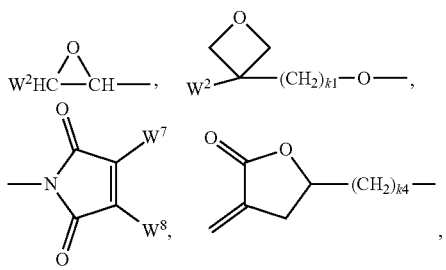

$CH_2$=$CW^2$—$(O)_{k3}$—, $CW^1$=CH—CO—$(O)_{k3}$—, $CH_3$—CH=CH—O—, $(CH_2$=$CH)_2$CH—O—CO—, $(CH_2$=$CHCH_2)_2$CH—O—CO—, $(CH_2$=$CH)_2$CH—O—, $(CH_2$=CH—$CH_2)_2$N—, $(CH_2$=CH—$CH_2)_2$NCO—, $CH_2$=CH—$(COO)_{k1}$-Phe-$(O)_{k2}$—, $CH_2$=CH—$(CO)_{k1}$-Phe-$(O)_{k2}$—, Phe-CH=CH—, HOOC— and $W^4 W^5 W^6$Si—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P/P^1/P^2/P^3$ are selected from the group consisting of $CH_2$=$CW^1$—CO—O—, $CH_2$=$CW^1$—CO—,

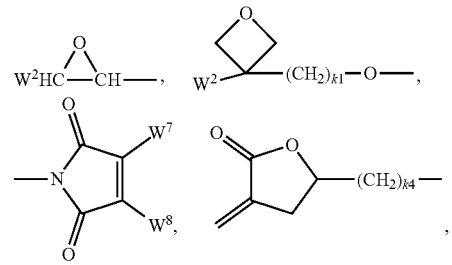

$CH_2$=$CW^2$—O—, $CW^1$=CH—CO—$(O)_{k3}$—, $(CH_2$=$CH)_2$CH—O—CO—, $(CH_2$=$CHCH_2)_2$CH—O—CO—, $(CH_2$=$CH)_2$CH—O—, $(CH_2$=CH—$CH_2)_2$N—, $(CH_2$=CH—$CH_2)_2$NCO—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH— and $W^4 W^5 W^6$Si—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P/P^1/P^2/P^3$ are independently selected from the group consisting of $CH_2$=$CW^1$—CO—O—, in particular $CH_2$=CH—CO—O—, $CH_2$=$C(CH_3)$—CO—O— and $CH_2$=CF—CO—O—, furthermore $CH_2$=CH—O—, $(CH_2$=$CH)_2$CH—O—CO—, $(CH_2$=$CH)_2$CH—O—,

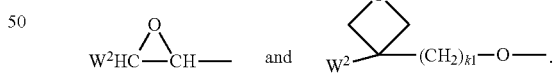

Very particularly preferred groups $P/P^1/P^2/P^3$ are therefore independently selected from the group consisting of acrylate, methacrylate, fluoroacrylate, furthermore vinyloxy, chloroacrylate, oxetane and epoxide groups, and of these in turn preferably an acrylate or methacrylate group. For the group P a methacrylate group is usually preferred most.

Preferred spacer groups Sp, $Sp^1$ or $Sp^2$ are a single bond or selected from the formula Sp"-X", so that the radical $P^{1/2}$-$Sp^{1/2}$- conforms to the formula $P^{1/2}$-Sp"-X"—, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —Si($R^0 R^{00}$)—, —CO—, —CO—O—, —O—CO—, —O—CO—O—, —S—CO—, —CO—S—, —N(R⁰)—CO—O—, —O—CO—N(R⁰⁰)—, —N(R⁰⁰)—CO—N(R⁰⁰)—, —CH=CH— or —C≡C— in such a way that O and/or S atoms are not linked directly to one another, X" denotes —O—, —S—, —CO—, —CO—O—, —O—CO—, —O—CO—O—, —CO—N(R⁰⁰)—, —N(R⁰⁰)—CO—, —N(R⁰⁰)—CO—N(R⁰⁰)—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—CO—O—, —O—CO—CH=CH— or a single bond, R⁰ in each case independently denotes H, F or straight-chain or branched alkyl having 1 to 12 C atoms, in which, in addition, one or more H atoms may each be replaced by F, R⁰⁰ in each case independently denotes alkyl having 1 to 12 C atoms, R⁰⁰⁰ in each case independently denotes H or alkyl having 1 to 12 C atoms, and Y² and Y³ each, independently of one another, denote H, F, Cl or CN.

X" is preferably —O—, —S—, —CO—, —COO—, —O—CO—, —O—COO— or a single bond.

Typical spacer groups Sp" are, for example, a single bond, —(CH₂)ₚ₁—, —(CH₂CH₂O)_q₁—CH₂CH₂—, —CH₂CH₂—S—CH₂CH₂—, or —(SiR⁰⁰R⁰⁰⁰—O)ₚ₁—, in which p1 is an integer from 1 to 12, q1 is an integer from 1 to 3, and R⁰⁰ and R⁰⁰⁰ have the meanings indicated above.

Particularly preferred groups -Sp"-X"— are —(CH₂)ₚ₁—, —(CH₂)ₚ₁—O—, —(CH₂)ₚ₁—O—CO—, —(CH₂)ₚ₁—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The substances of the formula M preferably contain no —OH, —NH₂, —SH, —NHR¹¹, —C(O)OH and —CHO radicals.

Suitable and preferred (co)monomers for use in displays according to the invention are selected, for example, from the following formulae:

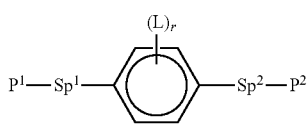
M1

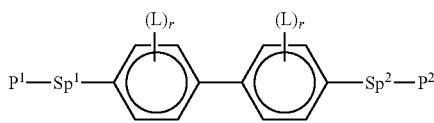
M2

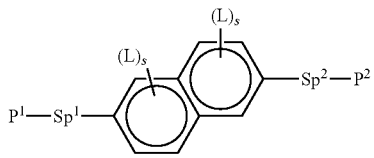
M3

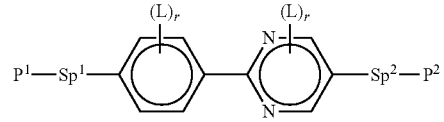
M4

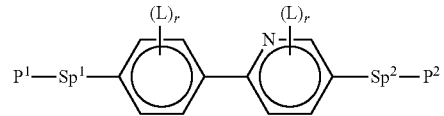
M5

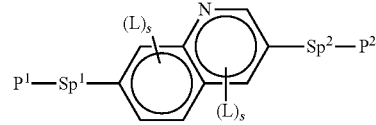
M6

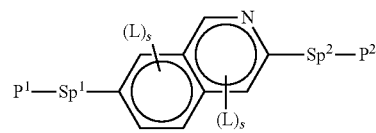
M7

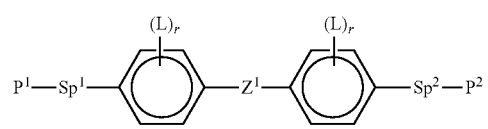
M8

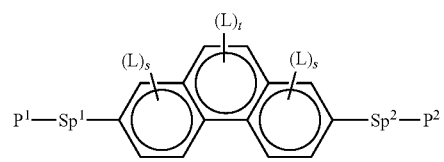
M9

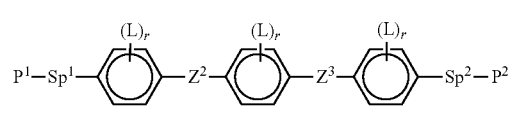
M10

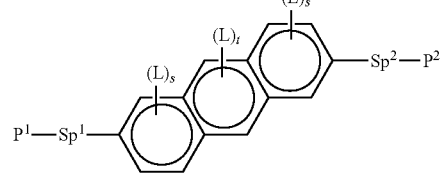
M11

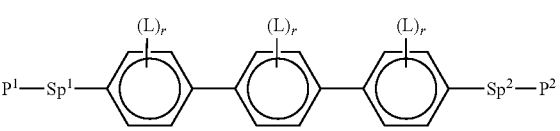
M12

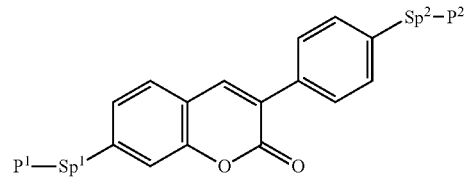
M13

M14
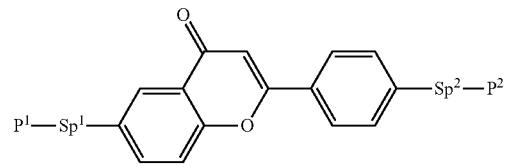
M15
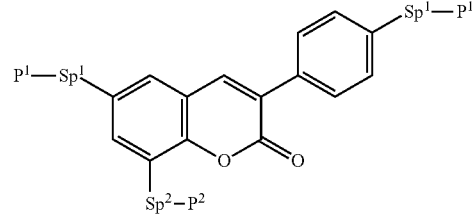
M16
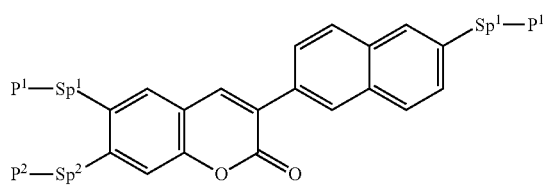
M17
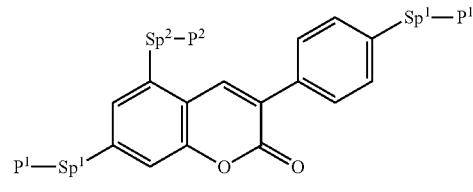
M18
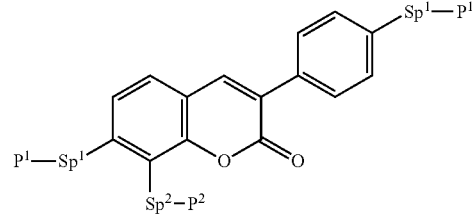
M19
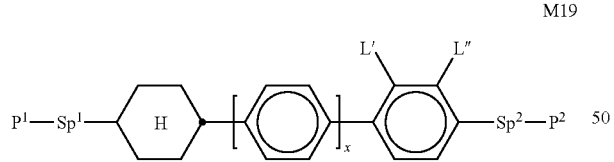
M20
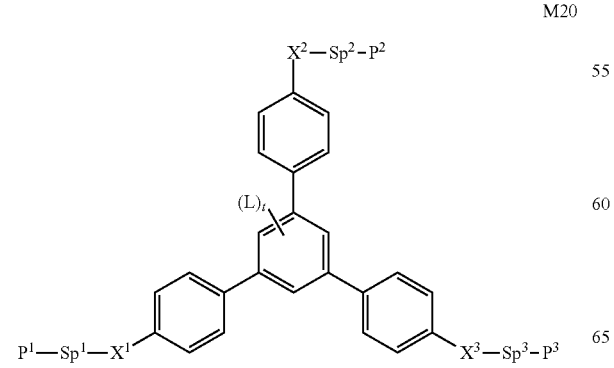
M21
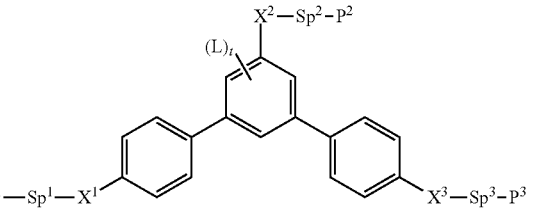
M22
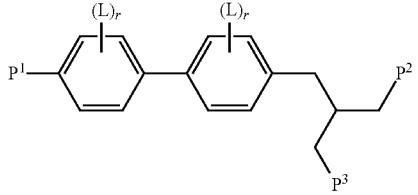
M23
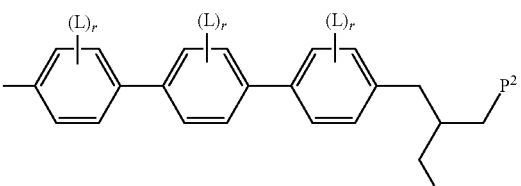
M24
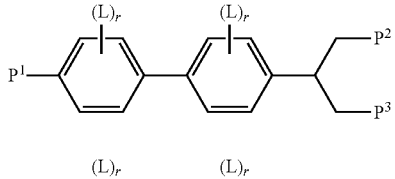
M25
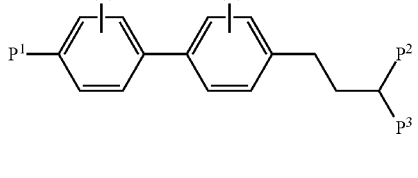
M26
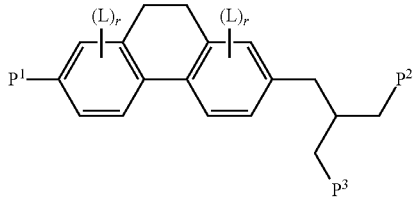
M27
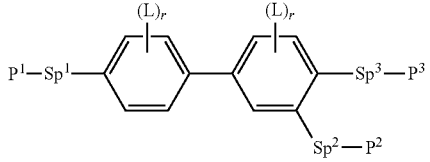
M28
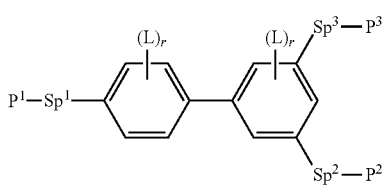

-continued

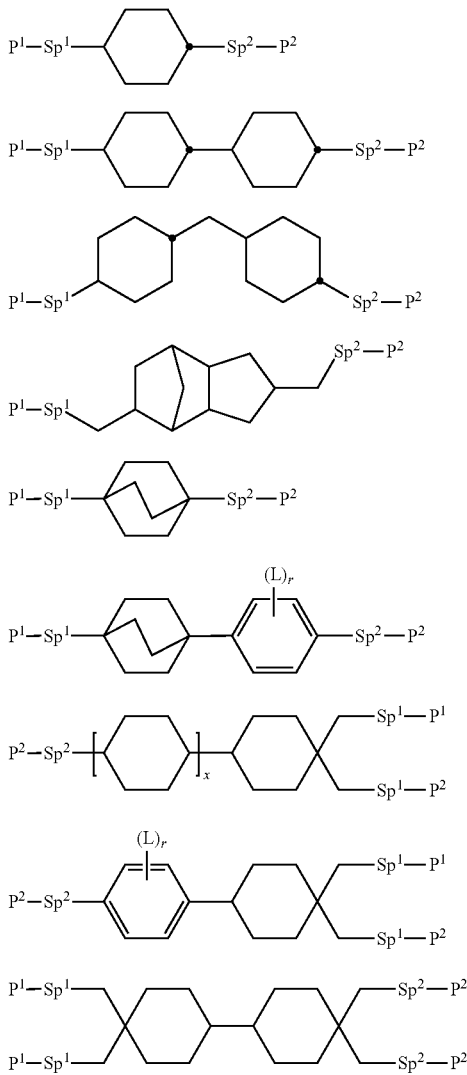

in which the individual radicals have the following meanings:

$P^1$, $P^2$ and $P^3$ each, independently of one another, denote a polymerizable group, preferably having one of the meanings indicated above and below for P, preferably an acrylate, methacrylate, fluoroacrylate, oxetane, vinyloxy or epoxide group, $Sp^1$, $Sp^2$ and $Sp^3$ each, independently of one another, denote a single bond or a spacer group, preferably having one of the meanings as indicated above and below for formula M, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and wherein the bonding between groups —$(CH_2)_{p1}$—O—, —$(CH_2)_{p1}$—CO—O— and —$(CH_2)_{p1}$—O—CO—O— and the adjacent ring occurs via the O atom, where, in addition, one or more of the radicals $P^1$-$Sp^1$-, $P^2$-$Sp^2$- and $P^3$-$Sp^3$- may denote a radical $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^0)$—, —C≡C—, —O—, —S—, —CO—, —CO—, —O—CO—, or —O—CO—O— in such a way that O and/or S atoms are not linked directly to one another, and in which, in addition, one or more H atoms may each be replaced by F, Cl or CN, preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another and on each occurrence identically or differently, denote H or alkyl having 1 to 12 C atoms, $X^1$, $X^2$ and $X^3$ each, independently of one another, denote —CO—O—, O—CO— or a single bond, $Z^1$ denotes —O—, —CO—, —C($R^y R^z$)— or —$CF_2 CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$— where n is 2, 3 or 4, $R^y$ and $R^z$ each, independently of one another, denote H, F, $CH_3$ or $CF_3$, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M37, the ring group

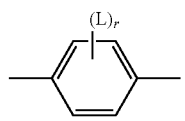

preferably denotes

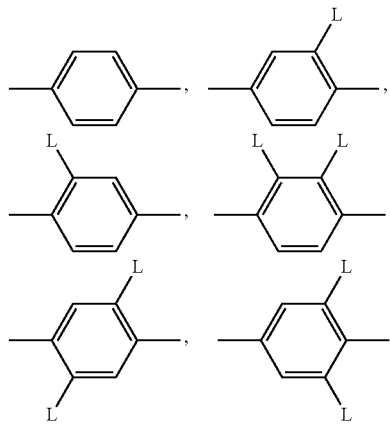

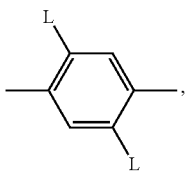

in which L, on each occurrence identically or differently, has one of the above meanings and preferably denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, particularly preferably F, Cl, CN, $CH_3$, $C_2H_5$, $OCH_3$, $COCH_3$, $OCF_3$ or P-Sp-, very particularly preferably F, Cl, $CH_3$, $OCH_3$, $COCH_3$ or $OCF_3$, in particular F or $CH_3$.

The LC medium or the polymerizable component preferably comprises one or more compounds selected from the group of the formulae M1-M28, particularly preferably from the group of the formulae M2-M15, very particularly preferably from the group of the formulae M2, M3, M9, M14 and M15. The LC medium or the polymerizable component preferably comprises no compounds of the formula M10 in which either of $Z^2$ and $Z^3$ denote —(CO)O— or —O(CO)—.

For the production of PS-VA displays, the polymerizable compounds are polymerized or crosslinked (if a polymerizable compound contains two or more polymerizable groups) by in-situ polymerization in the LC medium between the substrates of the LC display, optionally with application of a voltage. The polymerization can be carried out in one step. It is also possible to carry out firstly the polymerization with application of a voltage in a first step in order to produce a pretilt angle, and subsequently, in a second polymerization step, to polymerize or crosslink the compounds which have not fully reacted in the first step without an applied voltage ("end curing"). Suitable and preferred polymerization methods are, for example, thermal or photopolymerization, preferably photopolymerization, in particular UV photopolymerization. One or more initiators can optionally also be added here. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1 173® (Ciba AG). If an initiator is employed, its proportion is preferably 0.001 to 5% by weight, particularly preferably 0.001 to 1% by weight.

The polymerizable component or the LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of the RMs or the polymerizable component, is preferably 10-10,000 ppm, particularly preferably 50-500 ppm.

Besides the self-alignment additives described above and the optional polymerizable compounds (M) described above, the LC media for use in the LC displays according to the invention comprise an LC mixture ("host mixture") comprising one or more, preferably two or more, low-molecular-weight (having a molecular weight <600) compounds. The latter are stable or unreactive with respect to a polymerization reaction under the conditions used for the polymerization of the polymerizable compounds. In principle, any dielectrically negative LC mixture which is suitable for use in conventional VA displays is suitable as host mixture. Host mixtures having a positive dielectric anisotropy can be employed in principle, too, if desired. The proportion of the host mixture for liquid-crystal displays is generally 95% by weight or more, preferably 97% by weight or more.

Suitable LC mixtures are known to the person skilled in the art and are described in the literature. LC media for VA displays having negative dielectric anisotropy are described in EP 1 378 557 A1 or WO 2013/004372.

Preferred embodiments of the liquid-crystalline medium having negative dielectric anisotropy according to the invention are indicated below:

a) Liquid-crystalline medium which additionally comprises one or more compounds selected from the group of the compounds of the formulae IIA, IIB and IIC:

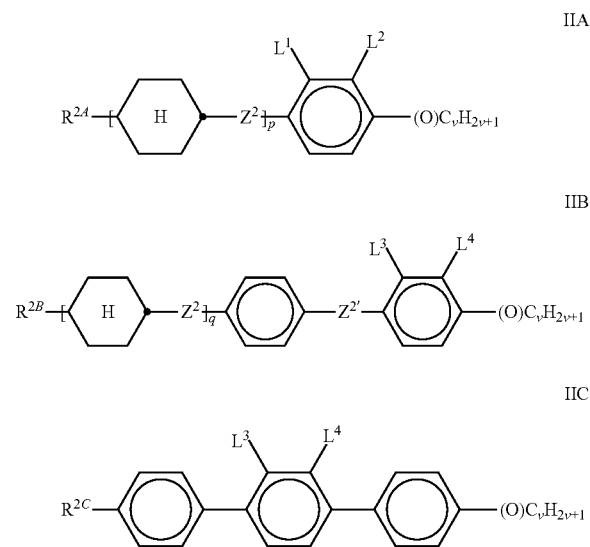

in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

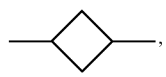

—C≡C—, —$CF_2$O—, —$OCF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CH CH$_2$O—, p denotes 0, 1 or 2,
q denotes 0 or 1, and
v denotes 1 to 6, preferably 2 or 4.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —C$_2$H$_4$— or —CH$_2$O— bridge.

If in the formula IIB $Z^2$=—C$_2$H$_4$— or —CH$_2$O—, $Z^{2'}$ is preferably a single bond or, if $Z^{2'}$=—C$_2$H$_4$— or —CH$_2$O—, $Z^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, $L^3$ and $L^4$ preferably each denote F.

Preferred compounds of the formulae IIA, IIB and IIC are indicated below:

IIA-1
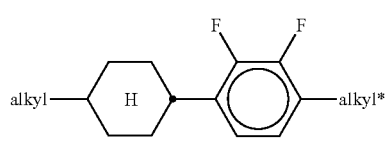

IIA-2
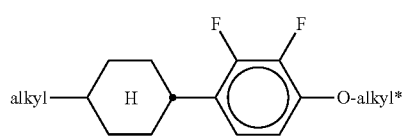

IIA-3
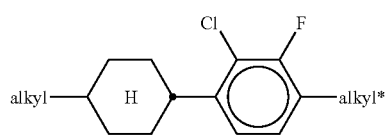

IIA-4
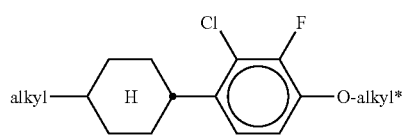

IIA-5
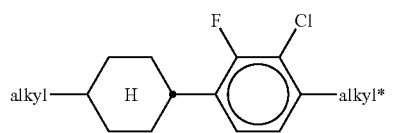

IIA-6
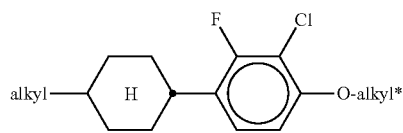

-continued

IIA-7
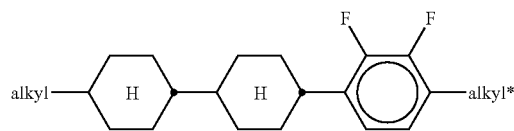

IIA-8
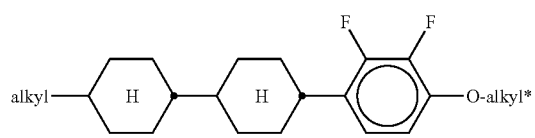

IIA-9
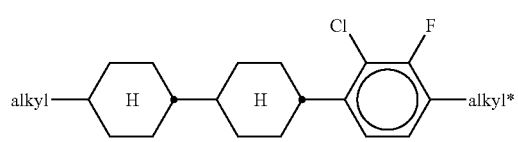

IIA-10
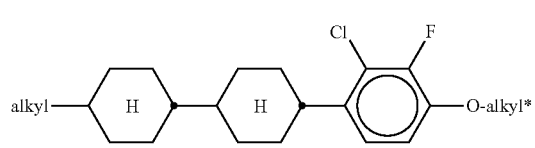

IIA-11
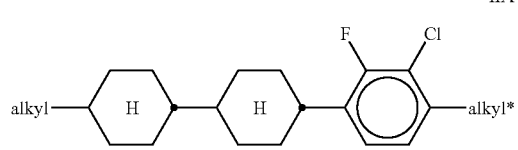

IIA-12
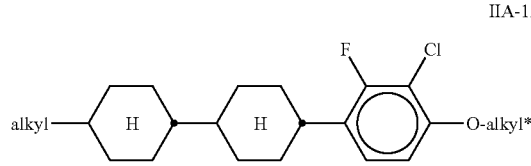

IIA-13
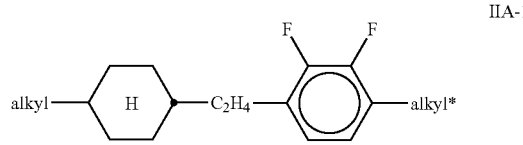

IIA-14
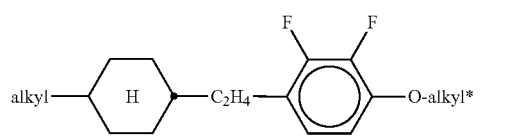

IIA-15
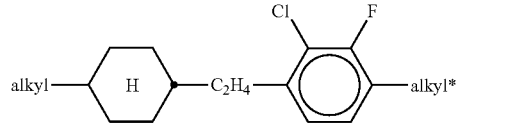

IIA-16
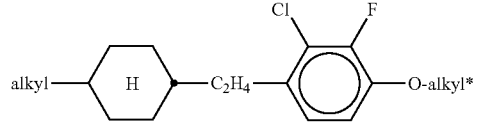

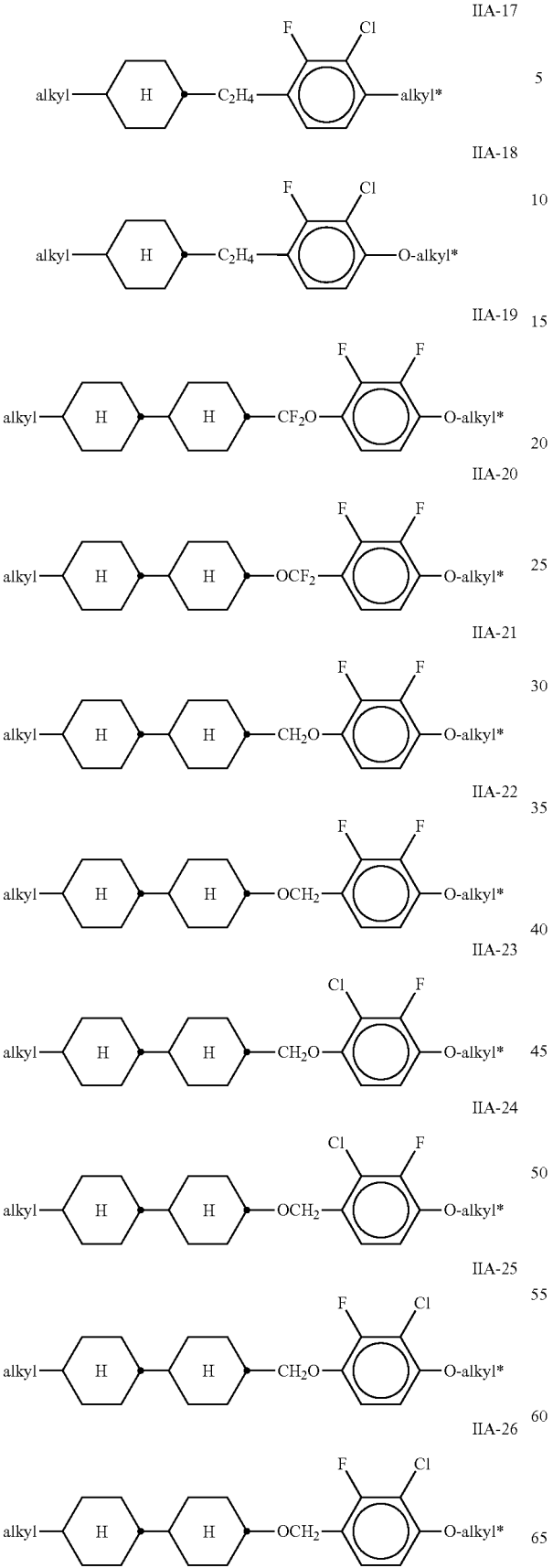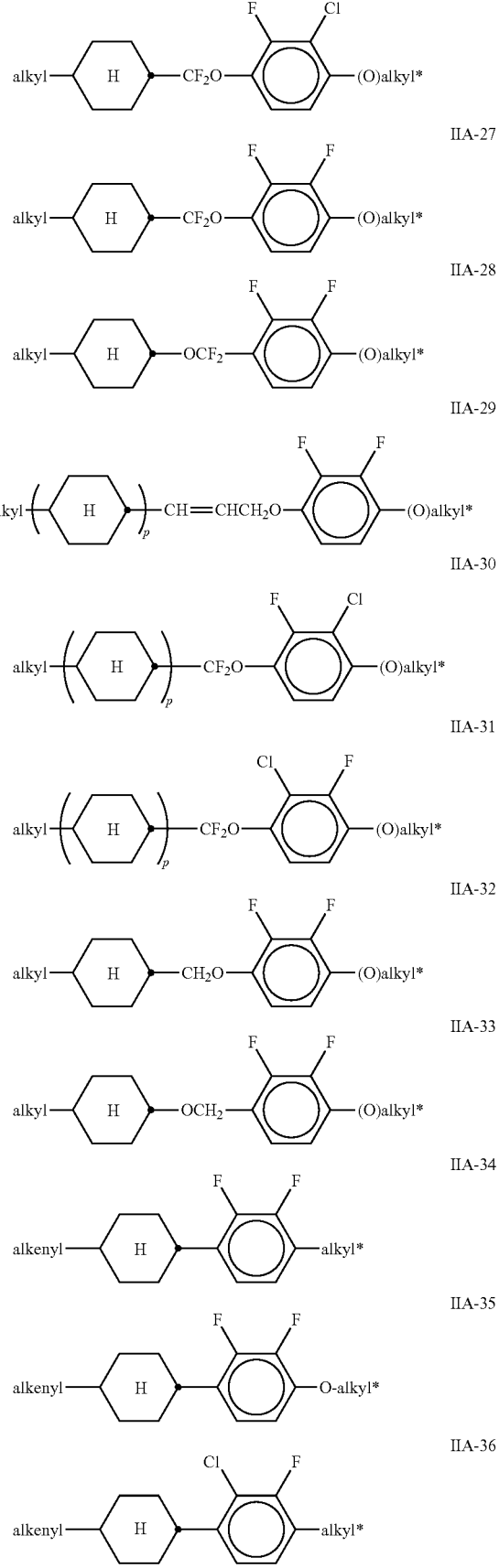

IIA-57
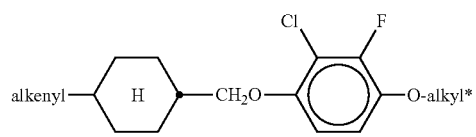
IIA-58
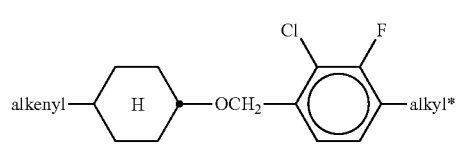
IIA-59
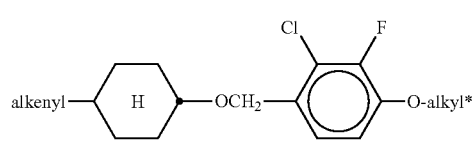
IIA-60
IIA-61
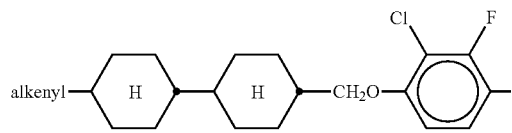
IIA-62
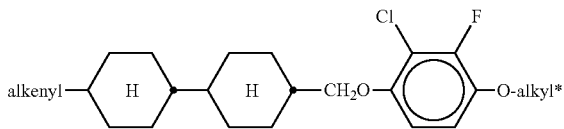
IIA-63
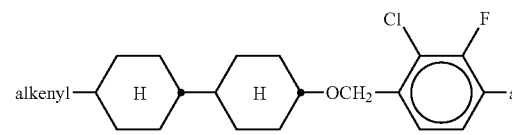
IIA-64
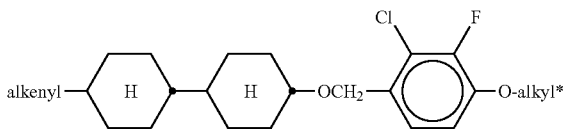
IIA-65
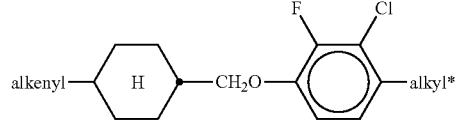
IIA-66
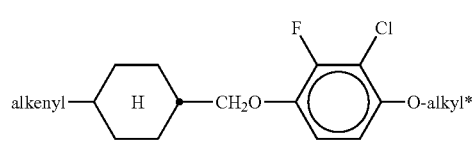
IIA-67
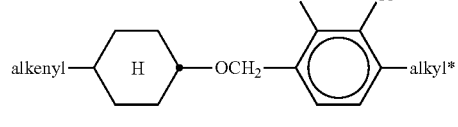
IIA-67
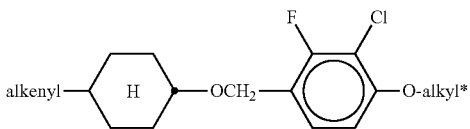
IIA-68
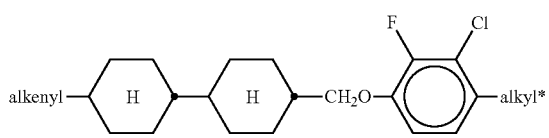
IIA-69
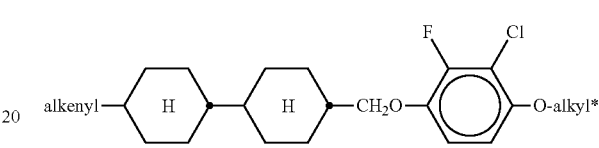
IIA-70
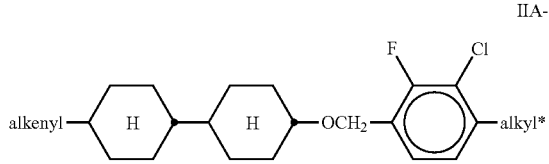
IIA-71
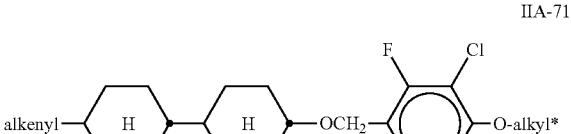
IIA-72
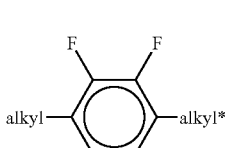
IIA-73
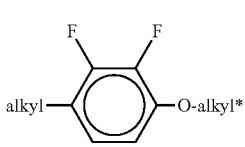
IIA-74
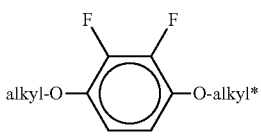
IIA-75
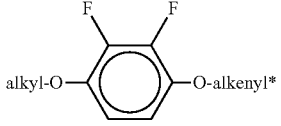
IIA-76
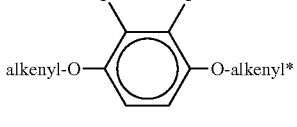

IIB-1
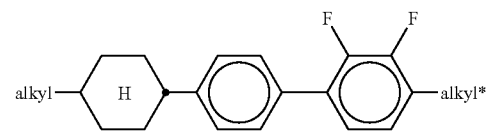

IIB-2
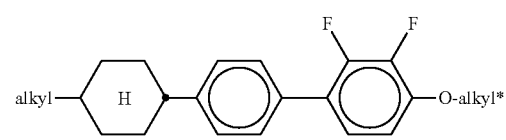

IIB-3
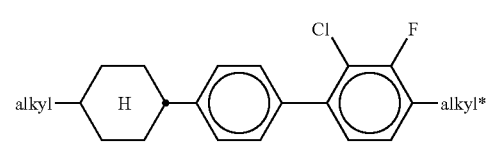

IIB-4
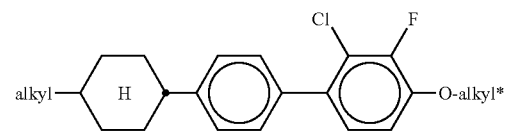

IIB-5
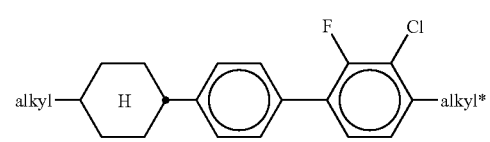

IIB-6
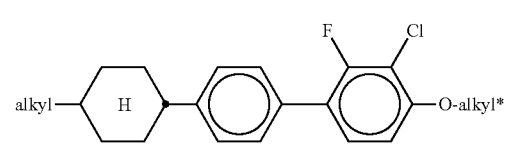

IIB-7
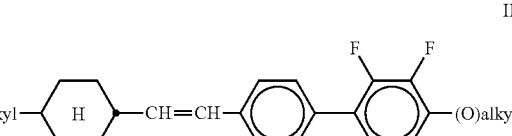

IIB-8
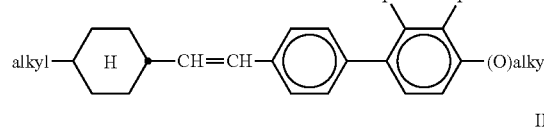

IIB-9
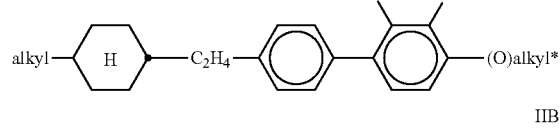

IIB-10
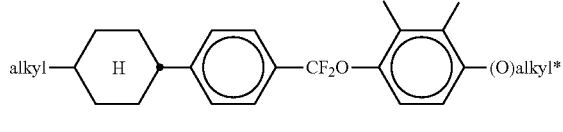

IIB-11
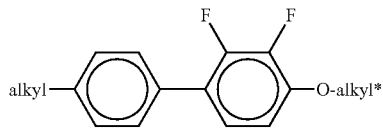

IIB-12
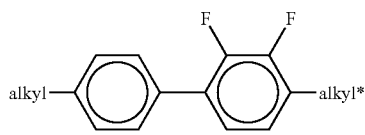

IIB-13
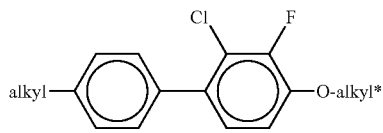

IIB-14
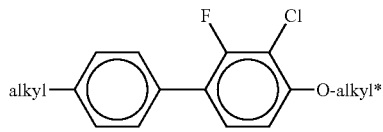

IIB-15
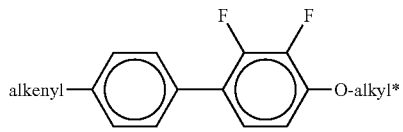

IIB-16
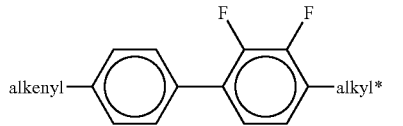

IIB-17
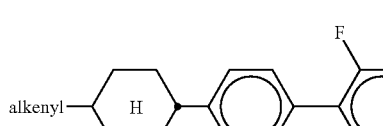

IIB-18
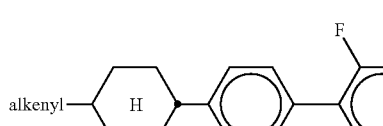

IIC-1
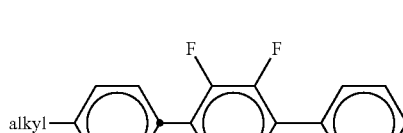

in which alkyl and alkyl* each, independently of one another, denote a straight-chain alkyl radical having 1-6 C atoms and in which alkenyl and alkenyl* each, independently of one another, denote a straight-chain alkenyl radical having 2-6 C atoms.

Particularly preferred mixtures according to the invention comprise one or more compounds of the formulae IIA-2, IIA-8, IIA-14, IIA-29, IIA-35, IIA-74, IIB-2, IIB-11, IIB-16 and IIC-1.

The proportion of compounds of the formulae IIA and/or IIB in the mixture as a whole is preferably at least 10% by weight.

Particularly preferred media according to the invention comprise at least one compound of the formula IIC-1,

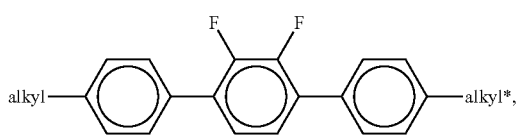

in which alkyl and alkyl* have the meanings indicated above, preferably in amounts of ≥3% by weight, in particular ≥5% by weight and particularly preferably 5-25% by weight.

b) Liquid-crystalline medium which additionally comprises one or more compounds of the formula III,

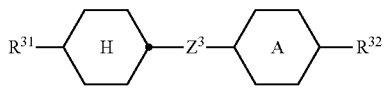

in which
$R^{31}$ and $R^{32}$ each, independently of one another, denote a straight-chain alkyl, alkoxyalkyl, alkenyl or alkoxy radical having up to 12 C atoms, and

denotes

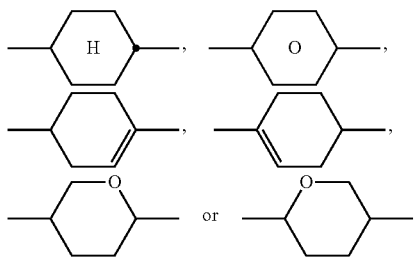

$Z^3$ denotes a single bond, —CH$_2$CH$_2$—, —CH═CH—, —CF$_2$O—, —OCF$_2$—, —CH$_2$O—, —OCH$_2$—, —COO—, —O—CO—, —C$_2$F$_4$—, —O$_4$H$_8$—, —CF═CF—.

Preferred compounds of the formula III are indicated below:

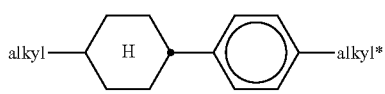

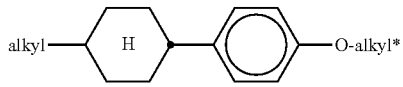

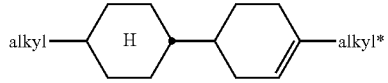

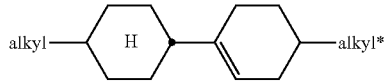

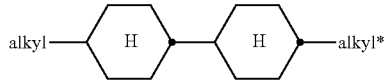

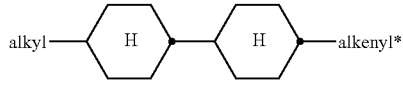

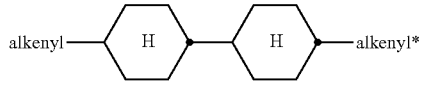

in which
alkyl and alkyl* each, independently of one another, denote a straight-chain alkyl radical having 1-6 C atoms,
alkenyl and alkenyl* each, independently of one another, denote a straight-chain alkenyl radical having 2-6 C atoms.

The proportion of compounds of the formula III in the mixture as a whole is preferably at least 5% by weight.

Preference is given to mixtures according to the invention comprising one or more of the compounds

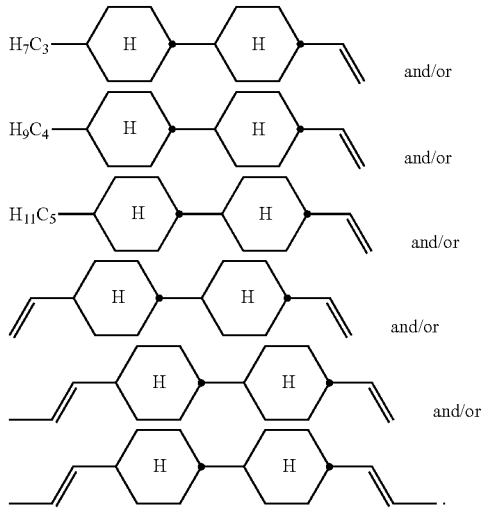

preferably in total amounts of ≥5% by weight, in particular ≥10% by weight.

Preference is given to mixtures according to the invention comprising the compound

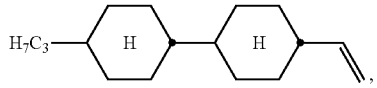

preferably in total amounts of >5% by weight, in particular ≥20% by weight.

d) Liquid-crystalline medium which additionally comprises one or more tetracyclic compounds of the formulae

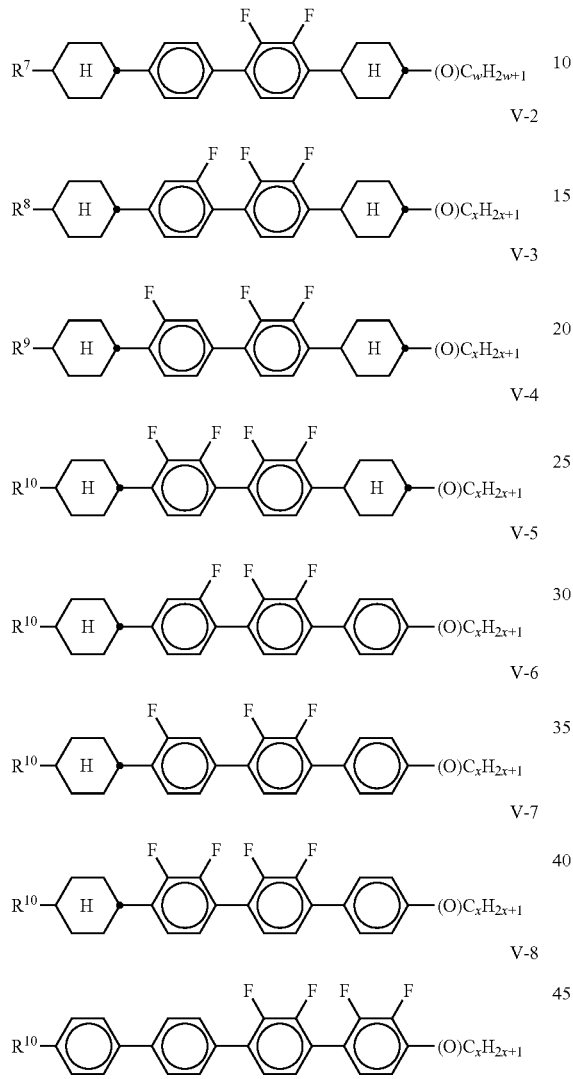

in which
R$^{7-10}$ each, independently of one another, have one of the meanings indicated for R$^{2A}$ in formula IIA above, and w and x each, independently of one another, denote 1 to 6.

Particular preference is given to mixtures comprising at least one compound of the formula V-8.

e) Liquid-crystalline medium which additionally comprises one or more compounds of the formulae Y-1 to Y-6,

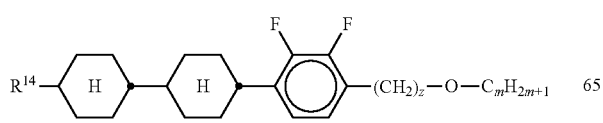

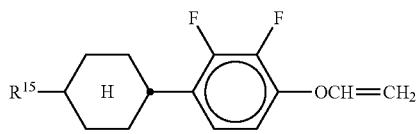

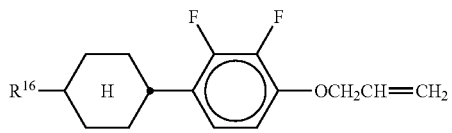

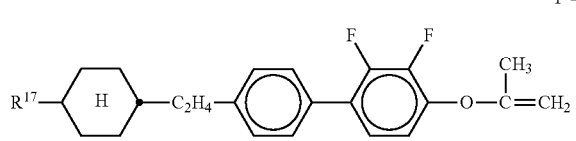

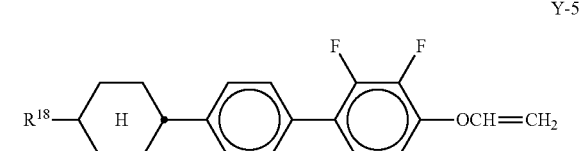

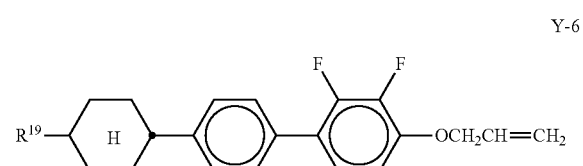

in which R$^{14}$-R$^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21,

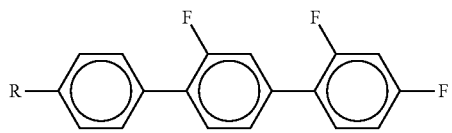

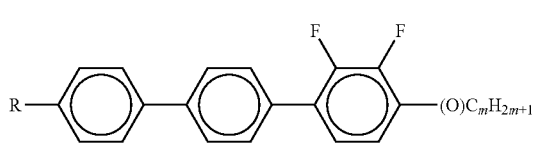

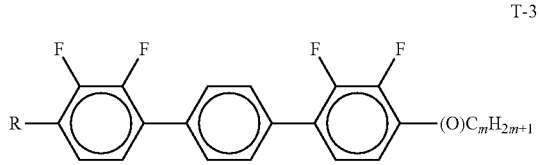

-continued

T-4
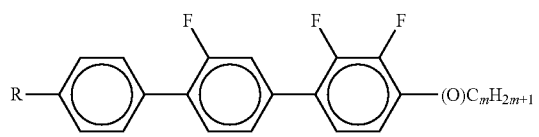

T-5
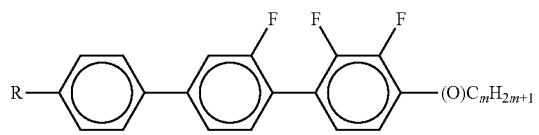

T-6
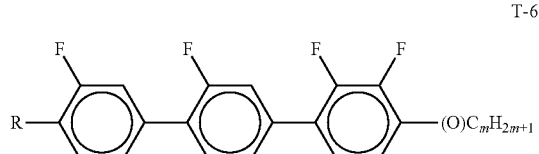

T-7
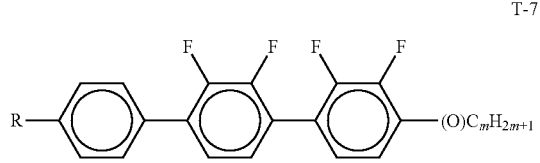

T-8
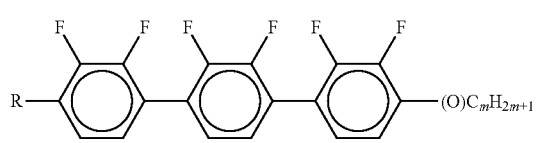

T-9
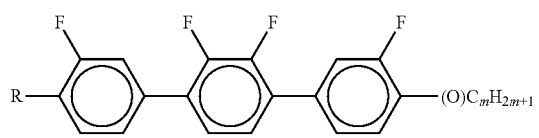

T-10
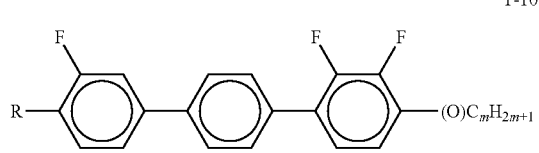

T-11
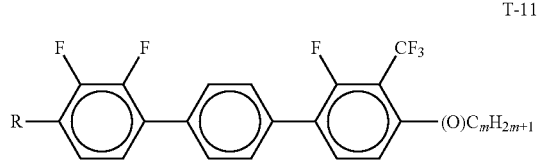

T-12
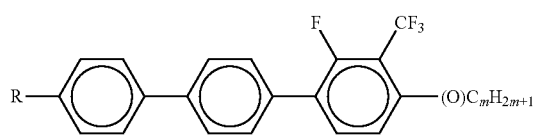

T-13
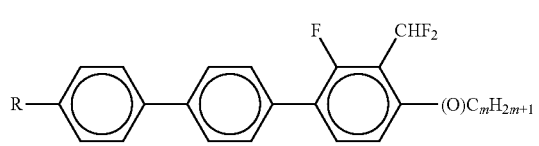

-continued

T-14
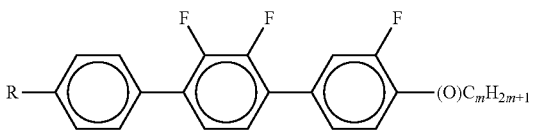

T-15
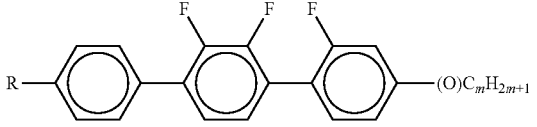

T-16
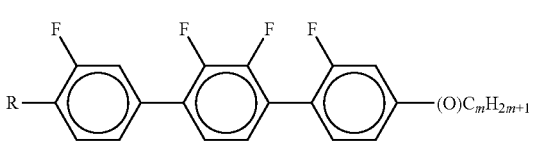

T-17
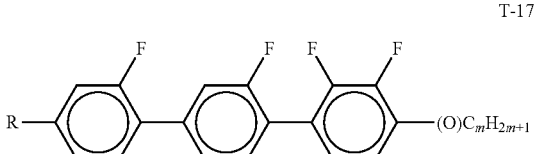

T-18
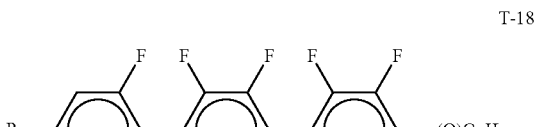

T-19
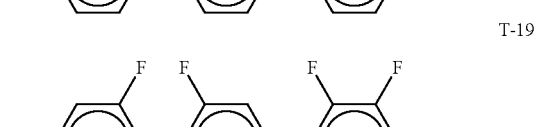

T-20
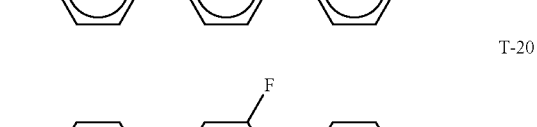

T-21
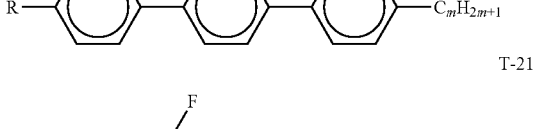

in which

R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl.

In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

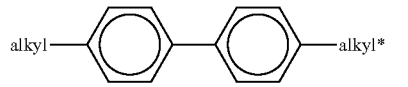
B-1

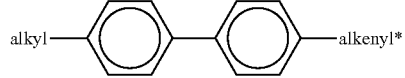
B-2

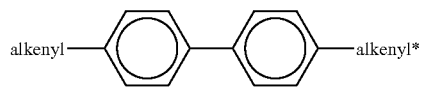
B-3 in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

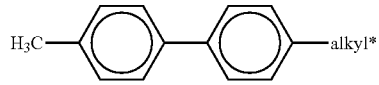
B-1a

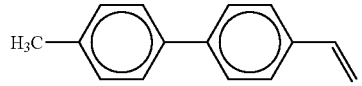
B-2a

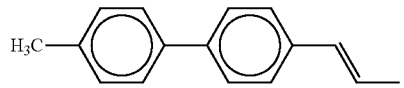
B-2b

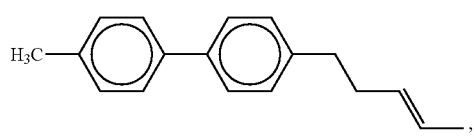
B-2c in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-7,

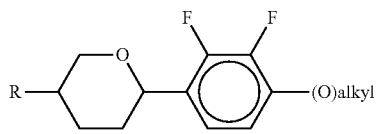
Z-1

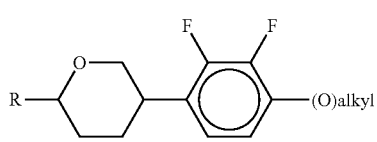
Z-2

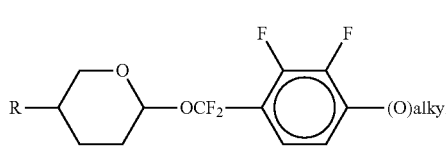
Z-3

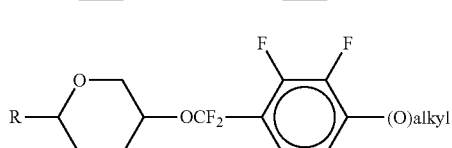
Z-4

Z-5

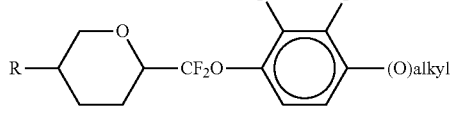
Z-6

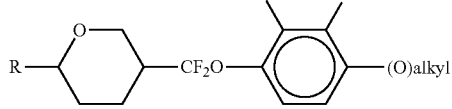
Z-7

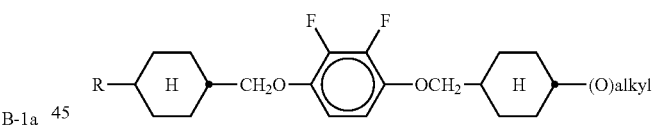

in which R and alkyl have the meanings indicated above.

i) Liquid-crystalline medium comprising at least one compound of the formulae O-1 to O-11,

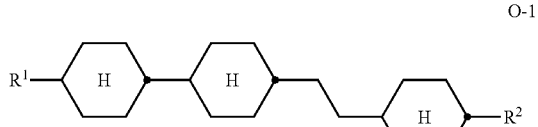
O-1

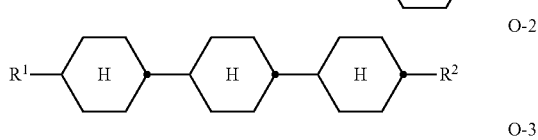
O-2

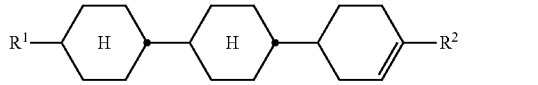
O-3

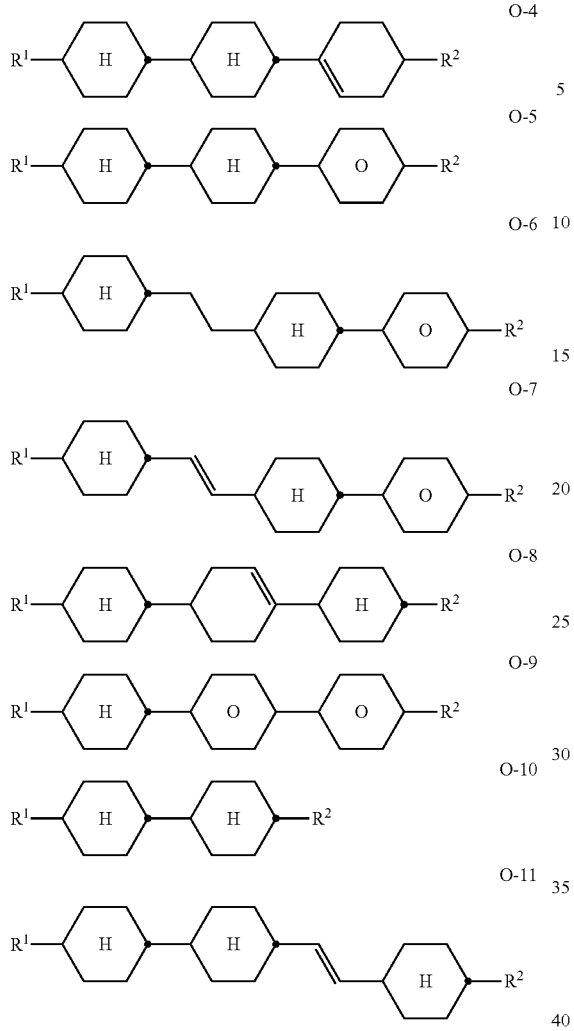

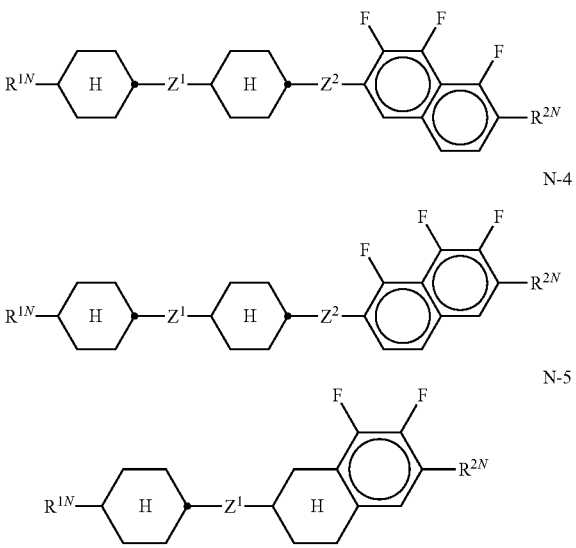

in which $R^1$ and $R^2$ have the meanings indicated for $R^{2A}$. $R^1$ and $R^2$ preferably each, independently of one another, denote straight-chain alkyl or Alkenyl having up to 6 carbon atoms.

j) Preferred liquid-crystalline media according to the invention comprise one or more substances which contain a tetrahydronaphthyl or naphthyl unit, such as, for example, the compounds of the formulae N-1 to N-5,

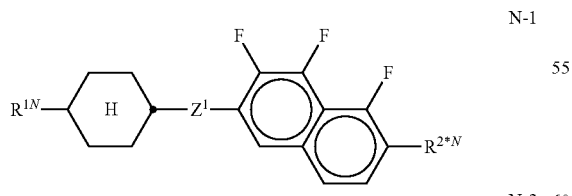

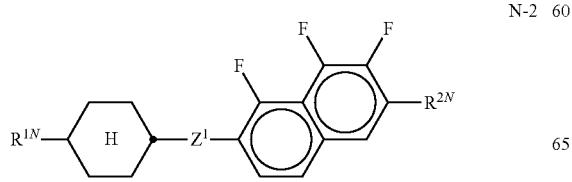

in which $R^{1N}$ and $R^{2N}$ each, independently of one another, denote H, an alkyl or alkenyl radical having up to 15 C atoms, which is unsubstituted, monosubstituted by CN or $CF_3$ or at least monosubstituted by halogen, in which one or more $CH_2$ groups are optionally replaced by —O—, —S—,

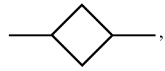

—C≡C—, —$CF_2$O—, —O$CF_2$—, —OC—O— or —O—CO— in such a way that O atoms are not linked directly to one another, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3$O—, —O$(CH_2)_3$—, —CH=CHCH$_2$CH$_2$—, —CH$_2$CH$_2$CH=CH—, —CH$_2$O—, —OCH$_2$—, —COO—, —O—CO—, —$C_2F_4$—, —CF=CF—, —CF=CH—, —CH=CF—, —$CF_2$O—, —OCF$_2$—, —CH$_2$— or a single bond.

k) Preferred mixtures comprise one or more compounds selected from the group of the difluorodibenzochromane compounds of the formula BC, chromans of the formula CR, fluorinated phenanthrenes of the formulae PH-1 and PH-2, fluorinated dibenzofurans of the formula BF-1 and BF2 and fluorinated dibenzothiophene compounds of the formula BS-1 and BS-2,

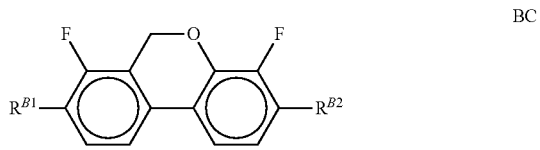

CR

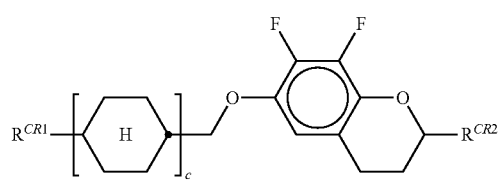

PH-1

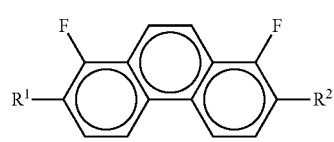

PH-2

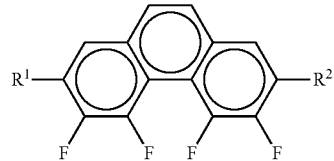

BF-1

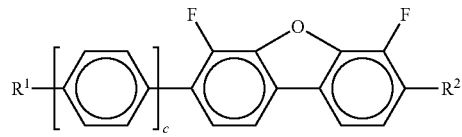

BF-2

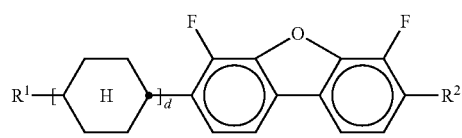

BS-1

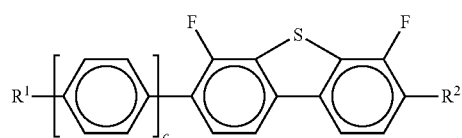

BS-2

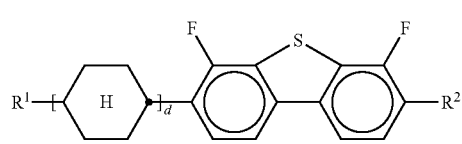

in which
$R^{B1}$, $R^{B2}$, $R^{CR1}$, $R^{CR2}$, $R^1$, $R^2$ each, independently of one another, have the meaning of $R^{2A}$. c denotes 0, 1 or 2 and d denotes 1 or 2.

The mixtures according to the invention preferably comprise the compounds of the formulae BC, CR, PH-1, PH-2, BF-1, BF-2, BS-1 and/or BS-2 in amounts of 3 to 20% by weight, in particular in amounts of 3 to 15% by weight.

Particularly preferred compounds of the formulae BC, CR, BF-1 are the compounds BC-1 to BC-7 and CR-1 to CR-5,

BC-1

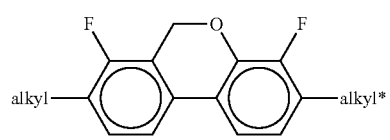

BC-2

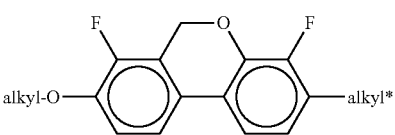

BC-3

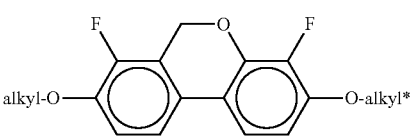

BC-4

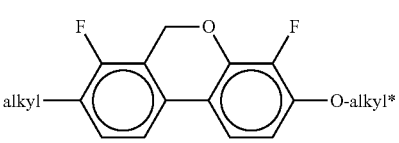

BC-5

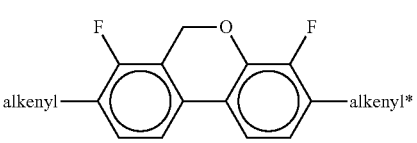

BC-6

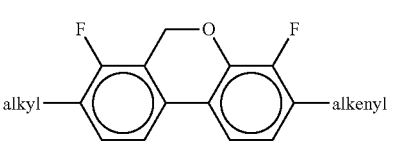

BC-7

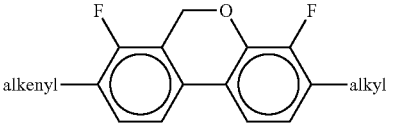

CR-1

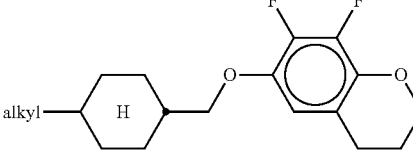

CR-2

CR-3

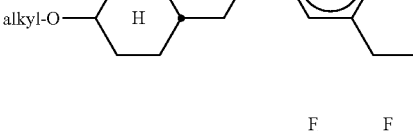

CR-4

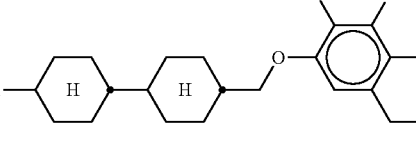

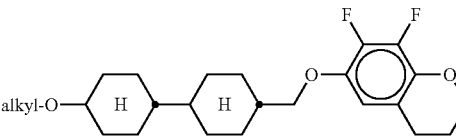

CR-5
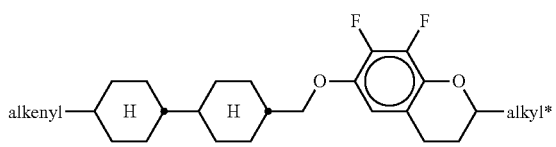

BF-1a
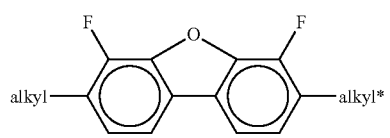

BF-1b
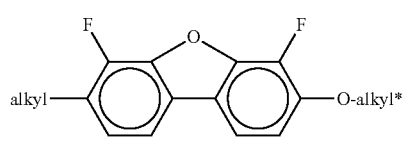

BF-1c
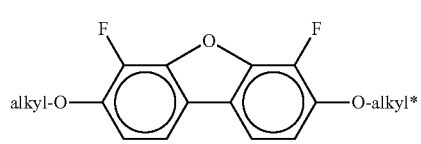

BF-1d
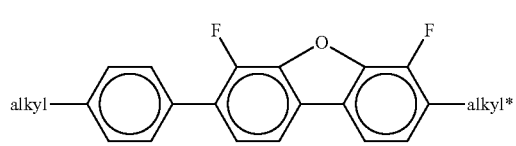

BF-1e
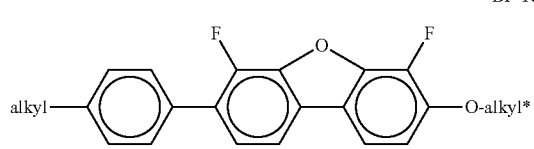

BF-1f
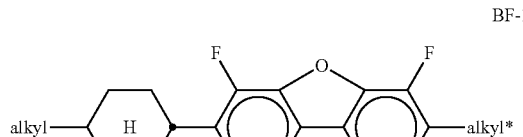

BF-1g
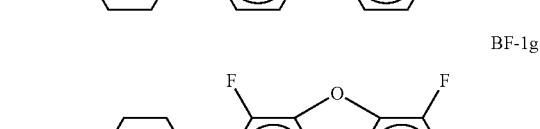

BS-1a
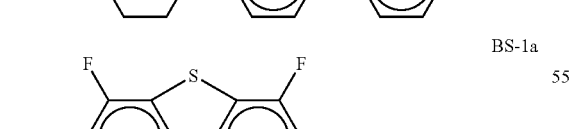

BS-1b
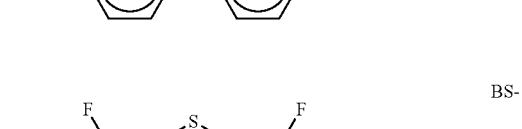

BS-1c
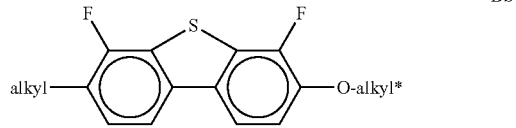

BS-1d
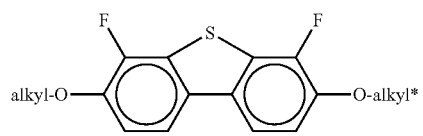

BS-1e
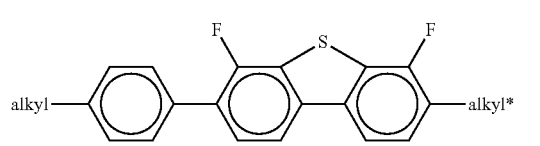

BS-1f
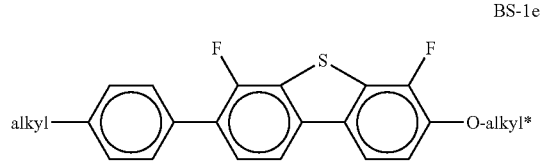

BS-1g
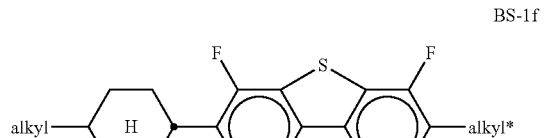

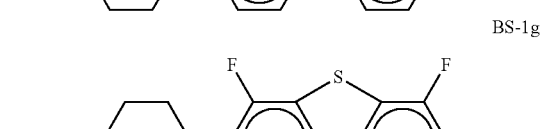

in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.

l) Preferred mixtures comprise one or more indane compounds of the formula In,

In
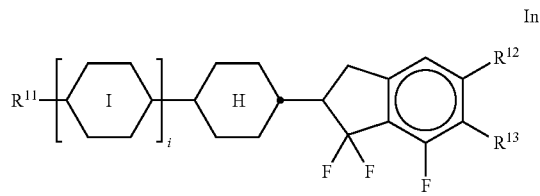

in which
$R^{11}$, $R^{12}$
$R^{13}$ each, independently of one another, denote a straight-chain alkyl, alkoxy, alkoxyalkyl or alkenyl radical having 1-6 C atoms,
$R^{12}$ and $R^{13}$ additionally denote H or halogen,

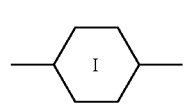

denotes
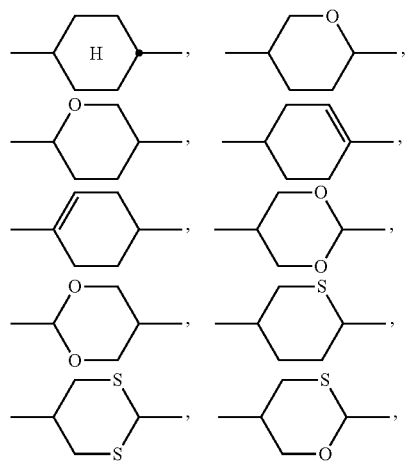
i denotes 0, 1 or 2.
In the case that $R^{12}$ and/or $R^{13}$ denote halogen, halogen is preferably F.
Preferred compounds of the formula In are the compounds of the formulae In-1 to In-16 indicated below:
In-1
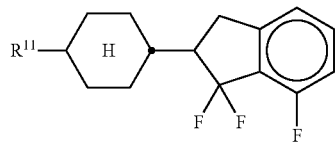
In-2
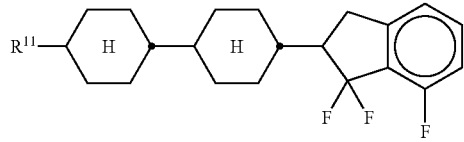
In-3
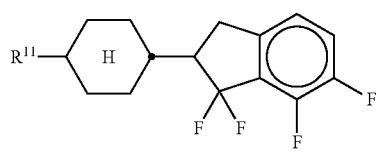
In-4
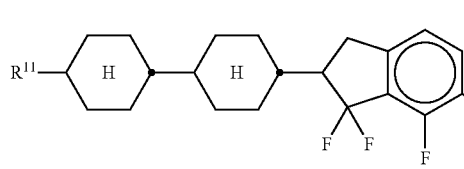
In-5
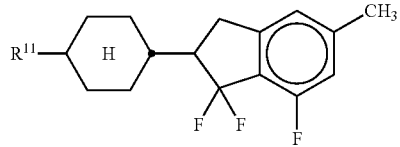
In-6
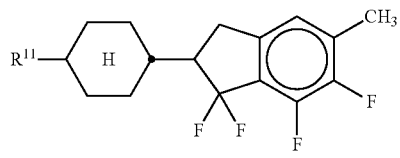
In-7
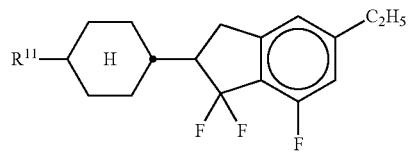
In-8
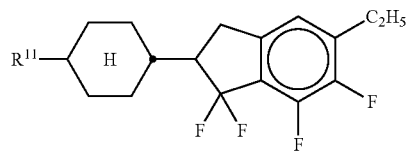
In-9
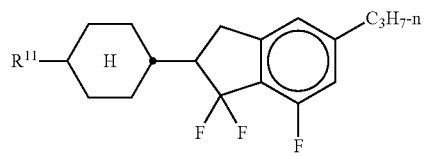
In-10
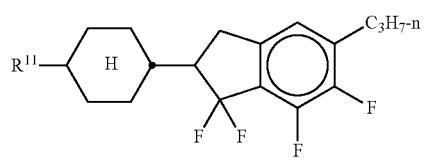
In-11
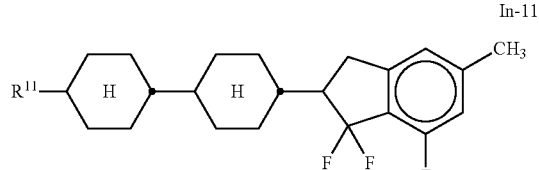
In-12
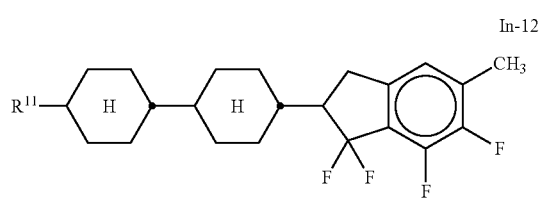
In-13
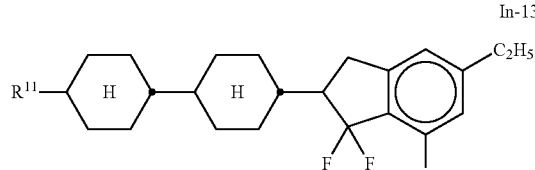
In-14
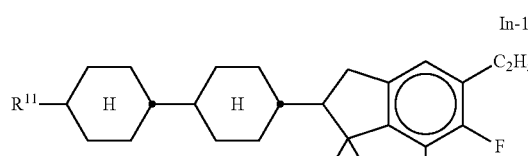
In-15
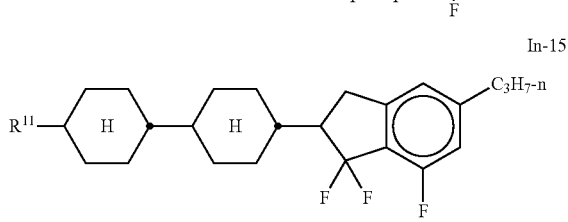

In-16

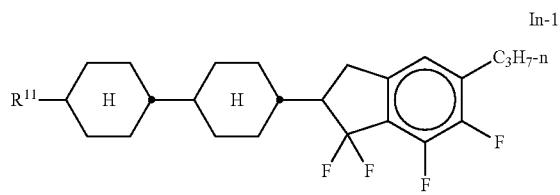

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11, L-1
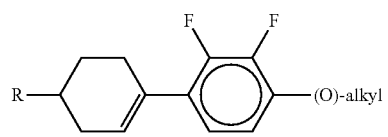

L-2
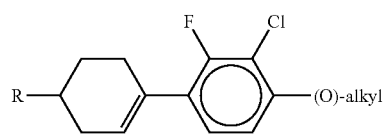

L-3
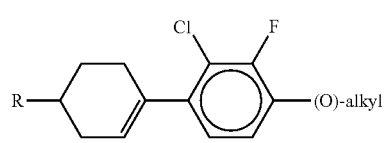

L-4
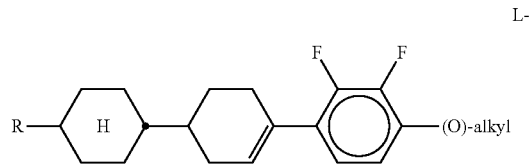

L-5
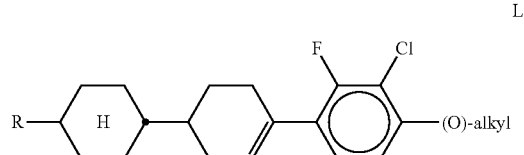

L-6
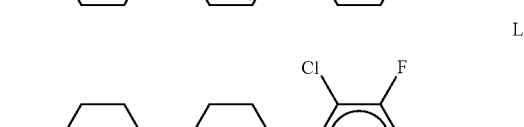

L-7
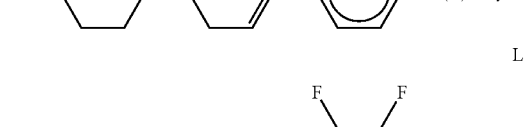

L-8
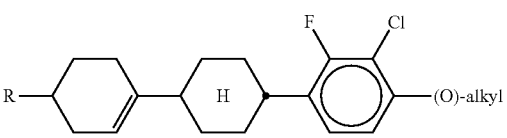

L-9
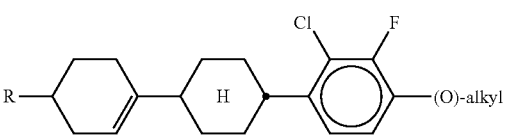

L-10
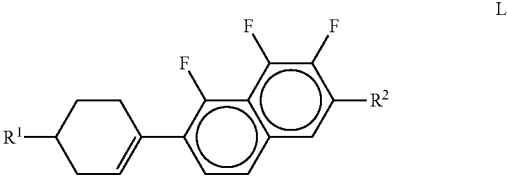

L-11
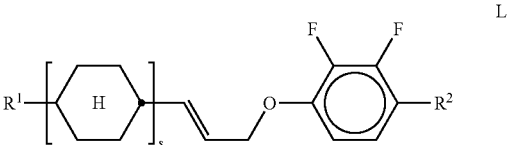

in which

R, $R^1$ and $R^2$ each, independently of one another, denote H, an alkyl or alkenyl radical having up to 15 C atoms, which is unsubstituted, monosubstituted by CN or $CF_3$ or at least monosubstituted by halogen, in which one or more $CH_2$ groups are optionally replaced by —O—, —S—,

—C≡C—, —$CF_2$O—, —O$CF_2$—, —OC—O— or —O—CO— in such a way that O atoms are not linked directly to one another, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

n) Preferred mixtures additionally comprise one or more tolan compounds of the formula To-1 and To-2, To-1
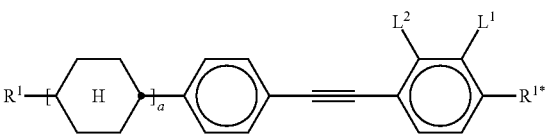

-continued

To-2

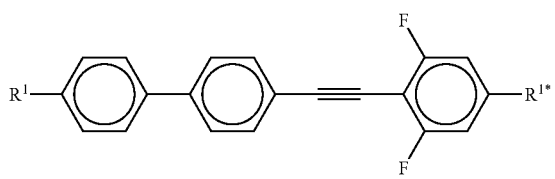

in which
R¹ and R¹' each, independently of one another, denote an alkyl or alkoxy radical having 1 to 15 C atoms, where, in addition, one or more CH₂ groups in these radicals may each be replaced, independently of one another, by —C≡C—, —CF₂O—, —CH=CH—,

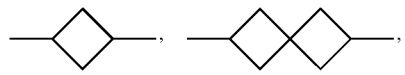

—O—, —CO—O—, —O—CO— in such a way that O atoms are not linked directly to one another, and in which, in addition, one or more H atoms may be replaced by halogen,
a 0 or 1,
L¹ and L² each, independently of one another, denote H, F, Cl, CF₃ or CHF₂, preferably H or F.
Preferred compounds of the formulae To-1 and To-2 are the compounds of the formula To-1a

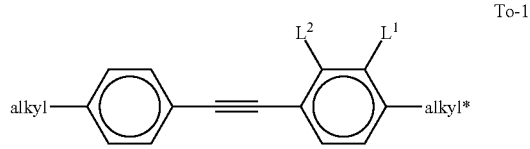

To-1b

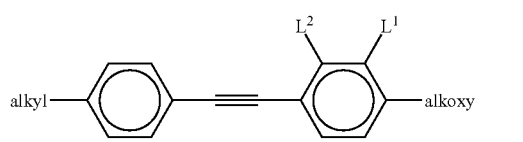

To-1c

To-1d

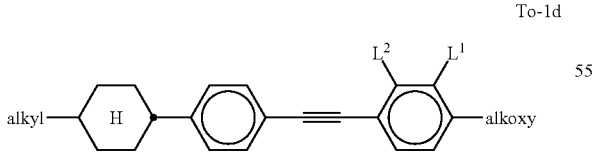

To-2a

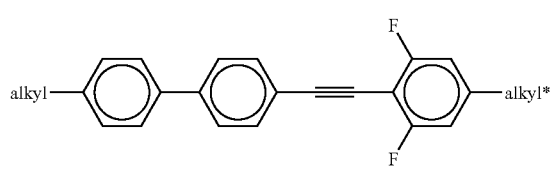

in which
alkyl and alkyl* each, independently of one another, denote a straight-chain alkyl radical having 1-6 C atoms,
alkoxy or O-alkyl denotes a straight-chain alkoxy radical having 1-6 C atoms, and
L¹ and L² each, independently of one another, denote H, F, Cl, CF₃ or CHF₂, preferably H or F.

In particular, the following compounds of the formula To-1 are preferred:

To-1a-1

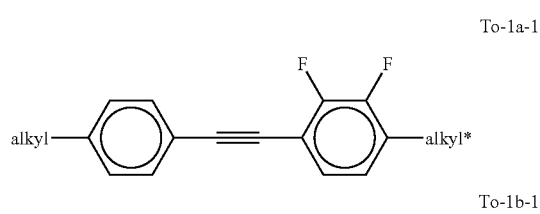

To-1b-1

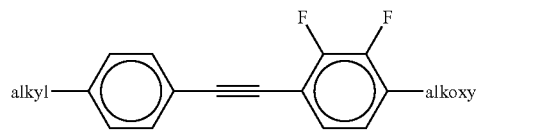

To-1c-1

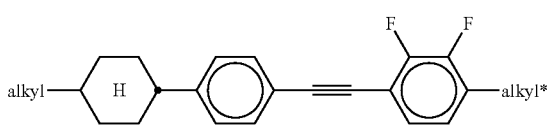

To-1d-1

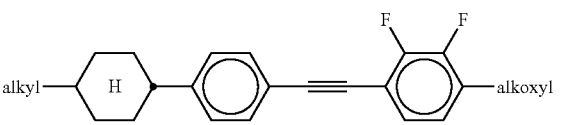

To-1a-2

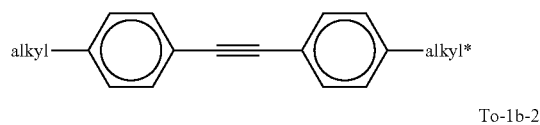

To-1b-2

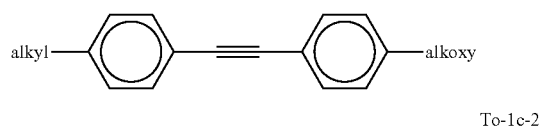

To-1c-2

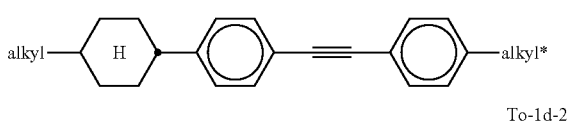

To-1d-2

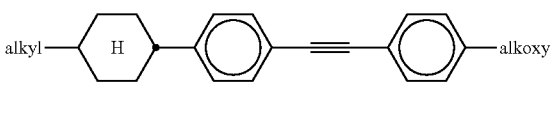

where
alkyl, alkyl* and alkoxy have the meanings indicated above.

o) Preferred mixtures contain at least one compound of the formula P,

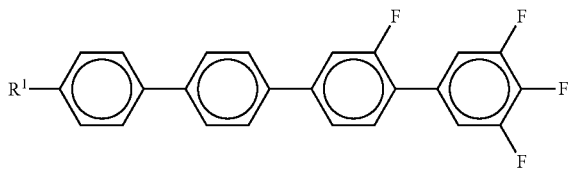

wherein R¹ denotes H, halogen, straight-chain, branched or cyclic alkyl having 1 to 25 C atoms, in which one or more non-adjacent CH₂ groups are each optionally replaced by —O—, —S—, —CO—, —CH=CH—, —C≡C—, —COO—, —O—CO—, or —O—CO—O— in such a way that O and/or S atoms are not linked directly to one another and in which one or more H atoms are each optionally replaced by F or Cl, or denotes a group -Sp-P. In a preferred embodiment R¹ denotes alkyl, in particular n-$C_3H_7$. The compound P is preferably used in amounts of 0.01-10%, in particular 0.01-5%, by weight.

The LC medium preferably has a Δε of −1.5 to −8.0, in particular −2.5 to −6.0 at 20° C. and 1 kHz.

The values of the birefringence Δn in the liquid-crystal mixture are generally between 0.07 and 0.16, preferably between 0.08 and 0.12 at 20° C. The rotational viscosity $\gamma_1$ at 20° C. before the polymerization is preferably ≤165 mPa·s, in particular ≤140 mPa·s.

Preferred embodiments of the liquid-crystalline medium according to the invention having negative dielectric anisotropy are indicated below:

LC medium which additionally comprises one or more compounds of the formulae II and/or III:

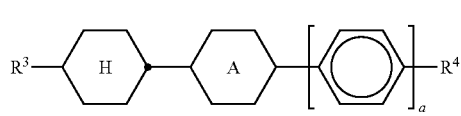

(II)

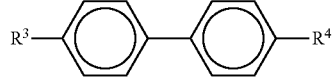

(III)

in which ring A denotes 1,4-phenylene or trans-1,4-cyclohexylene, a is 0 or 1,

R³ in each case, independently of one another, denotes alkyl having 1 to 9 C atoms or alkenyl having 2 to 9 C atoms, preferably alkenyl having 2 to 9 C atoms, and R⁴ in each case, independently of one another, denotes an unsubstituted or halogenated alkyl radical having 1 to 12 C atoms, where, in addition, one or two non-adjacent CH₂ groups may each be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

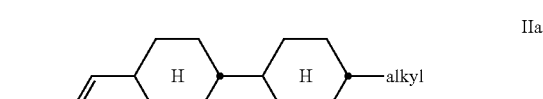

IIa

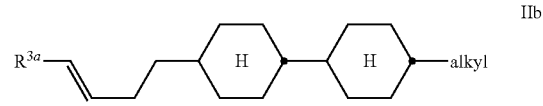

IIb

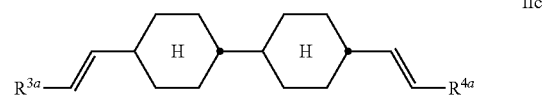

IIc

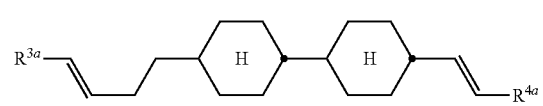

IId

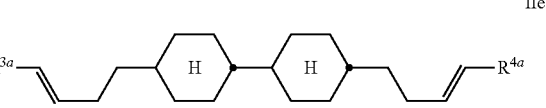

IIe

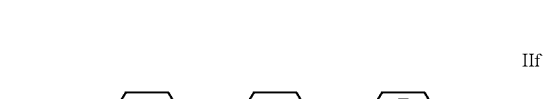

IIf

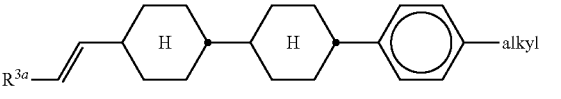

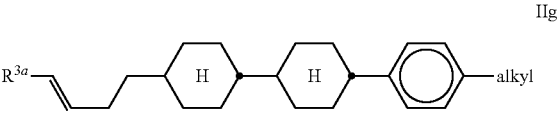

IIg

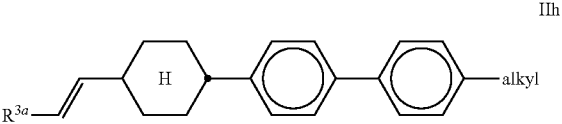

IIh

IIi

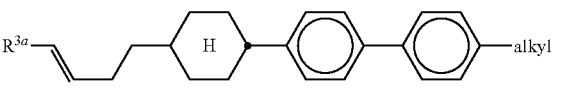

in which R³ᵃ and R⁴ᵃ each, independently of one another, denote H, CH₃, C₂H₅ or C₃H₇, and "alkyl" denotes a straight-chain alkyl group having 1 to 8, preferably 1, 2, 3, 4 or 5, C atoms. Particular preference is given to compounds of the formulae IIa and IIf, in particular those in which R³ᵃ denotes H or CH₃, preferably H, and compounds of the formula IIc, in particular those in which R³ᵃ and R⁴ᵃ denote H, CH₃ or C₂H₅.

The nematic phase of the LC medium in accordance with the invention preferably has a nematic phase in a temperature range from 10° C. or less to 60° C. or more, particularly preferably from 0 or less to 70° C. or more.

For the purposes of the present application, the two formulae for substituted benzene rings

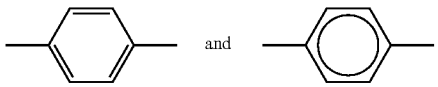 and 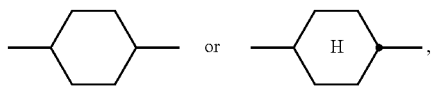

are equivalent. 1,4-substituted cyclohexane is represented by

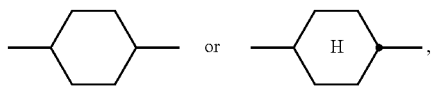

which is preferably in the 1,4-trans-configuration.

The following abbreviations are used:
(n, m, z: in each case, independently of one another, 1, 2, 3, 4, 5 or 6)

TABLE A

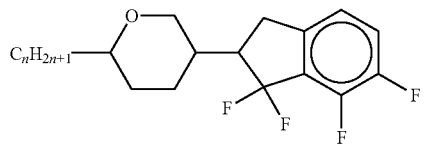

AlK-n-F

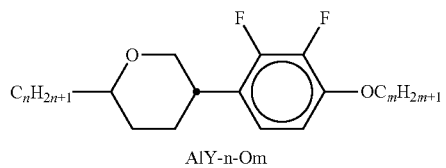

AlY-n-Om

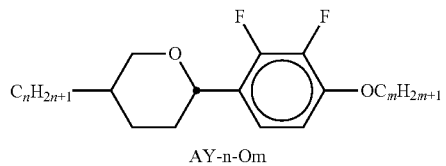

AY-n-Om

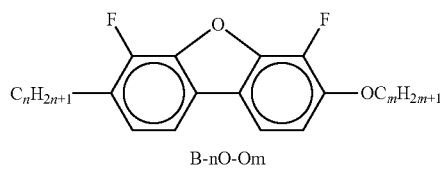

B-nO-Om

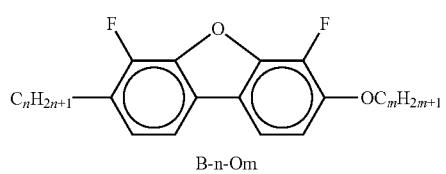

B-n-Om

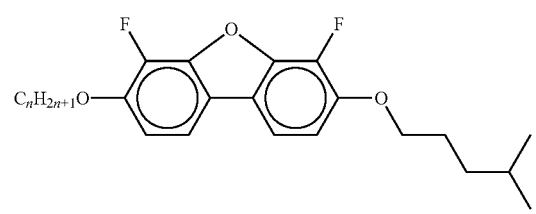

B-nO-O5i

TABLE A-continued
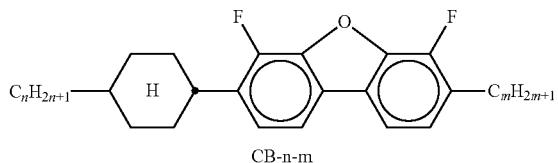
CB-n-m
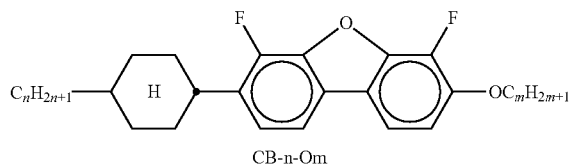
CB-n-Om
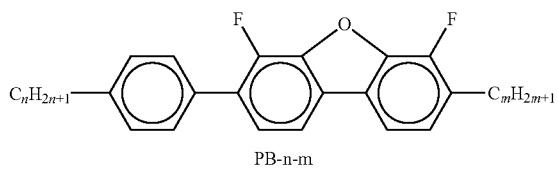
PB-n-m
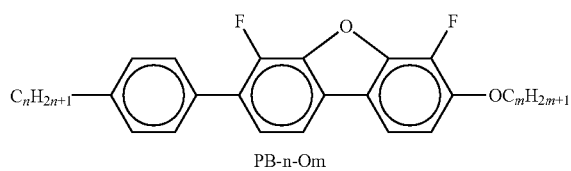
PB-n-Om
BCH-nm
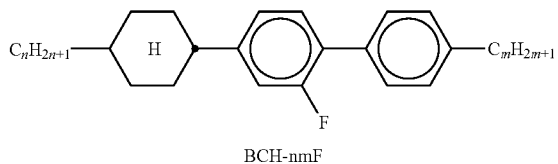
BCH-nmF
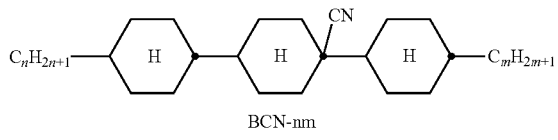
BCN-nm
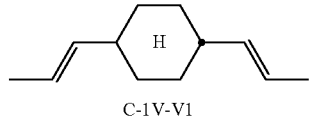
C-1V-V1
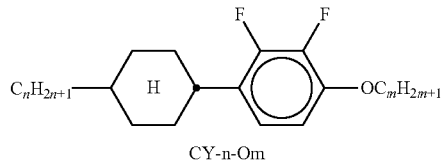
CY-n-Om TABLE A-continued
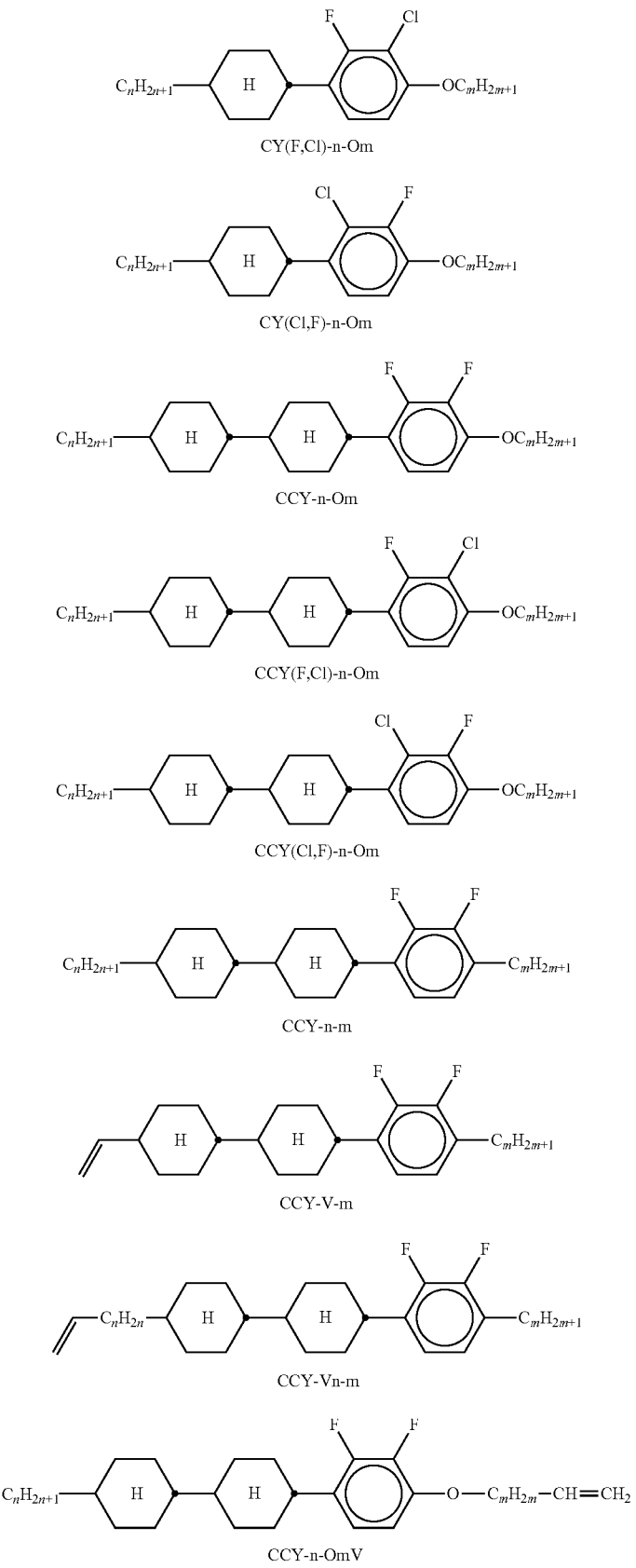

TABLE A-continued
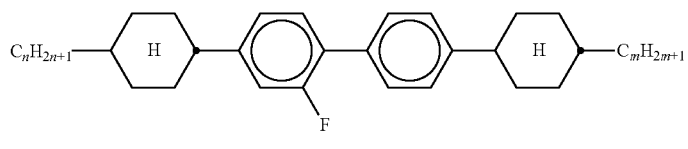
CBC-nmF
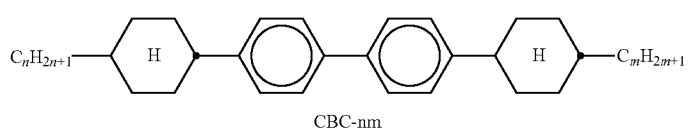
CBC-nm
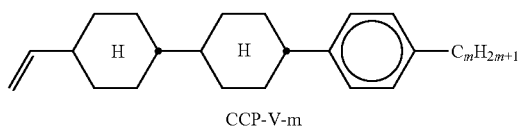
CCP-V-m
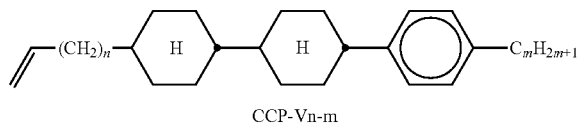
CCP-Vn-m
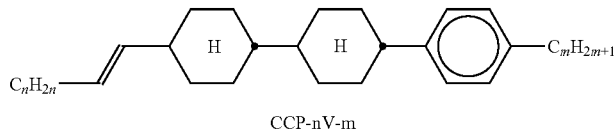
CCP-nV-m
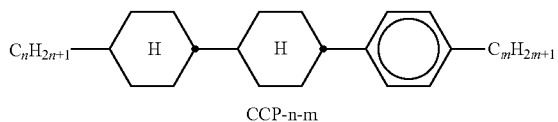
CCP-n-m
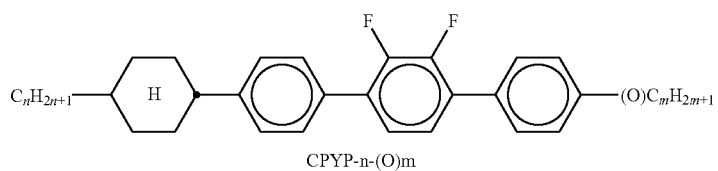
CPYP-n-(O)m
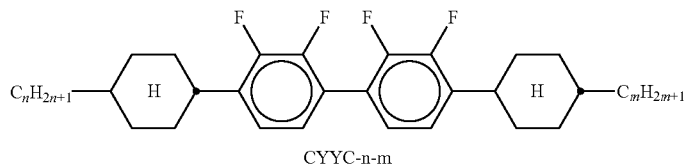
CYYC-n-m
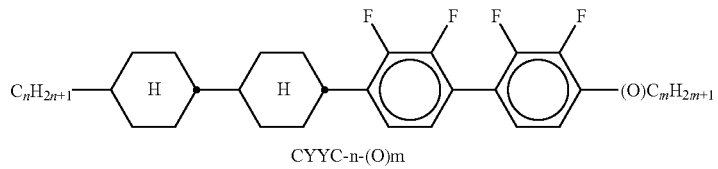
CYYC-n-(O)m
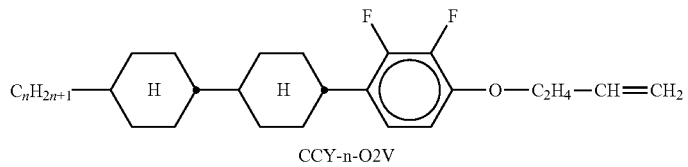
CCY-n-O2V TABLE A-continued
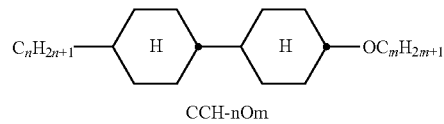
CCH-nOm
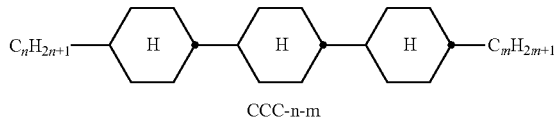
CCC-n-m
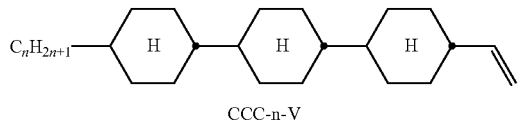
CCC-n-V
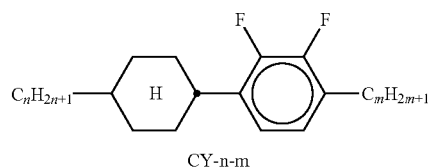
CY-n-m
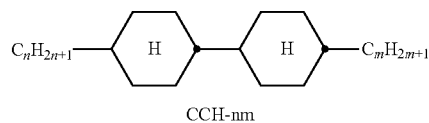
CCH-nm
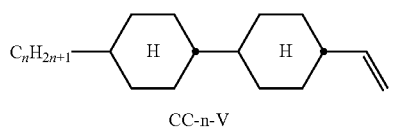
CC-n-V
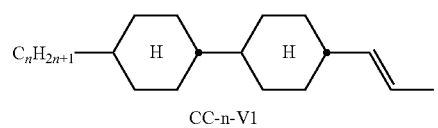
CC-n-V1
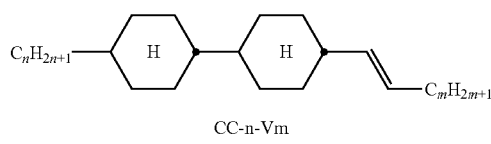
CC-n-Vm
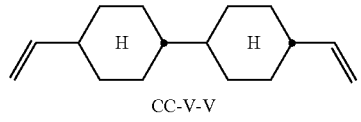
CC-V-V
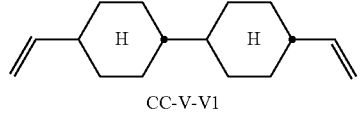
CC-V-V1
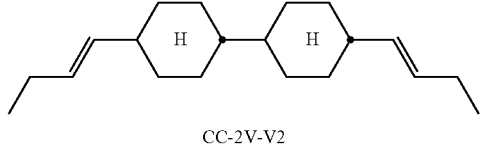
CC-2V-V2

TABLE A-continued
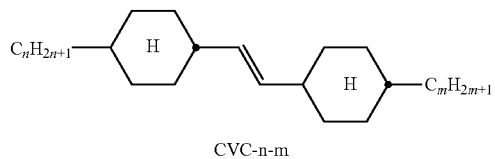
CVC-n-m
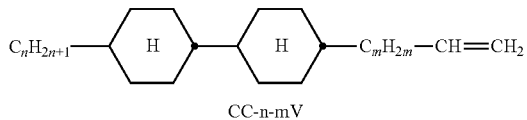
CC-n-mV
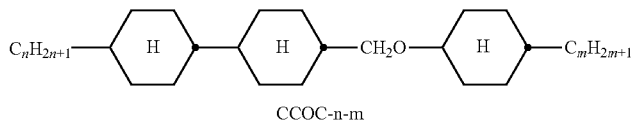
CCOC-n-m
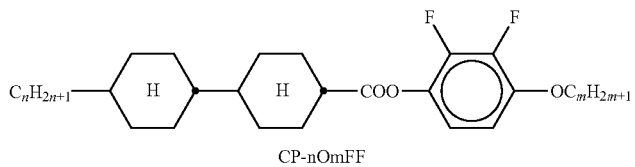
CP-nOmFF
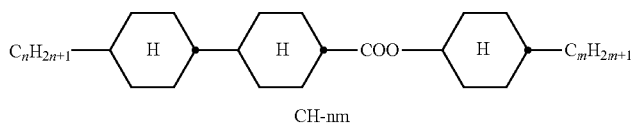
CH-nm
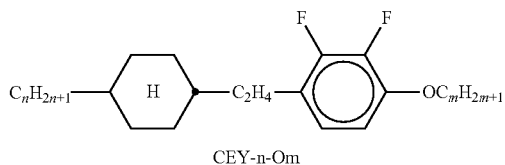
CEY-n-Om
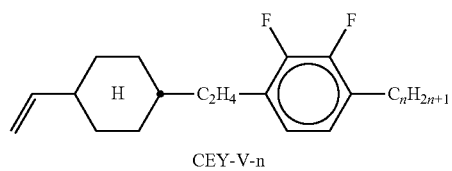
CEY-V-n
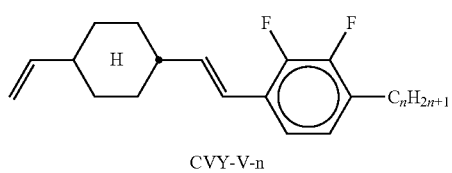
CVY-V-n
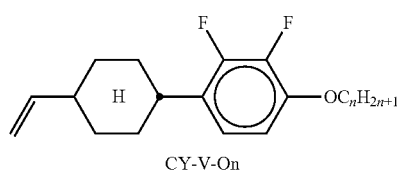
CY-V-On TABLE A-continued
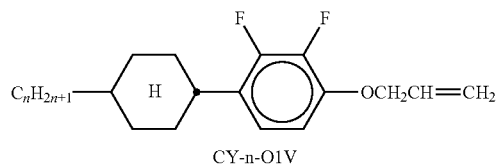
CY-n-O1V
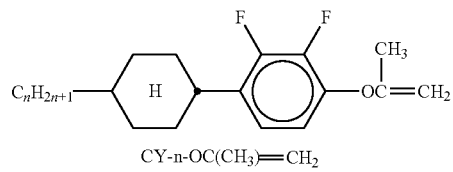
CY-n-OC(CH₃)=CH₂
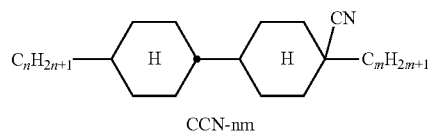
CCN-nm
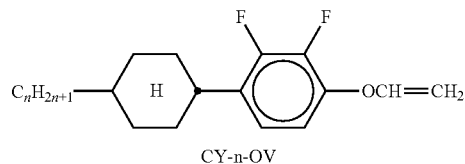
CY-n-OV
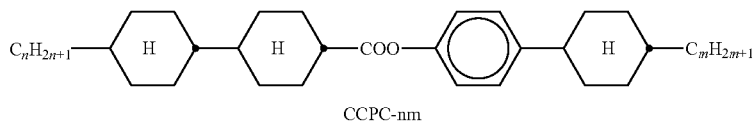
CCPC-nm
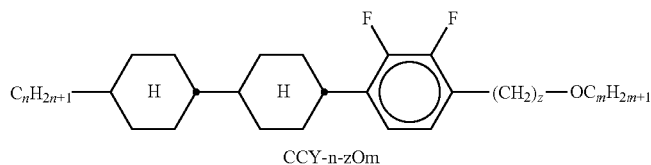
CCY-n-zOm
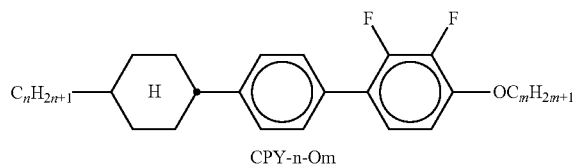
CPY-n-Om
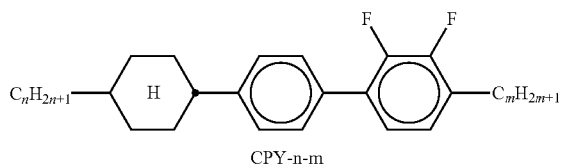
CPY-n-m
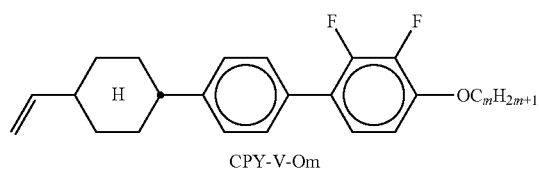
CPY-V-Om TABLE A-continued
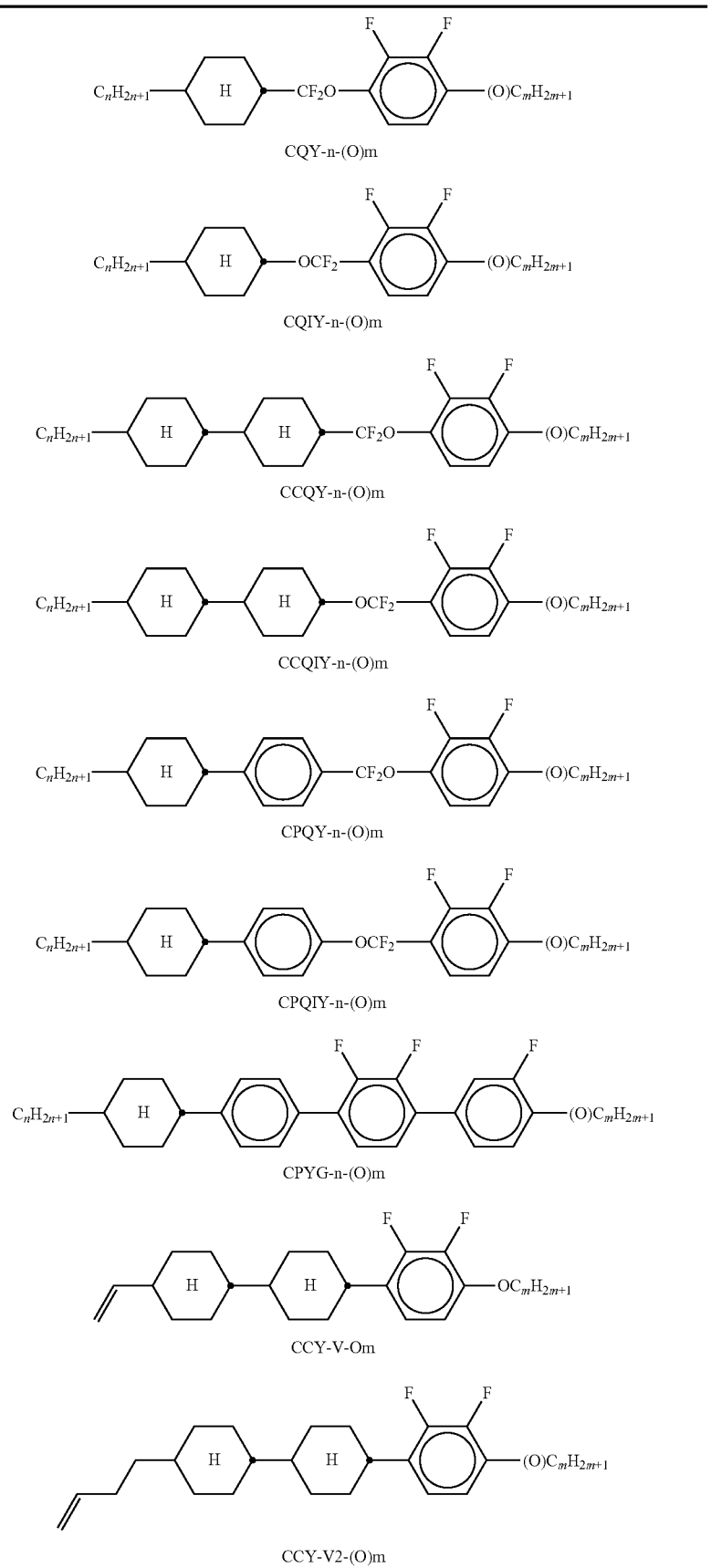

TABLE A-continued
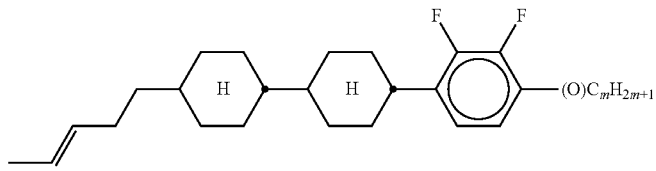
CCY-1V2-(O)m
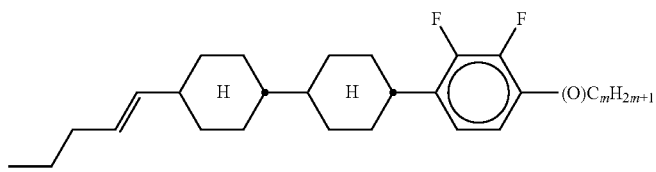
CCY-3V-(O)m
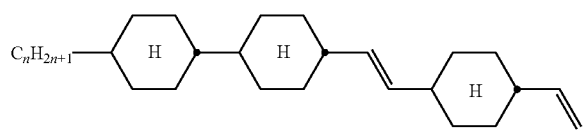
CCVC-n-V
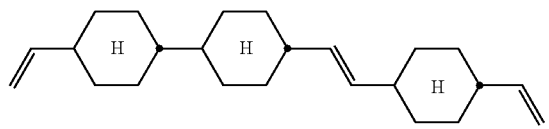
CCVC-V-V
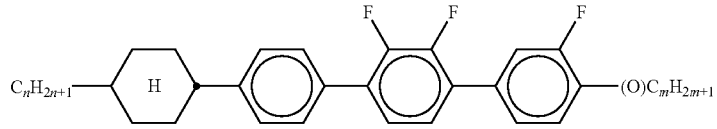
CPYG-n-(O)m
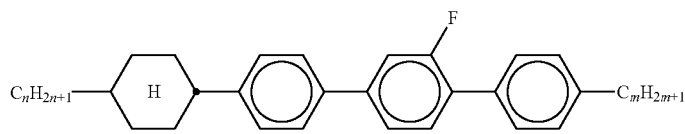
CPGP-n-m
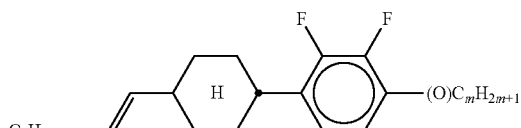
CY-nV-(O)m
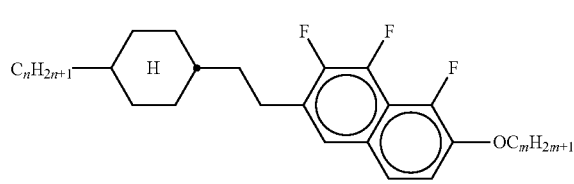
CENaph-n-Om TABLE A-continued
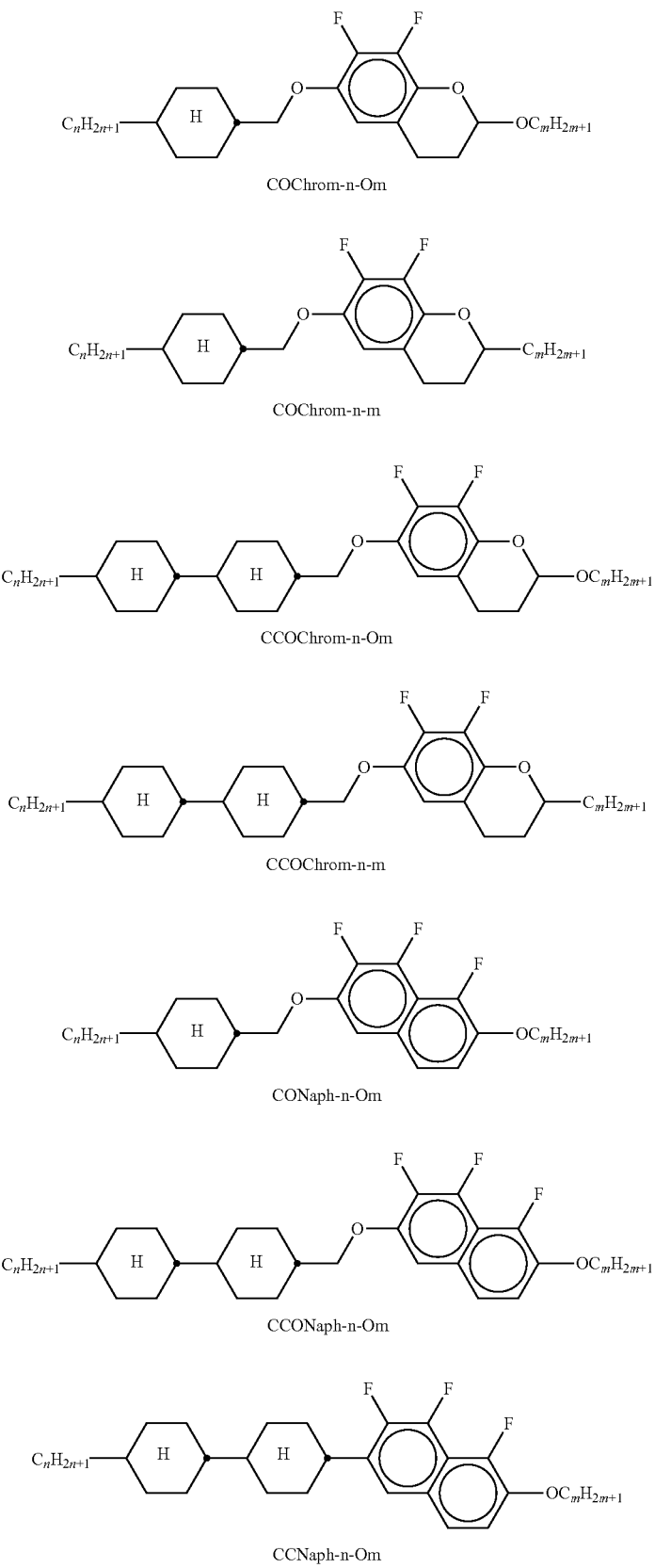

TABLE A-continued
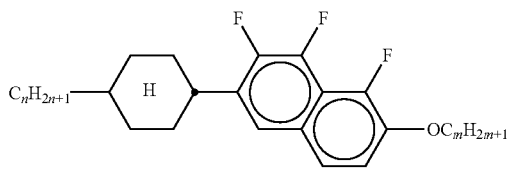
CNaph-n-Om
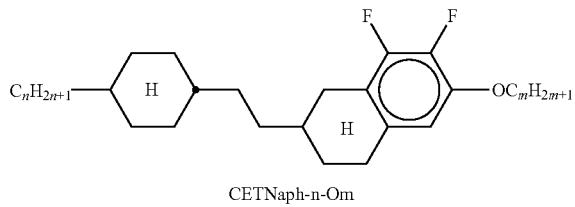
CETNaph-n-Om
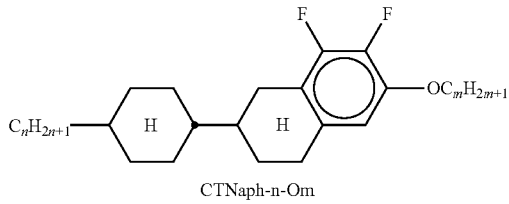
CTNaph-n-Om
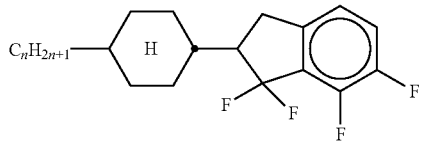
CK-n-F
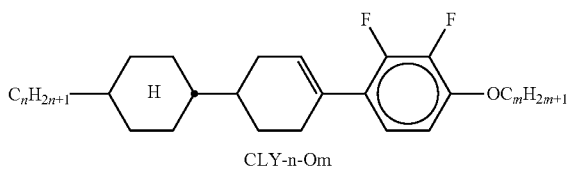
CLY-n-Om
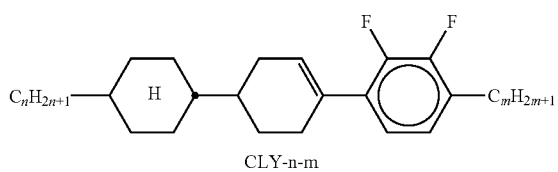
CLY-n-m
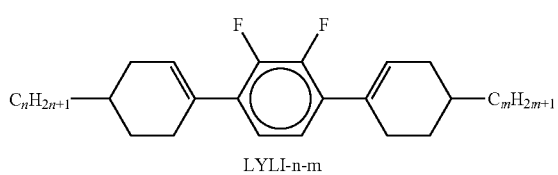
LYLI-n-m
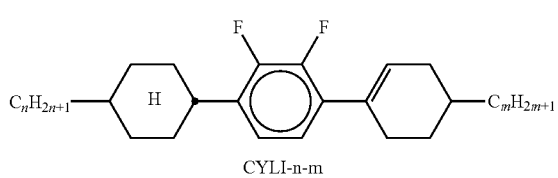
CYLI-n-m TABLE A-continued
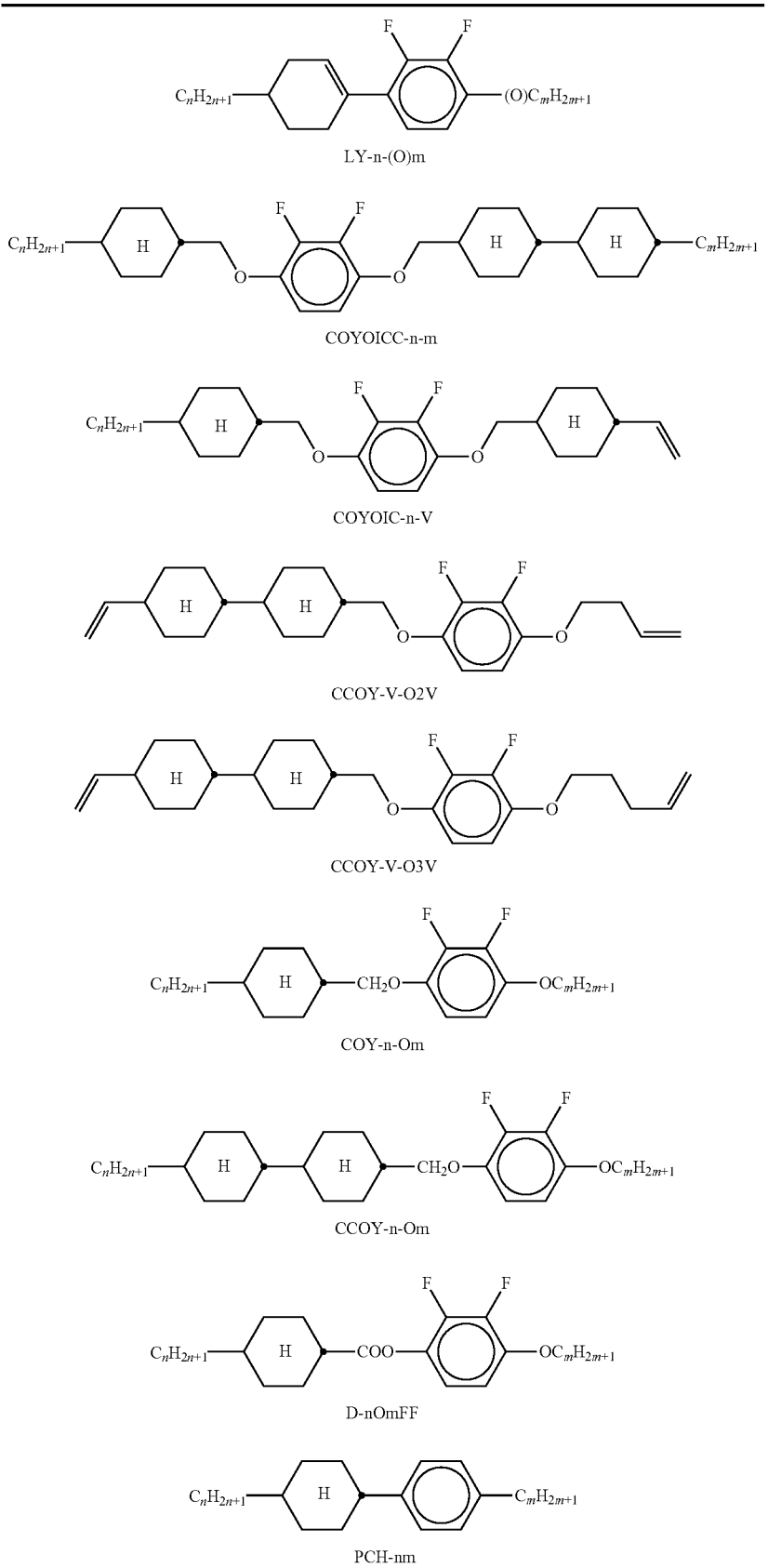

TABLE A-continued
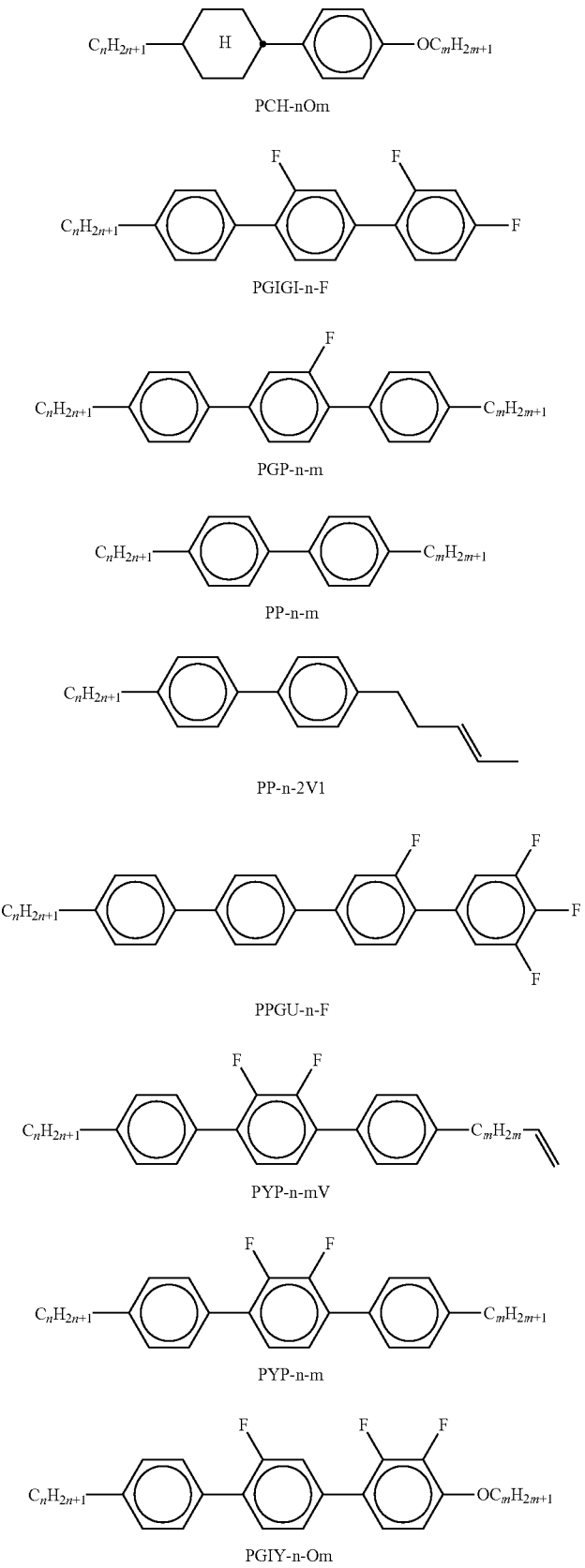

TABLE A-continued
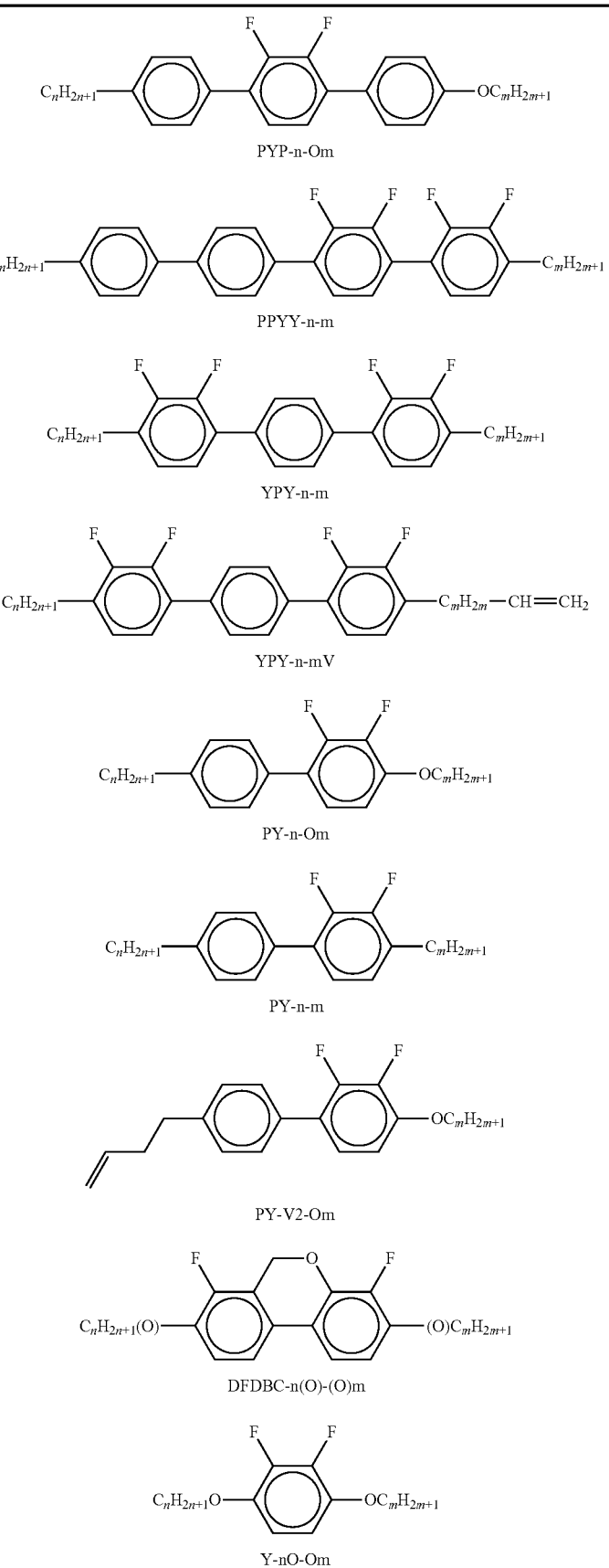

TABLE A-continued
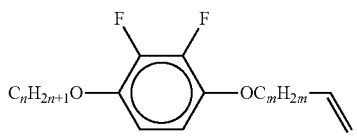
Y-nO-OmV
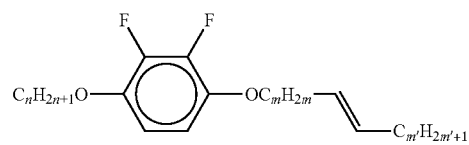
Y-nO-OmVm′
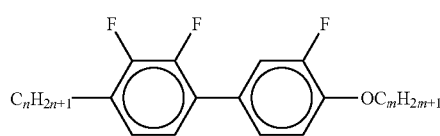
YG-n-Om
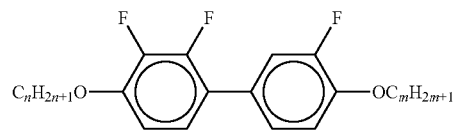
YG-nO-Om
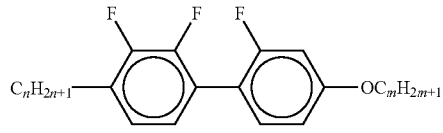
YGI-n-Om
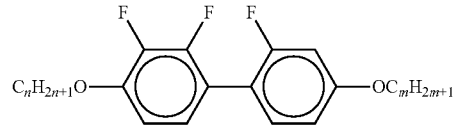
YGI-nO-Om
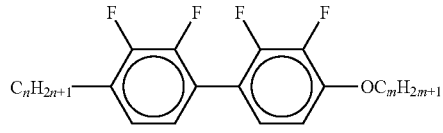
YY-n-Om
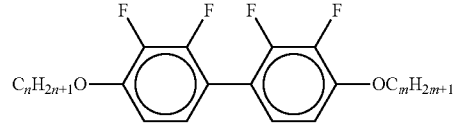
YY-nO-Om In a preferred embodiment of the present invention, the LC media according to the invention comprise one or more compounds selected from the group consisting of compounds from Table A.
TABLE B
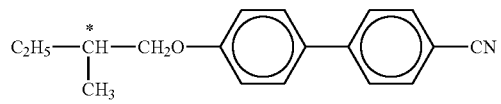
C 15
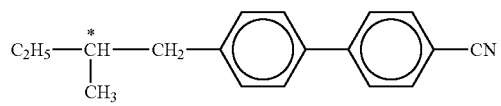
CB 15
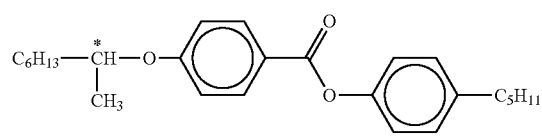
CM 21
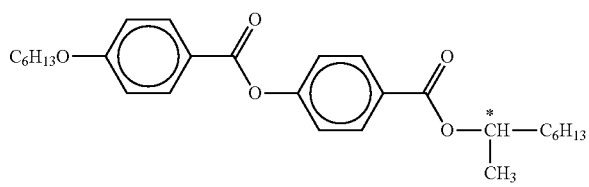
R/S-811
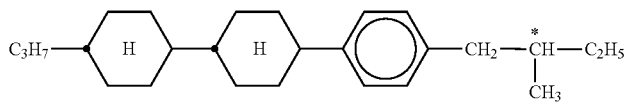
CM 44
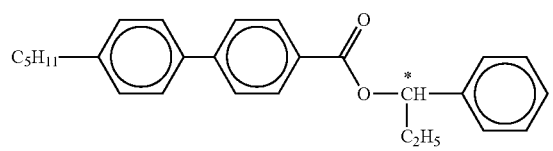
CM 45
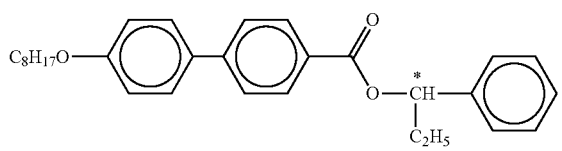
CM 47
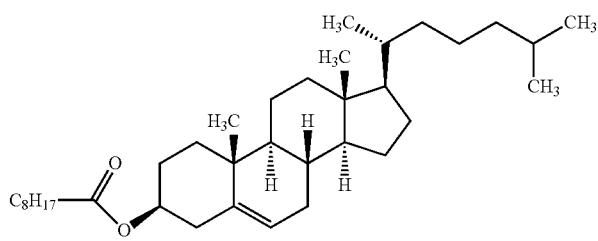
CN TABLE B-continued

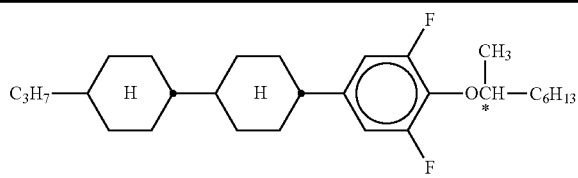

R/S-2011

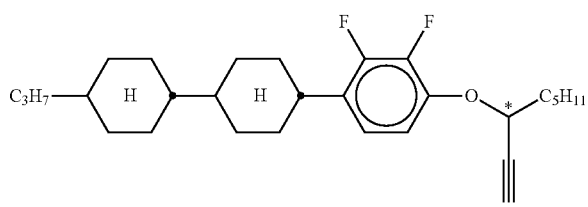

R/S-3011

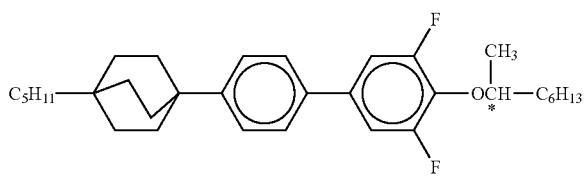

R/S-4011

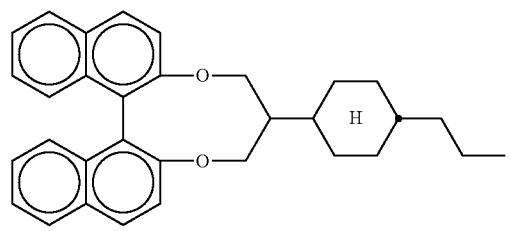

R/S-5011

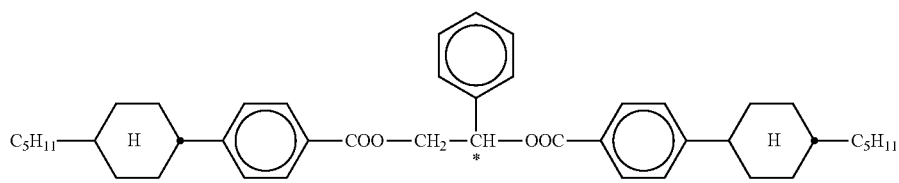

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

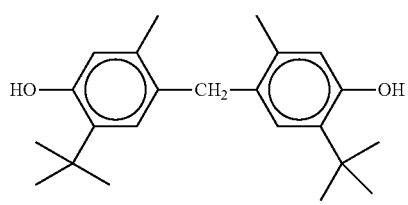

TABLE C-continued
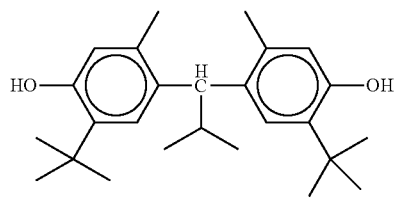
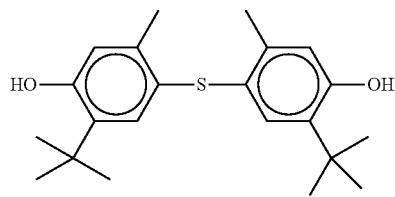
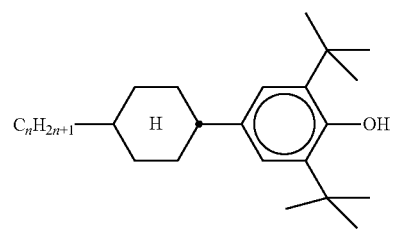
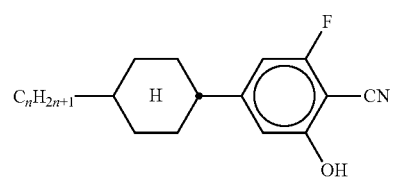
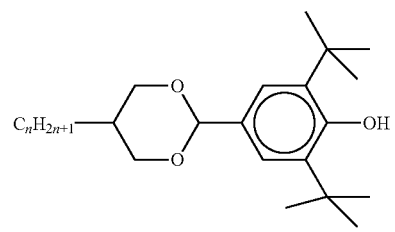
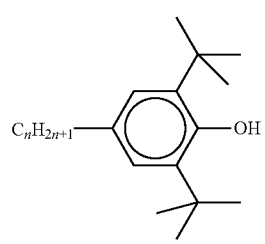
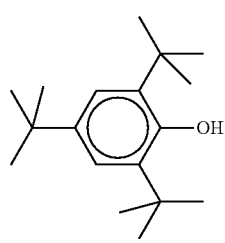

TABLE C-continued
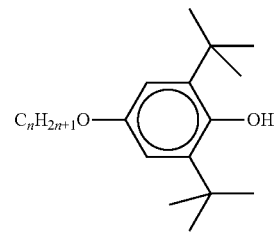
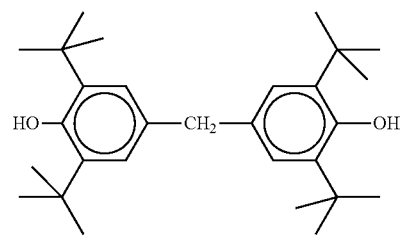
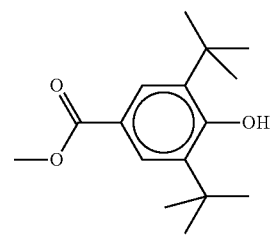
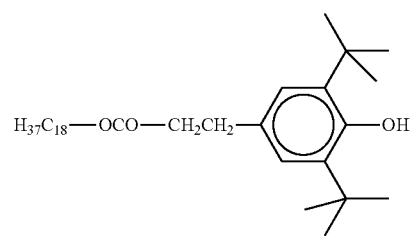
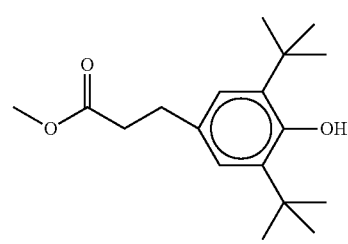
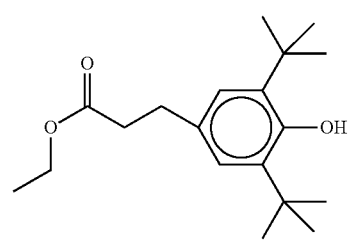

TABLE C-continued
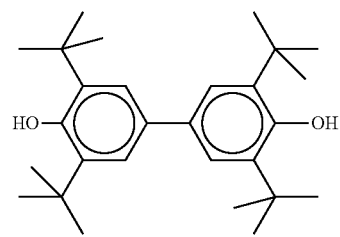
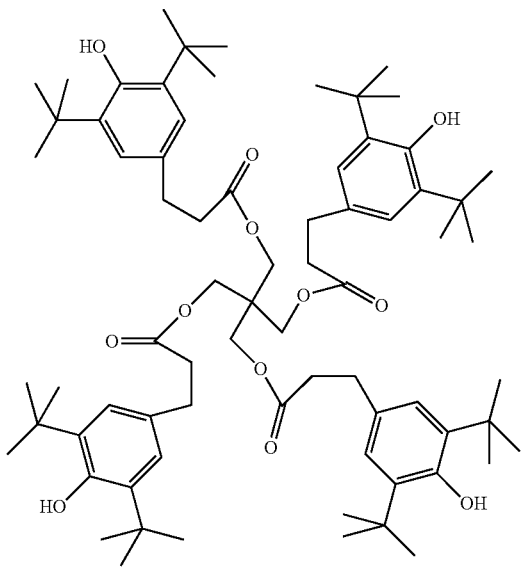 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
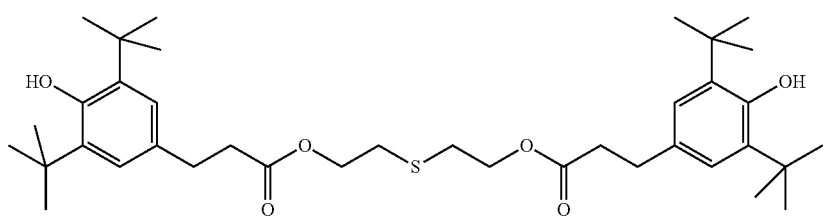 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
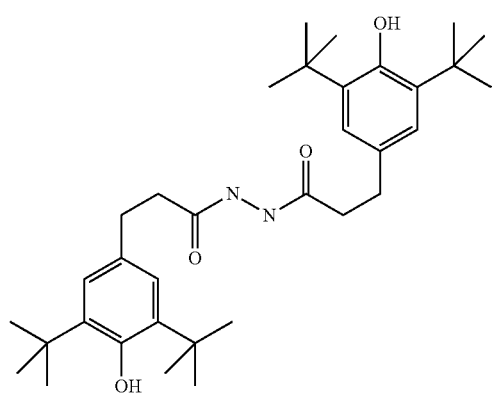 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
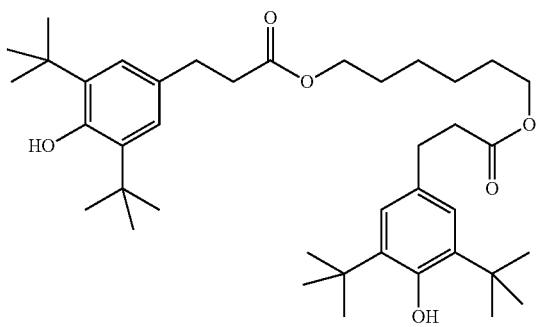 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
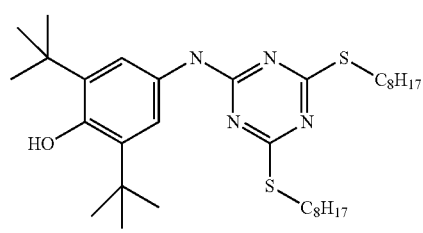
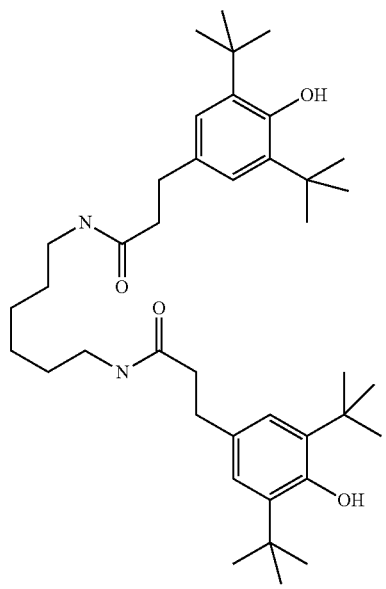 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
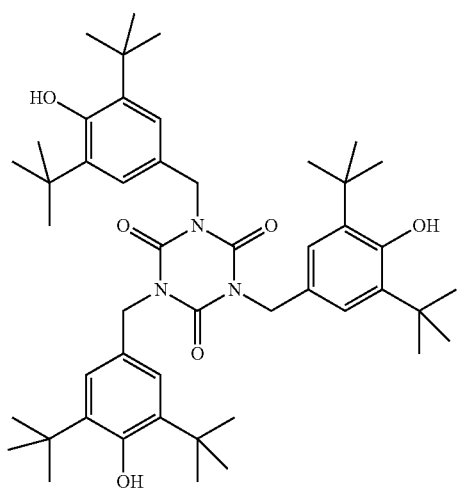 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
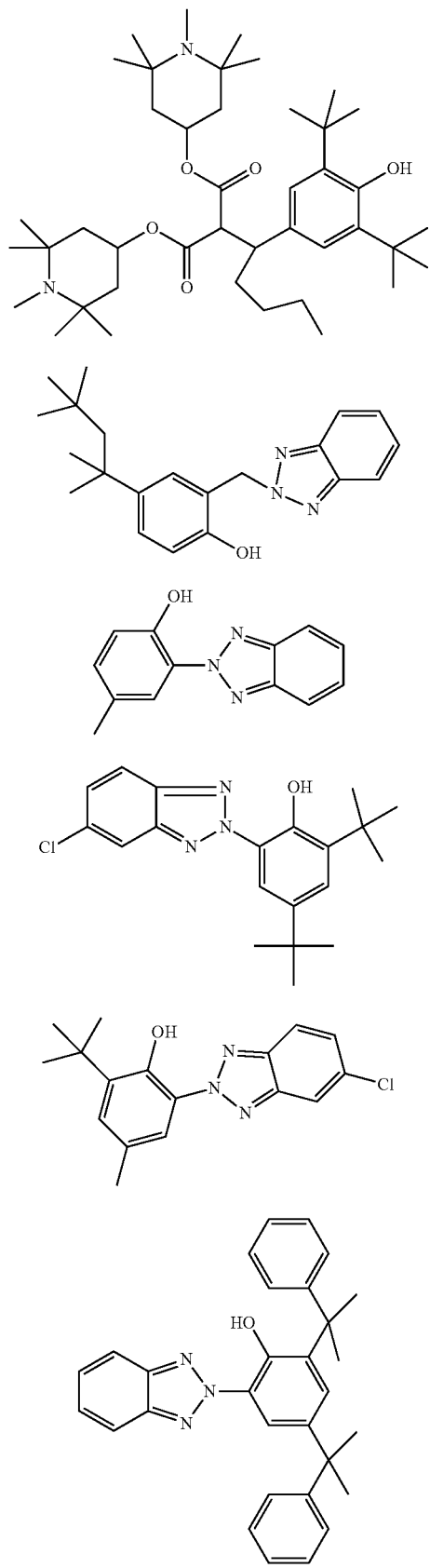

TABLE C-continued
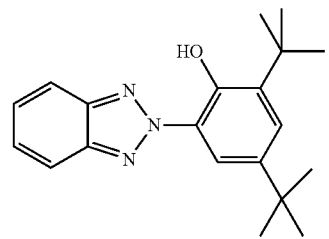 [SMILES: CC(C)(C)c1cc(-n2nc3ccccc3n2)c(O)c(C(C)(C)C)c1]
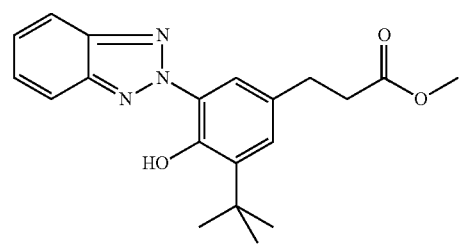
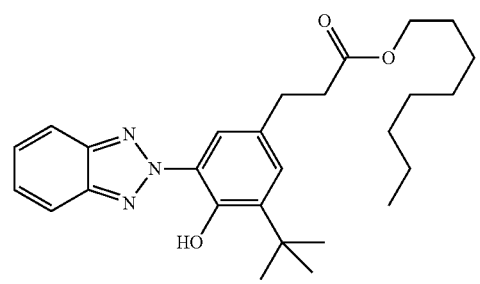 [SMILES: CCCCCCCCOC(=O)CCc1cc(-n2nc3ccccc3n2)c(O)c(C(C)(C)C)c1]
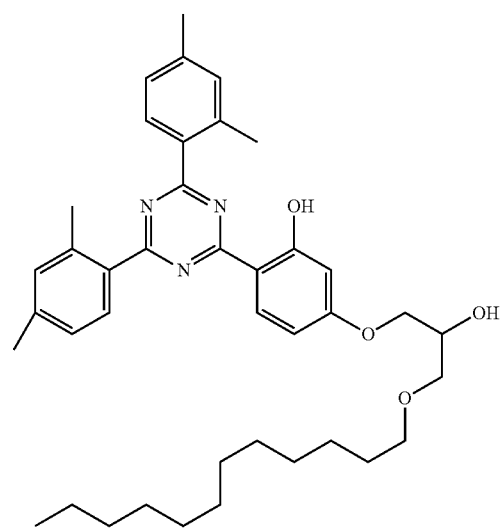 [SMILES: CCCCCCCCCCCCOCC(O)COc1ccc(-c2nc(-c3ccc(C)cc3C)nc(-c3ccc(C)cc3C)n2)c(O)c1]

TABLE C-continued
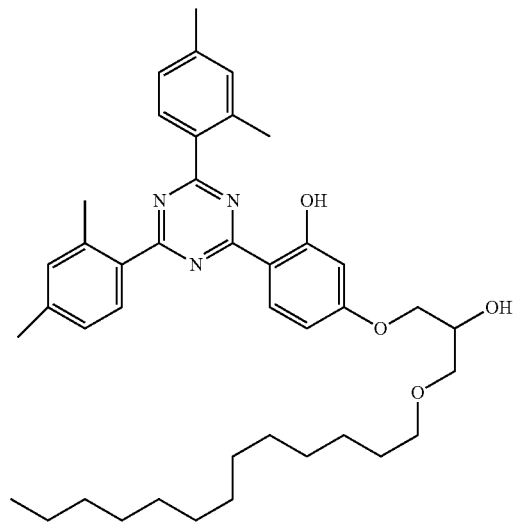 [SMILES: CCCCCCCCCCCCCOCC(O)COc1ccc(-c2nc(-c3ccc(C)cc3C)nc(-c3ccc(C)cc3C)n2)c(O)c1]
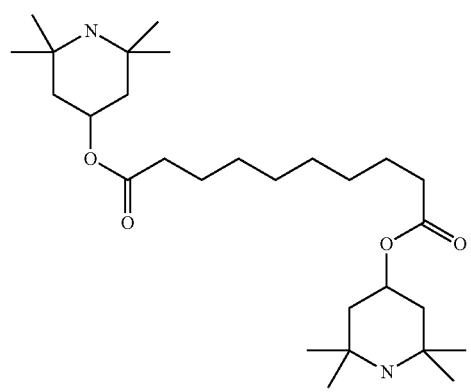
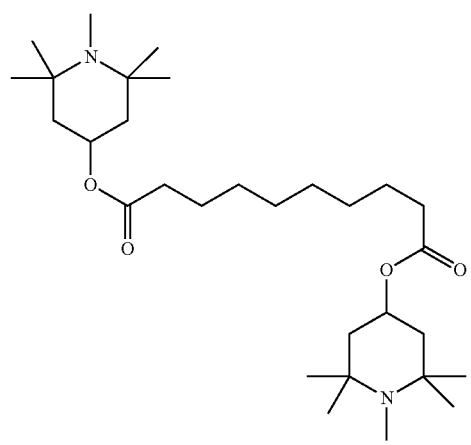

TABLE C-continued
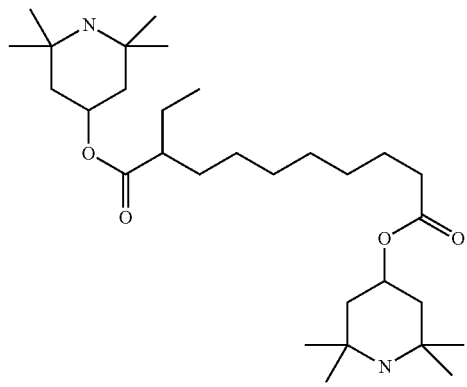
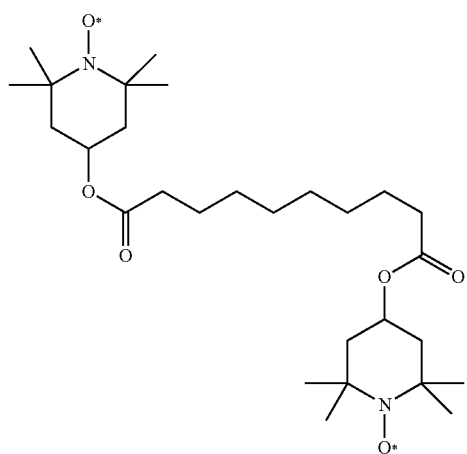
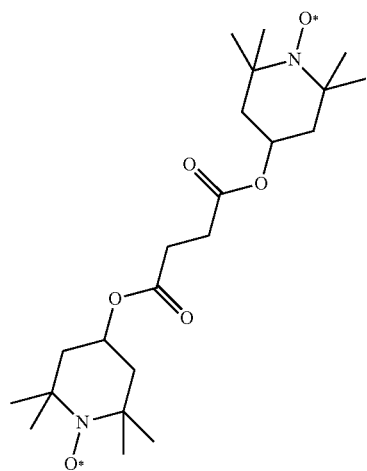

TABLE C-continued

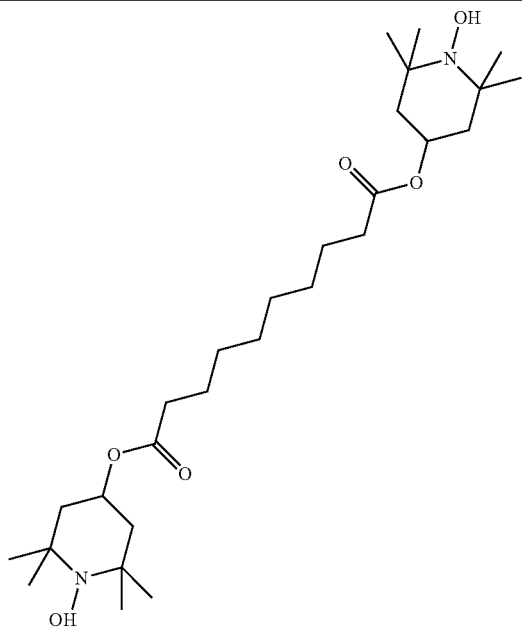

Table C shows possible stabilisers which can be added to the LC media according to the invention.
(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers.

The LC media preferably comprise one or more stabilisers selected from the group consisting of compounds from Table C.

TABLE D

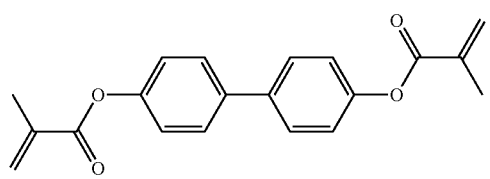 [SMILES: C=C(C)C(=O)Oc1ccc(-c2ccc(OC(=O)C(=C)C)cc2)cc1]

RM-1

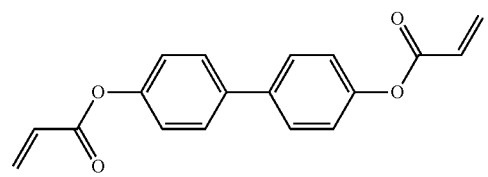 [SMILES: C=CC(=O)Oc1ccc(-c2ccc(OC(=O)C=C)cc2)cc1]

RM-2

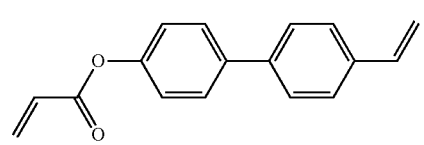 [SMILES: C=CC(=O)Oc1ccc(-c2ccc(C=C)cc2)cc1]

RM-3

TABLE D-continued
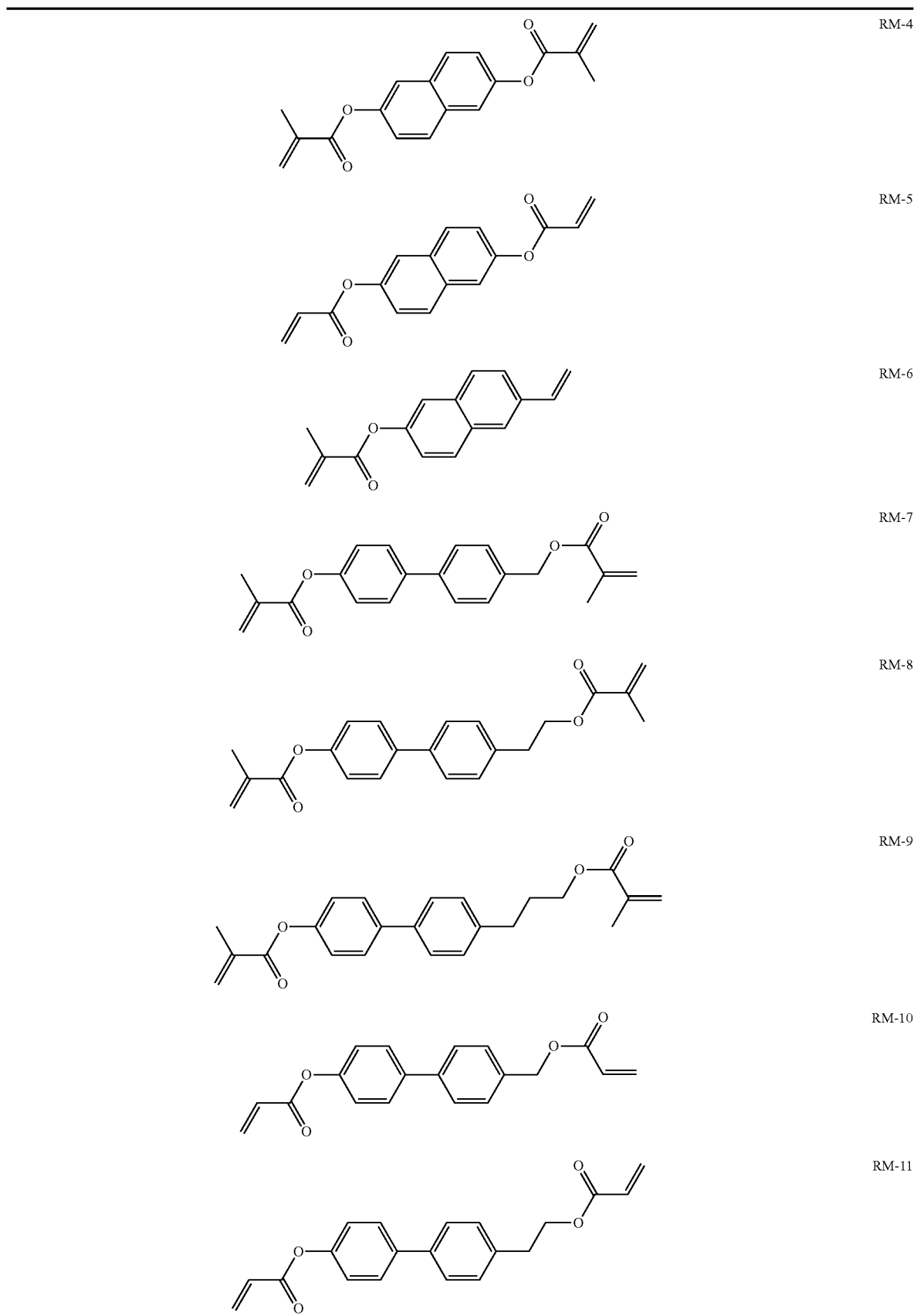

TABLE D-continued
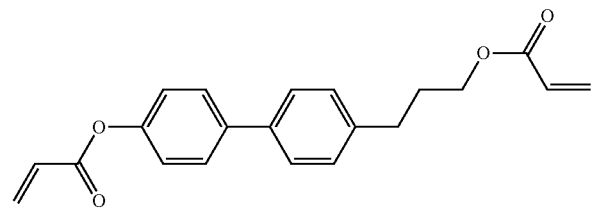 [SMILES: C=CC(=O)OCCCc1ccc(-c2ccc(OC(=O)C=C)cc2)cc1] RM-12
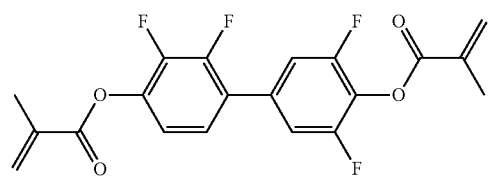 [SMILES: C=C(C)C(=O)Oc1ccc(-c2cc(F)c(OC(=O)C(=C)C)c(F)c2)c(F)c1F] RM-13
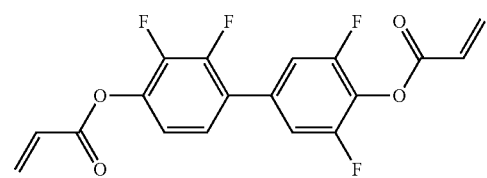 [SMILES: C=CC(=O)Oc1ccc(-c2cc(F)c(OC(=O)C=C)c(F)c2)c(F)c1F] RM-14
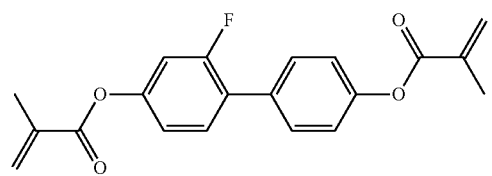 RM-15
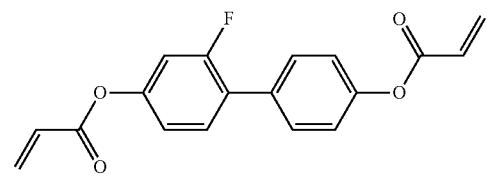 [SMILES: C=CC(=O)Oc1ccc(-c2ccc(OC(=O)C=C)cc2F)cc1] RM-16
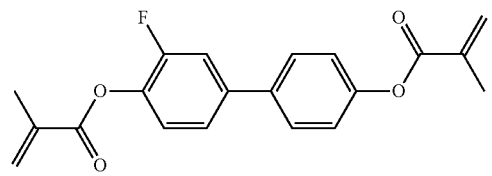 [SMILES: C=C(C)C(=O)Oc1ccc(-c2ccc(OC(=O)C(=C)C)c(F)c2)cc1] RM-17
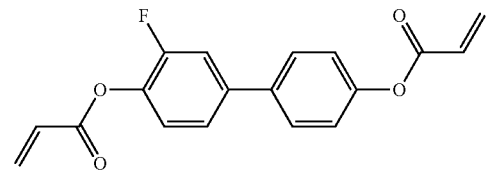 [SMILES: C=CC(=O)Oc1ccc(-c2ccc(OC(=O)C=C)c(F)c2)cc1] RM-18
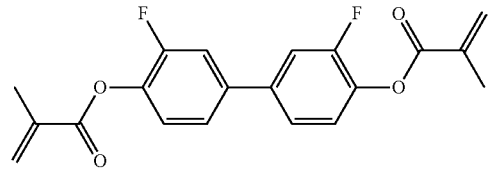 RM-19

TABLE D-continued
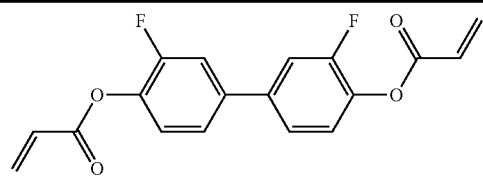
RM-20
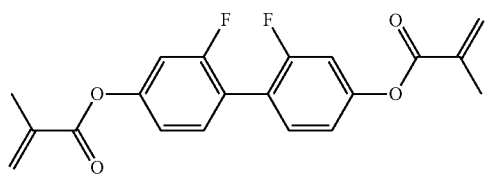
RM-21
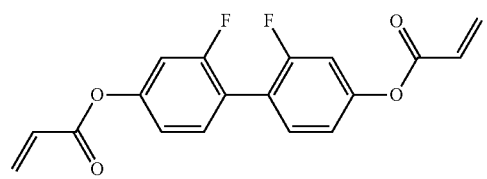 [SMILES: C=CC(=O)Oc1ccc(-c2ccc(OC(=O)C=C)cc2F)c(F)c1]
RM-22
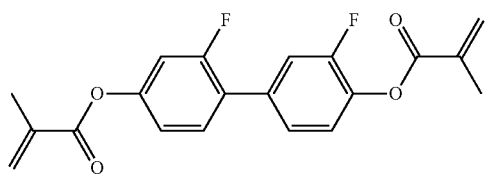
RM-23
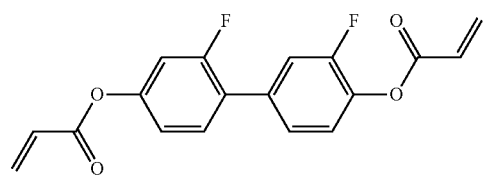 [SMILES: C=CC(=O)Oc1ccc(-c2ccc(OC(=O)C=C)c(F)c2)c(F)c1]
RM-24
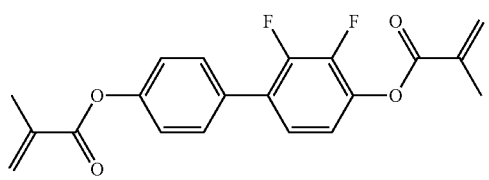 [SMILES: C=C(C)C(=O)Oc1ccc(-c2ccc(OC(=O)C(=C)C)c(F)c2F)cc1]
RM-25
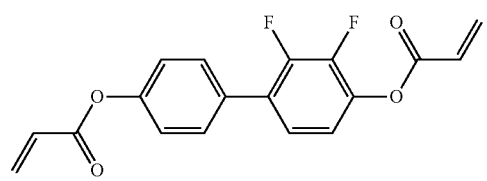
RM-26
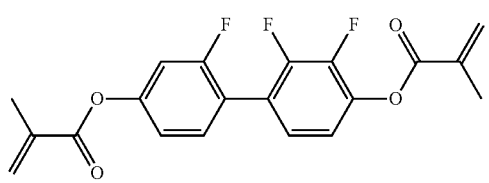 [SMILES: C=C(C)C(=O)Oc1ccc(-c2ccc(OC(=O)C(=C)C)c(F)c2F)c(F)c1]
RM-27
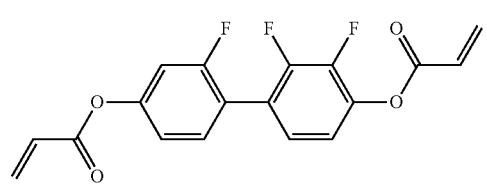 [SMILES: C=CC(=O)Oc1ccc(-c2ccc(OC(=O)C=C)c(F)c2F)c(F)c1]
RM-28

TABLE D-continued
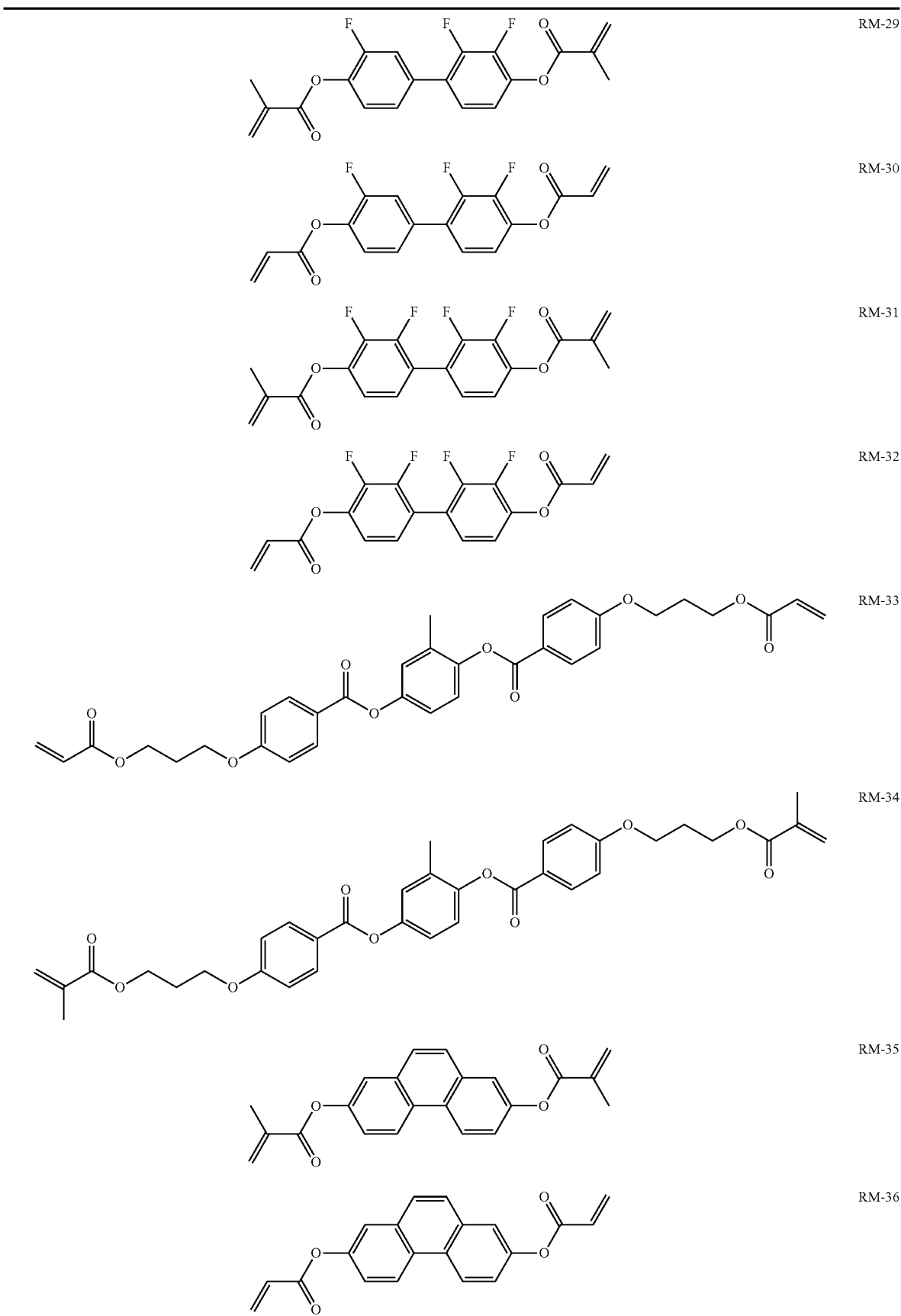

TABLE D-continued
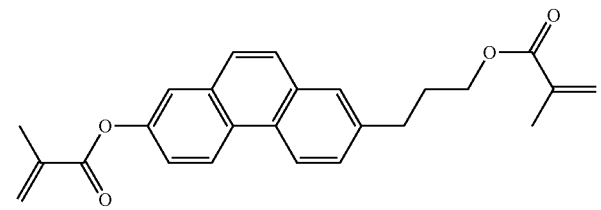 [SMILES: C=C(C)C(=O)OCCCc1ccc2c(ccc3cc(OC(=O)C(=C)C)ccc32)c1]
RM-37
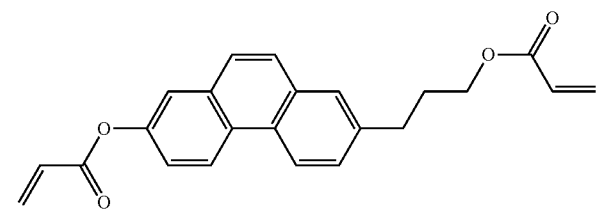 [SMILES: C=CC(=O)OCCCc1ccc2c(ccc3cc(OC(=O)C=C)ccc32)c1]
RM-38
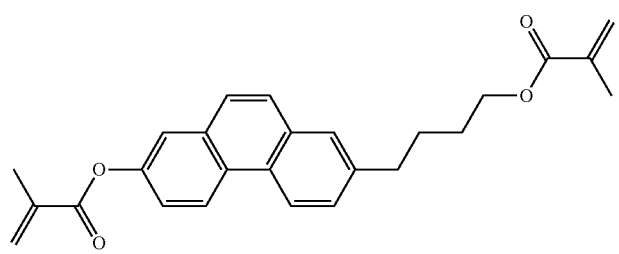 [SMILES: C=C(C)C(=O)OCCCCc1ccc2c(ccc3cc(OC(=O)C(=C)C)ccc32)c1]
RM-39
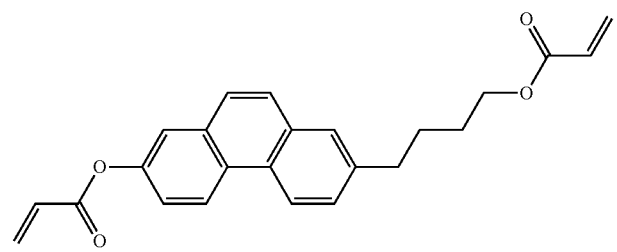 [SMILES: C=CC(=O)OCCCCc1ccc2c(ccc3cc(OC(=O)C=C)ccc32)c1]
RM-40
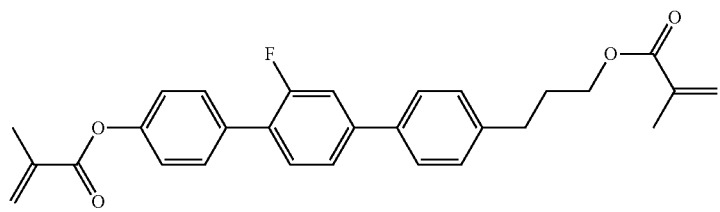 [SMILES: C=C(C)C(=O)OCCCc1ccc(-c2ccc(-c3ccc(OC(=O)C(=C)C)cc3)c(F)c2)cc1]
RM-41
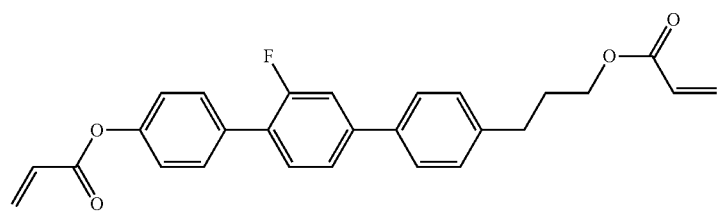 [SMILES: C=CC(=O)OCCCc1ccc(-c2ccc(-c3ccc(OC(=O)C=C)cc3)c(F)c2)cc1]
RM-42
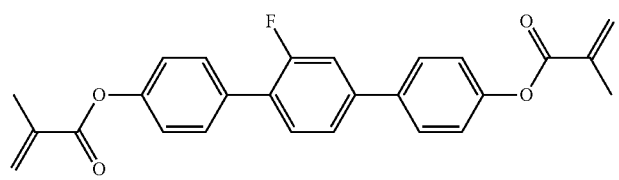 [SMILES: C=C(C)C(=O)Oc1ccc(-c2ccc(-c3ccc(OC(=O)C(=C)C)cc3)c(F)c2)cc1]
RM-43

TABLE D-continued
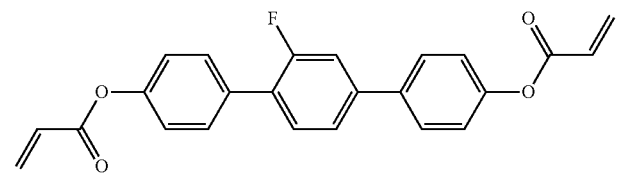 [SMILES: C=CC(=O)Oc1ccc(-c2ccc(-c3ccc(OC(=O)C=C)cc3)c(F)c2)cc1]
RM-44
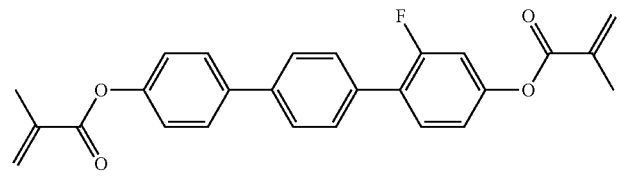 [SMILES: C=C(C)C(=O)Oc1ccc(-c2ccc(-c3ccc(OC(=O)C(=C)C)cc3F)cc2)cc1]
RM-45
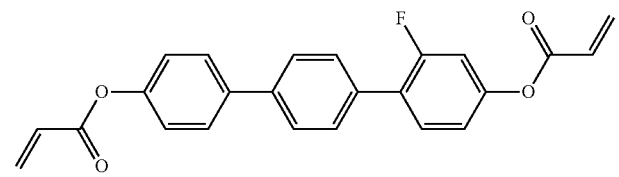 [SMILES: C=CC(=O)Oc1ccc(-c2ccc(-c3ccc(OC(=O)C=C)cc3F)cc2)cc1]
RM-46
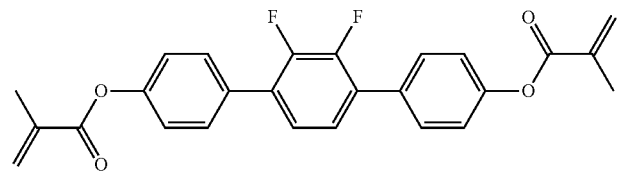
RM-47
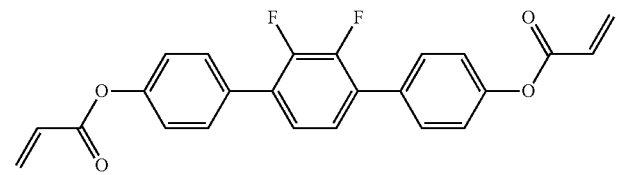 [SMILES: C=CC(=O)Oc1ccc(-c2ccc(-c3ccc(OC(=O)C=C)cc3)c(F)c2F)cc1]
RM-48
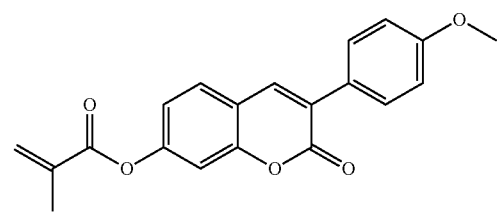 [SMILES: C=C(C)C(=O)Oc1ccc2cc(-c3ccc(OC)cc3)c(=O)oc2c1]
RM-49
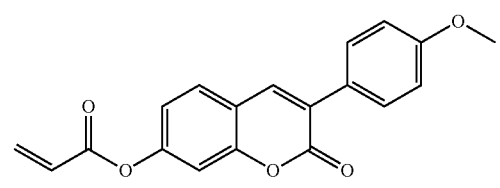 [SMILES: C=CC(=O)Oc1ccc2cc(-c3ccc(OC)cc3)c(=O)oc2c1]
RM-50
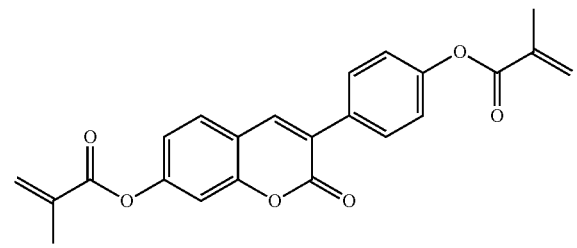 [SMILES: C=C(C)C(=O)Oc1ccc(-c2cc3ccc(OC(=O)C(=C)C)cc3oc2=O)cc1]
RM-51

TABLE D-continued
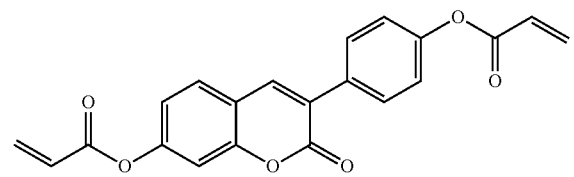 [SMILES: C=CC(=O)Oc1ccc(-c2cc3ccc(OC(=O)C=C)cc3oc2=O)cc1] RM-52
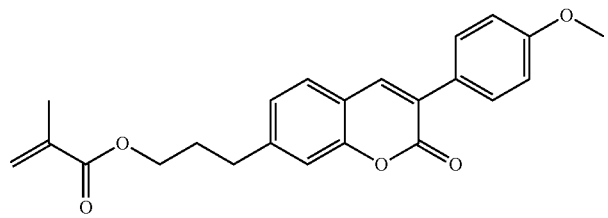 [SMILES: C=C(C)C(=O)OCCCc1ccc2cc(-c3ccc(OC)cc3)c(=O)oc2c1] RM-53
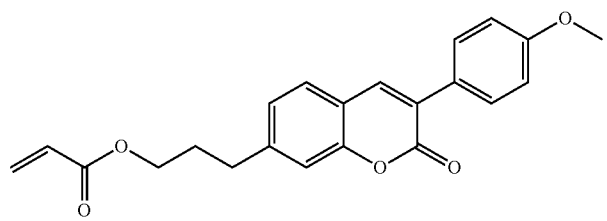 [SMILES: C=CC(=O)OCCCc1ccc2cc(-c3ccc(OC)cc3)c(=O)oc2c1] RM-54
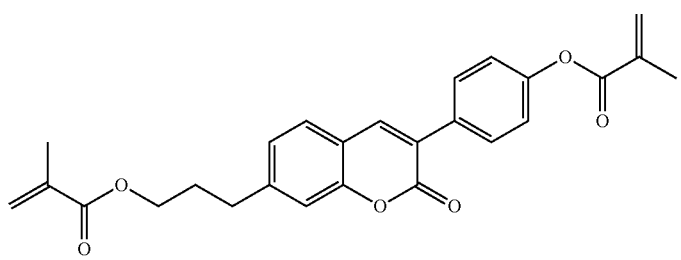 [SMILES: C=C(C)C(=O)OCCCc1ccc2cc(-c3ccc(OC(=O)C(=C)C)cc3)c(=O)oc2c1] RM-55
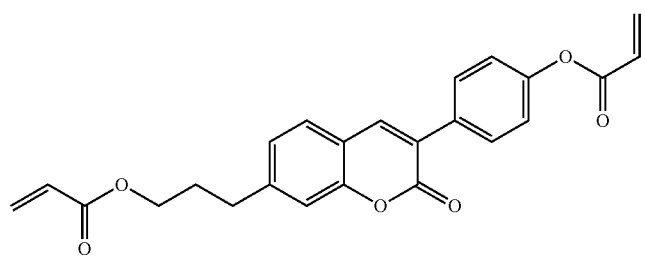 [SMILES: C=CC(=O)OCCCc1ccc2cc(-c3ccc(OC(=O)C=C)cc3)c(=O)oc2c1] RM-56
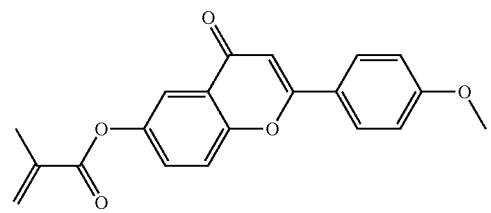 [SMILES: C=C(C)C(=O)Oc1ccc2oc(-c3ccc(OC)cc3)cc(=O)c2c1] RM-57
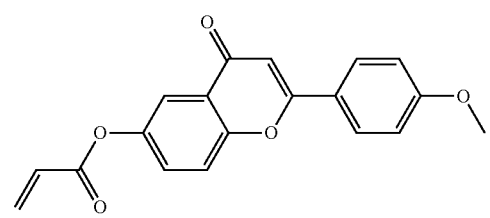 [SMILES: C=CC(=O)Oc1ccc2oc(-c3ccc(OC)cc3)cc(=O)c2c1] RM-58

TABLE D-continued
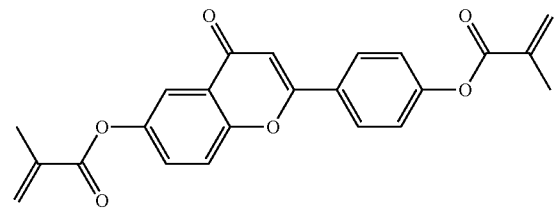 [SMILES: C=C(C)C(=O)Oc1ccc(-c2cc(=O)c3cc(OC(=O)C(=C)C)ccc3o2)cc1]
RM-59
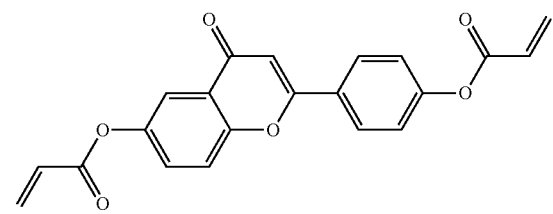 [SMILES: C=CC(=O)Oc1ccc(-c2cc(=O)c3cc(OC(=O)C=C)ccc3o2)cc1]
RM-60
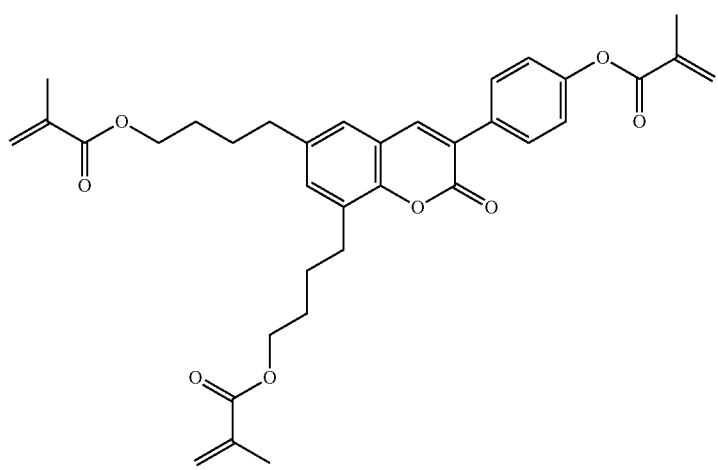 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61
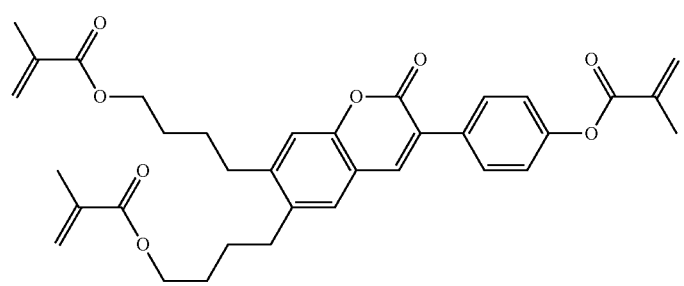 [SMILES: C=C(C)C(=O)OCCCCc1cc2cc(-c3ccc(OC(=O)C(=C)C)cc3)c(=O)oc2cc1CCCCOC(=O)C(=C)C]
RM-62
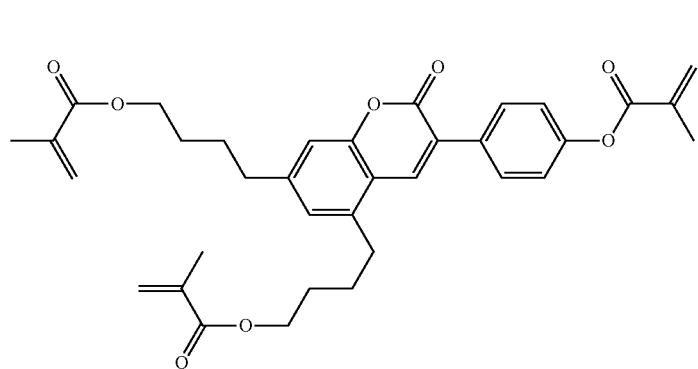 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63

TABLE D-continued
RM-64
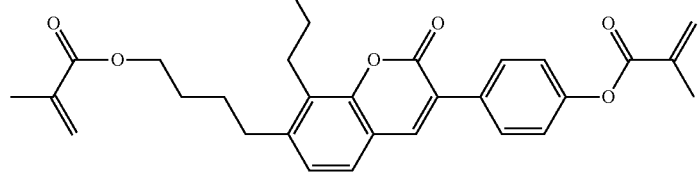
RM-65
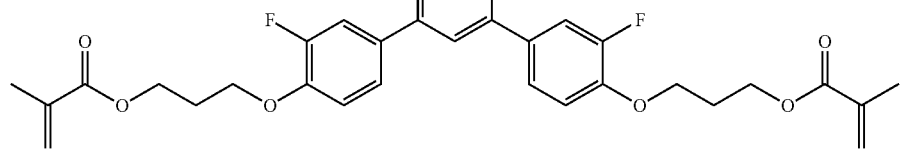
RM-66
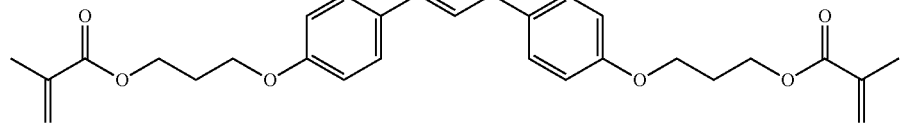
RM-67
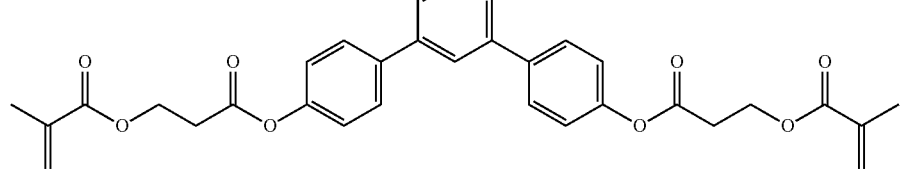
RM-68
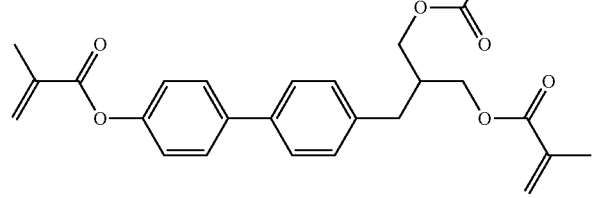

TABLE D-continued
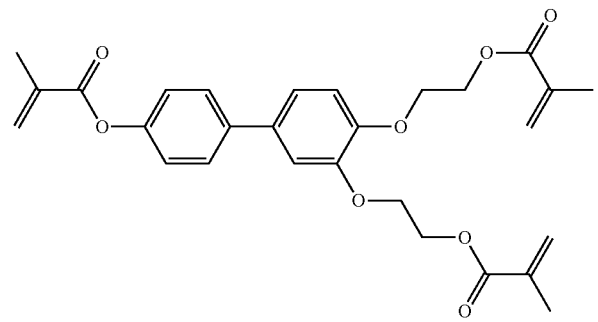 [SMILES: C=C(C)C(=O)OCCOc1ccc(-c2ccc(OC(=O)C(=C)C)cc2)cc1OCCOC(=O)C(=C)C] RM-69
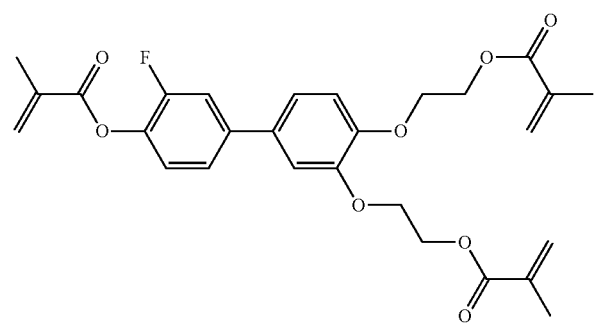 [SMILES: C=C(C)C(=O)OCCOc1ccc(-c2ccc(OC(=O)C(=C)C)c(F)c2)cc1OCCOC(=O)C(=C)C] RM-70
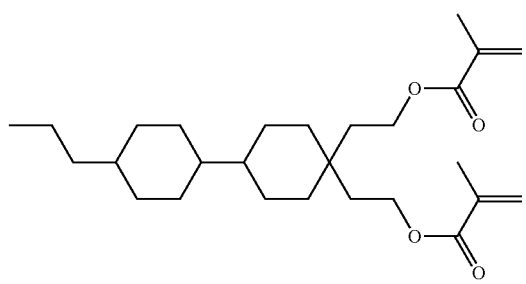 [SMILES: C=C(C)C(=O)OCCC1(CCOC(=O)C(=C)C)CCC(C2CCC(CCC)CC2)CC1] RM-71
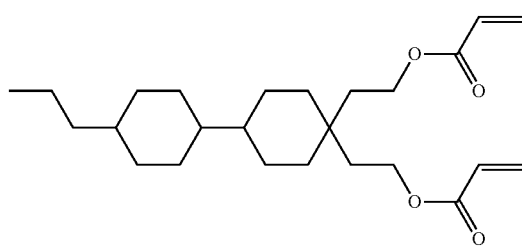 [SMILES: C=CC(=O)OCCC1(CCOC(=O)C=C)CCC(C2CCC(CCC)CC2)CC1] RM-72
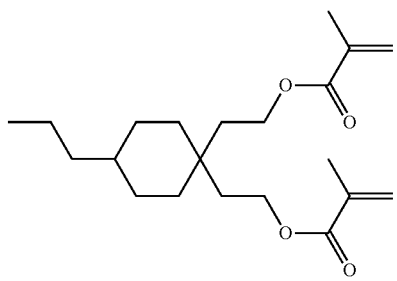 [SMILES: C=C(C)C(=O)OCCC1(CCOC(=O)C(=C)C)CCC(CCC)CC1] RM-73

TABLE D-continued

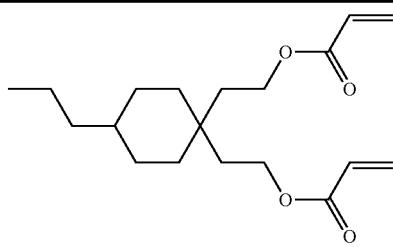
RM-74

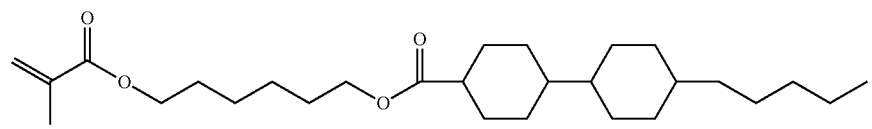 [SMILES: C=C(C)C(=O)OCCCCCCOC(=O)C1CCC(C2CCC(CCCCC)CC2)CC1]
RM-75

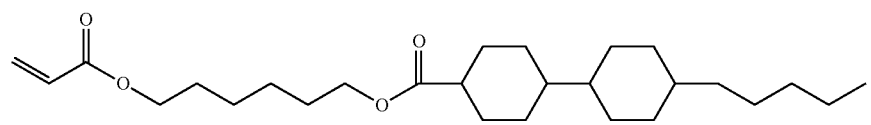 [SMILES: C=CC(=O)OCCCCCCOC(=O)C1CCC(C2CCC(CCCCC)CC2)CC1]
RM-76

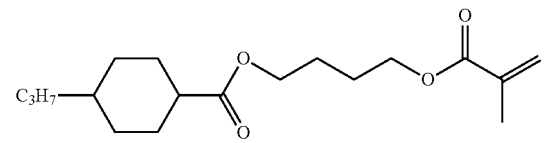
RM-77

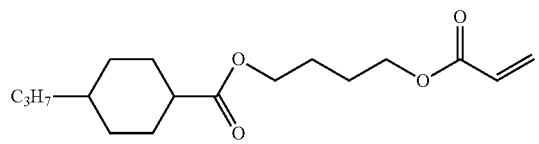
RM-78

Table D shows illustrative compounds which can be used in the LC media in accordance with the present invention, preferably as polymerizable compounds.

In a preferred embodiment of the present invention, the mesogenic media comprise one or more compounds selected from the group of the compounds from Table D.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN]
$V_0$ capacitive threshold (Freedericks threshold) at 20° C. [V].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The polymerizable compounds are polymerized in the display or test cell by irradiation with UVA light of defined intensity for a prespecified time, with a voltage optionally being applied simultaneously to the display (voltage usually 5 to 30 V, alternating current (200 Hz). In the examples, unless indicated otherwise, a 100 mW/cm² iron doped mercury vapor lamp is used, and the intensity is measured using a standard UV meter (Ushio UNI meter) fitted with a 320 nm (optionally 340 nm) band-pass filter (the power meters measure the intensity at 365 nm).

The LC media should spread onto a surface evenly leading to a uniform alignment and brightness. Although low amounts of additives are necessary for complete vertical alignment, the occurrence of spreading effects often necessitates higher amounts. Non-uniformities, here "spreading effects", are dependent on the concentration of the additive(s), but also on the mode of applying the medium into the cell. More additive usually improves the spreading, however high loadings of additives are not desirable in view of reliability (VHR, LTS, etc.). In the examples the quality of spreading of the mixture is assessed by inspection of the vertical alignment over the whole cell area (8 cm×4 cm) between crossed polarizers, where the cell is filled through a gap from one end. In the case of unwanted spreading effects of the alignment additives such defects are detected here by incomplete alignment at the cell edge opposite to the injection point of the cell. The area of incomplete alignment is detectable as brighter area between crossed polarizers. The percentage of dark area (vertical orientation) is measured and used as the criterion indicating the absence of spreading effects of the mixture.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

SYNTHESIS EXAMPLES

Example 1. 2-Methyl-acrylic acid 3-[4''-(3,3-bis-hydroxymethyl-heptyloxy)-2'-ethyl-5''-[3-(2-methyl-acryloyloxy)-propyl]-4-(4-pentyl-cyclohexyl)[1,1';4',1'']terphenyl-3''-yl]-propyl ester a stirred solution of sodium carbonate (13.9 g, 131.3 mmol) in water (90 mL). The resulted mixture was treated with bis(triphenylphosphine)-palladium(II) chloride (0.3 g, 0.44 mmol) and stirred at 85° C. for 4 h, before it was cooled down to the room temperature, treated with water and methyl tert-butyl ether. Organic phase was separated; aqueous phase was extracted with methyl tert-butyl ether. The combined organic phase was washed with saturated NaCl solution, dried over Na$_2$SO$_4$, filtered and concentrated in vacuo. The residue was purified by flash chromatography (heptane/ethyl acetate) to give the desired product (27.8 g) as white crystals.

Step 1.2. Synthesis of 2'-ethyl-4-(4-pentyl-cyclohexyl)-[1,1';4',1'']terphenyl-4''-ol

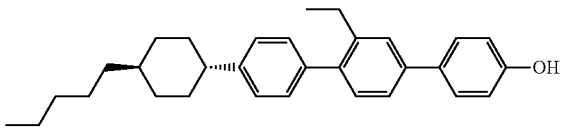

A solution of bromide 1.1 (27.7 g, 67 mmol) in tetrahydrofuran (130 mL) was added to a stirred solution of potassium carbonate (15.5 g, 112.2 mmol) in water (80 mL). The resulted mixture was heated up to 60° C. and treated

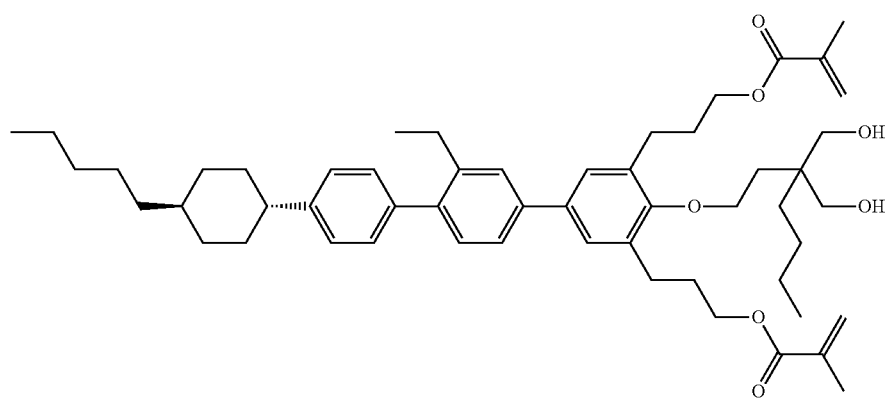 [SMILES: C=C(C)C(=O)OCCCc1cc(-c2ccc(-c3ccc([C@H]4CC[C@H](CCCCC)CC4)cc3)c(CC)c2)cc(CCCOC(=O)C(=C)C)c1OCCC(CO)(CO)CCCC]

Step 1.1. Synthesis of 4-bromo-2-ethyl-4'-(4-pentyl-cyclohexyl)-biphenyl

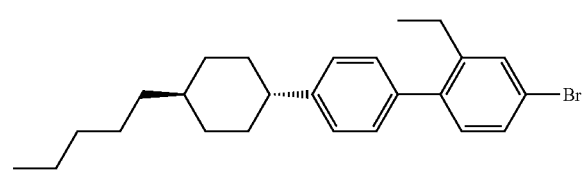 [SMILES: CCCCC[C@H]1CC[C@H](c2ccc(-c3ccc(Br)cc3CC)cc2)CC1]

A solution of 4-bromo-2-ethyl-1-iodobenzene (27.2 g, 87.5 mmol)) and [4-(4-pentylcyclohexyl)-phenyl]-boronic acid (24.0 g, 87.5 mmol) in toluene (370 mL) was added to with butyldi-1-adamantylphosphine(di-(1-adamantyl)-butylphosphine) (0.5 g, 1.3 mmol) and with tris(dibenzylidenacetone)-dipalladium(0) (0.6 g, 0.66 mmol), followed an addition of a solution of 4-hydroxyphenyl boronic acid (10.0 g, 72.6 mmol) in tetrahydrofuran (130 mL) at 65° C. The reaction mixture was stirred overnight under reflux, before it was cooled to the room temperature, treated with water and methyl tert-butyl ether and acidified with 2N HCl solution (to pH 6). Phases were separated, and the aqueous phase was extracted with methyl tert-butyl ether. The combined organic phases were washed with saturated NaCl solution, dried over Na$_2$SO$_4$, filtered and concentrated in vacuo. The residue was purified by flash chromatography (heptane/ethyl acetate) to give phenol (26.7 g) as yellow solid.

Step 1.3. Synthesis of 3",5"-dibromo-2'-ethyl-4-(4-pentyl-cyclohexyl)[1,1';4',1"]terphenyl-4"-ol

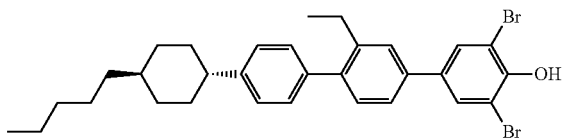 [SMILES: CCCCC[C@H]1CC[C@H](c2ccc(-c3ccc(-c4cc(Br)c(O)c(Br)c4)cc3CC)cc2)CC1]

N-Bromosuccinimide (17.6 g, 98.9 mmol) was added portionswise to a stirred solution of phenol 1.2 (21.4 g, 50.2 mmol) and diisopropyl amine (1.5 ml, 10.3 mmol) in tetrahydrofuran (500 mL) at −5° C. The reaction mixture was allowed to warm to room temperature and stirred overnight, before it was quenched with sodium hydrogensulfite (250 mL, 39% solution). Phases were separated, and the aqueous phase was extracted with methyl tert-butyl ether. The combined organic phases were washed with saturated NaCl solution, dried over $Na_2SO_4$, filtered and concentrated in vacuo to give dibromide (33.2 g) as an orange oil.

Step 1.4. Synthesis of 4"-[3,3-bis-(tert-butyl-dimethyl-silanyloxymethyl)heptyloxy]-3",5"-dibromo-2'-ethyl-4-(4-pentyl-cyclohexyl)-[1,1';4',1"]terphenyl

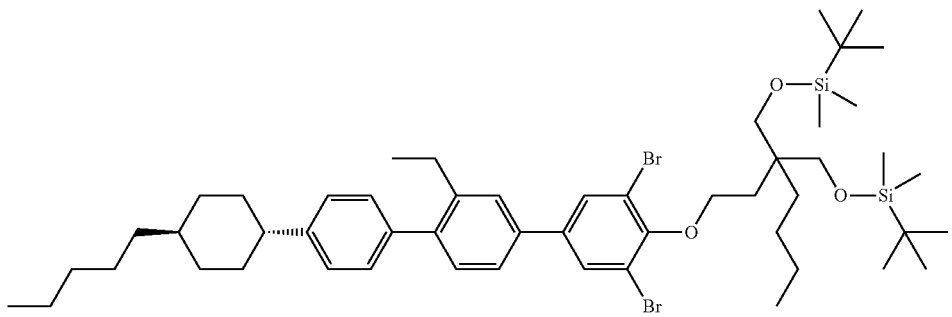 [SMILES: CCCCC[C@H]1CC[C@H](c2ccc(-c3ccc(-c4cc(Br)c(OCCC(CCCC)(CO[Si](C)(C)C(C)(C)C)CO[Si](C)(C)C(C)(C)C)c(Br)c4)cc3CC)cc2)CC1]

Triphenylphosphine (7.1 g, 27.1 mmol) was added to a stirred solution of dibromide 1.3 (13.0 g, 22.2 mmol) and 3,3-bis-(tert-butyl-dimethylsilanyloxymethyl)-heptan-1-ol (11.5 g, 28.3 mmol) in tetrahydrofuran (150 mL), followed by the addition of diisopropyl azodicarboxylate (5.3 mL, 27.1 mmol) at room temperature. The reaction mixture was stirred overnight, before it was concentrated under the reduced pressure, treated with heptane (100 mL) and filtered. The mother liquor was concentrated in vacuo and the residue was purified by flash chromatography (heptane/toluene) to give the desired product (17.7 g) as a colorless oil.

Step 1.5. Synthesis of 3-[4"-[3,3-bis-(tert-butyl-dimethyl-silanyloxymethyl)heptyloxy]-2'-ethyl-5"-(3-hydroxy-propyl)-4-(4-pentyl-cyclohexyl)[1,1';4',1"]terphenyl-3"-yl]-propan-1-ol

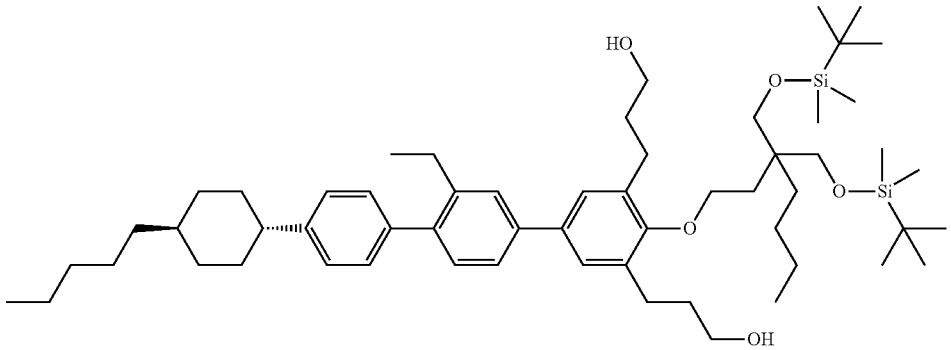 [SMILES: CCCCC[C@H]1CC[C@H](c2ccc(-c3ccc(-c4cc(CCCO)c(OCCC(CCCC)(CO[Si](C)(C)C(C)(C)C)CO[Si](C)(C)C(C)(C)C)c(CCCO)c4)cc3CC)cc2)CC1]

A solution of dibromide 1.4 (25.7 g, 25.4 mmol) and 2-butoxy-1,2-oxaborolane (13.7 g, 96.4 mmol) in tetrahydrofuran (400 mL) was added to a stirred solution of potassium phosphate monohydrate (30.7 g, 126.8 mmol) in water (80 mL). The resulted mixture was treated with palladium(II) acetate (0.1 g, 0.5 mmol) and 2-dicyclohexylphosphino-2',6'-diisopropoxybiphenyl (0.5 g, 1.0 mmol) at room temperature. The reaction mixture was stirred overnight at 65° C., before it was cooled to the room temperature and treated with water and methyl tert-butyl ether. Phases were separated, and the aqueous phase was extracted with methyl tert-butyl ether. The combined organic phases were washed with saturated NaCl solution, dried over $Na_2SO_4$, filtered and concentrated in vacuo. The residue was purified by flash chromatography (heptane/ethyl acetate) to give the desired diol (19.0 g) as a yellowish oil.

Step 1.6. Synthesis of 2-methyl-acrylic acid 3-[4"-[3,3-bis-(tert-butyldimethyl-silanyloxymethyl)-heptyloxy]-2'-ethyl-5"-[3-(2-methyl-acryloyloxy)propyl]-4-(4-pentyl-cyclohexyl)-[1,1';4',1"]terphenyl-3"-yl]-propyl ester

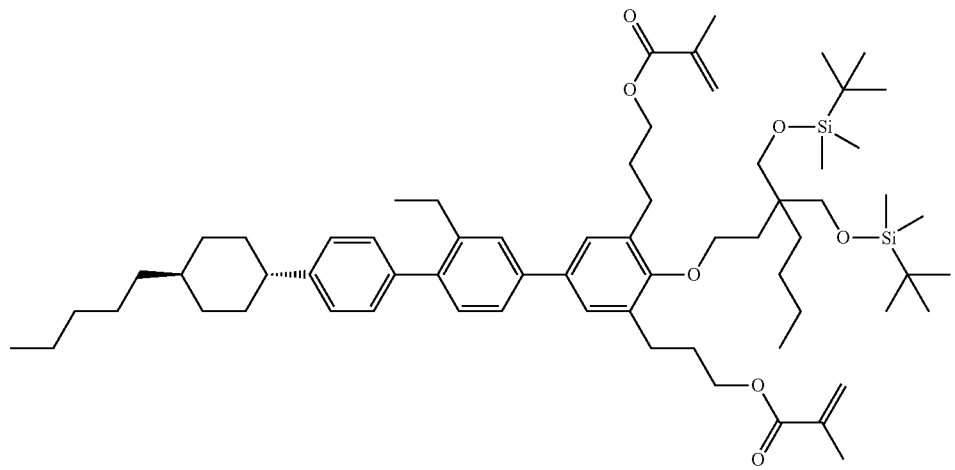 [SMILES: C=C(C)C(=O)OCCCc1cc(-c2ccc(-c3ccc([C@H]4CC[C@H](CCCCC)CC4)cc3)c(CC)c2)cc(CCCOC(=O)C(=C)C)c1OCCC(CCCC)(CO[Si](C)(C)C(C)(C)C)CO[Si](C)(C)C(C)(C)C]

A solution of diol 1.5 (19.0 g, 20.32 mmol) in dichloromethane (220 mL) was treated with methacrylic acid (8.6 mL, 101.6 mmol) and 4-(dimethylamino)pyridine (0.5 g, 4.1 mmol) at room temperature, followed by treatment with a solution of 1-(3-dimethylaminopropyl)-3-ethylcarbodiimide (17.5 mL, 101.6 mmol) in dichloromethane (90 mL) at 3° C. The reaction mixture was allowed to warm to the room temperature and was stirred overnight, before it was concentrated in vacuo. The residue was purified with flash chromatography (dichloromethane/methyl tert-butyl ether) to give the desired product (10.7 g) as a colorless oil.

Step 1.7. Synthesis of 2-methyl-acrylic acid 3-[4"-(3,3-bis-hydroxymethylheptyloxy)-2'-ethyl-5"-[3-(2-methyl-acryloyloxy)-propyl]-4-(4-pentyl-cyclohexyl)-[1,1';4',1"]terphenyl-3"-yl]-propyl ester

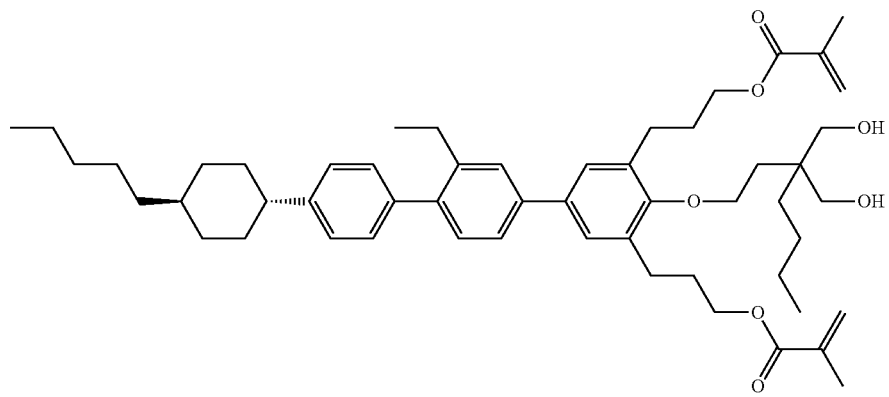 [SMILES: C=C(C)C(=O)OCCCc1cc(-c2ccc(-c3ccc([C@H]4CC[C@H](CCCCC)CC4)cc3)c(CC)c2)cc(CCCOC(=O)C(=C)C)c1OCCC(CO)(CO)CCCC]

A solution of tetrabutyl ammonium fluoride (1M in THF, 32 mL, 32 mmol) was added dropwise to a stirred solution of compound 1.6 (10.6 g, 12.7 mmol) in tetrahydrofuran (80 mL) at 3° C. The reaction mixture was allowed to warm to room temperature, was stirred overnight, cooled to 0° C. and treated with methyl tert-butyl ether and aqueous NaHCO$_3$ solution (to pH 9). Phases were separated, and the aqueous phase was extracted with methyl tert-butyl ether. The combined organic phases were washed with saturated NaCl solution, dried over Na$_2$SO$_4$, filtered and concentrated in vacuo. The residue was purified by flash chromatography (heptane/ethyl acetate) to give the desired diol (5.5 g) as a colorless oil. $^1$H NMR (Chloroform-d): δ 7.47 (d, J=1.9 Hz, 1H), 7.40 (dd, J=7.9, 2.0 Hz, 1H), 7.33 (s, 2H), 7.29 (d, J=4.7 Hz, 5H), 6.15 (t, J=1.3 Hz, 2H), 5.59 (p, J=1.6 Hz, 2H), 4.29 (t, J=6.6 Hz, 4H), 3.97 (t, J=6.4 Hz, 2H), 3.71 (d, J=5.2 Hz, 4H), 2.87-2.76 (m, 6H), 2.71 (q, J=7.5 Hz, 2H), 2.55 (tt, J=12.0, 3.4 Hz, 1H), 2.16-2.07 (m, 4H), 2.04-1.88 (m, 12H), 1.53 (qd, J=12.9, 3.3 Hz, 2H), 1.43-1.23 (m, 15H), 1.24-1.04 (m, 5H), 1.01-0.86 (m, 6H).

Example 2. 2-Methyl-acrylic acid 3-[4-(3,3-bis-hydroxymethyl-heptyloxy)-2'-cyclopropyl-5-[3-(2-methyl-acryloyloxy)-propyl]-4'''-(4-pentyl-cyclohexyl)[1,1';4',1'']terphenyl-3-yl]-propyl ester

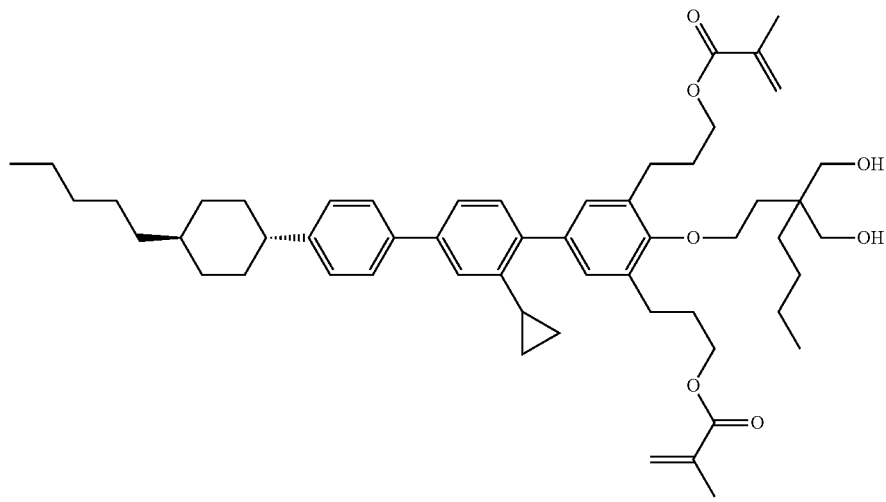

Step 2.1. Synthesis of 4'-bromo-2'-chloro-biphenyl-4-ol

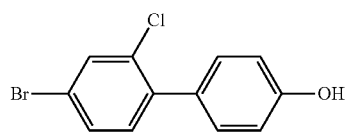 [SMILES: Oc1ccc(-c2ccc(Br)cc2Cl)cc1]

A solution of 4-bromo-2-chloro-iodobenzene (46.0 g, 142.1 mmol) and 4-hydroxyphenyl boronic acid (20.2 g, 142.1 mmol) in 1,4-dioxane (480 mL) was added to a stirred solution of Na$_2$CO$_3$ (32.1 g, 302.6 mmol) in water (150 mL). The resulted mixture was treated with [1,1'-bis(diphenylphosphino)ferrocene]dichloropalladium (11) (3.1 g, 4.3 mmol) and stirred overnight at 80° C., before it was cooled to the room temperature, treated with water and methyl tert-butyl ether and acidified with 2N HCl solution (to pH 7). The suspension was filtered through a pad of Celite, phases were separated, and the aqueous phase was extracted with methyl tert-butyl ether. The combined organic phases were washed with saturated NaCl solution, dried over Na$_2$SO$_4$, filtered and concentrated in vacuo. The residue was purified by flash chromatography (heptane/ethyl acetate) to give phenol (23.4 g) as a brownish solid.

Step 2.2. Synthesis of 2'-chloro-4''-(4-pentyl-cyclohexyl)-[1,1';4',1'']terphenyl-4-ol

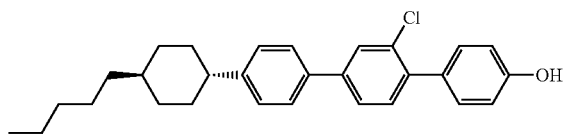 [SMILES: CCCCC[C@H]1CC[C@H](c2ccc(-c3ccc(-c4ccc(O)cc4)c(Cl)c3)cc2)CC1]

A solution of bromide 2.1 (21.4 g, 67.5 mmol) in tetrahydrofuran (200 mL) was added to a stirred solution of potassium carbonate (15.8 g, 114.7 mmol) in water (60 mL). The resulted mixture was heated up to 60° C. and treated with butyldi-1-adamantylphosphine(di-(1-adamantyl)-butylphosphine) (0.51 g, 1.4 mmol) and with Tris(dibenzylidenacetone)-dipalladium (0) (0.6 g, 0.67 mmol), followed an addition of a solution of [4-(4-pentylcyclohexyl)-phenyl]-boronic acid (18.6 g, 67.5 mmol) in tetrahydrofuran (40 mL) at 65° C. The reaction mixture was stirred overnight under reflux, before it was cooled to the room temperature, treated with water and methyl tert-butyl ether and acidified with 2N HCl solution (to pH 3). Phases were separated, and the aqueous phase was extracted with methyl tert-butyl ether. The combined organic phases were washed with saturated NaCl solution, dried over Na$_2$SO$_4$, filtered and concentrated in vacuo. The residue was purified by flash chromatography (dichloromethane/methyl tert-butyl ether) to give phenol (29.8 g) as a yellow solid.

Step 2.3. Synthesis of 2'-cyclopropyl-4"-(4-pentyl-cyclohexyl)[1,1';4',1"]terphenyl-4-ol

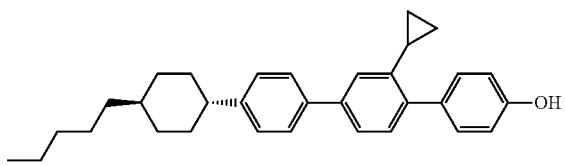 [SMILES: CCCCC[C@H]1CC[C@H](c2ccc(-c3ccc(-c4ccc(O)cc4)c(C4CC4)c3)cc2)CC1]

Palladium (II) acetate (0.46 g, 2.0 mmol) and 2-dicyclohexylphosphino-2',4',6'-triisopropylbiphenyl (1.9 g, 4.1 mmol) were added to a stirred solution of potassium carbonate (28.0 g, 202.7 mmol), phenol 2.2 (30.6 g, 67.6 mmol) and cyclopropyl boronic acid (12.2 g, 135.1 mmol) in water (80 mL) and toluene (450 mL). The reaction mixture was stirred overnight under reflux, before it was cooled to the room temperature, treated with water and methyl tert-butyl ether and acidified with 2N HCl solution (to pH 3). Phases were separated, and the aqueous phase was extracted with methyl tert-butyl ether. The combined organic phases were washed with saturated NaCl solution, dried over $Na_2SO_4$, filtered and concentrated in vacuo. The residue was purified by flash chromatography (heptane/ethyl acetate) and recrystallization (1-chlorobutane) to give the desired phenol (17.7 g) as a brownish solid.

Step 2.4. Synthesis of 3,5-dibromo-2'-cyclopropyl-4"-(4-pentyl-cyclohexyl)[1,1';4',1"]terphenyl-4-ol

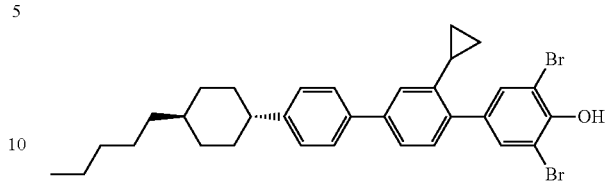

A solution of N-bromosuccinimide (13.9 g, 78.2 mmol) in dichloromethane (100 mL) was added dropwise to a stirred solution of phenol 2.3 (17.2 g, 39.1 mmol) and diisopropyl amine (1.1 ml, 8.2 mmol) in dichloromethane (200 mL) at −5° C. The reaction mixture was allowed to warm to room temperature and stirred overnight, before it was quenched with sodium hydrogensulfite (250 mL, 39% solution). Phases were separated, and the aqueous phase was extracted with dichloromethane. The combined organic phases were washed with saturated NaCl solution, dried over $Na_2SO_4$, filtered and concentrated in vacuo to give dibromide (22.3 g) as brown oil.

Step 2.5. Synthesis of 4-[3,3-bis-(tert-butyl-dimethyl-silanyloxymethyl)heptyloxy]-3,5-dibromo-2'-cyclopropyl-4"-(4-pentyl-cyclohexyl)[1,1';4',1"]terphenyl

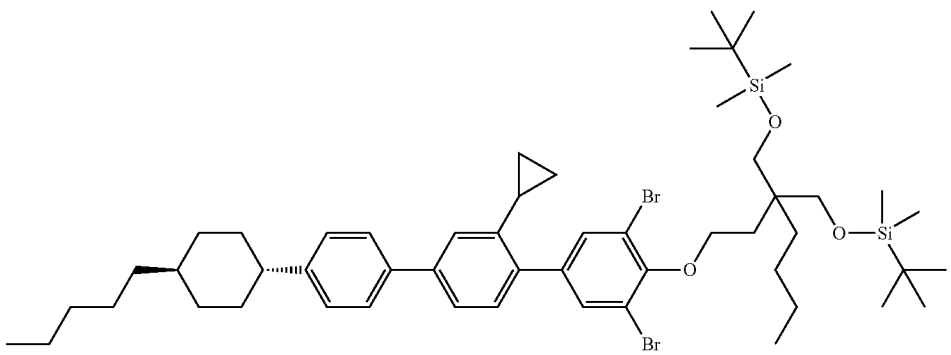 [SMILES: CCCCC[C@H]1CC[C@H](c2ccc(-c3ccc(-c4cc(Br)c(OCCC(CCCC)(CO[Si](C)(C)C(C)(C)C)CO[Si](C)(C)C(C)(C)C)c(Br)c4)c(C4CC4)c3)cc2)CC1]

Triphenylphosphine (12.0 g, 45.7 mmol) was added to a stirred solution of dibromide 2.4 (22.3 g, 37.4 mmol) and 3,3-bis-(tert-butyl-dimethylsilanyloxymethyl)-heptan-1-ol (19.3 g, 47.6 mmol) in tetrahydrofuran (250 mL), followed by the addition of diisopropyl azodicarboxylate (9.0 mL, 45.7 mmol) at room temperature. The reaction mixture was stirred overnight, before it was concentrated under the reduced pressure, treated with heptane (400 mL) and filtered. The mother liquor was concentrated in vacuo and the residue was purified by flash chromatography (heptane/toluene) to give the desired product (19.1 g) as a colorless oil.

Step 2.6. Synthesis of 3-[4-[3,3-bis-(tert-butyl-dimethyl-silanyloxymethyl)heptyloxy]-2'-cyclopropyl-5-(3-hydroxy-propyl)-4''-(4-pentyl-cyclohexyl)[1,1';4',1'']terphenyl-3-yl]-propan-1-ol

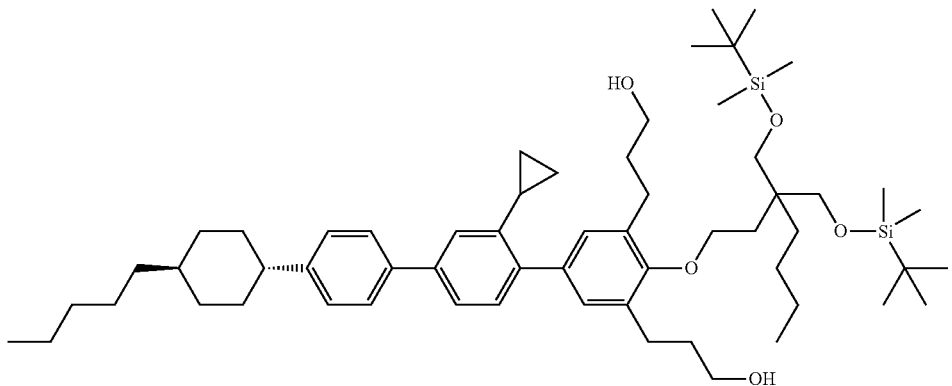 [SMILES: CCCCC[C@H]1CC[C@H](c2ccc(-c3ccc(-c4cc(CCCO)c(OCCC(CCCC)(CO[Si](C)(C)C(C)(C)C)CO[Si](C)(C)C(C)(C)C)c(CCCO)c4)c(C4CC4)c3)cc2)CC1]

A solution of dibromide 2.5 (19.4 g, 19.7 mmol) and 2-butoxy-1,2-oxaborolane (10.6 g, 74.8 mmol) in tetrahydrofuran (300 mL) was added to a stirred solution of potassium phosphate monohydrate (23.9 g, 98.4 mmol) in water (60 mL). The resulted mixture was treated with palladium(II) acetate (0.09 g, 0.39 mmol) and 2-dicyclohexylphosphino-2',6'-diisopropoxybiphenyl (0.39 g, 0.79 mmol) at room temperature. The reaction mixture was stirred for 4.5 h at 65° C., before it was cooled to the room temperature and treated with water and methyl tert-butyl ether. Phases were separated, and the aqueous phase was extracted with methyl tert-butyl ether. The combined organic phases were washed with saturated NaCl solution, dried over $Na_2SO_4$, filtered and concentrated in vacuo. The residue was purified by flash chromatography (heptane/ethyl acetate) to give the desired diol (17.8 g) as a yellowish oil.

Step 2.7. Synthesis of 2-methyl-acrylic acid 3-[4-[3,3-bis-(tert-butyl-dimethylsilanyloxymethyl)-heptyloxy]-2'-cyclopropyl-5-[3-(2-methyl-acryloyloxy)propyl]-4''-(4-pentyl-cyclohexyl)-[1,1';4',1''] terphenyl-3-yl]-propyl ester

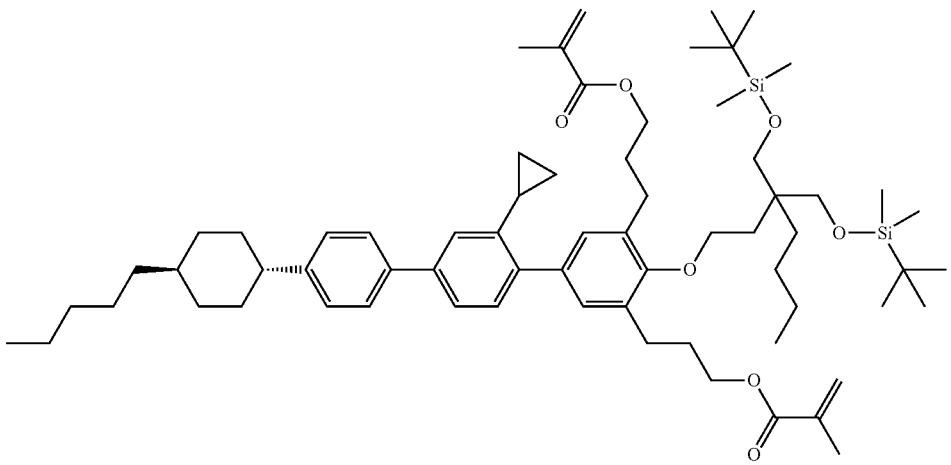 [SMILES: C=C(C)C(=O)OCCCc1cc(-c2ccc(-c3ccc([C@H]4CC[C@H](CCCCC)CC4)cc3)cc2C2CC2)cc(CCCOC(=O)C(=C)C)c1OCCC(CCCC)(CO[Si](C)(C)C(C)(C)C)CO[Si](C)(C)C(C)(C)C]

A solution of diol 2.6 (17.8 g, 18.8 mmol) in dichloromethane (140 mL) was treated with methacrylic acid (8.0 mL, 94.0 mmol) and 4-(dimethylamino)pyridine (0.46 g, 3.8 mmol) at room temperature, followed by treatment with a solution of 1-(3-dimethylaminopropyl)-3-ethylcarbodiimide (16.0 mL, 94.0 mmol) in dichloromethane (50 mL) at 3° C. The reaction mixture was allowed to warm to the room temperature and was stirred overnight, before it was concentrated in vacuo. The residue was purified with flash chromatography (dichloromethane) to give the desired product (13.7 g) as a colorless oil.

Step 2.8. Synthesis of 2-methyl-acrylic acid 3-[4-(3,3-bis-hydroxymethylheptyloxy)-2'-cyclopropyl-5-[3-(2-methyl-acryloyloxy)-propyl]-4"-(4-pentyl-cyclohexyl)-[1,1';4',1"]terphenyl-3-yl]-propyl ester

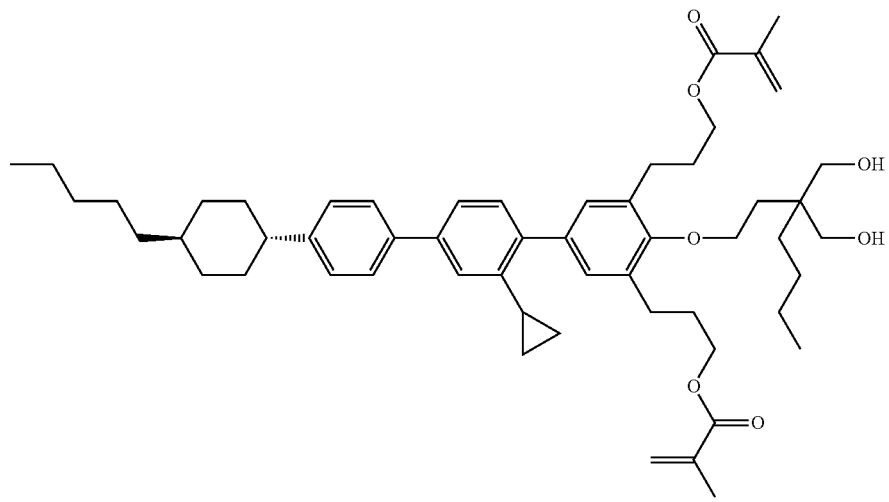 [SMILES: C=C(C)C(=O)OCCCc1cc(-c2ccc(-c3ccc([C@H]4CC[C@H](CCCCC)CC4)cc3)cc2C2CC2)cc(CCCOC(=O)C(=C)C)c1OCCC(CO)(CO)CCCC]

A solution of tetrabutyl ammonium fluoride (1M in THF, 40 mL, 40 mmol) was added dropwise to a stirred solution of compound 2.7 (13.7 g, 12.7 mmol) in tetrahydrofuran (100 mL) at 2° C. The reaction mixture was allowed to warm to room temperature, was stirred overnight, cooled to 0° C. and treated with methyl tert-butyl ether and aqueous NaHCO$_3$ solution (to pH 8). Phases were separated, and the aqueous phase was extracted with methyl tert-butyl ether. The combined organic phases were washed with saturated NaCl solution, dried over Na$_2$SO$_4$, filtered and concentrated in vacuo. The residue was purified by flash chromatography (heptane/ethyl acetate) to give the desired diol (6.1 g) as a colorless oil. $^1$H NMR (Chloroform-d): δ 7.56-7.51 (m, 2H), 7.42 (dd, J=7.9, 1.9 Hz, 1H), 7.34-7.30 (m, 2H), 7.28 (d, J=7.9 Hz, 1H), 7.21 (s, 2H), 7.14 (d, J=1.8 Hz, 1H), 6.13 (t, J=1.3 Hz, 2H), 5.58 (p, J=1.6 Hz, 2H), 4.27 (t, J=6.6 Hz, 4H), 4.00 (t, J=6.4 Hz, 2H), 3.71 (d, J=5.3 Hz, 4H), 2.89-2.74 (m, 6H), 2.54 (tt, J=12.1, 3.3 Hz, 1H), 2.13-2.05 (m, 4H), 2.04-1.88 (m, 13H), 1.52 (qd, J=12.7, 3.0 Hz, 2H), 1.41-1.22 (m, 15H), 1.10 (qd, J=12.8, 3.1 Hz, 2H), 0.97-0.87 (m, 8H), 0.82-0.76 (m, 2H).

According to the synthetic procedures, described for example, in the documents WO 2012/038026 A1, EP 2918658, WO 2016/015803, WO 2017/041893, WO 2017/045740 and the above shown synthesis pathway the following compounds have been synthesized:
Example 3
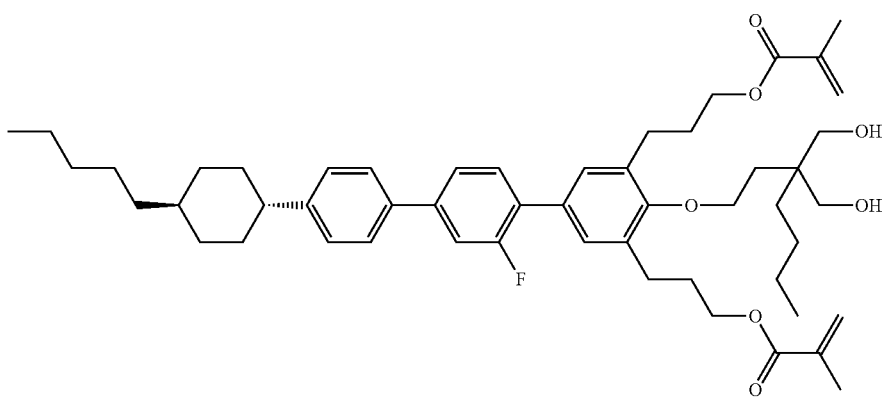 [SMILES: C=C(C)C(=O)OCCCc1cc(-c2ccc(-c3ccc([C@H]4CC[C@H](CCCCC)CC4)cc3)cc2F)cc(CCCOC(=O)C(=C)C)c1OCCC(CO)(CO)CCCC]
White crystals. Melting point: 58° C. (K 58 I).
$^1$H NMR (Chloroform-d): δ 7.59-7.55 (m, 2H), 7.49-7.42 (m, 2H), 7.38 (dd, J=12.1, 1.5 Hz, 1H), 7.35-7.32 (m, 2H), 7.30 (d, J=1.4 Hz, 2H), 6.13 (t, J=1.3 Hz, 2H), 5.59 (p, J=1.6 Hz, 2H), 4.28 (t, J=6.5 Hz, 4H), 3.98 (t, J=6.4 Hz, 2H), 3.70 (s, 4H), 2.87-2.70 (m, 6H), 2.55 (tt, J=12.1, 3.3 Hz, 1H), 2.15-2.04 (m, 4H), 2.05-1.88 (m, 12H), 1.52 (qd, J=12.8, 3.0 Hz, 2H), 1.41-1.22 (m, 15H), 1.10 (qd, J=13.1, 12.7, 2.8 Hz, 2H), 0.94 (q, J=6.9 Hz, 6H).
Example 4
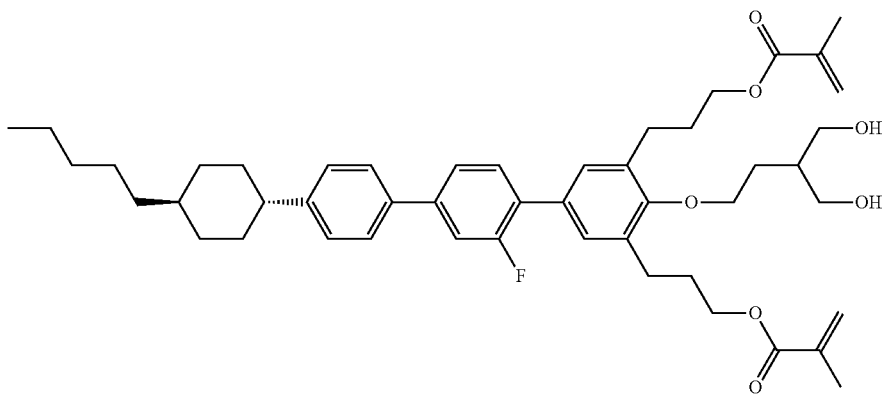 [SMILES: C=C(C)C(=O)OCCCc1cc(-c2ccc(-c3ccc([C@H]4CC[C@H](CCCCC)CC4)cc3)cc2F)cc(CCCOC(=O)C(=C)C)c1OCCC(CO)CO]

White crystals. Melting point: 76° C. (K 76 SmA 91 l).
¹H NMR (500 MHz, Chloroform-d): δ 7.60-7.54 (m, 2H), 7.49-7.43 (m, 2H), 7.38 (dd, J=12.0, 1.6 Hz, 1H), 7.35-7.32 (m, 2H), 7.30 (d, J=1.4 Hz, 2H), 6.13 (t, J=1.4 Hz, 2H), 5.59 (p, J=1.6 Hz, 2H), 4.28 (t, J=6.6 Hz, 4H), 4.01-3.89 (m, 4H), 3.82 (dd, J=10.8, 6.7 Hz, 2H), 2.84-2.75 (m, 4H), 2.70 (br.s., 2H), 2.55 (tt, J=12.2, 3.4 Hz, 1H), 2.18-2.03 (m, 5H), 2.02-1.85 (m, 12H), 1.52 (qd, J=12.8, 3.0 Hz, 2H), 1.43-1.23 (m, 9H), 1.10 (qd, J=13.1, 12.7, 2.8 Hz, 2H), 0.93 (t, J=7.1 Hz, 3H).
Example 5
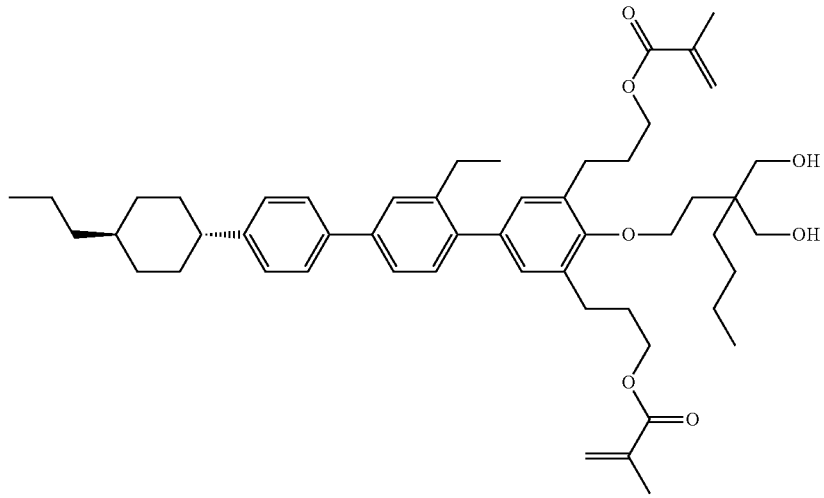 [SMILES: C=C(C)C(=O)OCCCc1cc(-c2ccc(-c3ccc([C@H]4CC[C@H](CCC)CC4)cc3)cc2CC)cc(CCCOC(=O)C(=C)C)c1OCCC(CO)(CO)CCCC]
White crystals. Melting point: 58° C. (K 58 l).
¹H NMR (Chloroform-d): δ 7.61-7.56 (m, 2H), 7.53 (d, J=1.9 Hz, 1H), 7.45 (dd, J=7.9, 2.0 Hz, 1H), 7.34-7.31 (m, 2H), 7.24 (d, J=7.9 Hz, 1H), 7.07 (s, 2H), 6.13 (t, J=1.3 Hz, 2H), 5.58 (p, J=1.6 Hz, 2H), 4.26 (t, J=6.6 Hz, 4H), 4.00 (t, J=6.3 Hz, 2H), 3.71 (s, 4H), 2.89-2.76 (m, 6H), 2.67 (q, J=7.5 Hz, 2H), 2.55 (tt, J=12.1, 3.4 Hz, 1H), 2.11-2.04 (m, 4H), 2.04-1.86 (m, 12H), 1.53 (qd, J=12.9, 3.2 Hz, 2H), 1.44-1.23 (m, 11H), 1.18 (t, J=7.5 Hz, 3H), 1.11 (qd, J=12.8, 3.2 Hz, 2H), 0.95 (td, J=7.1, 3.0 Hz, 6H).
Example 6
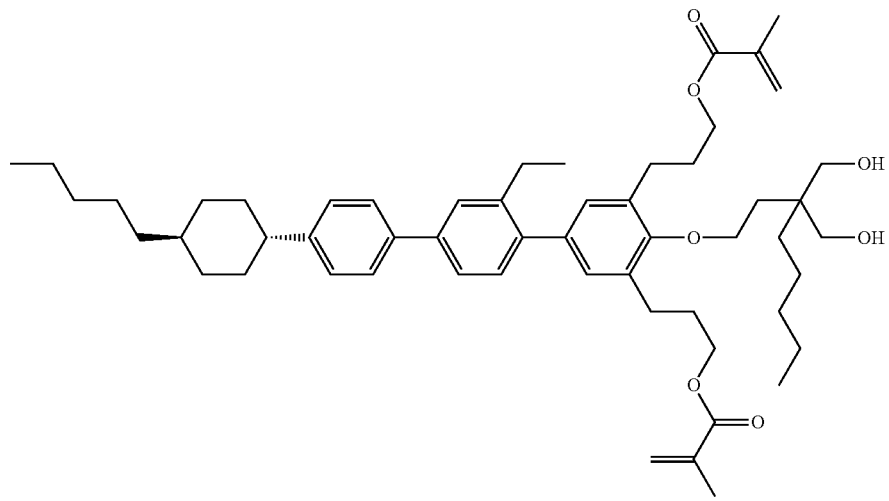

White crystals. Melting point: 40° C. (K 40 l).
¹H NMR (Chloroform-d): δ 7.61-7.55 (m, 2H), 7.53 (d, J=1.9 Hz, 1H), 7.45 (dd, J=7.9, 2.0 Hz, 1H), 7.35-7.30 (m, 2H), 7.24 (d, J=7.9 Hz, 1H), 7.06 (s, 2H), 6.13 (t, J=1.3 Hz, 2H), 5.58 (p, J=1.6 Hz, 2H), 4.26 (t, J=6.6 Hz, 4H), 3.99 (t, J=6.3 Hz, 2H), 3.76-3.64 (m, 4H), 2.86-2.74 (m, 6H), 2.66 (q, J=7.6 Hz, 2H), 2.59-2.48 (m, 1H), 2.11-2.04 (m, 4H), 2.04-1.88 (m, 12H), 1.53 (qd, J=12.8, 3.1 Hz, 2H), 1.41-1.23 (m, 17H), 1.18 (t, J=7.5 Hz, 3H), 1.10 (qd, J=12.9, 3.1 Hz, 2H), 0.93 (td, J=7.0, 5.4 Hz, 6H).
Example 7
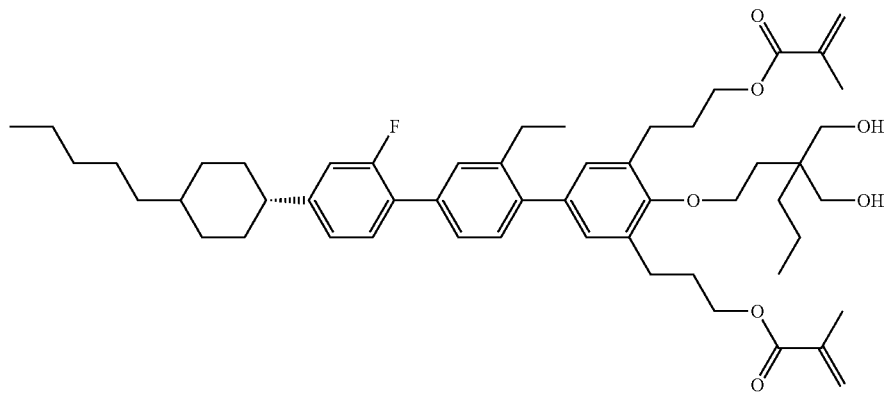
White Crystals: Tg −18° C., melting point: 52° C.
¹H NMR (400 MHz, Chloroform-d) δ 7.49-7.34 (m, 2H), 7.10-6.97 (m, 2H), 6.10 (t, J=1.4 Hz, 1H), 5.55 (p, J=1.6 Hz, 1H), 4.24 (t, J=6.6 Hz, 2H), 3.97 (t, J=6.4 Hz, 1H), 3.68 (d, J=5.6 Hz, 2H), 2.83-2.72 (m, 3H), 2.63 (q, J=7.5 Hz, 1H), 2.10-1.91 (m, 8H), 1.89 (t, J=6.5 Hz, 1H), 1.60 (s, 2H), 1.55-1.40 (m, 1H), 1.36-1.28 (m, 5H), 1.28-1.18 (m, 2H), 1.18-0.99 (m, 3H), 0.97-0.86 (m, 3H).
Example 8
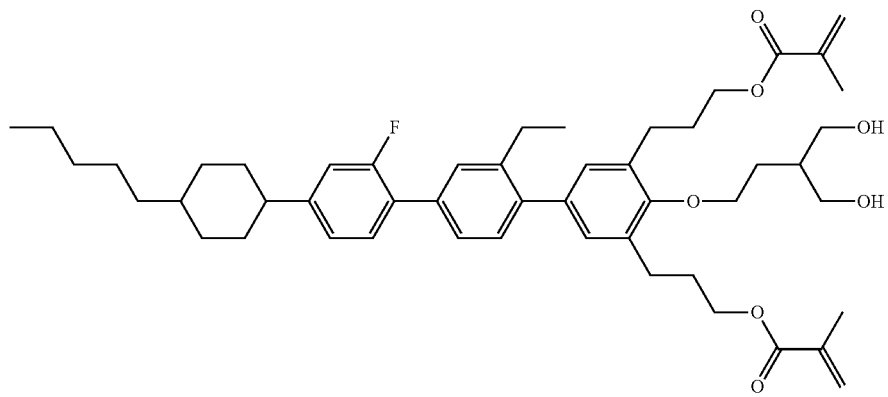 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]

White Crystals: Tg −28° C., melting point: 54° C.

$^1$H NMR (400 MHz, Chloroform-d) δ 7.49-7.34 (m, 1H), 7.03 (s, 1H), 6.10 (t, J=1.3 Hz, 1H), 5.56 (p, J=1.6 Hz, 1H), 4.24 (t, J=6.6 Hz, 2H), 3.97-3.86 (m, 2H), 3.80 (ddd, J=10.9, 6.7, 5.4 Hz, 1H), 2.79-2.70 (m, 2H), 2.68-2.58 (m, 2H), 2.15-2.01 (m, 2H), 2.01-1.90 (m, 4H), 1.87 (q, J=6.2 Hz, 1H), 1.58 (s, 1H), 1.56-1.40 (m, 1H), 1.38-1.18 (m, 4H), 1.18-0.99 (m, 2H), 0.90 (t, J=6.9 Hz, 1H).

Example 9

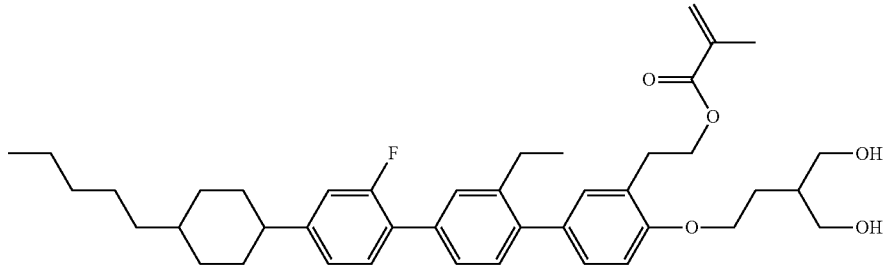 [SMILES: C=C(C)C(=O)OCCc1cc(-c2ccc(-c3ccc(C4CCC(CCCCC)CC4)cc3F)cc2CC)ccc1OCCC(CO)CO]

White Crystals: Tg −17° C., melting point: 74° C.

1H NMR (400 MHz, Chloroform-d) δ 7.49-7.34 (m, 1H), 7.03 (s, 1H), 6.10 (t, J=1.3 Hz, 1H), 5.56 (p, J=1.6 Hz, 1H), 4.24 (t, J=6.6 Hz, 2H), 3.97-3.86 (m, 2H), 3.80 (ddd, J=10.9, 6.7, 5.4 Hz, 1H), 2.79-2.70 (m, 2H), 2.68-2.58 (m, 2H), 2.15-2.01 (m, 2H), 2.01-1.90 (m, 4H), 1.87 (q, J=6.2 Hz, 1H), 1.58 (s, 1H), 1.56-1.40 (m, 1H), 1.38-1.18 (m, 4H), 1.18-0.99 (m, 2H), 0.90 (t, J=6.9 Hz, 1H).

Example 10

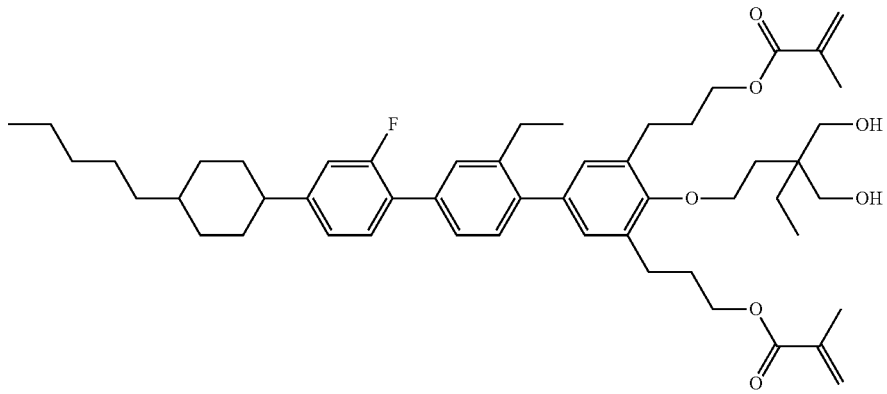 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CC)(CO)CO]

White Crystals: Tg −18° C., melting point: 45° C.

$^1$H NMR (500 MHz, Chloroform-d) δ 7.45-7.38 (m, 1H), 7.13-7.01 (m, 2H), 6.13 (t, J=1.3 Hz, 1H), 5.58 (p, J=1.6 Hz, 1H), 4.26 (t, J=6.5 Hz, 2H), 3.99 (t, J=6.4 Hz, 1H), 3.73-3.69 (m, 2H), 2.83-2.73 (m, 3H), 2.66 (q, J=7.6 Hz, 1H), 2.12-2.04 (m, 2H), 2.04-1.95 (m, 5H), 1.92 (dd, J=13.3, 3.2 Hz, 1H), 1.55-1.33 (m, 4H), 1.33-1.22 (m, 3H), 1.20-1.02 (m, 3H), 0.96-0.89 (m, 3H).

Example 11

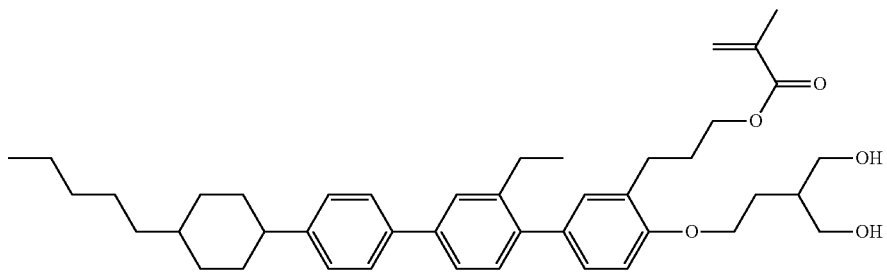

White Crystals: Tg −26° C., melting point: 85° C.
¹H NMR (500 MHz, Chloroform-d) δ 7.61-7.56 (m, 2H), 7.53 (d, J=1.9 Hz, 1H), 7.45 (dd, J=7.8, 2.0 Hz, 1H), 7.32 (d, J=8.2 Hz, 2H), 7.21-7.14 (m, 2H), 6.91 (d, J=8.3 Hz, 1H), 6.11 (p, J=1.1 Hz, 1H), 5.58 (p, J=1.6 Hz, 1H), 4.24 (t, J=6.9 Hz, 2H), 4.13 (t, J=6.0 Hz, 2H), 3.95 (dd, J=10.8, 4.0 Hz, 2H), 3.81 (dd, J=10.8, 7.0 Hz, 2H), 2.78 (dd, J=8.5, 6.6 Hz, 2H), 2.69 (q, J=7.5 Hz, 2H), 2.55 (tt, J=12.0, 3.4 Hz, 2H), 2.15 (ddp, J=10.9, 7.1, 3.9, 3.4 Hz, 1H), 2.10-2.02 (m, 2H), 2.02-1.87 (m, 9H), 1.59-1.45 (m, 2H), 1.42-1.22 (m, 9H), 1.21-1.03 (m, 5H), 0.93 (t, J=7.1 Hz, 3H).
Example 12
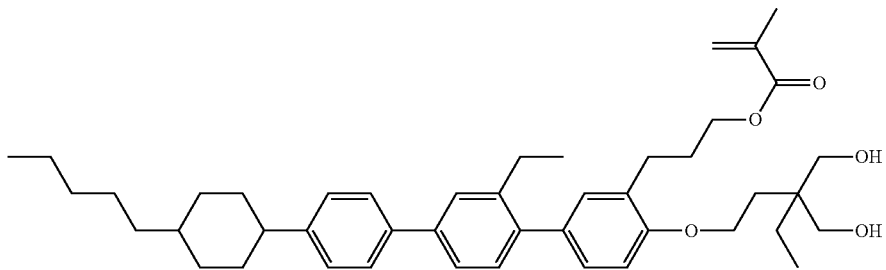 [SMILES: C=C(C)C(=O)OCCCc1cc(-c2ccc(-c3ccc(C4CCC(CCCCC)CC4)cc3)cc2CC)ccc1OCCC(CC)(CO)CO]
White Crystals: Tg −15° C.
¹H NMR (500 MHz, Chloroform-d) δ 7.58 (d, J=8.2 Hz, 2H), 7.45 (dd, J=7.9, 2.0 Hz, 1H), 7.32 (d, J=8.3 Hz, 2H), 7.26 (d, J=7.9 Hz, 1H), 7.22-7.14 (m, 2H), 6.95 (d, J=8.3 Hz, 1H), 4.24 (t, J=6.6 Hz, 2H), 4.17 (t, J=6.3 Hz, 2H), 3.77-3.67 (m, 4H), 2.78 (dd, J=8.5, 6.6 Hz, 2H), 2.68 (q, J=7.5 Hz, 2H), 2.59-2.50 (m, 3H), 2.05 (dq, J=8.8, 6.7 Hz, 2H), 2.01-1.88 (m, 9H), 1.59-1.42 (m, 7H), 1.40-1.22 (m, 9H), 1.21-1.04 (m, 5H), 0.98-0.90 (m, 6H).
Example 13
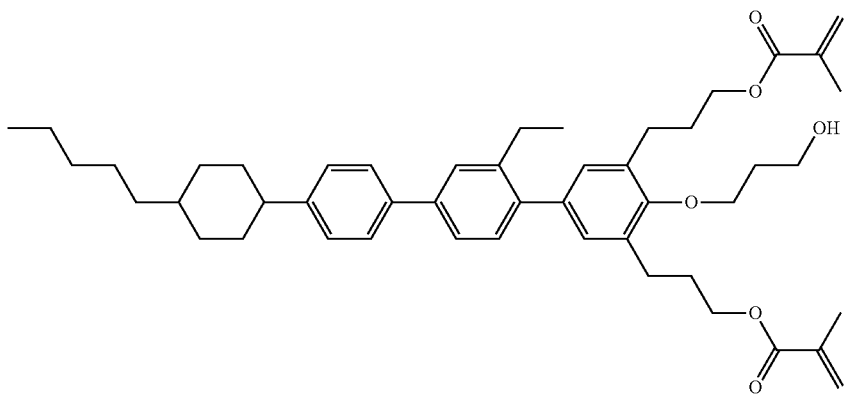 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]

White Crystals Tg −30° C. TM=52° C.

H NMR (500 MHz, Chloroform-d) δ 7.60-7.52 (m, 2H), 7.50 (d, J=1.9 Hz, 1H), 7.42 (dd, J=7.9, 1.9 Hz, 1H), 7.30 (d, J=1.8 Hz, 2H), 7.22 (d, J=7.9 Hz, 1H), 7.03 (s, 2H), 6.11 (t, J=1.3 Hz, 2H), 5.55 (p, J=1.6 Hz, 2H), 4.24 (t, J=6.5 Hz, 4H), 4.00 (t, J=5.9 Hz, 2H), 3.95 (t, J=5.8 Hz, 2H), 2.84-2.73 (m, 4H), 2.64 (q, J=7.6 Hz, 2H), 2.52 (tt, J=12.1, 3.4 Hz, 1H), 2.06 (ddq, J=12.7, 9.7, 6.2 Hz, 6H), 1.99-1.84 (m, 11H), 1.50 (qd, J=12.8, 3.1 Hz, 2H), 1.40-1.20 (m, 9H), 1.18-1.02 (m, 5H), 0.91 (t, J=7.0 Hz, 3H).

Example 14

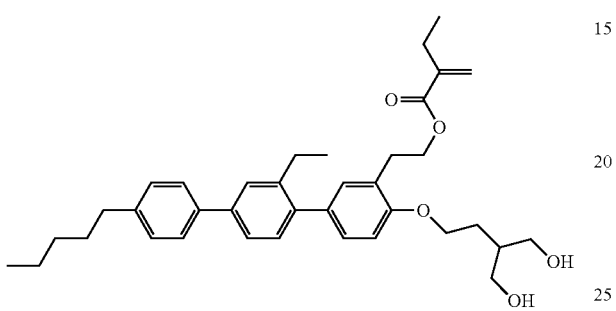

White Crystals Tg −24° C. Tm=51° C.

$^1$H NMR (500 MHz, Chloroform-d) δ 7.61-7.56 (m, 2H), 7.53 (d, J=1.9 Hz, 1H), 7.46 (dd, J=7.9, 2.0 Hz, 1H), 7.34-7.27 (m, 2H), 7.25 (d, J=7.9 Hz, 1H), 7.23-7.17 (m, 2H), 6.93 (d, J=8.3 Hz, 1H), 6.15 (d, J=1.3 Hz, 1H), 5.54 (t, J=1.6 Hz, 1H), 4.45 (t, J=7.3 Hz, 2H), 4.15 (t, J=5.9 Hz, 2H), 3.94 (dd, J=10.7, 4.1 Hz, 2H), 3.82 (dd, J=10.8, 6.8 Hz, 2H), 3.08 (t, J=7.3 Hz, 2H), 2.72-2.63 (m, 4H), 2.33 (tdd, J=8.8, 6.9, 1.4 Hz, 2H), 2.18 (ddp, J=11.0, 7.0, 4.0, 3.5 Hz, 1H), 1.91 (q, J=6.2 Hz, 2H), 1.75-1.61 (m, 2H), 1.39 (dq, J=7.2, 4.0, 3.3 Hz, 4H), 1.17 (t, J=7.5 Hz, 3H), 1.08 (t, J=7.4 Hz, 3H), 0.98-0.88 (m, 3H).

Example 15

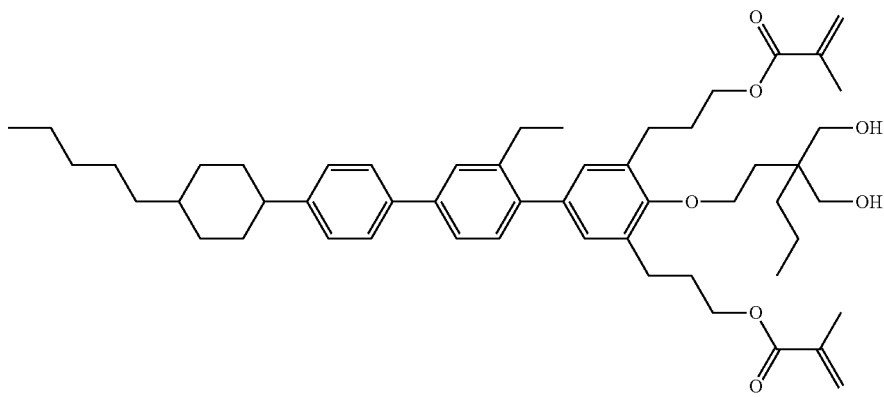

White Crystals Tg −17° C. Tm=50° C.

$^1$H NMR (500 MHz, Chloroform-d) δ 7.60-7.52 (m, 2H), 7.50 (d, J=1.9 Hz, 1H), 7.42 (dd, J=7.8, 2.0 Hz, 1H), 7.31 (s, 2H), 7.22 (d, J=7.9 Hz, 1H), 7.04 (s, 2H), 6.10 (s, 2H), 5.56 (t, J=1.8 Hz, 2H), 4.24 (t, J=6.5 Hz, 4H), 3.97 (t, J=6.3 Hz, 2H), 3.69 (s, 4H), 2.91-2.69 (m, 5H), 2.64 (q, J=7.6 Hz, 2H), 2.52 (tt, J=12.2, 3.4 Hz, 1H), 2.15-1.76 (m, 16H), 1.50 (qd, J=12.7, 3.1 Hz, 2H), 1.39-1.19 (m, 13H), 1.15 (t, J=7.5 Hz, 3H), 1.08 (qd, J=12.8, 3.1 Hz, 2H), 0.92 (dt, J=14.2, 6.4 Hz, 6H).

Example 16

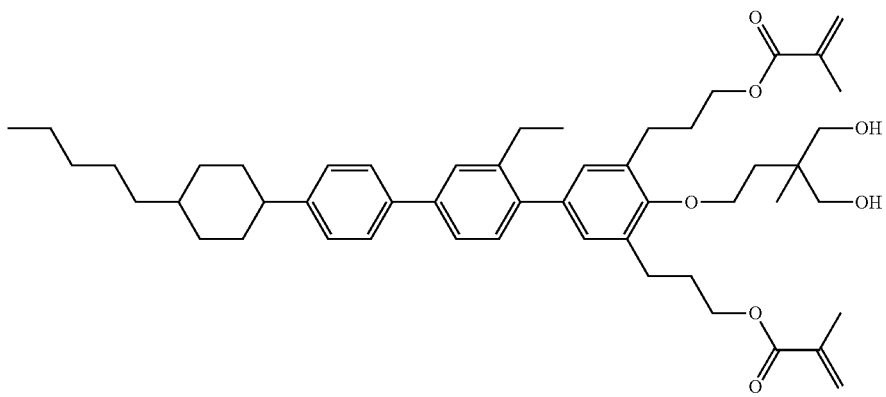

White Crystals Tg −18° C. Tm=52° C.
$^1$H NMR (500 MHz, Chloroform-d) δ 7.61-7.53 (m, 2H), 7.50 (d, J=1.9 Hz, 1H), 7.42 (dd, J=7.9, 1.9 Hz, 1H), 7.30 (d, J=8.3 Hz, 2H), 7.22 (d, J=7.9 Hz, 1H), 7.04 (s, 2H), 6.10 (t, J=1.3 Hz, 2H), 5.56 (p, J=1.6 Hz, 2H), 4.24 (t, J=6.5 Hz, 4H), 4.00 (t, J=6.3 Hz, 2H), 3.66 (s, 4H), 2.80-2.73 (m, 4H), 2.64 (q, J=7.5 Hz, 2H), 2.52 (tt, J=12.1, 3.4 Hz, 1H), 2.04 (ddt, J=18.1, 8.3, 6.4 Hz, 6H), 1.98-1.83 (m, 10H), 1.50 (qd, J=12.8, 3.1 Hz, 4H), 1.39-1.18 (m, 10H), 1.15 (t, J=7.5 Hz, 3H), 1.08 (qd, J=12.8, 3.1 Hz, 2H), 0.95-0.86 (m, 6H).

Example 17

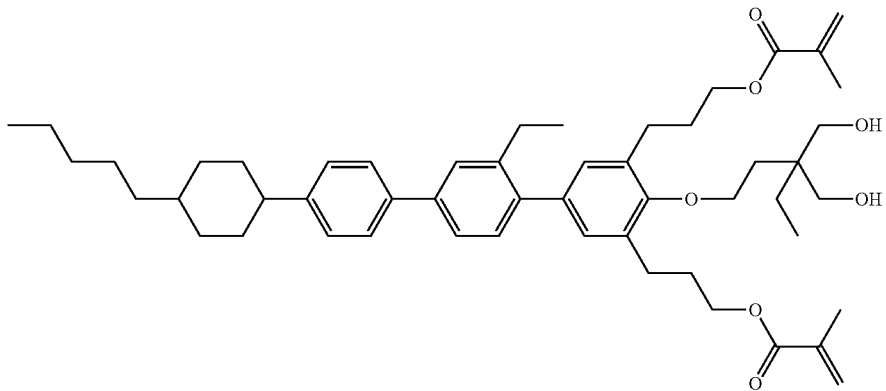

White Crystals Tg −28° C. Tm=37° C.
$^1$H NMR (500 MHz, Chloroform-d) δ 7.58-7.53 (m, 2H), 7.50 (d, J=1.9 Hz, 1H), 7.43 (dd, J=7.9, 2.0 Hz, 1H), 7.30 (d, J=8.2 Hz, 2H), 7.22 (d, J=7.9 Hz, 1H), 7.04 (s, 2H), 6.11 (t, J=1.3 Hz, 2H), 5.56 (p, J=1.6 Hz, 2H), 4.24 (t, J=6.5 Hz, 4H), 3.97 (t, J=6.4 Hz, 2H), 3.68 (d, J=4.6 Hz, 4H), 2.85-2.70 (m, 6H), 2.64 (q, J=7.5 Hz, 2H), 2.52 (tt, J=12.1, 3.4 Hz, 1H), 2.10-2.01 (m, 4H), 2.00-1.86 (m, 12H), 1.50 (qd, J=12.8, 3.1 Hz, 2H), 1.40 (q, J=7.6 Hz, 2H), 1.37-1.18 (m, 10H), 1.15 (t, J=7.5 Hz, 3H), 1.08 (qd, J=13.0, 3.1 Hz, 2H), 0.94-0.83 (m, 6H).

Example 18
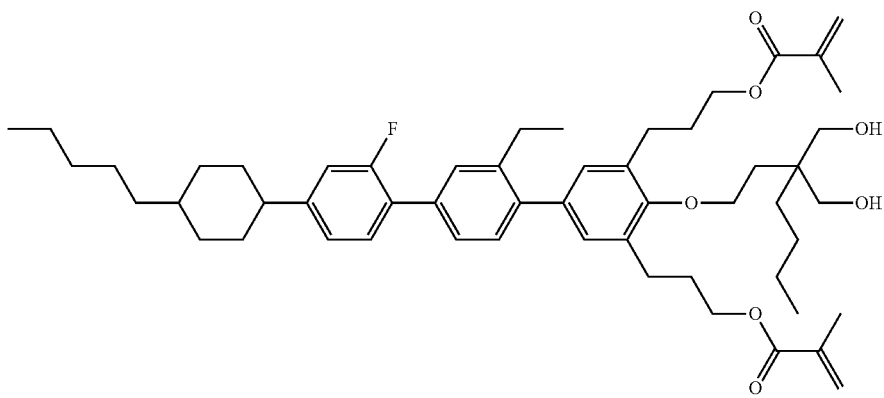 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
White Crystals Tg −18° C. Tm=40° C.
¹H NMR (500 MHz, Chloroform-d) δ 7.46 (d, J=1.6 Hz, 1H), 7.43-7.34 (m, 2H), 7.22 (d, J=7.9 Hz, 1H), 7.07 (dd, J=8.0, 1.7 Hz, 1H), 7.02 (d, J=17.6 Hz, 3H), 6.10 (t, J=1.3 Hz, 2H), 5.56 (p, J=1.6 Hz, 2H), 4.24 (t, J=6.5 Hz, 4H), 3.97 (t, J=6.3 Hz, 2H), 3.68 (s, 4H), 2.82-2.71 (m, 6H), 2.63 (q, J=7.5 Hz, 2H), 2.51 (tt, J=12.3, 3.5 Hz, 1H), 2.09-2.01 (m, 4H), 2.01-1.84 (m, 12H), 1.53-1.40 (m, 2H), 1.38-1.17 (m, 15H), 1.14 (t, J=7.5 Hz, 3H), 1.07 (qd, J=13.0, 3.2 Hz, 2H), 0.96-0.78 (m, 6H).
Example 19
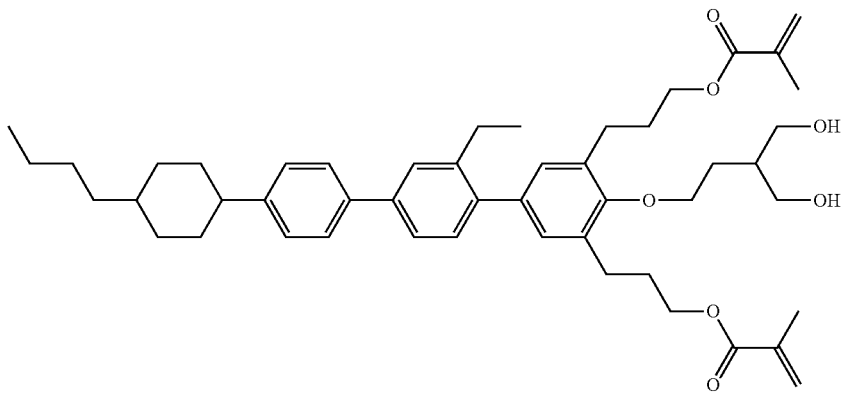 [SMILES: C=C(C)C(=O)OCCCc1cc(-c2ccc(-c3ccc(C4CCC(CCCC)CC4)cc3)cc2CC)cc(CCCOC(=O)C(=C)C)c1OCCC(CO)CO]
White Crystals Tg −24° C. Tm=67° C.
¹H NMR (500 MHz, Chloroform-d) δ 7.59-7.53 (m, 2H), 7.50 (d, J=1.9 Hz, 1H), 7.42 (dd, J=7.9, 1.9 Hz, 1H), 7.30 (d, J=8.2 Hz, 2H), 7.22 (d, J=7.8 Hz, 1H), 7.03 (s, 2H), 6.15-6.04 (m, 2H), 5.56 (p, J=1.6 Hz, 2H), 4.24 (t, J=6.6 Hz, 4H), 3.92 (dt, J=8.8, 5.2 Hz, 4H), 3.80 (dd, J=10.8, 6.7 Hz, 2H), 2.81-2.70 (m, 4H), 2.64 (q, J=7.5 Hz, 3H), 2.52 (tt, J=12.2, 3.4 Hz, 2H), 2.12 (tt, J=6.5, 4.1 Hz, 1H), 2.08-2.00 (m, 4H), 1.98-1.82 (m, 12H), 1.50 (qd, J=12.8, 3.1 Hz, 2H), 1.38-1.19 (m, 7H), 1.15 (t, J=7.5 Hz, 3H), 1.08 (qd, J=12.9, 3.2 Hz, 2H), 0.97-0.84 (m, 3H).

Example 20

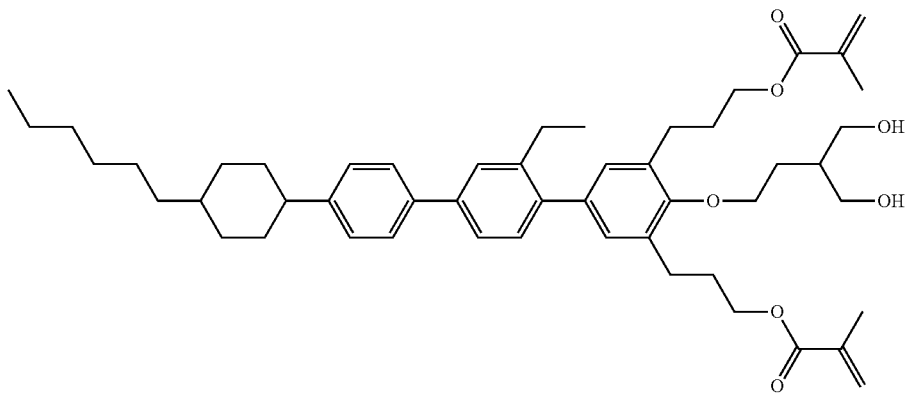 [SMILES: C=C(C)C(=O)OCCCc1cc(-c2ccc(-c3ccc(C4CCC(CCCCCC)CC4)cc3)cc2CC)cc(CCCOC(=O)C(=C)C)c1OCCC(CO)CO]

White Crystals Tg −26° C. Tm=72° C.
$^1$H NMR (500 MHz, Chloroform-d) δ 7.59-7.52 (m, 2H), 7.50 (d, J=1.9 Hz, 1H), 7.42 (dd, J=7.9, 2.0 Hz, 1H), 7.30 (d, J=8.3 Hz, 2H), 7.22 (d, J=7.9 Hz, 1H), 7.03 (s, 2H), 6.10 (t, J=1.4 Hz, 2H), 5.56 (p, J=1.6 Hz, 2H), 4.24 (t, J=6.6 Hz, 4H), 3.92 (dt, J=8.9, 5.2 Hz, 4H), 3.80 (dd, J=10.8, 6.7 Hz, 2H), 2.80-2.70 (m, 4H), 2.64 (q, J=7.5 Hz, 3H), 2.52 (tt, J=12.2, 3.4 Hz, 2H), 2.12 (tt, J=6.6, 4.2 Hz, 1H), 2.08-1.99 (m, 4H), 1.98-1.77 (m, 12H), 1.50 (qd, J=12.8, 3.1 Hz, 2H), 1.39-1.18 (m, 11H), 1.15 (t, J=7.6 Hz, 3H), 1.08 (qd, J=12.8, 3.1 Hz, 2H), 0.90 (t, J=6.9 Hz, 3H).

Example 21

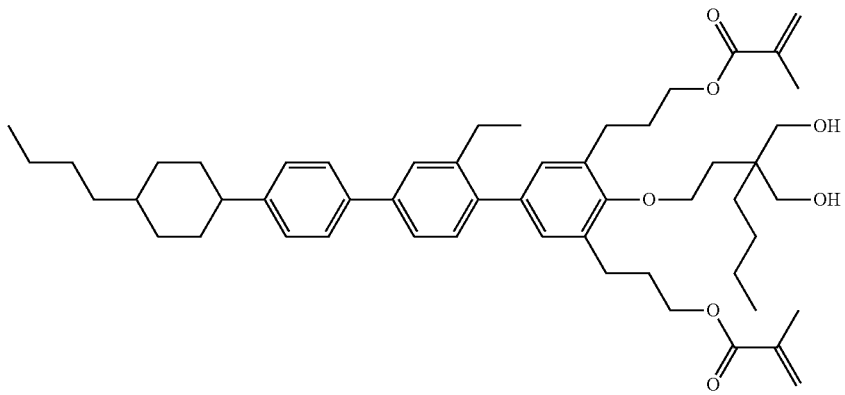 [SMILES: C=C(C)C(=O)OCCCc1cc(-c2ccc(-c3ccc(C4CCC(CCCC)CC4)cc3)cc2CC)cc(CCCOC(=O)C(=C)C)c1OCCC(CO)(CO)CCCC]

White Crystals Tg −18° C. Tm=67° C.
$^1$H NMR (500 MHz, Chloroform-d) b 7.60-7.51 (m, 2H), 7.50 (d, J=1.9 Hz, 1H), 7.43 (dd, J=7.9, 1.9 Hz, 1H), 7.30 (d, J=8.2 Hz, 2H), 7.22 (d, J=7.9 Hz, 1H), 7.04 (s, 2H), 6.11 (t, J=1.3 Hz, 2H), 5.56 (p, J=1.6 Hz, 2H), 4.24 (t, J=6.6 Hz, 4H), 3.97 (t, J=6.3 Hz, 2H), 3.69 (s, 4H), 2.91-2.68 (m, 6H), 2.64 (q, J=7.5 Hz, 2H), 2.52 (tt, J=12.2, 3.4 Hz, 1H), 2.10-2.01 (m, 4H), 2.01-1.84 (m, 12H), 1.50 (qd, J=12.8, 3.1 Hz, 2H), 1.40-1.19 (m, 13H), 1.15 (t, J=7.5 Hz, 3H), 1.08 (qd, J=12.9, 3.2 Hz, 2H), 0.92 (h, J=3.7 Hz, 6H).

Example 23

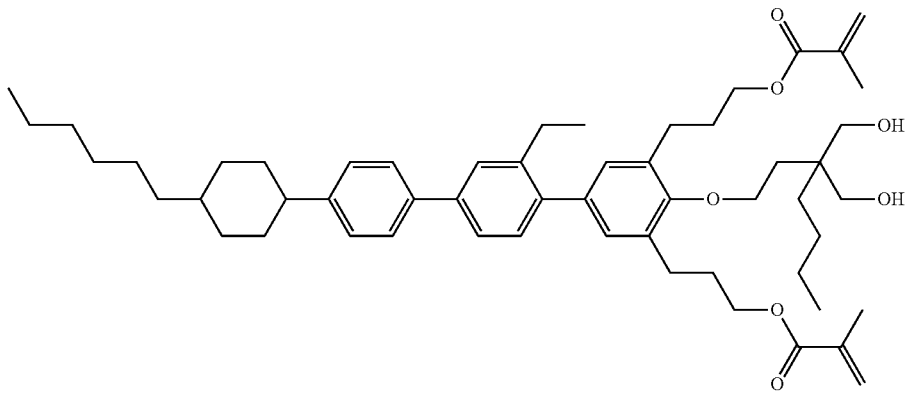 [SMILES: C=C(C)C(=O)OCCCc1cc(-c2ccc(-c3ccc(C4CCC(CCCCCC)CC4)cc3)cc2CC)cc(CCCOC(=O)C(=C)C)c1OCCC(CO)(CO)CCCC]

Tg −24° C.
H NMR (500 MHz, Chloroform-d) δ 7.60-7.52 (m, 2H), 7.50 (d, J=1.8 Hz, 1H), 7.42 (dd, J=7.9, 1.9 Hz, 1H), 7.30 (d, J=8.3 Hz, 2H), 7.22 (d, J=7.9 Hz, 1H), 7.04 (s, 2H), 6.10 (d, J=1.6 Hz, 2H), 5.56 (p, J=1.6 Hz, 2H), 4.24 (t, J=6.6 Hz, 4H), 3.97 (t, J=6.3 Hz, 2H), 3.69 (s, 4H), 2.83-2.71 (m, 6H), 2.64 (q, J=7.5 Hz, 2H), 2.52 (tt, J=12.1, 3.4 Hz, 1H), 2.09-2.01 (m, 4H), 2.01-1.83 (m, 12H), 1.50 (qd, J=12.8, 3.1 Hz, 2H), 1.39-1.21 (m, 17H), 1.15 (t, J=7.5 Hz, 3H), 1.08 (qd, J=12.9, 3.2 Hz, 2H), 0.91 (dt, J=10.3, 6.9 Hz, 6H).

EXAMPLES

The compounds employed, if not commercially available, are synthesized by standard laboratory procedures. The LC media originate from Merck KGaA, Germany.

A) Mixture Examples

LC media according to the invention are prepared using the following liquid-crystalline mixtures consisting of low-molecular-weight components in the percentage proportions by weight indicated.

| H1: Nematic host mixture (Δε < 0) | | | |
|---|---|---|---|
| CY-3-O2 | 15.50% | Clearing point [° C.]: | 75.1 |
| CCY-3-O3 | 8.00% | Δn (589 nm, 20° C.): | 0.098 |
| CCY-4-O2 | 10.00% | Δε (1 kHz, 20° C.): | −3.0 |
| CPY-2-O2 | 5.50% | ε$_{\parallel}$ (1 kHz, 20° C.): | 3.4 |
| CPY-3-O2 | 11.50% | ε$_{\perp}$ (1 kHz, 20° C.): | 6.4 |
| CC-3-4 | 9.25% | K$_1$ (20° C.) [pN]: | 13.1 |
| CC-2-3 | 24.50% | K$_3$ (20° C.) [pN]: | 13.3 |
| PYP-2-3 | 8.75% | γ$_1$ (20° C.) [mPa · s]: | 113 |
| CP-3-O1 | 7.00% | V$_0$ (20° C.) [V]: | 2.22 |

| H2: Nematic host mixture (Δε < 0) | | | |
|---|---|---|---|
| CPP-3-2 | 10.5% | Clearing point [° C.]: | 74.5 |
| CC-3-4 | 9.0% | Δn (589 nm, 20° C.): | 0.109 |
| CC-3-5 | 9.0% | Δε (1 kHz, 20° C.): | −3.4 |
| CCP-3-1 | 8.0% | ε$_{\parallel}$ (1 kHz, 20° C.): | 3.7 |
| CCY-3-O2 | 9.5% | ε$_{\perp}$ (1 kHz, 20° C.): | 7.0 |
| CCY-4-O2 | 5.5% | K$_1$ (20° C.) [pN]: | 14.0 |
| CPY-3-O2 | 5.5% | K$_3$ (20° C.) [pN]: | 15.7 |
| CY-3-O2 | 15% | γ$_1$ (20° C.) [mPa · s]: | 128 |

-continued

| H2: Nematic host mixture (Δε < 0) | | | |
|---|---|---|---|
| CY-5-O2 | 5.0% | V$_0$ (20° C.) [V]: | 2.25 |
| CP-3-O1 | 7.0% | | |
| PY-3-O2 | 16% | | |

| H3: Nematic host mixture (Δε < 0) | | | |
|---|---|---|---|
| CC-3-V1 | 9.00% | Clearing point [° C.]: | 74.7 |
| CC-2-3 | 18.00% | Δn (589 nm, 20° C.): | 0.098 |
| CC-3-4 | 3.00% | Δε (1 kHz, 20° C.): | −3.4 |
| CC-3-5 | 7.00% | ε$_{\parallel}$ (1 kHz, 20° C.): | 3.5 |
| CCP-3-1 | 5.50% | ε$_{\perp}$ (1 kHz, 20° C.): | 6.9 |
| CCY-3-O2 | 11.50% | K$_1$ (20° C.) [pN]: | 14.9 |
| CPY-2-O2 | 8.00% | K$_3$ (20° C.) [pN]: | 15.9 |
| CPY-3-O2 | 11.00% | γ$_1$ (20° C.) [mPa · s]: | 108 |
| CY-3-O2 | 15.50% | V$_0$ (20° C.) [V]: | 2.28 |
| PY-3-O2 | 11.50% | | |

| H4: Nematic host mixture (Δε < 0) | | | |
|---|---|---|---|
| CY-3-O2 | 10.0% | Clearing point [° C.]: | 81 |
| CCY-3-O1 | 8.0% | Δn (589 nm, 20° C.): | 0.103 |
| CCY-3-O2 | 11.0% | Δε (1 kHz, 20° C.): | −3.8 |
| CCY-4-O2 | 5.0% | K$_1$ (20° C.) [pN]: | 13.9 |
| CCY-5-O2 | 2.0% | K$_3$ (20° C.) [pN]: | 15.0 |
| CPY-2-O2 | 9.0% | γ$_1$ (20° C.) [mPa · s]: | 133 |
| CPY-3-O2 | 9.0% | V$_0$ (20° C.) [V]: | 2.10 |
| CC-3-4 | 9.0% | | |
| CC-2-3 | 17.5% | | |
| CP-3-O1 | 9.0% | | |
| PYP-2-3 | 2.5% | | |
| PY-3-O2 | 8.0% | | |

| H5: Nematic host mixture (Δε < 0) | | | |
|---|---|---|---|
| CY-3-O4 | 14.00% | Clearing point [° C.]: | 80.0 |
| CCY-3-O2 | 9.00% | Δn (589 nm, 20° C.): | 0.090 |
| CCY-3-O3 | 9.00% | Δε (1 kHz, 20° C.): | −3.3 |
| CPY-2-O2 | 10.00% | ε$_{\parallel}$ (1 kHz, 20° C.): | 3.4 |
| CPY-3-O2 | 10.00% | ε$_{\perp}$ (1 kHz, 20° C.): | 6.7 |
| CCY-3-1 | 8.00% | K$_1$ (20° C.) [pN]: | 15.1 |
| CC-3-4 | 9.00% | K$_3$ (20° C.) [pN]: | 14.6 |
| CC-3-5 | 6.00% | γ$_1$ (20° C.) [mPa · s]: | 140 |

| H5: Nematic host mixture (Δε < 0) | | | |
|---|---|---|---|
| CP-5-3 | 10.00% | $V_0$ (20° C.) [V]: | 2.23 |
| CC-3-O1 | 6.00% | | |
| CC-3-O3 | 9.00% | | |

| H6: Nematic host mixture (Δε < 0) | | | |
|---|---|---|---|
| CPP-3-2 | 6.5% | Clearing point [° C.]: | 74.7 |
| CC-3-V1 | 8.0% | Δn (589 nm, 20° C.): | 0.104 |
| CC-2-3 | 17% | Δε (1 kHz, 20° C.): | −3.0 |
| CC-3-4 | 6.5% | $\varepsilon_\parallel$ (1 kHz, 20° C.): | 3.38 |
| CCY-3-O1 | 3.5% | $\varepsilon_\perp$ (1 kHz, 20° C.): | 6.33 |
| CCY-3-O2 | 12.5% | $K_1$ (20° C.) [pN]: | 14.8 |
| CPY-2-O2 | 5.5% | $K_3$ (20° C.) [pN]: | 15.8 |
| CPY-3-O2 | 10% | $\gamma_1$ (20° C.) [mPa · s]: | 106 |
| CY-3-O2 | 15.5% | $V_0$ (20° C.) [V]: | 2.43 |
| CP-3-O1 | 4.5% | | |
| PP-1-2V1 | 5.0% | | |
| PY-3-O2 | 5.5% | | |

| H7: Nematic host mixture (Δε < 0) | | | |
|---|---|---|---|
| CC-3-V | 37.50% | Clearing point [° C.]: | 74.8 |
| CC-3-V1 | 2.00% | Δn (589 nm, 20° C.): | 0.099 |
| CCY-4-O2 | 14.50% | Δε (1 kHz, 20° C.): | −2.9 |
| CPY-2-O2 | 10.50% | $\varepsilon_\parallel$ (1 kHz, 20° C.): | 3.7 |
| CPY-3-O2 | 9.50% | $\varepsilon_\perp$ (1 kHz, 20° C.): | 6.6 |
| CY-3-O2 | 15.00% | $K_1$ (20° C.) [pN]: | 12.2 |
| CY-3-O4 | 4.50% | $K_3$ (20° C.) [pN]: | 13.4 |
| PYP-2-4 | 5.50% | $\gamma_1$ (20° C.) [mPa · s]: | 92 |
| PPGU-3-F | 1.00% | $V_0$ (20° C.) [V]: | 2.28 |

| H8: Nematic host mixture (Δε < 0) | | | |
|---|---|---|---|
| CC-2-3 | 20.00% | Clearing point [° C.]: | 74.8 |
| CC-3-O1 | 6.00% | Δn (589 nm, 20° C.): | 0.105 |
| CC-3-4 | 6.00% | Δε (1 kHz, 20° C.): | −3.2 |
| CCP-3-1 | 3.00% | $\varepsilon_\parallel$ (1 kHz, 20° C.): | 3.5 |
| CCY-3-O2 | 11.00% | $\varepsilon_\perp$ (1 kHz, 20° C.): | 6.8 |
| CPY-2-O2 | 12.00% | $K_1$ (20° C.) [pN]: | 12.7 |
| CPY-3-O2 | 11.00% | $K_3$ (20° C.) [pN]: | 13.6 |
| CY-3-O2 | 14.00% | $\gamma_1$ (20° C.) [mPa · s]: | 120 |
| CY-3-O4 | 4.00% | $V_0$ (20° C.) [V]: | 2.16 |
| CP-3-O1 | 4.00% | | |
| PYP-2-3 | 9.00% | | |

| H9: Nematic host mixture (Δε < 0) | | | |
|---|---|---|---|
| CC-4-V | 17.00% | Clearing point [° C.]: | 106.1 |
| CCP-V-1 | 15.00% | Δn (589 nm, 20° C.): | 0.120 |
| CCZPC-3-3 | 2.50% | Δε (1 kHz, 20° C.): | −3.6 |
| CCY-3-O2 | 4.00% | $\varepsilon_\parallel$ (1 kHz, 20° C.): | 3.5 |
| CCY-3-O3 | 5.00% | $\varepsilon_\perp$ (1 kHz, 20° C.): | 7.0 |
| CCY-4-O2 | 5.00% | $K_1$ (20° C.) [pN]: | 16.8 |
| CLY-3-O2 | 3.50% | $K_3$ (20° C.) [pN]: | 17.3 |
| CLY-3-O3 | 2.00% | $\gamma_1$ (20° C.) [mPa · s]: | 207 |
| CPY-2-O2 | 8.00% | $V_0$ (20° C.) [V]: | 2.33 |
| CPY-3-O2 | 10.00% | | |
| CY-3-O4 | 17.00% | | |
| PYP-2-3 | 11.00% | | |

| H10: Nematic host mixture (Δε < 0) | | | |
|---|---|---|---|
| CY-3-O2 | 15.00% | Clearing point [° C.]: | 75.5 |
| CCY-4-O2 | 9.50% | Δn (589 nm, 20° C.): | 0.108 |
| CCY-5-O2 | 5.00% | Δε (1 kHz, 20° C.): | −3.0 |
| CPY-2-O2 | 9.00% | $\varepsilon_\parallel$ (1 kHz, 20° C.): | 3.5 |
| CPY-3-O2 | 9.00% | $\varepsilon_\perp$ (1 kHz, 20° C.): | 6.5 |
| CC-3-4 | 9.00% | $K_1$ (20° C.) [pN]: | 12.9 |
| CC-2-3 | 22.00% | $K_3$ (20° C.) [pN]: | 13.0 |
| PYP-2-3 | 7.00% | $\gamma_1$ (20° C.) [mPa · s]: | 115 |
| PYP-2-4 | 7.50% | $V_0$ (20° C.) [V]: | 2.20 |
| CP-3-O1 | 7.00% | | |

| H11: Nematic host mixture (Δε < 0) | | | |
|---|---|---|---|
| CY-3-O2 | 15.00% | Clearing point [° C.]: | 74.7 |
| CY-5-O2 | 6.50% | Δn (589 nm, 20° C.): | 0.108 |
| CCY-3-O2 | 11.00% | Δε (1 kHz, 20° C.): | −3.0 |
| CPY-2-O2 | 5.50% | $\varepsilon_\parallel$ (1 kHz, 20° C.): | 3.6 |
| CPY-3-O2 | 10.50% | $\varepsilon_\perp$ (1 kHz, 20° C.): | 6.6 |
| CC-3-V | 28.50% | $K_1$ (20° C.) [pN]: | 12.9 |
| CC-3-V1 | 10.00% | $K_3$ (20° C.) [pN]: | 15.7 |
| PYP-2-3 | 12.50% | $\gamma_1$ (20° C.) [mPa · s]: | 97 |
| PPGU-3-F | 0.50% | $V_0$ (20° C.) [V]: | 2.42 |

| H12: Nematic host mixture (Δε < 0) | | | |
|---|---|---|---|
| CC-3-5 | 9.50% | Clearing point [° C.]: | 79.1 |
| CC-5-O1 | 5.00% | Δn (589 nm, 20° C.): | 0.091 |
| CCY-2-1 | 9.50% | Δε (1 kHz, 20° C.): | −3.6 |
| CCY-3-1 | 10.50% | $\varepsilon_\parallel$ (1 kHz, 20° C.): | 3.5 |
| CCY-3-O2 | 10.50% | $\varepsilon_\perp$ (1 kHz, 20° C.): | 7.1 |
| CCY-5-O2 | 9.50% | $K_1$ (20° C.) [pN]: | 14.6 |
| CPY-2-O2 | 12.00% | $K_3$ (20° C.) [pN]: | 14.5 |
| CY-3-O4 | 9.00% | $\gamma_1$ (20° C.) [mPa · s]: | 178 |
| CY-5-O4 | 11.00% | $V_0$ (20° C.) [V]: | 2.12 |
| CP-5-3 | 13.50% | | |

| H13: Nematic host mixture (Δε < 0) | | | |
|---|---|---|---|
| CPP-3-2 | 4.00% | Clearing point [° C.]: | 74.8 |
| CC-3-V1 | 8.00% | Δn (589 nm, 20° C.): | 0.106 |
| CC-2-3 | 13.00% | Δε (1 kHz, 20° C.): | −3.5 |
| CC-3-4 | 7.00% | $\varepsilon_\parallel$ (1 kHz, 20° C.): | 3.6 |
| CC-3-5 | 7.00% | $\varepsilon_\perp$ (1 kHz, 20° C.): | 7.1 |
| CCY-3-O2 | 13.00% | $K_1$ (20° C.) [pN]: | 14.8 |
| CPY-2-O2 | 7.00% | $K_3$ (20° C.) [pN]: | 15.8 |
| CPY-3-O2 | 12.00% | $\gamma_1$ (20° C.) [mPa · s]: | 115 |
| CY-3-O2 | 12.00% | $V_0$ (20° C.) [V]: | 2.23 |
| CP-3-O1 | 2.00% | | |
| PY-3-O2 | 15.00% | | |

| H14: Nematic host mixture (Δε < 0) | | | |
|---|---|---|---|
| CY-3-O4 | 22.00% | Clearing point [° C.]: | 86.9 |
| CY-5-O4 | 12.00% | Δn (589 nm, 20° C.): | 0.111 |
| CCY-3-O2 | 6.00% | Δε (1 kHz, 20° C.): | −4.9 |
| CCY-3-O3 | 6.00% | $\varepsilon_\parallel$ (1 kHz, 20° C.): | 3.8 |
| CCY-4-O2 | 6.00% | $\varepsilon_\perp$ (1 kHz, 20° C.): | 8.7 |
| CPY-2-O2 | 10.00% | $K_1$ (20° C.) [pN]: | 14.9 |
| CPY-3-O2 | 10.00% | $K_3$ (20° C.) [pN]: | 15.9 |
| PYP-2-3 | 7.00% | $\gamma_1$ (20° C.) [mPa · s]: | 222 |
| CC-3-V1 | 7.00% | $V_0$ (20° C.) [V]: | 1.91 |
| CC-5-V | 10.00% | | |
| CCZPC-3-3 | 2.00% | | |
| CCZPC-3-5 | 2.00% | | |

| H15: Nematic host mixture (Δε < 0) | | | |
|---|---|---|---|
| CY-3-O4 | 12.00% | Clearing point [° C.]: | 86.0 |
| CY-5-O2 | 10.00% | Δn (589 nm, 20° C.): | 0.110 |
| CY-5-O4 | 8.00% | Δε (1 kHz, 20° C.): | −5.0 |
| CCY-3-O2 | 8.00% | $\varepsilon_\parallel$ (1 kHz, 20° C.): | 3.8 |
| CCY-4-O2 | 7.00% | $\varepsilon_\perp$ (1 kHz, 20° C.): | 8.8 |
| CCY-5-O2 | 6.00% | $K_1$ (20° C.) [pN]: | 14.7 |
| CCY-2-1 | 8.00% | $K_3$ (20° C.) [pN]: | 16.0 |
| CCY-3-1 | 7.00% | $\gamma_1$ (20° C.) [mPa · s]: | 250 |
| CPY-3-O2 | 9.00% | $V_0$ (20° C.) [V]: | 1.90 |
| CPY-3-O2 | 9.00% | | |
| CPP-3-2 | 6.00% | | |
| CP-5-3 | 10.00% | | |

| H16: Nematic host mixture (Δε < 0) | | | |
|---|---|---|---|
| CC-3-V1 | 10.25% | Clearing point [° C.]: | 74.7 |
| CC-2-3 | 18.50% | Δn (589 nm, 20° C.): | 0.103 |
| CC-3-5 | 6.75% | Δε (1 kHz, 20° C.): | −3.1 |
| CCP-3-1 | 6.00% | $\varepsilon_\parallel$ (1 kHz, 20° C.): | 3.4 |
| CCY-3-1 | 2.50% | $\varepsilon_\perp$ (1 kHz, 20° C.): | 6.4 |
| CCY-3-O2 | 12.00% | $K_1$ (20° C.) [pN]: | 15.4 |
| CPY-2-O2 | 6.00% | $K_3$ (20° C.) [pN]: | 16.8 |
| CPY-3-O2 | 9.75% | $\gamma_1$ (20° C.) [mPa · s]: | 104 |
| CY-3-O2 | 11.50% | $V_0$ (20° C.) [V]: | 2.46 |
| PP-1-2V1 | 3.75% | | |
| PY-3-O2 | 13.00% | | |

| H17: Nematic host mixture (Δε < 0) | | | |
|---|---|---|---|
| CC-3-V | 27.50% | Clearing point [° C.]: | 74.7 |
| CC-3-V1 | 10.00% | Δn (589 nm, 20° C.): | 0.104 |
| CC-3-5 | 8.00% | Δε (1 kHz, 20° C.): | −3.0 |
| CCY-3-O2 | 9.25% | $\varepsilon_\parallel$ (1 kHz, 20° C.): | 3.4 |
| CLY-3-O2 | 10.00% | $\varepsilon_\perp$ (1 kHz, 20° C.): | 6.4 |
| CPY-3-O2 | 11.75% | $K_1$ (20° C.) [pN]: | 15.3 |
| PY-3-O2 | 14.00% | $K_3$ (20° C.) [pN]: | 16.2 |
| PY-4-O2 | 9.00% | $\gamma_1$ (20° C.) [mPa · s]: | 88 |
| PYP-2-4 | 0.50% | $V_0$ (20° C.) [V]: | 2.44 |

| H18: Nematic host mixture (Δε < 0) | | | |
|---|---|---|---|
| B-2O-O5 | 4.00% | Clearing point [° C.]: | 74.2 |
| CPP-3-2 | 8.00% | Δn (589 nm, 20° C.): | 0.1091 |
| CC-3-V1 | 9.00% | Δε (1 kHz, 20° C.): | −3.1 |
| CC-3-O1 | 2.00% | $\varepsilon_\parallel$ (1 kHz, 20° C.): | 3.6 |
| CC-3-4 | 8.00% | $\varepsilon_\perp$ (1 kHz, 20° C.): | 6.7 |
| CC-3-5 | 7.00% | $K_1$ (20° C.) [pN]: | 14.5 |
| CCP-3-1 | 8.00% | $K_3$ (20° C.) [pN]: | 16.5 |
| CCP-V2-1 | 5.00% | $\gamma_1$ (20° C.) [mPa · s]: | 108 |
| CCY-3-O2 | 10.50% | $V_0$ (20° C.) [V]: | |
| CLY-3-O2 | 1.00% | | |
| CPY-3-O2 | 2.50% | | |
| CY-3-O2 | 11.50% | | |
| CP-301 | 5.50% | | |
| PY-3-O2 | 18.00% | | |

| H19: Nematic host mixture (Δε < 0) | | | |
|---|---|---|---|
| CC-3-V | 15.00% | Clearing point [° C.]: | 74.4 |
| CC-3-V1 | 9.00% | Δn (589 nm, 20° C.): | 0.1086 |
| CC-2-3 | 8.00% | Δε (1 kHz, 20° C.): | −3.2 |
| CC-3-4 | 7.50% | $\varepsilon_\parallel$ (1 kHz, 20° C.): | 3.5 |
| CCY-3-O2 | 10.00% | $\varepsilon_\perp$ (1 kHz, 20° C.): | 6.7 |
| CCY-5-O2 | 8.00% | $K_1$ (20° C.) [pN]: | 14.3 |
| CPY-2-O2 | 3.00% | $K_3$ (20° C.) [pN]: | 15.7 |
| CPY-3-O2 | 8.50% | $\gamma_1$ (20° C.) [mPa · s]: | 102 |
| CY-3-O2 | 7.00% | $V_0$ (20° C.) [V]: | |
| PY-3-O2 | 16.00% | | |
| PYP-2-3 | 8.00% | | |

| H20: Nematic host mixture (Δε < 0) | | | |
|---|---|---|---|
| CC-3-V1 | 8.00% | Clearing point [° C.]: | 74.6 |
| CC-2-3 | 15.00% | Δn (589 nm, 20° C.): | 0.0899 |
| CC-3-4 | 5.00% | Δε (1 kHz, 20° C.): | −3.3 |
| CC-3-5 | 6.00% | $\varepsilon_\parallel$ (1 kHz, 20° C.): | 3.5 |
| CCP-3-1 | 3.00% | $\varepsilon_\perp$ (1 kHz, 20° C.): | 6.8 |
| CCY-3-O1 | 8.00% | $K_1$ (20° C.) [pN]: | 13.9 |
| CCY-3-O2 | 10.00% | $K_3$ (20° C.) [pN]: | 14.6 |
| CCY-3-O3 | 6.00% | $\gamma_1$ (20° C.) [mPa · s]: | 114 |
| CCY-4-O2 | 6.00% | $V_0$ (20° C.) [V]: | |
| CY-3-O2 | 12.00% | | |
| CY-3-O4 | 3.75% | | |
| CP-301 | 3.00% | | |
| PY-3-O2 | 2.75% | | |
| PY-4-O2 | 6.50% | | |
| PYP-2-3 | 5.00% | | |

| H21: Nematic host mixture (Δε < 0) | | | |
|---|---|---|---|
| CC-3-V1 | 3.00% | Clearing point [° C.]: | 74.8 |
| CP-3-O1 | 9.00% | Δn (589 nm, 20° C.): | 0.0891 |
| CC-3-O3 | 5.00% | Δε (1 kHz, 20° C.): | −3.2 |
| CC-3-4 | 9.00% | $\varepsilon_\parallel$ (1 kHz, 20° C.): | 3.5 |
| CC-3-5 | 9.00% | $\varepsilon_\perp$ (1 kHz, 20° C.): | 6.7 |
| CCP-3-1 | 8.00% | $K_1$ (20° C.) [pN]: | 14.2 |
| CCY-3-O2 | 11.50% | $K_3$ (20° C.) [pN]: | 16.3 |
| CCY-5-O2 | 9.00% | $\gamma_1$ (20° C.) [mPa · s]: | 115 |
| CPY-3-O2 | 6.00% | $V_0$ (20° C.) [V]: | |
| CY-3-O2 | 15.00% | | |
| CP-3-01 | 4.50% | | |
| PY-3-O2 | 11.00% | | |

| H22: Nematic host mixture (Δε < 0) | | | |
|---|---|---|---|
| CPP-3-2 | 6.00% | Clearing point [° C.]: | 74.8 |
| CC-3-V1 | 6.00% | Δn (589 nm, 20° C.): | 0.1066 |
| CC-3-4 | 9.00% | Δε (1 kHz, 20° C.): | −3.3 |
| CC-3-5 | 7.00% | $\varepsilon_\parallel$ (1 kHz, 20° C.): | 3.6 |
| CCP-3-1 | 8.00% | $\varepsilon_\perp$ (1 kHz, 20° C.): | 6.9 |
| CCP-3-3 | 3.00% | $K_1$ (20° C.) [pN]: | 14.2 |
| CCY-3-1 | 2.00% | $K_3$ (20° C.) [pN]: | 16.5 |
| CCY-3-O2 | 10.50% | $\gamma_1$ (20° C.) [mPa · s]: | 118 |
| CCY-4-O2 | 5.00% | $V_0$ (20° C.) [V]: | |
| CPY-3-O2 | 3.50% | | |
| CY-3-O2 | 14.00% | | |
| CP-3-01 | 5.50% | | |
| PY-1-O4 | 6.50% | | |
| PY-3-O2 | 14.00% | | |

The following self-alignment additives are particularly used. They are synthesized as provided in the examples above or in analogy thereof, or according to prior publications including WO 2012/038026 A1, WO 2014/094959 A1, WO 2013/004372 A1 or EP 2918658 A2. The numbering below is used within the mixture examples:
| No. | Structure |
|-----|-----------|
| 1 | 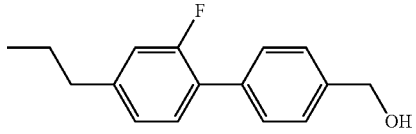 [SMILES: CCCc1ccc(-c2ccc(CO)cc2)c(F)c1] |
| 2 | 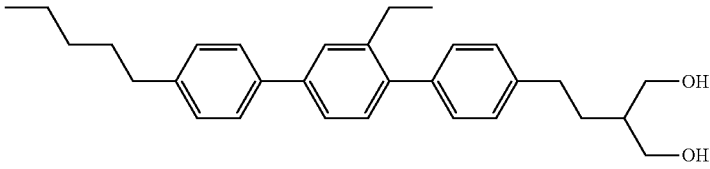 |
| 3 | 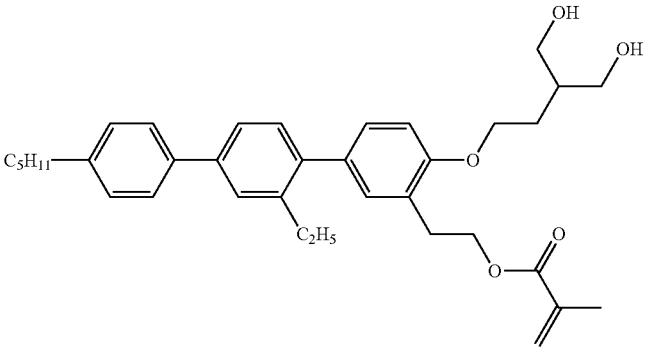 |
| 4 | 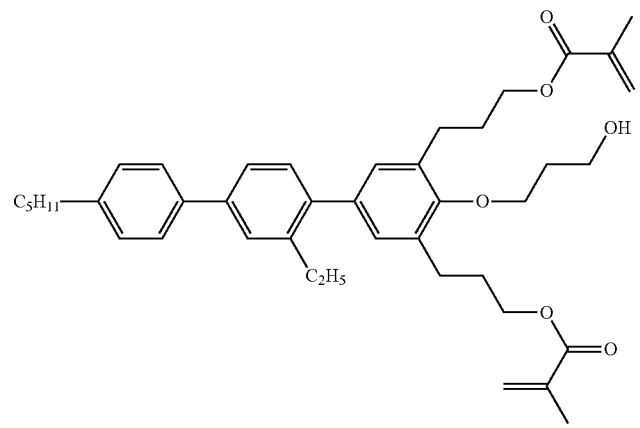 |
| 5 | 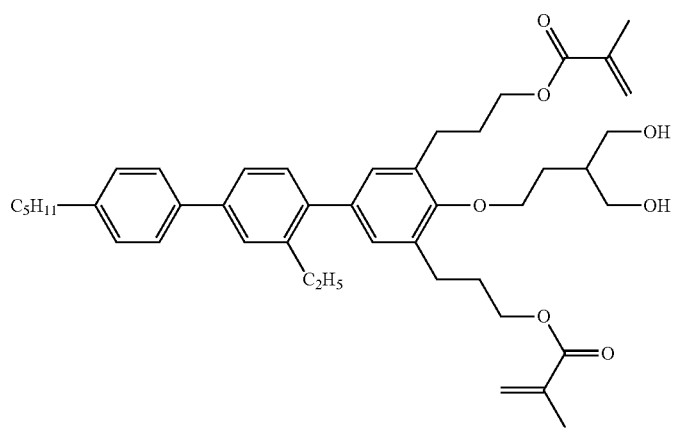 |

-continued
| No. | Structure |
|---|---|
| 6 | 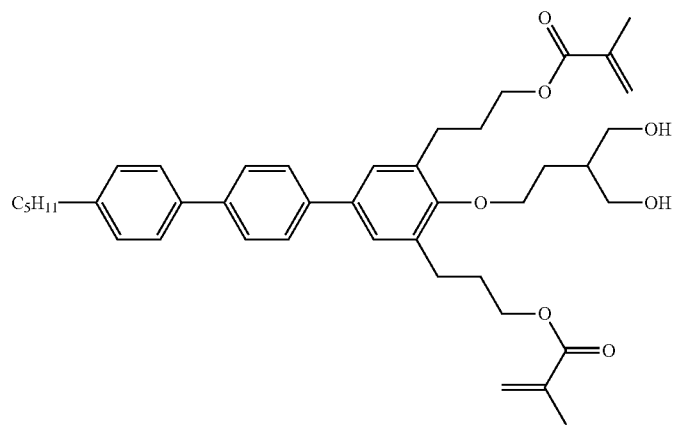 |
| 7 | 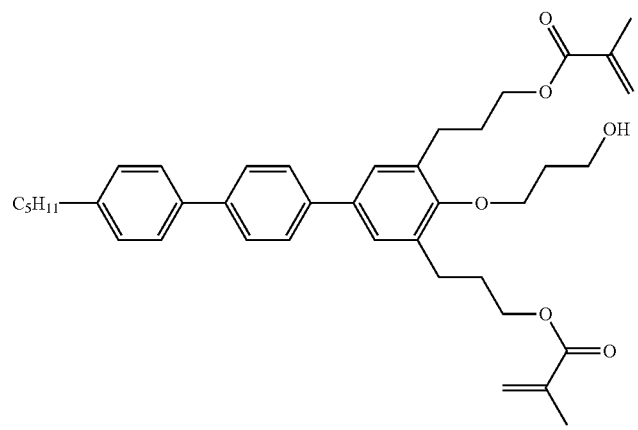 |
| 8 | 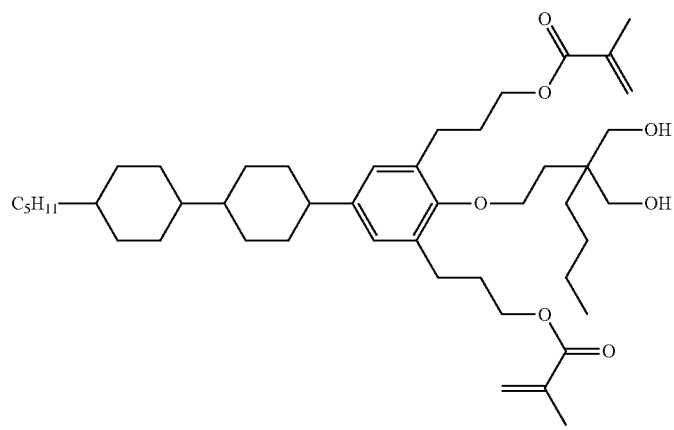 |

-continued
| No. | Structure |
|---|---|
| 9 | 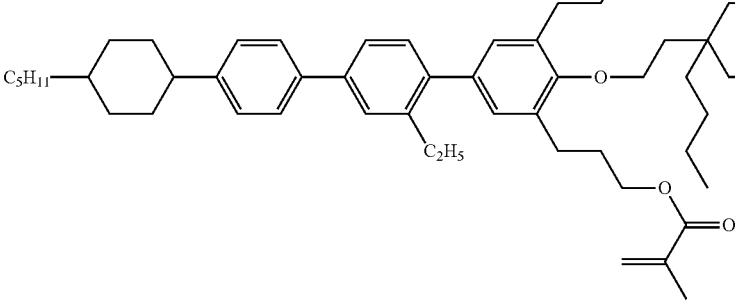 |
| 10 | 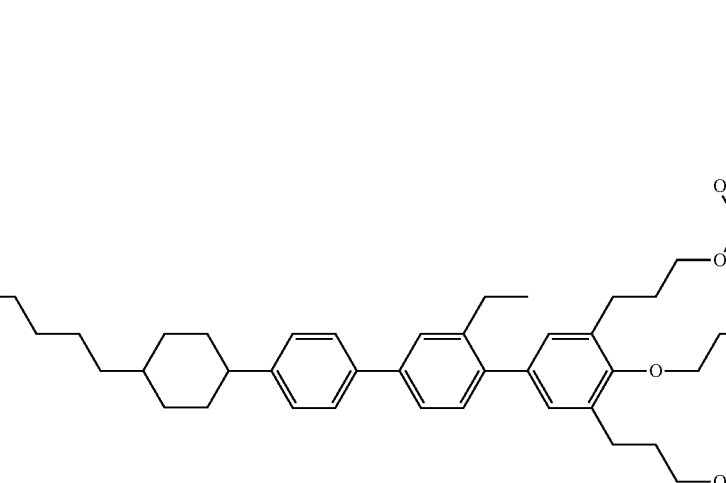 |
| 11 | 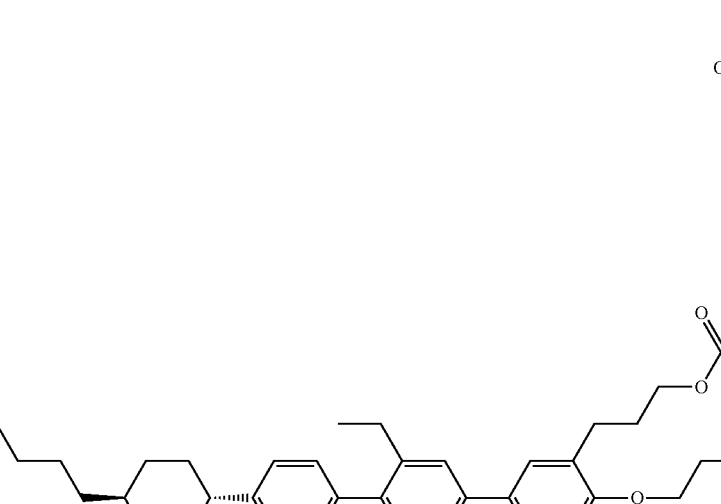 |

-continued
| No. | Structure |
|---|---|
| 12 | 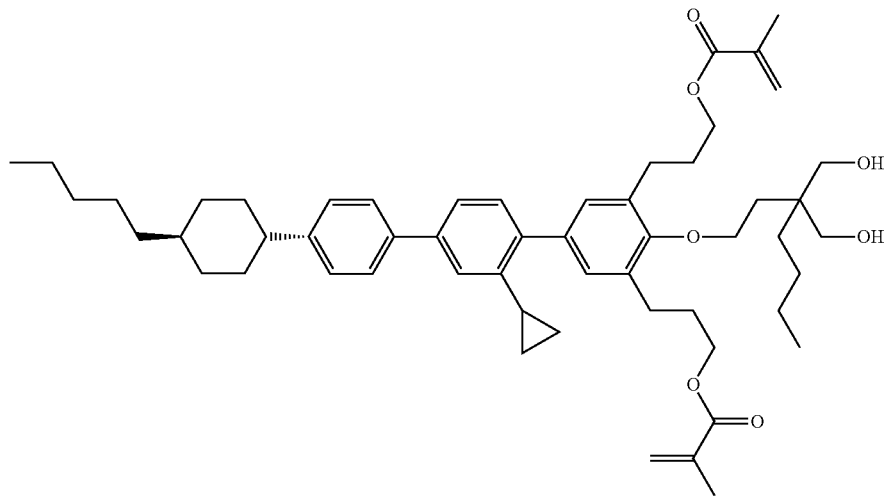 |
| 13 | 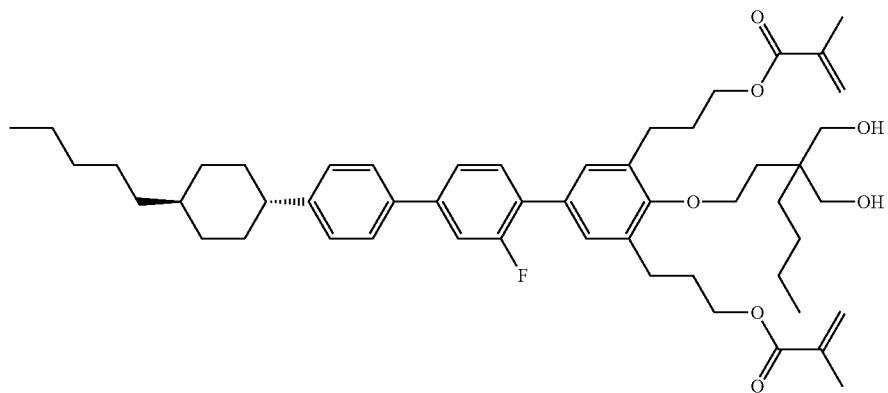 [SMILES: C=C(C)C(=O)OCCCc1cc(-c2ccc(-c3ccc([C@H]4CC[C@H](CCCCC)CC4)cc3)cc2F)cc(CCCOC(=O)C(=C)C)c1OCCC(CO)(CO)CCCC] |
| 14 | 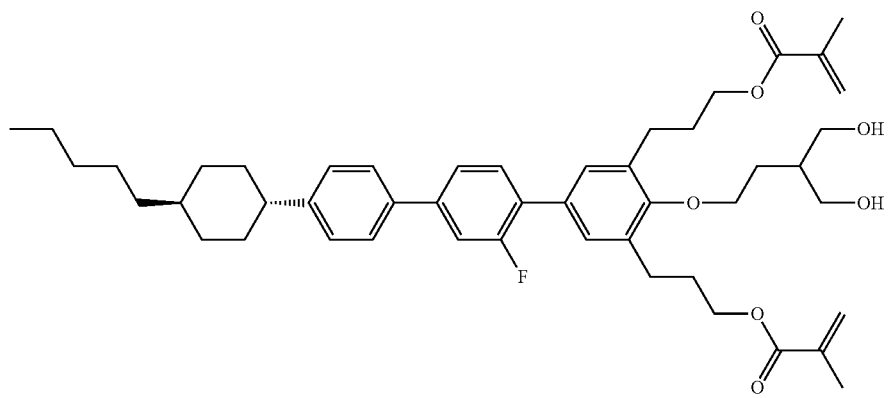 [SMILES: C=C(C)C(=O)OCCCc1cc(-c2ccc(-c3ccc([C@H]4CC[C@H](CCCCC)CC4)cc3)cc2F)cc(CCCOC(=O)C(=C)C)c1OCCC(CO)CO] |

-continued
| No. | Structure |
|---|---|
| 15 | 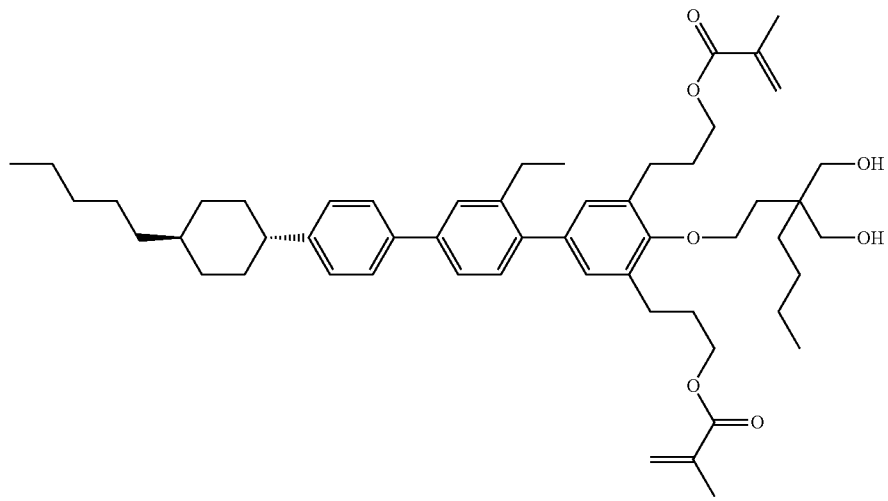 [SMILES: C=C(C)C(=O)OCCCc1cc(-c2ccc(-c3ccc([C@H]4CC[C@H](CCCCC)CC4)cc3)cc2CC)cc(CCCOC(=O)C(=C)C)c1OCCC(CO)(CO)CCCC] |
| 16 | 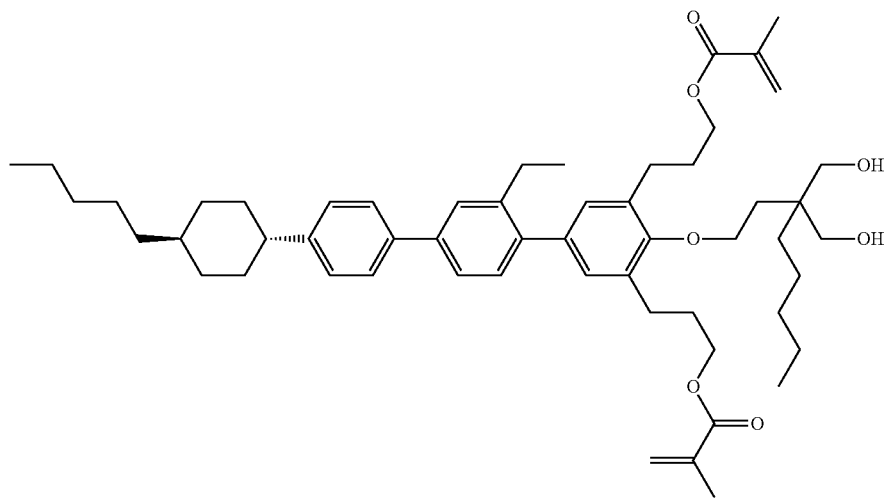 [SMILES: C=C(C)C(=O)OCCCc1cc(-c2ccc(-c3ccc([C@H]4CC[C@H](CCCCC)CC4)cc3)cc2CC)cc(CCCOC(=O)C(=C)C)c1OCCC(CO)(CO)CCCCC] |
| 17 | 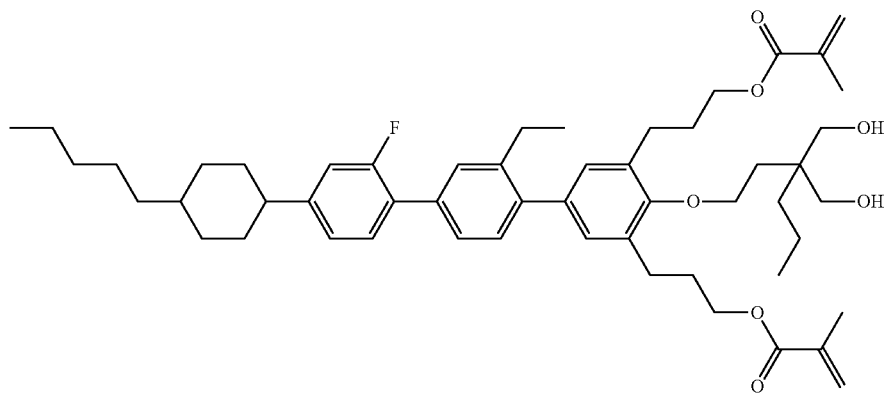 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC] |

| No. | Structure |
|---|---|
| 18 | 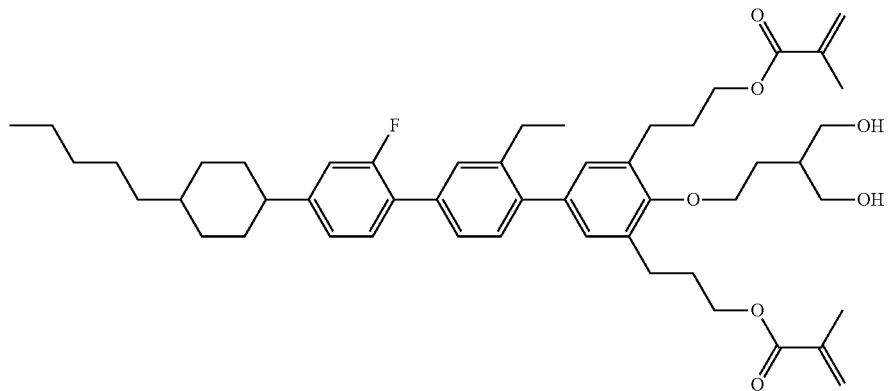 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO] |
| 19 | 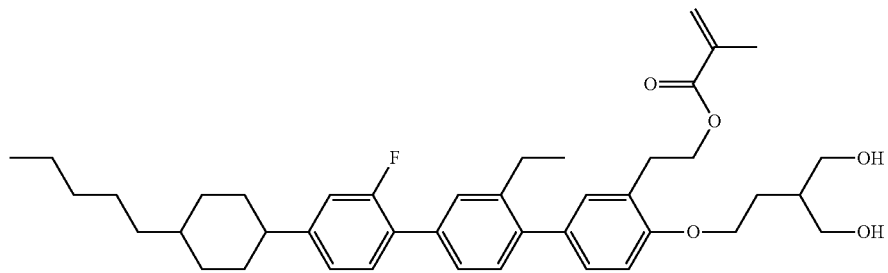 [SMILES: C=C(C)C(=O)OCCc1cc(-c2ccc(-c3ccc(C4CCC(CCCCC)CC4)cc3F)cc2CC)ccc1OCCC(CO)CO] |
| 20 | 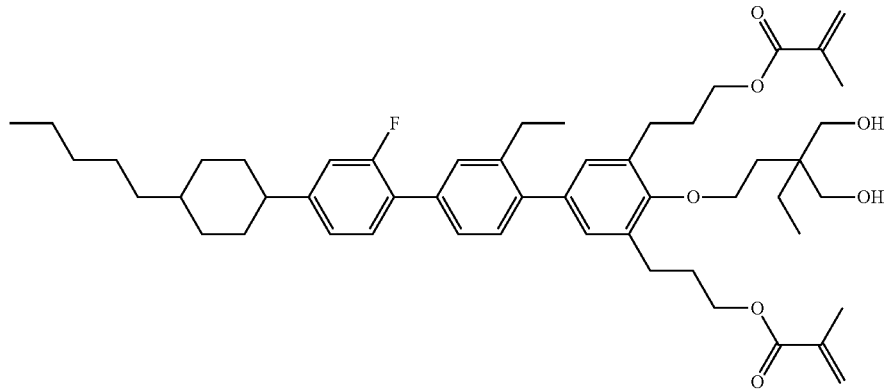 |
| 21 | 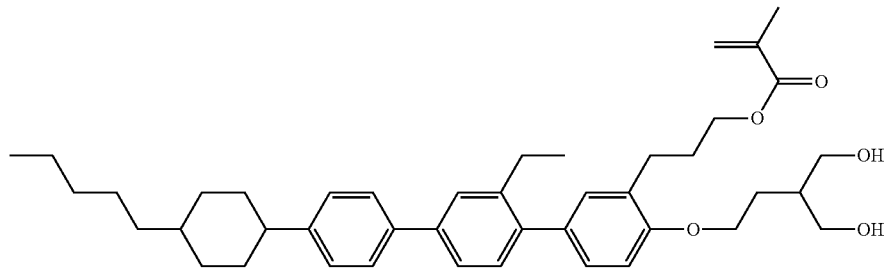 [SMILES: C=C(C)C(=O)OCCCc1cc(-c2ccc(-c3ccc(C4CCC(CCCCC)CC4)cc3)cc2CC)ccc1OCCC(CO)CO] |

| No. | Structure |
|-----|-----------|
| 22 | 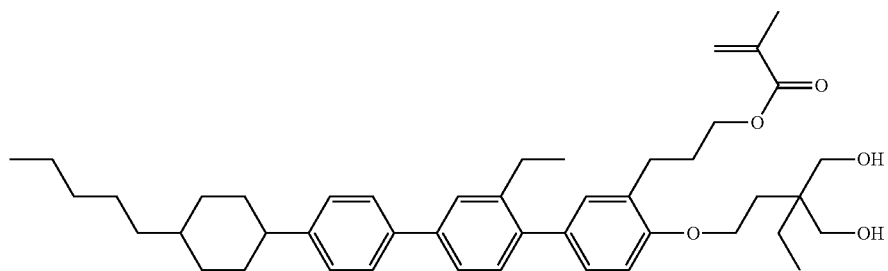 [SMILES: C=C(C)C(=O)OCCCc1cc(-c2ccc(-c3ccc(C4CCC(CCCCC)CC4)cc3)cc2CC)ccc1OCCC(CC)(CO)CO] |
| 23 | 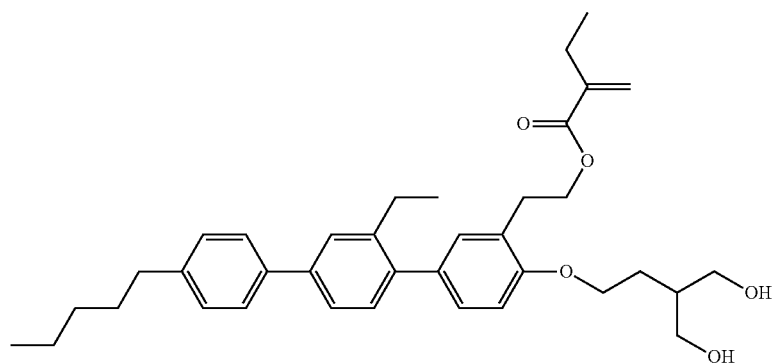 [SMILES: C=C(CC)C(=O)OCCc1cc(-c2ccc(-c3ccc(CCCCC)cc3)cc2CC)ccc1OCCC(CO)CO] |
| 24 | 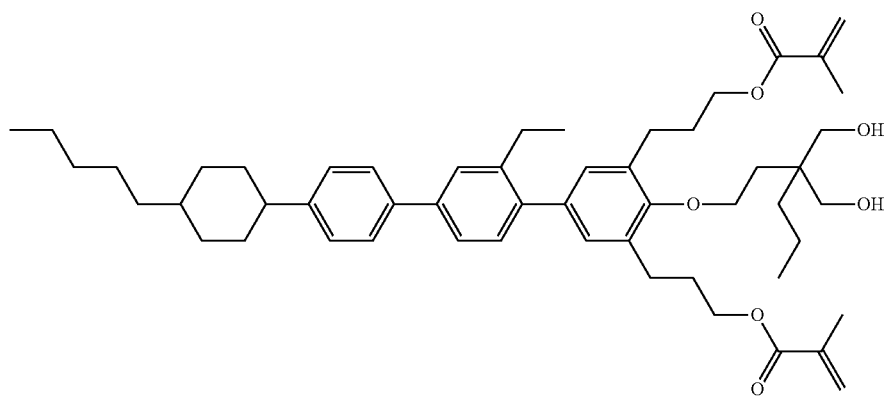 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC] |
| 25 | 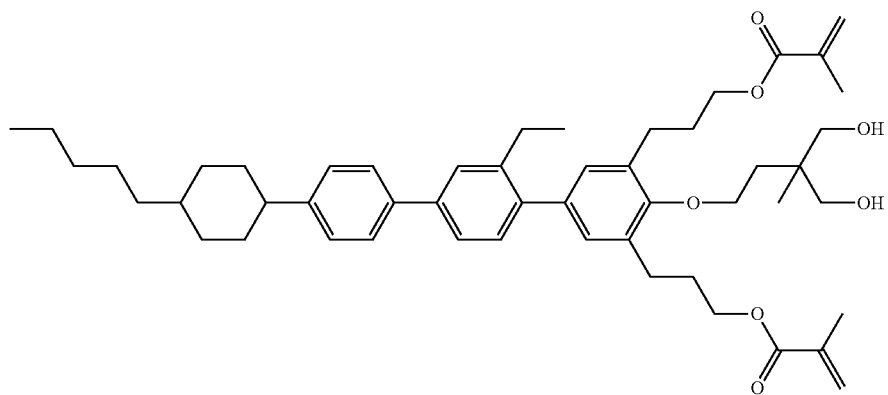 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(C)(CO)CO] |

-continued
| No. | Structure |
|---|---|
| 26 | 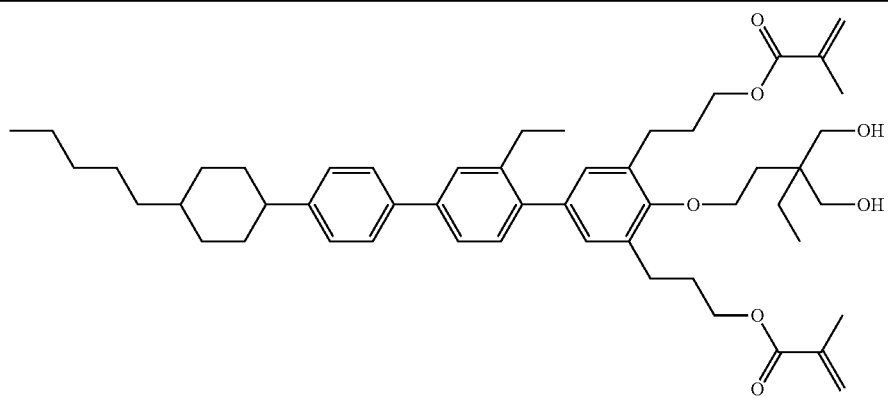 |
| 27 | 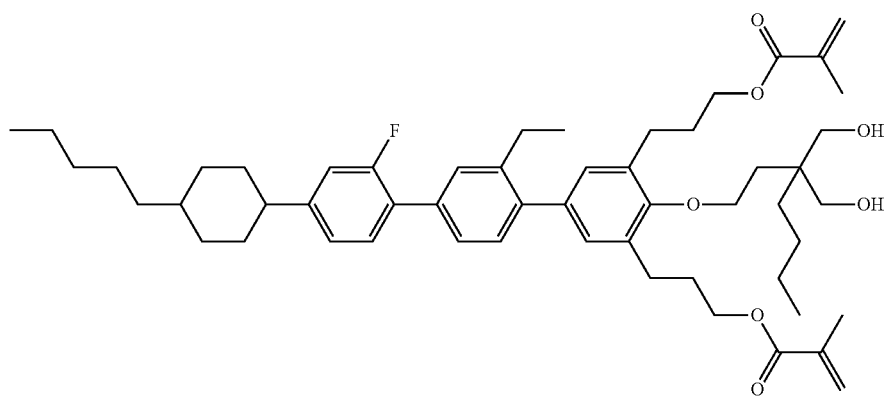 |
| 28 | 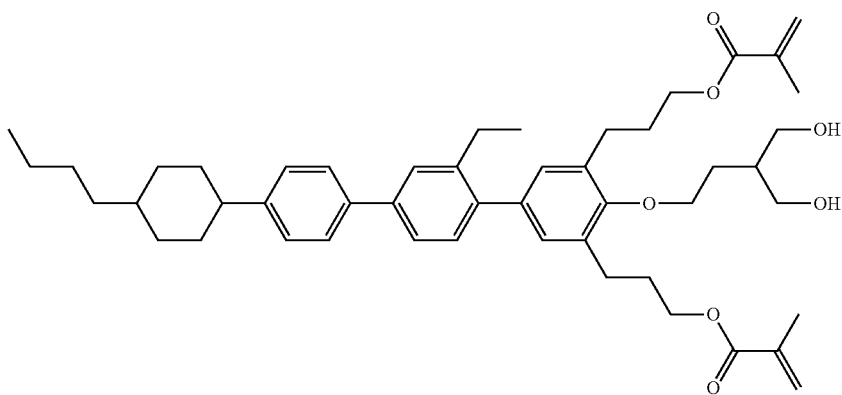 [SMILES: C=C(C)C(=O)OCCCc1cc(-c2ccc(-c3ccc(C4CCC(CCCC)CC4)cc3)cc2CC)cc(CCCOC(=O)C(=C)C)c1OCCC(CO)CO] |
| 29 | 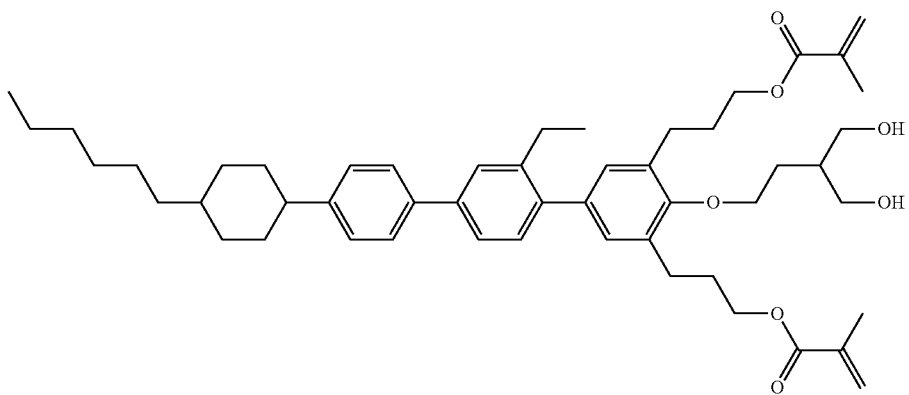 [SMILES: C=C(C)C(=O)OCCCc1cc(-c2ccc(-c3ccc(C4CCC(CCCCCC)CC4)cc3)cc2CC)cc(CCCOC(=O)C(=C)C)c1OCCC(CO)CO] |

-continued

| No. | Structure |
|---|---|
| 30 | 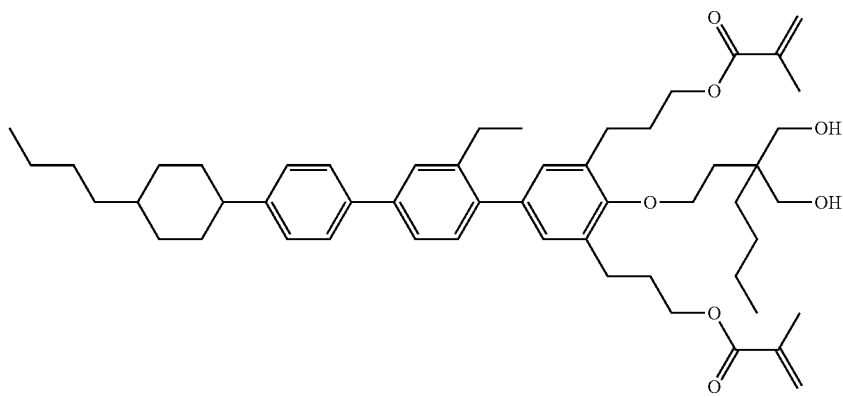 [SMILES: C=C(C)C(=O)OCCCc1cc(-c2ccc(-c3ccc(C4CCC(CCCC)CC4)cc3)cc2CC)cc(CCCOC(=O)C(=C)C)c1OCCC(CO)(CO)CCCC] |
| 31 | 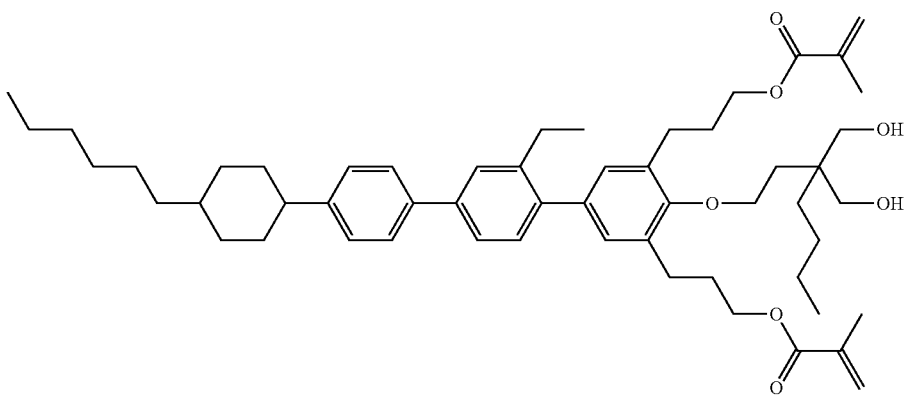 [SMILES: C=C(C)C(=O)OCCCc1cc(-c2ccc(-c3ccc(C4CCC(CCCCCC)CC4)cc3)cc2CC)cc(CCCOC(=O)C(=C)C)c1OCCC(CO)(CO)CCCC] |
| 32 | 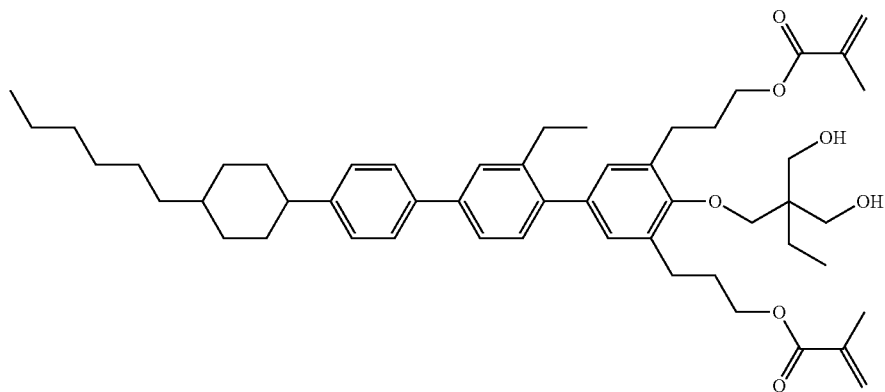 [SMILES: C=C(C)C(=O)OCCCc1cc(-c2ccc(-c3ccc(C4CCC(CCCCCC)CC4)cc3)cc2CC)cc(CCCOC(=O)C(=C)C)c1OCC(CC)(CO)CO] |

The following polymerizable compound is used:

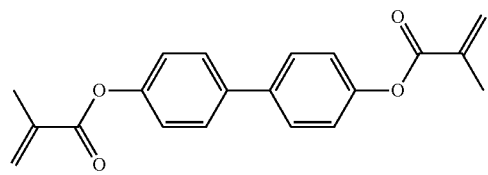
RM-1

MIXTURE EXAMPLE 1

Self-alignment additives 1 (2% by weight) and 2 (0.03% by weight) are added to a nematic LC medium H1 of the VA-type ($\Delta\varepsilon<0$) and the mixture is homogenized.

Use in Test Cells without Pre-Alignment Layer:

The mixture formed is introduced into a test cell (without polyimide alignment layer, layer thickness d=4.0 μm, ITO coated center on both sides, without passivation layer). The LC medium spontaneously achieves a stable vertical alignment (dark region between crossed polarizers). The VA cell formed can be switched reversibly by application of a voltage.

The overall amount of self-alignment additives 1+2 can be considerably reduced in comparison to a mixture containing only additive 1 (see Comparative Mixture Example 1a/b), while maintaining the same level of alignment.

Comparative Mixture Example 1a

Self-alignment additives 1 (3% by weight) is added to a nematic LC medium H1 of the VA-type ($\Delta\varepsilon<0$) and the mixture is homogenized.
Use in test cell is made as described for Mixture Example 1.

Comparative Mixture Example 1b

Self-alignment additives 1 (2% by weight) is added to a nematic LC medium $H_1$ of the VA-type ($\Delta\varepsilon<0$) and the mixture is homogenized.
Use in test cell is made as described for Mixture Example 1.
Heat stability of Mixture Example 1 and comparison:
As a stress test a heat load of 120° C. for 1 hour is applied.

TABLE 1

Stability of vertical alignment after heat load.

| Mixture Example | Additive(s) | Alignment after heat stress |
|---|---|---|
| 1 | 1 + 2 (Σ 2.03%) | Complete |
| Comparative 1a | 1 (3%) | Complete |
| Comparative 1b | 1 (2%) | Partially incomplete by inspection |

Voltage Holding Ratio (VHR):
UV process for VHR measurements: Metal halide lamp, (100 mW/cm3, with 320 nm cut filter for 60 min) at 40° C. in fully ITO covered test cells.
VHR measurements are performed with a Toyo VHR instrument: VHR of the cells is measured one hour after the UV process of the test cells with the following conditions: frequency: 0.6 Hz, 60° C.

TABLE 2

Results of VHR tests after UV load (0.6 Hz, 60° C.).

| Mixture Example | Additive(s) | VHR after back light stress |
|---|---|---|
| 1 | 1 + 2 | 95.0% |
| Comparative 1a | 1 | 93.9% |

Mixture 1 and 1a, which have both sufficient heat stability, are compared in view of VHR. Mixture 1 has higher value of VHR than the comparative.

MIXTURE EXAMPLE 2

Self-alignment additive 4 (0.2% by weight), self-alignment additive 5 (0.6% by weight) and RM-1 (0.3% by weight) are added to a nematic LC medium H2 of the VA type ($\Delta\varepsilon<0$) and the mixture is homogenized.
Use in Test Cells without Pre-Alignment Layer:
The mixture formed is introduced into a test cell (without polyimide alignment layer, layer thickness d=4.0 μm, ITO coated center on both sides, without passivation layer). The LC medium spontaneously achieves a stable vertical alignment (dark region between crossed polarizers). The VA cell formed can be switched reversibly by application of a voltage.

Polymer Stabilization:
UV-curing process is performed by applying irradiation from a metal halide lamp (100 mW/cm³, with 320 nm cut filter for 60 min) at 40° C. whilst applying a square wave alternating voltage of 20 Vpp at 200 Hz. The quality of the vertical alignment is not affected by the UV-step.

Comparative Mixture Example 2

Self-alignment additive 5 (0.6% by weight) and RM-1 (0.3% by weight) are added to a nematic LC medium H2 of the VA type ($\Delta\varepsilon<0$) and the mixture is homogenized.
The LC medium is further used and tested like Mixture Example 2.
Results for Mixture Example 2 and Comparative Mixture 2:
Additive Spreading:
Method for spreading measurement: Test cells (8 cm×4 cm) are filled with the LC medium. The lower part of the cell in vicinity to the injection hole shows good vertical alignment. The upper part of the cell, opposite the filling entrance shows a variable portion of the cell area which is not perfectly aligned, characterized by higher transmission between crossed polarizers. The size of the area, usually a small stripe, depends on the type and concentration of the additive(s). The alignment is assessed through crossed polarizers. The percentage of area with good alignment is a criterion for the advantageous spreading behavior of the additives. The results are provided in the table below.

TABLE 3

Results for alignment in spreading measurement.

| Mixture Example | Additive(s) | Cell area showing vertical orientation |
|---|---|---|
| 2 | 4 + 5 | 97% |
| Comparative 2 | 5 | 93.5% |

The reliability of the polymerized test cell is tested with respect to LTS (low temperature stability), VHR (voltage holding ratio) and tilt stability (Tables below).
Voltage Holding Ratio (VHR):
UV process for VHR measurements: Metal halide lamp, (100 mW/cm³, with 320 nm cut filter for 60 min) at 40° C. in fully ITO covered test cells.
VHR measurements are performed with a Toyo VHR instrument: VHR of the cells is measured one hour after the UV process of the test cells with the following conditions: Frequency: 0.6 Hz, 60° C.

TABLE 4

Results of VHR tests after UV load (0.6 Hz, 60° C.).

| Mixture Example | Additive(s) | VHR after back light stress |
|---|---|---|
| 2 | 4 + 5 | 87% |
| Comparative 2 | 5 | 83% |

Low Temperature Stability (LTS):
The low temperature stability of Mixture Example 1 was as good as the comparative Mixture Example 1, despite its higher total content of additives.
Tilt Stability:
Test cells after polymer stabilization are stressed with 60 Vpp for 60 hours at room temperature. The difference in pre-tilt before and after this stress is used to assess the stability of the pre-tilts. A higher change in pre-tilt after stress indicates a less stable pre-tilt.

The change in the tilt angle after stress test is 0.2 degrees for Mixture Example 1. The tilt stability is higher than for the use of additive 4 alone, and similar to the use of additive 5 alone.

MIXTURE EXAMPLE 3

Self-alignment additives 3 (0.27% by weight), 9 (0.41% by weight) and RM-1 (0.3% by weight) are added to a nematic LC medium H3 of the VA-type ($\Delta\varepsilon<0$) and the mixture is homogenized.

Use in test cells without pre-alignment layer and polymer stabilization are performed like for Mixture Example 2.

Comparative Mixture Example 3

Self-alignment additive 3 (0.55% by weight) and RM-1 (0.3% by weight) are added to a nematic LC medium H3 of the VA-type ($\Delta\varepsilon<0$) and the mixture is homogenized.

Results for Mixture Example 3 and Comparative Mixture 3

TABLE 5

Results of VHR tests after UV load (0.6 Hz, 60° C.).

| Mixture Example | Additive(s) | VHR after back light stress |
|---|---|---|
| 3 | 3 + 9 | 97% |
| Comparative 3 | 3 | 94.8% |

The VHR value for a 1:1 mixture by moles of the two additives 3 and 9 is significantly higher than the midpoint of values for the sole additives.

Tilt generation: The behavior in tilt generation and tilt stability is similar to the comparative mixture.

In summary, the Mixture 3 with mixed additives has improved VHR compared to the sole additive, while tilt and spreading remain unaffected.

MIXTURE EXAMPLE 4

Self-alignment additives 4 (0.2% by weight), 5 (0.6% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 97%
  Low temperature stability (LTS): 120 h (−20° C.)
  The mixture shows superior tilt stability of 0.2°.

MIXTURE EXAMPLE 5

Self-alignment additives 4 (0.2% by weight), 8 (0.6% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 98%
  Low temperature stability (LTS): 380 h (−20° C.)
  The mixture shows superior tilt stability of 0.4°.

MIXTURE EXAMPLE 6

Self-alignment additives 7 (0.2% by weight), 8 (0.6% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 99%
  Low temperature stability (LTS): 380 h (−20° C.)
  The mixture shows superior tilt stability of 0.4°.

MIXTURE EXAMPLE 7

Self-alignment additives 7 (0.2% by weight), 5 (0.6% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 99%
  Low temperature stability (LTS): 120 h (−20° C.)
  The mixture shows superior tilt stability of 0.5°.

MIXTURE EXAMPLE 8

Self-alignment additives 3 (0.15% by weight), 4 (0.75% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 99%
  Low temperature stability (LTS): 700 h (−20° C.)
  The mixture shows superior tilt stability of 0.4°.

MIXTURE EXAMPLE 9

Self-alignment additives 5 (0.6% by weight), 10 (0.2% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 99%
  Low temperature stability (LTS): 1000 h (−20° C.)
  The mixture shows superior tilt stability of 0.5°.

MIXTURE EXAMPLE 10

Self-alignment additives 9 (0.35% by weight), 4 (0.75% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.
  Cell area showing vertical orientation: 94%
  Low temperature stability (LTS): 1000 h (−20° C.)
  The mixture shows superior tilt stability of 0.2°.

MIXTURE EXAMPLE 11

Self-alignment additives 3 (0.15% by weight), 9 (0.35% by weight) and RM-1 (0.3% by weight) are added to a nematic LC medium H4 of the VA-type ($\Delta\varepsilon<0$) and the mixture is homogenized.

Use in test cells without pre-alignment layer and polymer stabilization are performed like for Mixture Example 2.

Cell area showing vertical orientation: 94%

Low temperature stability (LTS): 1000 h (−20° C.)

MIXTURE EXAMPLE 12

Self-alignment additives 5 (0.15% by weight), 9 (0.35% by weight) and RM-1 (0.3% by weight) are added to a nematic LC medium H4 of the VA-type (Δε<0) and the mixture is homogenized.

Use in test cells without pre-alignment layer and polymer stabilization are performed like for Mixture Example 2.

Cell area showing vertical orientation: 93%

Low temperature stability (LTS): 1000 h (−20° C.)

MIXTURE EXAMPLE 13

Self-alignment additives 6 (0.15% by weight), 8 (0.35% by weight) and RM-1 (0.3% by weight) are added to a nematic LC medium H4 of the VA-type (Δε<0) and the mixture is homogenized.

Use in test cells without pre-alignment layer and polymer stabilization are performed like for Mixture Example 2.

Cell area showing vertical orientation: 92%

Low temperature stability (LTS): 800 h (−20° C.)

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosure[s] of all applications, patents and publications, cited herein and of corresponding European application No. EP 17208758.7, filed Dec. 20, 2017 are incorporated by reference herein.

The invention claimed is:

1. A liquid-crystal (LC) medium comprising
a low-molecular-weight, non-polymerizable liquid-crystalline component and
a combination of self-alignment additives for vertical alignment selected from the group consisting of formulae IG and IL

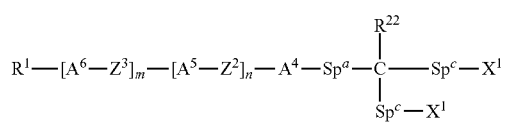
(IG)

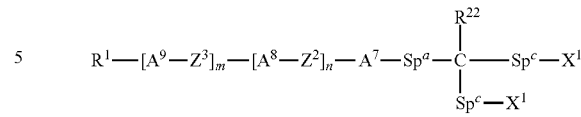
(IL)

combined with one or more compounds selected from the group consisting of formulae IE, IF, IJ and IK $$R^1\text{—}[A^6\text{—}Z^3]_m\text{—}[A^5\text{—}Z^2]_n\text{—}A^4\text{—}Sp^a\text{—}X^1 \quad \text{(IE)}$$

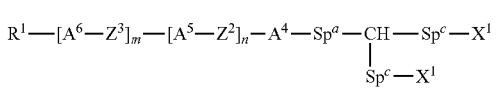
(IF)

$$R^1\text{—}[A^9\text{—}Z^3]_m\text{—}[A^8\text{—}Z^2]_n\text{—}A^7\text{—}Sp^a\text{—}X^1 \quad \text{(IJ)}$$

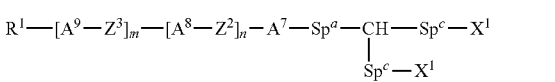
(IK)

in which $A^4, A^5, A^6$ each, independently of one another, denote an aromatic, heteroaromatic, alicyclic or heterocyclic group, which optionally contains fused rings, and which is optionally mono-or polysubstituted by a group L or -Sp-P, $A^7, A^8, A^9$ each, independently of one another, denote an aromatic, heteroaromatic, alicyclic or heterocyclic group, which optionally contains fused rings, and which is optionally mono-or polysubstituted by a group L or -Sp-P, P denotes a polymerizable group, Sp denotes a spacer group or a single bond, wherein formulae IE, IF and IG independently comprise one polymerizable group P each, and wherein formulae IJ, IK and IL independently comprise two or more polymerizable groups P each, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain alkyl, alkoxy, alkylcarbonyl, alkoxycarbonyl, alkylcarbonyloxy or alkoxycarbonyloxy having 1 to 25 C atoms, or branched alkyl, alkoxy, alkylcarbonyl, alkoxycarbonyl, alkylcarbonyloxy or alkoxycarbonyloxy having 3 to 25 C atoms, in which one or more H atoms are each optionally replaced by F or Cl, $Z^2, Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(—Sp-P)—, —CH$_2$CH(—Sp-P)—, or —CH(—Sp-P)CH(—Sp-P)—, n1 denotes 1, 2, 3 or 4, m denotes 0, 1, 2, 3, 4, 5 or 6, n denotes 0 or 1, R$^0$ in each case, independently of one another, denotes alkyl having 1 to 12 C atoms, R$^{00}$ in each case, independently of one another, denotes H or alkyl having 1 to 12 C atoms, R$^1$ denotes H, halogen, straight-chain alkyl having 1 to 25 C atoms, or branched or cyclic alkyl having 3 to 25 C atoms, in which one or more non-adjacent CH$_2$ groups are each optionally replaced by —O—, —S—, —CO—, —CH=CH—, —C≡C—, —CO—O—, —O—CO—, or —O—CO—O— in such a way that O and/or S atoms are not linked directly to one another and in which one or more H atoms are each optionally replaced by F or Cl, or denotes a group -Sp-P, X$^1$ each, independently of one another, denotes —OH, —SH, or —NH$_2$, R$^{22}$ denotes alkyl having 1 to 12 C atoms, and Sp$^a$, Sp$^c$ each, independently of one another, denotes a spacer group or a single bond.

2. The liquid-crystal (LC) medium according to claim 1 comprising any of the following combinations of a first and a second self-alignment additive of formulae:

IE and IG,
IF and IG,
IJ and IG,
IJ and IL,
IK and IL,
IE and IL,
IG and IK, or
IF and IL.

3. The liquid-crystal (LC) medium according to claim 1, wherein said two or more alignment additives each comprise one, two or more polymerizable groups.

4. The liquid-crystal (LC) medium according to claim 1, comprising one or more self-alignment additives selected from the group consisting of formulae IE and IJ and one or more self-alignment additives selected from the group consisting of formulae IG and IL.

5. The liquid-crystal (LC) medium according to claim 1, comprising one or more self-alignment additives of formula IJ and one or more compounds of formula IL.

6. The LC medium according to claim 1, further comprising a polymerizable or polymerized compound other than compounds of formulae IG, IL, IE, IF, IJ and IK, where the polymerized component is obtainable by polymerization of a polymerizable component.

7. The medium according to claim 1, wherein, in any of formulae IG, IL, IE, IF, IJ and IK,

A$^4$, A$^5$, A$^6$, A$^7$, A$^8$, A$^9$, each, independently of one another, denote 1,4-phenylene, naphthalene-1,4-diyl or naphthalene-2,6-diyl, in which one or more CH groups are each optionally replaced by N, cyclohexane-1,4-diyl, in which one or more non-adjacent CH$_2$ groups are each optionally replaced by O or S, 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydro-naphthalene-2,6-diyl, 1,2,3,4-tetrahydronaphthalene-2,6-diyl, indane-2,5-diyl, octahydro-4,7-methanoindane-2,5-diyl, or perhydrocyclopenta[a]phenanthrene-3,17-diyl, where any of which is unsubstituted or mono- or polysubstituted by a group L, and A$^4$ to A$^6$ is optionally substituted by a group -Sp-P, and A$^7$ to A$^9$ is optionally substituted by one, two or three groups -Sp-P.

8. The medium according to claim 1, wherein the compound of formula IJ is a compound of formula IJ1,

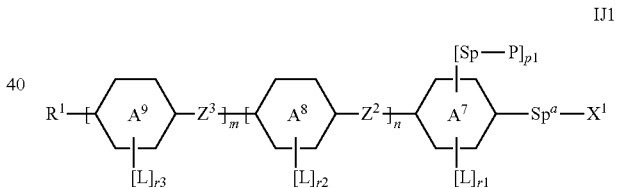

in which

R$^1$, A$^7$, A$^8$, A$^9$, Z$^2$, Z$^3$, m, n, L, Sp$^a$, X$^1$, Sp and P independently are defined as for the compound of formula IJ, p1 is 2, and r1, r2, r3 independently are 0, 1, 2 or 3.

9. The medium according to claim 1, wherein the compound of formula IK is a compound of formula IK1,

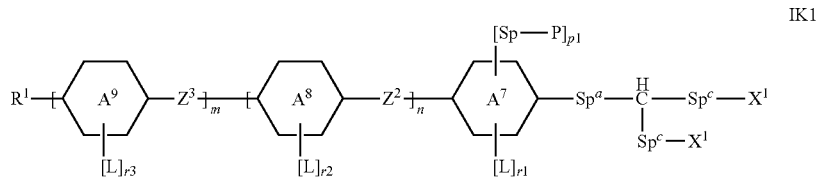

in which
R$^1$, A$^7$, A$^8$, A$^9$, Z$^2$, Z$^3$, m, n, L, Sp$^a$, Sp$^c$, X$^1$, Sp and P independently are defined as for the compound of formula IK,
P$^1$ is 2, and
r1, r2, r3 independently are 0, 1, 2 or 3.
10. The medium according to claim 1, wherein the one or more compounds of formula IJ are compounds of formulae IJ1-1 to IJ1-9:
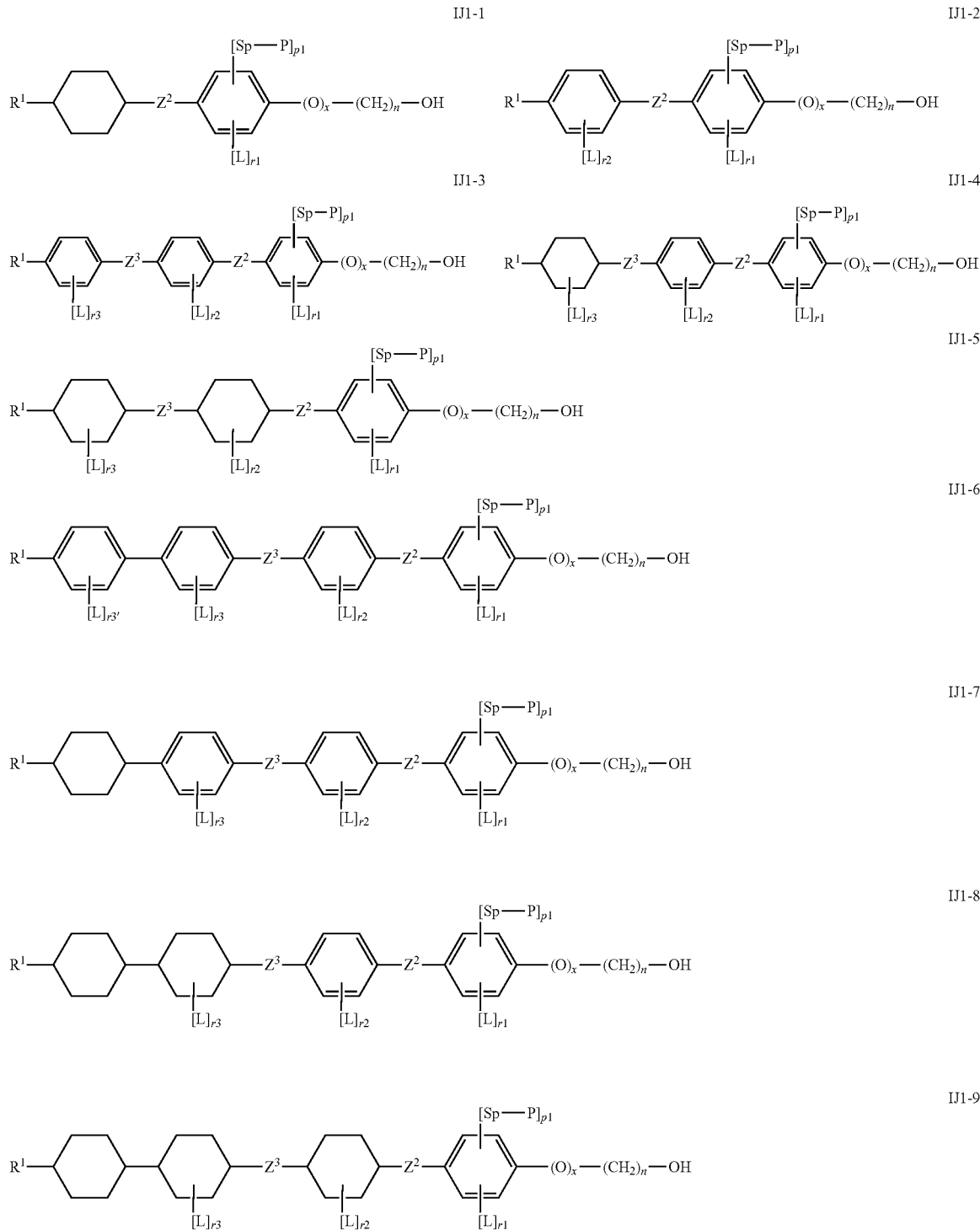

in which R¹, Z², Z³, L, Sp and P independently are as defined as for the compound of formula IJ, and x is 0 or 1, n is 1, 2, 3, 4, 5, 6, 7 or 8, p1 is 2, and r1, r2, r3, r3" independently denote 0, 1, 2 or 3.

11. The medium according to claim 1, wherein the one or more compounds of formula IK are compounds of formulae IK1-1 to IK1-9:

in which R¹, Z², Z³, L, Sp, Spy and P independently are as defined as for the compound of formula IK, and x is 0 or 1, n is 1, 2, 3, 4, 5, 6, 7 or 8, p1 is 2, and r1, r2, r3, r3" independently denote 0, 1, 2 or 3.

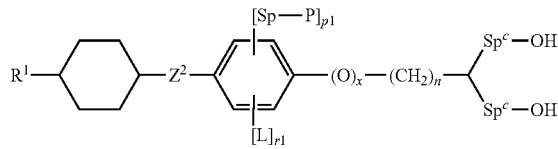

IK1-1

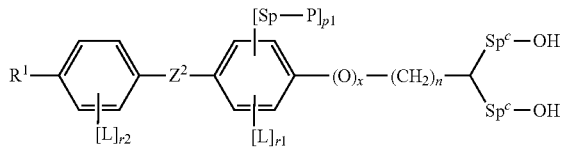

IK1-2

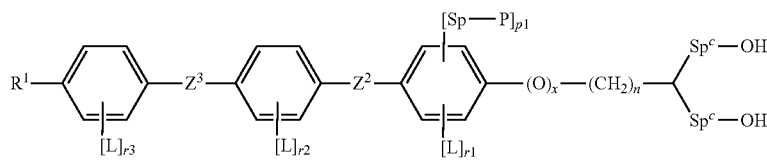

IK1-1

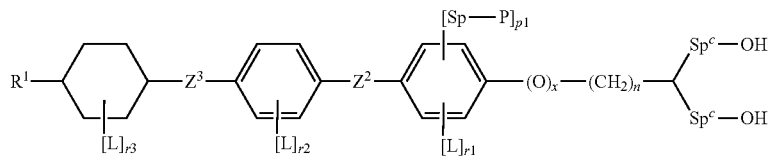

IK1-2

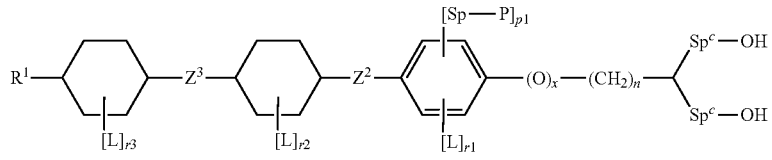

IK1-3

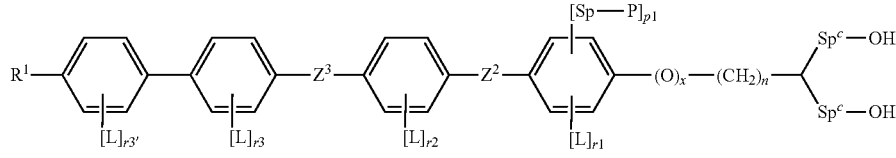

IK1-4

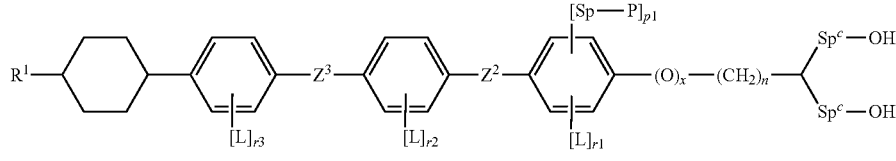

IK1-5

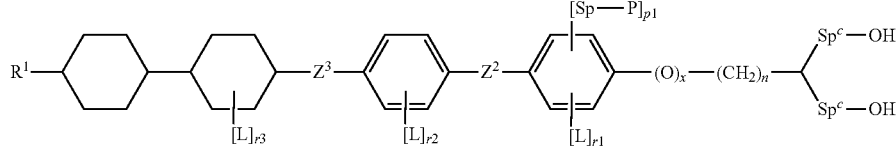

IK1-6

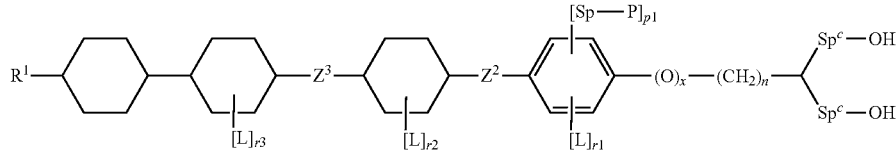

IK1-7

12. The medium according to claim 1, wherein the compound of formula IJ is a compound of formula IJ1,

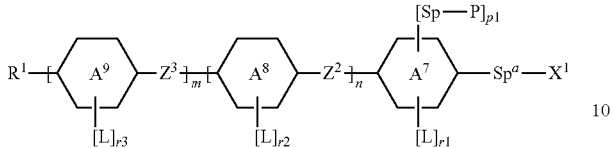

in which
R$^1$, A$^7$, A$^8$, A$^9$, Z$^2$, Z$^3$, m, n, L, Sp$^a$, X$^1$, Sp and P independently are defined as for the compound of formula IJ, p1 is 2, r1, r3 independently are 0, 1, 2 or 3, and r2 is 2, or wherein the compound of formula IK is a compound of formula IK1,

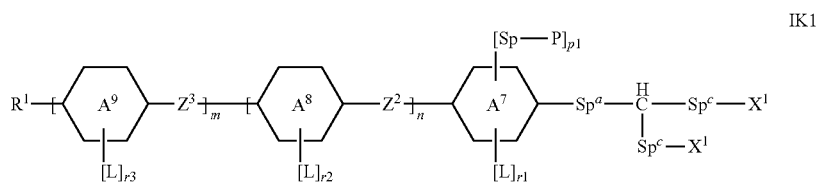

in which
R$^1$, A$^7$, A$^8$, A$^9$, Z$^2$, Z$^3$, m, n, L, Spa, Spy, X$^1$, Sp and P independently are defined as for the compound of formula IK, p1 is 2, r1, r3 independently are 0, 1, 2 or 3, and r2 is 2.

13. The medium according to one or more of claim 1, comprising one or more alignment additives selected from the group consisting of formulae IJ1-3 and IJ 1-7,

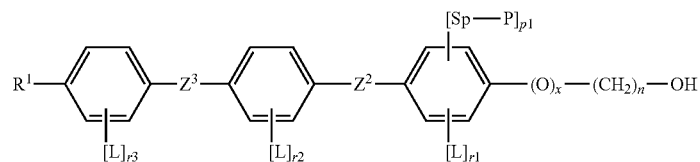

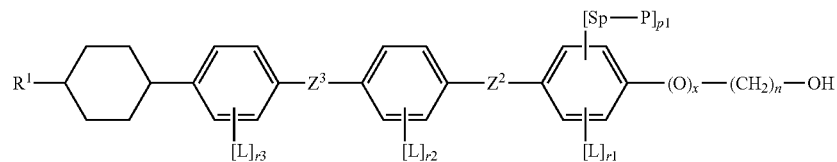

in which

R[1], Z[2], Z[3], L, Sp and P independently are as defined as for the compound of formula IJ, and x is 0 or 1, n is 1, 2, 3, 4, 5, 6, 7 or 8, p1 is 2, and r1, r2, r3 independently denote 0, 1, 2 or 3, and one or more additives selected from the group consisting of formulae IK1-1 and IK1-5

IK1-1
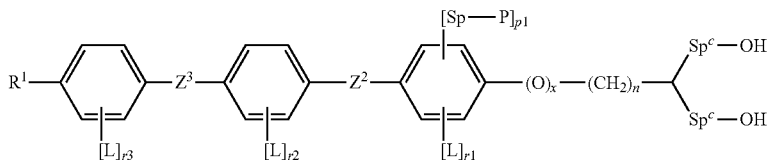

IK1-5
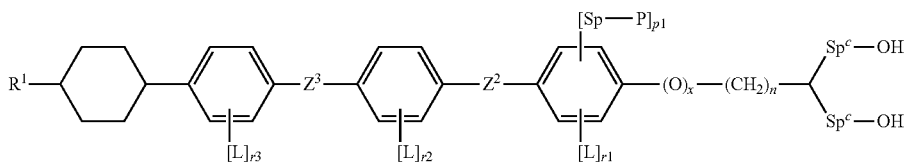

in which

R[1], Z[2], Z[3], L, Sp, Sp$^C$ and P independently are as defined as for the compound of formula IK, and x is 0 or 1, n is 1, 2, 3, 4, 5, 6, 7 or 8, p1 is 2, and r1, r2, r3 independently denote 0, 1, 2 or 3.

14. The medium according to claim 1, wherein for the compounds of formulae IG, IL, IE, IF, IJ and IK the groups Z[2] are single bonds.

15. The medium according to claim 1, which comprises compounds of formula IJ in a concentration of 0.1 or more and less than 0.4% by weight.

16. The medium according to claim 1, which comprises one or more compounds of formula IK in a total concentration of 0.2 or more and less than 0.8% by weight.

17. The medium according to claim 1, which further comprises one or more compounds selected from the group consisting of the compounds of formulae IIA, IIB and IIC:

IIA
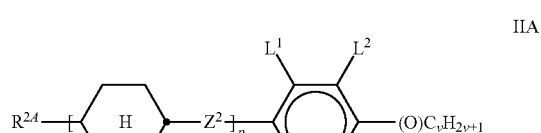

IIB
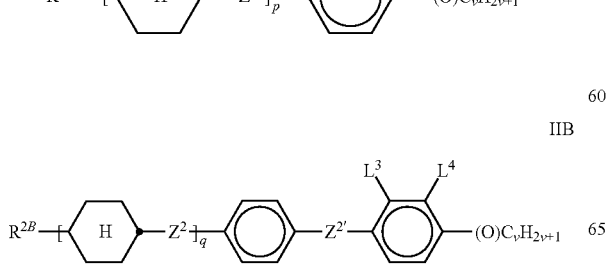

IIC
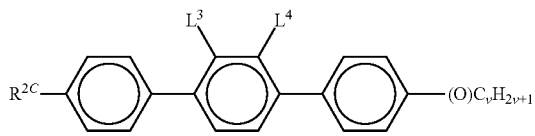

in which

R$^{2A}$, R$^{2B}$ and R$^{2C}$ each, independently of one another, denote H, an alkyl or alkenyl radical having up to 15 C atoms, which is unsubstituted, monosubstituted by CN or CF$_3$ or at least monosubstituted by halogen, in which one or more CH$_2$ groups are optionally replaced by —O—, —S—,

—C≡C—, —CF$_2$O—, —OCF$_2$—, —OC—O— or —O—CO— in such a way that 0 atoms are not linked directly to one another, L$^{1-4}$ each, independently of one another, denote F, Cl, CF$_3$ or CHF$_2$, Z[2] and Z[2'] each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, or —CH=CHCH$_2$O—, P denotes 0, 1 or 2, q denotes 0 or 1, and v denotes 1 to 6.

18. The medium according to claim 1, which additionally comprises one or more polymerizable compounds of formula M or a (co)polymer comprising one or more compounds of formula M:

P$^1$-Sp$^1$-A$^2$-(Z$^1$-A$^1$)$_n$-Sp$^2$-P$^2$    M in which

P$^1$, P$^2$ each independently denote a polymerizable group,

Sp$^1$, Sp$^2$ each independently denote a spacer group,

A$^1$, A$^2$ each, independently of one another, denotes a) trans-1,4-cyclohexylene, 1,4-cyclohexenylene or 4,4"-bicyclohexylene, in which one or more non-adjacent CH$_2$ groups are each optionally replaced by —O— or —S— and in which one or more H atoms are each optionally replaced by a group L, or is

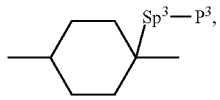

b) 1,4-phenylene or 1,3-phenylene, in which one or two CH groups are each optionally replaced by N and in which one or more H atoms are each optionally replaced by a group L or -Sp³-P,
c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl or selenophene-2,5-diyl, each of which is optionally mono-or polysubstituted by a group L,
d) a saturated, partially unsaturated or fully unsaturated, and optionally substituted, polycyclic radical having 5 to 20 cyclic C atoms, one or more of which are optionally replaced by heteroatoms, $P^3$ denotes a polymerizable group,
$Sp^3$ denotes a spacer group,
n denotes 0, 1, 2 or 3,
$Z^1$ in each case, independently of one another, denotes —CO—O—, —O—CO—, —CH₂O—, —OCH₂—, —CF₂O—, —OCF₂—, —(CH₂)$_{n*}$—where n* is 2, 3 or 4, —O—, —CO—, —C($R^cR^d$)—, —CH₂CF₂—, —CF₂CF₂— or a single bond,
L on each occurrence, identically or differently, denotes F, Cl, CN, SCN, $SF_5$ or a straight-chain or branched, in each case optionally fluorinated, alkyl, alkoxy, alkylcarbonyl, alkoxy-carbonyl, alkylcarbonyloxy or alkoxycarbonyloxy having 1 to 12 C atoms, or a branched, in each case optionally fluorinated, alkyl, alkoxy, alkylcarbonyl, alkoxycarbonyl, alkylcarbonyloxy or alkoxycarbonyloxy having 3 to 12 C atoms,
$R^c$ and $R^d$ each, independently of one another, denote H, F, $CF_3$, or alkyl having 1 to 6 C atoms,
where one or more of the groups $P^1$-$Sp^1$-, -$Sp^2$-$P^2$ and -$Sp^3$-$P^3$ optionally denote a radical $R^{aa}$, with the proviso that at least one of the groups $P^1$-$Sp^1$-, -$Sp^2$-$P^2$ and -$Sp^3$-$P^3$ present does not denote $R^{aa}$,
$R^{aa}$ denotes H, F, Cl, CN or straight-chain alkyl having 1 to 25 C atoms, or branched alkyl having 3 to 25 C atoms, in which one or more non-adjacent $CH_2$ groups are each optionally replaced, independently of one another, by)C($R^0$)=C($R^{00}$) -, —C≡C—, —O—, —S—, —CO—, —CO—O—, —O—CO—, or —O—CO—O— in such a way that 0 and/or S atoms are not linked directly to one another, and in which one or more H atoms are each optionally replaced by F, Cl or CN, and $R^0$, $R^{00}$ each, independently of one another, denote H, F or straight-chain alkyl having 1 to 12 C atoms, or branched alkyl having 3 to 12 C atoms, in which one or more H atoms are each optionally replaced by F.

19. The medium according to claim 18, wherein the polymerizable or polymerized component comprises 0.01 to 1.5% by weight of one or more compounds of formula M.

20. A liquid-crystal (LC) display comprising an LC cell having two substrates and at least two electrodes, where at least one substrate is transparent to light and at least one substrate has one or two electrodes, and having a layer of an LC medium according to claim 1 located between the substrates, where the combination of self-alignment additives for vertical alignment are selected from the group consisting of two or more of formulae IE, IF, IG, IJ, IK and IL for affecting homeotropic alignment of the LC medium with respect to the substrate surfaces.

21. The display according to claim 20, wherein at least one of the substrates has no alignment layer.

22. The display according to claim 20, wherein one or two of the substrates is coated with indium-tin oxide.

23. The display according to claim 20, which is a VA display containing an LC medium having negative dielectric anisotropy and electrodes arranged on opposite substrates.

24. A process for preparing a liquid-crystal medium, comprising mixing a combination of self-alignment additives for vertical alignment selected from the group consisting of two or more of formulae IE, IF, IG, IJ, IK and IL according to claim 1 with a low-molecular-weight liquid-crystalline component, and optionally adding one or more polymerizable compounds, and/or other additives.

25. A method for affecting homeotropic alignment of a liquid-crystal medium with respect to a surface delimiting the liquid-crystal medium, comprising adding to said medium a combination of self-alignment additives for vertical alignment selected from the group consisting of two or more of formulae IE, IF, IG, IJ, IK and IL according to claim 1 and optionally polymerizing the same.

26. A process for preparing an LC display comprising an LC cell having two substrates and at least two electrodes, where at least one substrate is transparent to light and at least one substrate has one or two electrodes, said process comprising
filling the cell with a liquid-crystal medium according to claim 1, where homeotropic alignment of the liquid-crystal medium with respect to the substrate surfaces is established,
optionally heating the medium, and
optionally polymerizing the polymerizable component(s), optionally with application of a voltage to the cell or under the action of an electric field.

27. The medium according to claim 1, wherein $R^{22}$ denotes alkyl having 2 to 5 C atoms.

* * * * *